(12) United States Patent
Hirschmann et al.

(10) Patent No.: US 12,305,103 B2
(45) Date of Patent: May 20, 2025

(54) LIQUID-CRYSTAL MEDIUM

(71) Applicant: MERCK PATENT GMBH, Darmstadt (DE)

(72) Inventors: Harald Hirschmann, Darmstadt (DE); Ewgenij Wakaresko, Darmstadt (DE)

(73) Assignee: MERCK PATENT GMBH, Darmstadt (DE)

(*) Notice: Subject to any disclaimer, the term of this patent is extended or adjusted under 35 U.S.C. 154(b) by 0 days.

(21) Appl. No.: 17/142,835

(22) Filed: Jan. 6, 2021

(65) Prior Publication Data

US 2021/0222067 A1 Jul. 22, 2021

(30) Foreign Application Priority Data

Jan. 7, 2020 (EP) ..................... 20150435

(51) Int. Cl.
*G02F 1/1333* (2006.01)
*C09K 19/06* (2006.01)
*C09K 19/30* (2006.01)
*C09K 19/34* (2006.01)
*C09K 19/04* (2006.01)

(52) U.S. Cl.
CPC ........ *C09K 19/3405* (2013.01); *C09K 19/065* (2013.01); *C09K 19/3003* (2013.01); *C09K 19/3028* (2013.01); *C09K 19/3491* (2013.01); *C09K 2019/0466* (2013.01); *C09K 2019/301* (2013.01); *C09K 2019/3016* (2013.01); *C09K 2019/3037* (2013.01); *C09K 2019/3408* (2013.01)

(58) Field of Classification Search
CPC .................................. C09K 19/3003
See application file for complete search history.

(56) References Cited

U.S. PATENT DOCUMENTS

| | | |
|---|---|---|
| 9,512,102 B2 | 12/2016 | Reiffenrath et al. |
| 10,017,695 B2 | 7/2018 | Lietzau et al. |
| 11,008,515 B2 | 5/2021 | Hirschmann et al. |
| 2015/0299161 A1* | 10/2015 | Reiffenrath .......... C07D 333/76 252/299.61 |
| 2016/0230092 A1 | 8/2016 | Li et al. |
| 2016/0298034 A1 | 10/2016 | Lietzau et al. |
| 2017/0362506 A1* | 12/2017 | Hirschmann .......... C09K 19/32 |
| 2018/0371318 A1* | 12/2018 | Adlem ................ C09K 19/3402 |
| 2019/0031958 A1 | 1/2019 | Xue et al. |
| 2019/0110636 A1 | 4/2019 | Webster |
| 2019/0161679 A1* | 5/2019 | Hirschmann .......... C09K 19/32 |
| 2019/0345390 A1 | 11/2019 | Zai et al. |
| 2020/0032143 A1 | 1/2020 | Takata |
| 2020/0102499 A1 | 4/2020 | Engel et al. |
| 2020/0199451 A1 | 6/2020 | Sakamoto et al. |

FOREIGN PATENT DOCUMENTS

| | | | |
|---|---|---|---|
| CN | 110300746 A | 10/2019 | |
| DE | 102018009037 A1 | 5/2019 | |
| EP | 3085753 A1 | 10/2016 | |
| EP | 2937342 B1 | 11/2016 | |
| EP | 3628721 A1 | 4/2020 | |
| TW | 201912767 A | 4/2019 | |
| TW | 201920623 A | 6/2019 | |
| TW | 201928025 A | 7/2019 | |
| WO | WO-2017102053 A2 * | 6/2017 | .......... C07C 69/734 |
| WO | 2019107394 A1 | 6/2019 | |

OTHER PUBLICATIONS

European Search Report EP21150447 dated May 25, 2021 (pp. 1-6).
Search report in corresponding EP 21150447.7 dated Apr. 5, 2023 (pp. 1-4).
Office Action in corresponding China application 202110016064.0 dated Dec. 14, 2023 (pp. 1-10).
Taiwan Office Action dated Aug. 21, 2024, Issued in corresponding application No. TW 110100588 (pp. 1-4).
International Search Report dated Jul. 22, 2024, Issued in corresponding application No. TW 110100588 (p. 5).

* cited by examiner

*Primary Examiner* — Geraldina Visconti
(74) *Attorney, Agent, or Firm* — Csaba Henter; MILLEN, WHITE, ZELANO & BRANIGAN

(57) ABSTRACT

A liquid crystal medium having negative dielectric anisotropy and containing one or more compounds of formulae B and C and one or more compounds of formula G

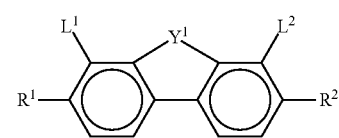

B

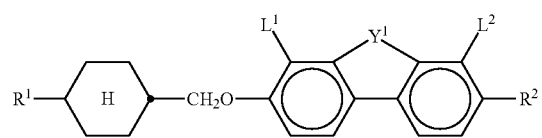

C

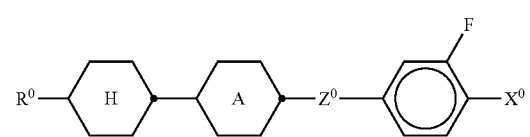

G and the use thereof for an active-matrix display, in particular based on the VA, SA-VA, IPS, PS-IPS, FFS, PS-FFS, UB-FFS or PS-UB-FFS effect.

13 Claims, No Drawings

LIQUID-CRYSTAL MEDIUM

The invention relates to a liquid-crystalline medium, in particular based on a mixture of polar compounds, and to the use thereof for an active-matrix display, in particular based on the VA, SA-VA, IPS, PS-IPS, FFS, PS-FFS, UB-FFS or PS-UB-FFS effect.

Media of this type can be used, in particular, for electro-optical displays having active-matrix addressing based on the ECB effect and for IPS (in-plane switching) displays or FFS (fringe field switching) displays.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\varepsilon \leq -0.5$ in order to be suitable for use in high-information display elements based on the ECB effect. Electro-optical display elements based on the ECB effect have a homeotropic edge alignment (VA technology=vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements.

Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:

1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris;

STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

There thus continues to be a great demand for MLC displays having very high specific resistance at the same time as a large working-temperature range, short response times and a low threshold voltage with the aid of which various grey shades can be produced.

The disadvantage of the frequently-used MLC-TN displays is due to their comparatively low contrast, the relatively high viewing-angle dependence and the difficulty of generating grey shades in these displays.

VA displays have significantly better viewing-angle dependencies and are therefore principally used for televisions and monitors. However, there continues to be a need here to improve the response times, in particular with respect to the use of televisions having frame rates (image change frequency/repetition rates) of greater than 60 Hz. At the same time, however, the properties, such as, for example, the low-temperature stability, must not be impaired.

High transmittance mobile applications are often using the UB-FFS mode. For additional power saving, lower frequency addressing is effectively used. This may, however, cause an undesired effect known as flicker, which is a time dependent variation in brightness, i.e. the brightness fluctuates during the charging and holding periods in display operation. More precisely, flicker is defined as the difference in transmittance between the positive and the negative frame divided by the average transmittance. It becomes more pronounced the lower the addressing frequency.

The main reasons causing flicker include generation of residual DC charge for example due to impurities, an asymmetric voltage between the electrodes or a flexoelectric contribution in the FFS electrode structure layout. The flicker induced by the flexoelectric effect can be evaluated by the so-called white flicker method as described in the example section.

Another problem is the occurrence of image sticking (or image burn), wherein the image produced in the LC display by temporary addressing of individual pixels still remains visible even after the electric field in these pixels has been switched off or after other pixels have been addressed. This can be evaluated by measuring the easy axis shift, which indicates the difference between the initial off-state orientation direction of the LC molecules relative to the substrate and their off-state orientation after several addressing cycles.

The invention is based on the object of providing liquid-crystal mixtures, in particular for monitor and TV applications, which are based on the ECB effect or on the IPS or FFS effect, which do not have the above-mentioned disadvantages or only do so to a reduced extent. In particular, it must be ensured for monitors and televisions that they also operate at extremely high and extremely low temperatures and at the same time have short response times and at the same time have improved reliability behaviour, in particular have no or significantly reduced image sticking after long operating times, and have reduced flicker.

This object was achieved by providing an LC medium as described and claimed hereinafter, wherein one or more compounds of formula B and/or C having a negative dielectric anisotropy are used in combination with one or more compounds of formula G with a terminal 3,4-difluorophenyl group having a positive dielectric anisotropy (hereinafter also referred to as "positive polar compounds"). It was surprisingly found that, compared to LC media not containing any positive polar compounds or containing different positive polar compounds, the LC media according to the present invention show reduced flicker while maintaining other desired properties like short response times, high transmittance and low threshold voltage.

The use of an LC mixture as disclosed and claimed hereinafter having negative dielectric anisotropy surprisingly results in very low rotational viscosities and in a reduction in the ratio of rotational viscosity and elastic constants, while maintaining a high reliability and high VHR values also after UV exposure, and at the same time show reduced flicker. Liquid-crystal mixtures, preferably VA, PS (=polymer stabilised)-VA, SA (=self alignment)-VA, IPS, PS-IPS, PS-FFS, FFS mixtures, in particular UB-FFS (ultra brightness fringe field switching) or PS-UB-FFS mixtures, which have short response times and good reliability, and at the same time good phase properties and good low-temperature behaviour can therefore be prepared.

SUMMARY OF THE INVENTION

The invention relates to a liquid crystal (LC) medium having negative dielectric anisotropy and comprising one or more compounds selected from the group consisting of formulae B and C and one or more compounds of formula G

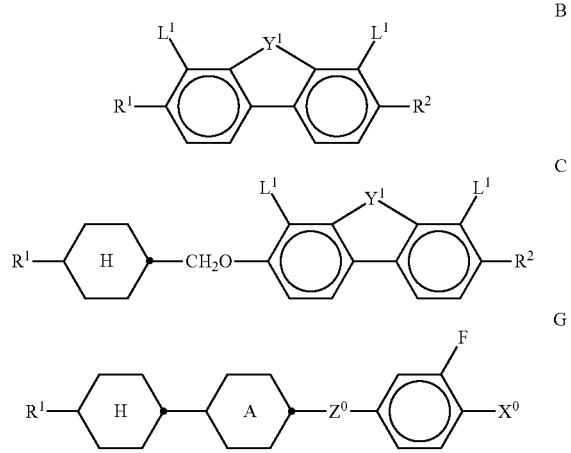

in which the individual radicals, on each occurrence identically or differently, and each, independently of one another, have the following meaning:

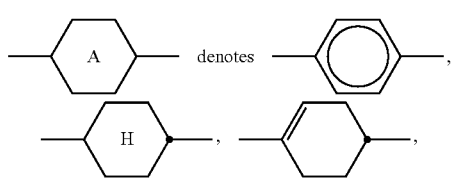

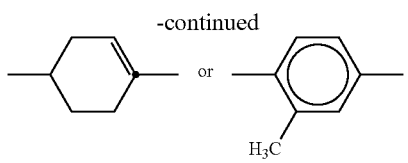

$R^0$, $R^1$, $R^2$ denote a straight chain or branched alkyl or alkoxy radical having 1 to 15 C atoms, where one or more $CH_2$ groups in these radicals may each be replaced, independently of one another, by

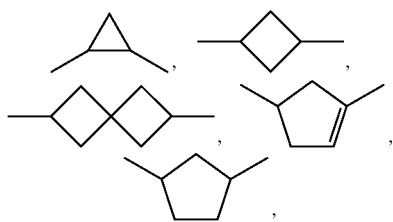

—C≡C—, —$CF_2O$—, —$OCF_2$—, —CH=CH—, —O—, —CO—O— or —O—CO— in such a way that O atoms are not linked directly to one another, and in which, in addition, one or more H atoms may be replaced by halogen, preferably by F, $L^1$, $L^2$ denote F or Cl, preferably F, $X^0$ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms, $Y^1$ denotes O, S or $CH_2O$, $Z^0$ denotes —$C_2H_4$—, —$CH_2O$—, $CF_2O$, —CH=CH— or a single bond.

The invention further relates to the use of an LC medium as described above and below for electro-optical purposes, in particular for the use in shutter glasses, for 3D applications, or in VA, PS-VA, SA-VA, IPS, PS-IPS, FFS, PS-FFS, UB-FFS or PS-UB-FFS displays.

The invention further relates to an electro-optical LC display containing an LC medium as described above and below, in particular an VA, PS-VA, SA-VA, IPS, PS-IPS, FFS, PS-FFS, UB-FFS or PS-UB-FFS display.

The invention furthermore relates to a process for preparing an LC medium as described above and below, comprising the steps of mixing one or more compounds selected from formula B and/or formula C with one or more compounds of formula G and optionally further LC compounds and optionally one or more additives.

The LC media according to the invention preferably exhibit very broad nematic phase ranges having clearing points 70° C., preferably 74° C., very favourable values for the capacitive threshold, relatively high values for the holding ratio and at the same time very good low-temperature stabilities at −20° C. and −30° C., as well as very low rotational viscosities and short response times.

The LC media according to the invention are furthermore distinguished by the fact that, in addition to the improvement in the rotational viscosity $\gamma_1$, high reliability and high VHR values, even after UV exposure, can be achieved.

The LC media according to the invention are furthermore distinguished by the fact that, in addition to the improvement in the rotational viscosity $\gamma_1$, relatively high values of the elastic constant $K_3$ for improving the response times can be observed. In particular, the mixtures according to the invention have a particularly low value for the ratio $\gamma_1/K_3$ of rotational viscosity $\gamma_1$ and elastic constant $K_3$, which is an indicator of a fast response time.

In the compounds of formula B, C and G, $R^0$, $R^1$ and $R^2$ denote preferably alkyl, alkoxy, oxaalkyl or alkoxyalkyl having 1 to 9, preferably 1 to 6, C atoms or alkenyl or alkenyloxy having 2 to 9, preferably 2 to 6, C atoms, all of which are optionally fluorinated or an cycloalkyl ring having 3, 4 or 5 carbon atoms.

In the compounds of formula B and C $R^1$ and $R^2$ denote preferably alkyl or alkoxy with 1 to 6 C atoms which is preferably straight-chain.

Preferred compounds of formula B are selected from the following subformulae:

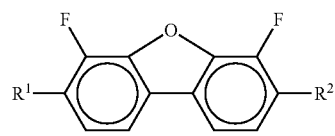

B1

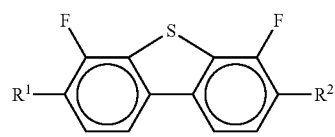

B2 wherein $R^1$ and $R^2$ have one of the meanings given in formula B and preferably denote straight-chain alkoxy having 1-6 C atoms, very preferably ethoxy, propoxy, butoxy, pentoxy or hexoxy. $R^1$ denotes very preferably ethoxy or propoxy, most preferably propoxy. $R^2$ denotes very preferably ethoxy, propoxy, butoxy, pentoxy or hexoxy, most preferably butoxy, pentoxy or hexoxy.

Very preferred are compounds of formula B2.

Very preferred compounds of formula B are selected from the following subformulae:

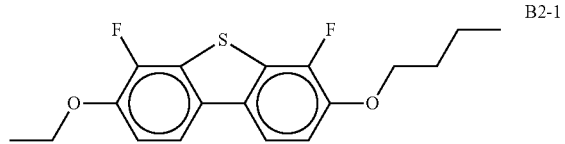

B2-1

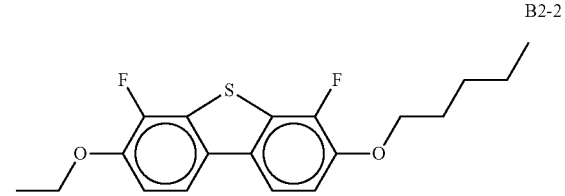

B2-2

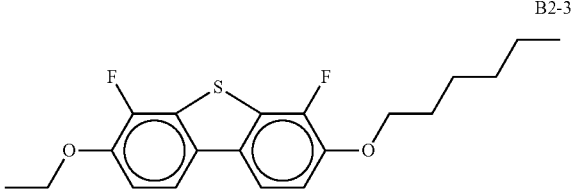

B2-3

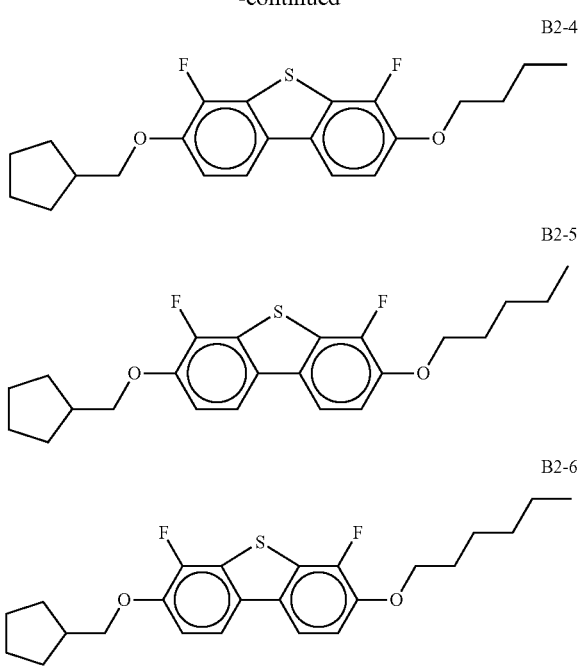

B2-4

B2-5

B2-6

Preferred compounds of formula C are selected from the following subformulae:

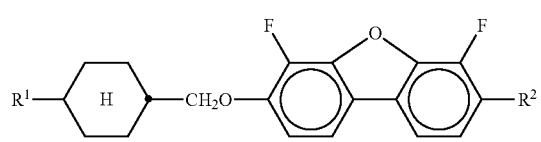

C1

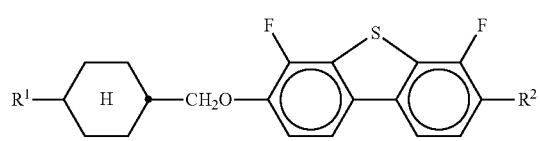

C2 wherein $R^1$ and $R^2$ have one of the meanings given in formula B. $R^1$ preferably denotes straight-chain alkyl having 1-6 C atoms, a cyclopentyl ring, a cyclopropyl ring, very preferably ethyl, propyl, butyl, pentyl or hexyl, most preferably ethyl, and $R^2$ preferably denotes straight-chain alkoxy having 1-6 C atoms, very preferably ethoxy, propoxy, butoxy, pentoxy or hexoxy, most preferably butoxy, pentoxy or hexoxy.

Very preferred are compounds of formula C2.

Very preferred compounds of formula C are selected from the following subformulae:

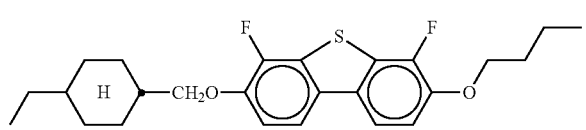

C2-1

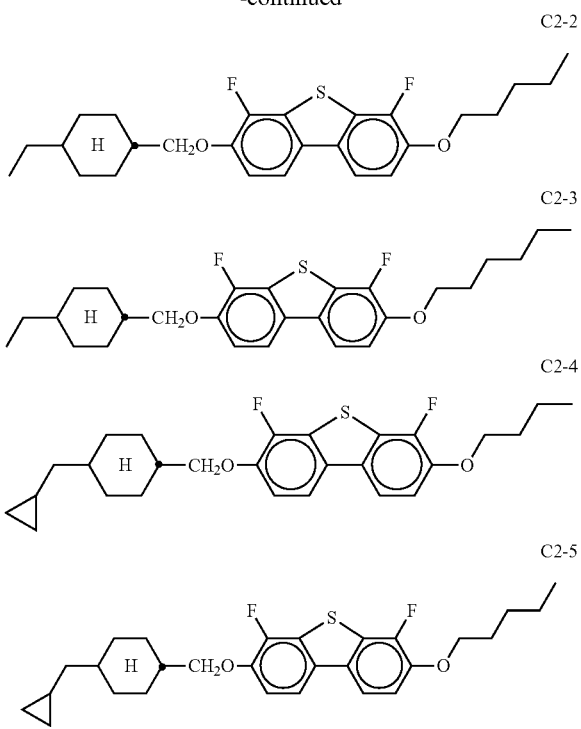

C2-2

C2-3

C2-4

C2-5

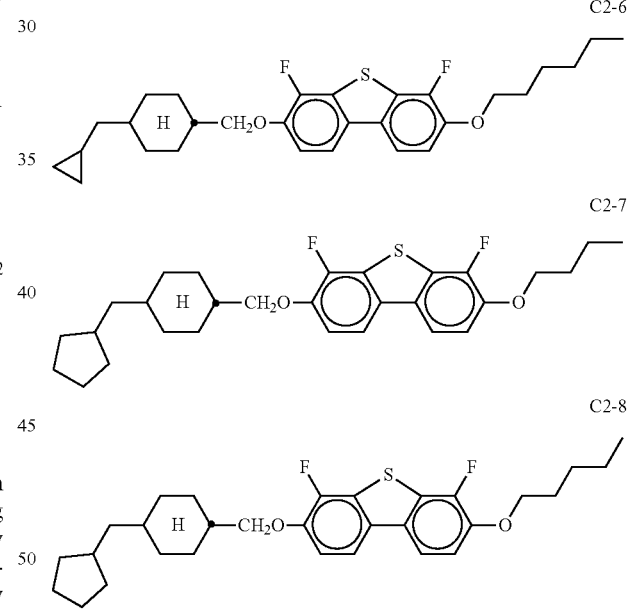

C2-6

C2-7

C2-8

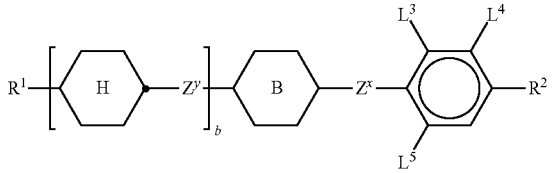

C2-9

Preferably the LC medium contains one or more compounds selected from the group consisting of formulae B1, B2 and C2.

Preferably the LC medium contains 1, 2 or 3 compounds of formula B and/or C or their subformulae.

Very preferably the LC medium contains one or more compounds of formula B2 and/or one or more compounds of formula C2.

Preferably the total proportion of the compounds of formula B and its subformulae in the LC medium is from 2 to 20%, very preferably from 7 to 14% by weight.

Preferably the total proportion of the compounds of formula B1 and its subformulae in the LC medium is from 2 to 8%, very preferably from 3 to 5% by weight.

Preferably the total proportion of the compounds of formula B2 and its subformulae in the LC medium is from 2 to 20%, very preferably from 7 to 14% by weight.

Preferably the total proportion of the compounds of formula C and its subformulae in the LC medium is from 2 to 20%, very preferably from 8 to 12% by weight.

In the compounds of formula G, $R^0$ denotes preferably alkyl with 1 to 6 C atoms or alkenyl with 2 to 6 C atoms which are preferably straight-chain.

In the compounds of formula G, $X^0$ is preferably F, Cl or a mono- or polyfluorinated alkyl or alkoxy radical having 1, 2 or 3 C atoms or a mono- or polyfluorinated alkenyl radical having 2 or 3 C atoms. $X^0$ is more preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF2$, $OCClFCF_2CF_3$, $OCH=CF_2$ or $CH=CF_2$, very preferably F or $OCF_3$, furthermore $CF_3$, $OCF=CF_2$, $OCHF_2$ or $OCH=CF_2$, very particularly preferably F, $OCF_3$ or $CF_3$, most preferably F.

Preferred compounds of formula G are selected from the following subformulae:

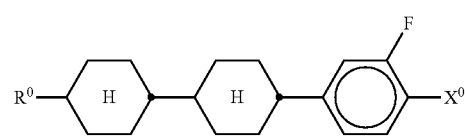

G1

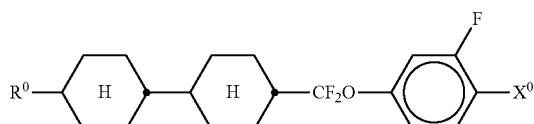

G2

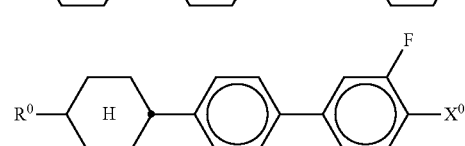

G3

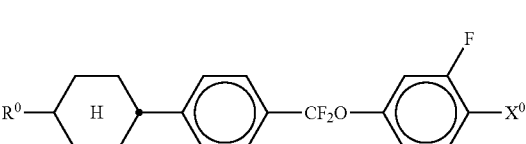

G4

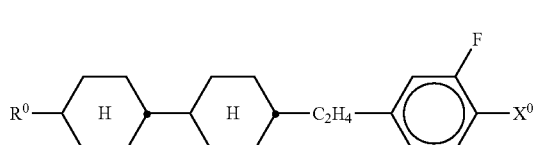

G5

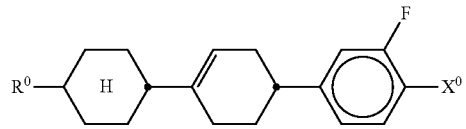

G6

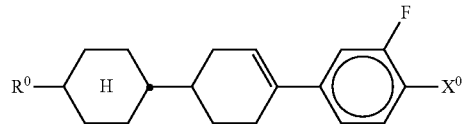

G7 wherein $R^0$ has one of the meanings given in formula G and preferably denotes straight-chain alkyl having 1-6 C atoms, very preferably ethyl, propyl, or butyl, or straight-chain alkenyl with 2 to 6 C atoms very preferably vinyl or 1-propenyl, most preferably vinyl, and $X^0$ has one of the meanings given in formula G and preferably denotes F, $CF_3$ or $OCF_3$, very preferably F.

Very preferred compounds of formula G are selected from the following subformulae:

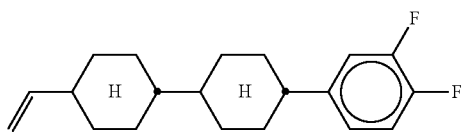

G1-1

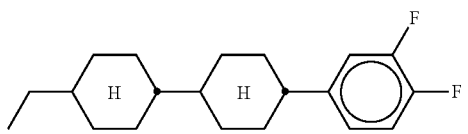

G1-2

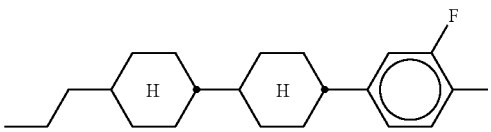

G1-3

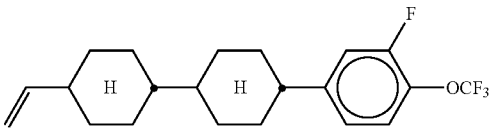

G1-4

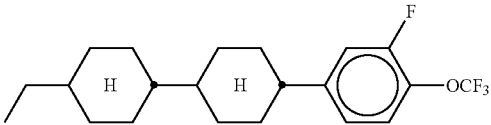

G1-5

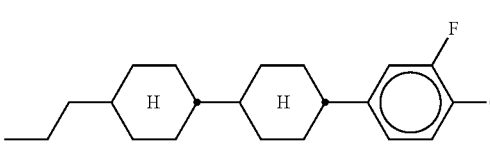

G1-6

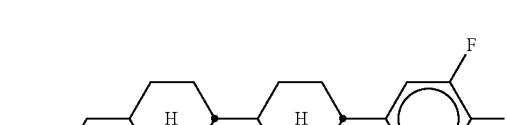

G1-7

G1-8
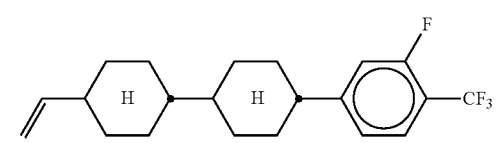
G1-9
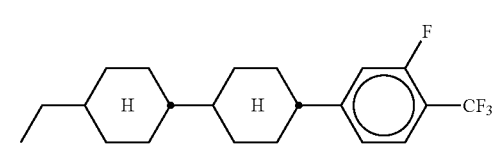
G1-10
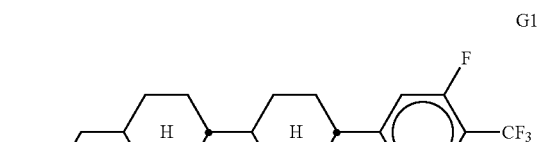
G1-11
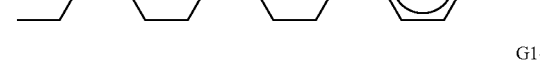
G2-1
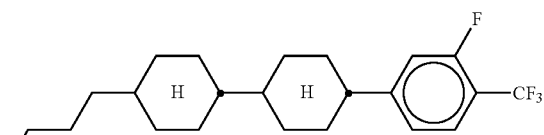
G2-2
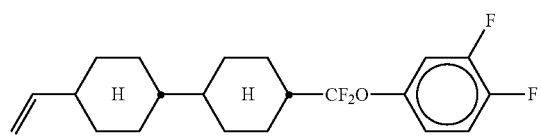
G2-3
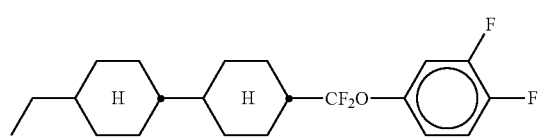
G3-1
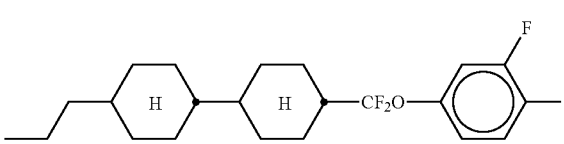
G3-2
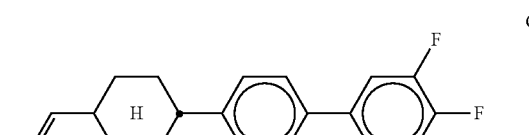
G3-3
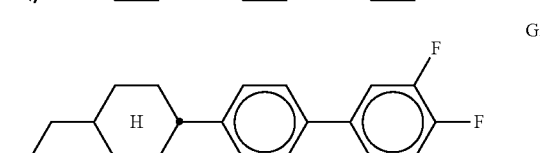
G3-4
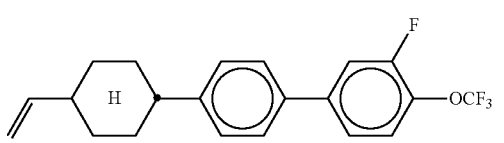
G3-5
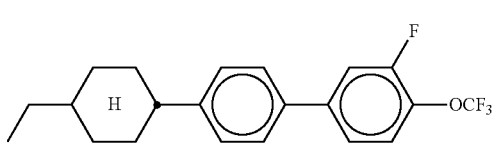
G3-6
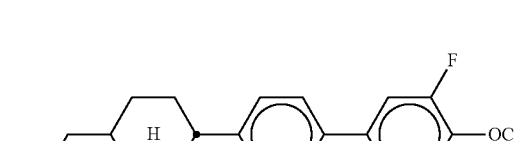
G4-1
G4-2
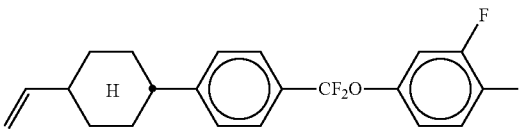
G4-3
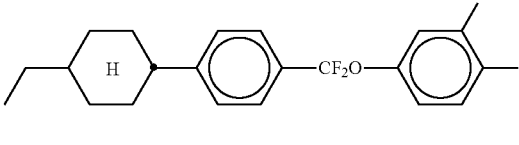
G5-1
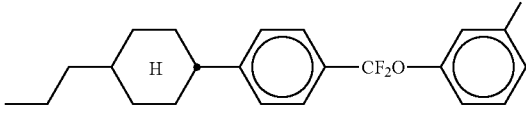
G5-2
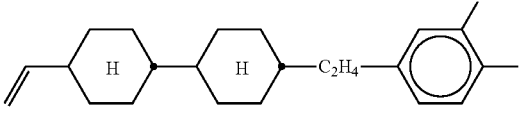
G5-3
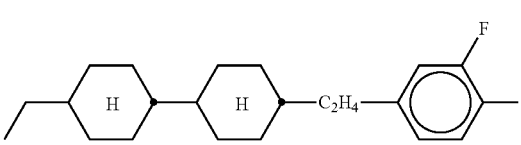
G6-1
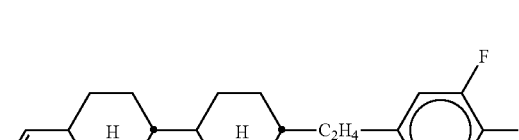

-continued

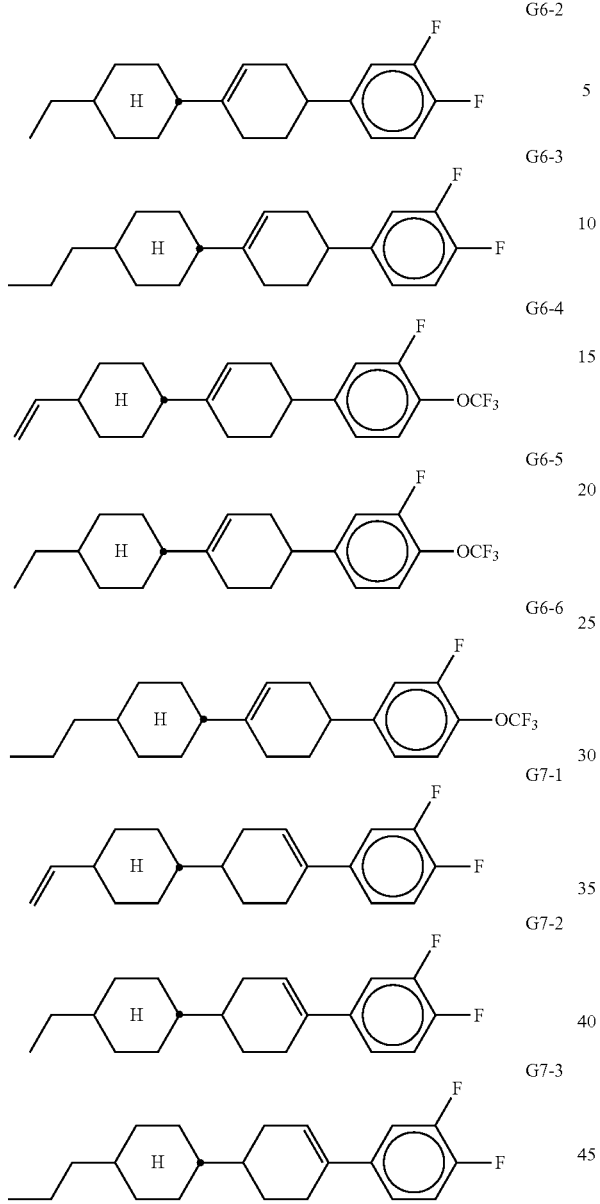

G6-2

G6-3

G6-4

G6-5

G6-6

G7-1

G7-2

G7-3

Preferably the LC medium contains one or more compounds selected from the group consisting of formulae G1-1, G1-3, G2-1 and G2-3.

Preferably the LC medium contains 1, 2 or 3 compounds of formula G or its subformulae.

Preferably the total proportion of the compounds of formula G and its subformulae in the LC medium is from 2 to 20%, very preferably from 4 to 10% by weight.

In the LC medium according to the present invention, by using the compounds of formula B and/or C in combination with compounds of formula G one or more of the following advantages could be achieved:
high transmittance,
high contrast ratio,
reduced image sticking,
reduced ODF (one drop filling) mura,
high reliability and high VHR value after UV exposure and/or heat treatment,
high birefringence,
reduced rotational viscosity
faster response times,
reduced white flicker,
lower easy axis shift $\Delta\Phi$.

Further preferred embodiments of the LC medium according to the present invention are listed below, including any combination thereof:

a) The LC medium comprises one or more compounds of the formula CY and/or PY:

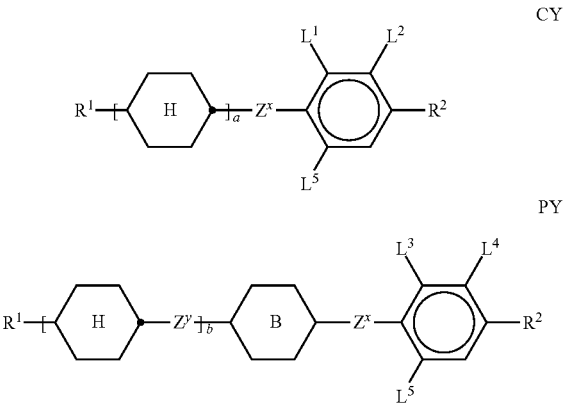

CY

PY wherein
a denotes 1 or 2,
b denotes 0 or 1,

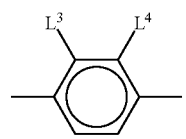

denotes

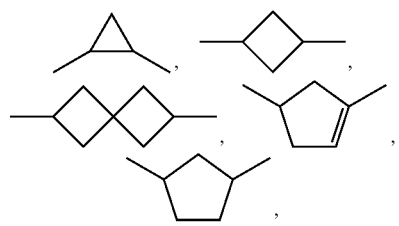

or $R^1$ and $R^2$ each, independently of one another, denote alkyl having 1 to 12 C atoms, where, in addition, one or two non-adjacent $CH_2$ groups may be replaced, independently of one another, by

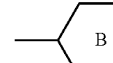

—O—, —CH=CH—, —CO—, —OCO— or —COO— in such a way that O atoms are not linked directly to one another, and in which, in addition, one or more H atoms may be replaced by halogen, preferably by F,
preferably $R^1$ and $R^2$ denote alkyl or alkoxy having 1 to 6 C atoms,
$Z^x$ and $Z^y$ each, independently of one another,
denote —$CH_2CH_2$—, —CH=CH—, —$CF_2O$—, —$OCF_2$—, —$CH_2O$—, —$OCH_2$—, —CO—O—, —O—CO—, —C$_2$F$_4$—, —CF=CF—, —CH=CH—CH$_2$O— or a single bond, preferably a single bond, L$^{1-4}$ each, independently of one another, denote F, Cl, OCF$_3$, CF$_3$, CH$_3$, CH$_2$F, CHF$_2$, and L$^5$ denotes H or CH$_3$.

Preferably, both L$^1$ and L$^2$ denote F or one of L$^1$ and L$^2$ denotes F and the other denotes Cl, or both L$^3$ and L$^4$ denote F or one of L$^3$ and L$^4$ denotes F and the other denotes Cl. L$^5$ preferably denotes H.

The compounds of the formula CY are preferably selected from the group consisting of the following sub-formulae:

CY1
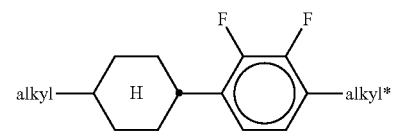

CY2
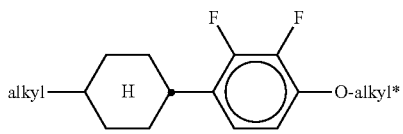

CY3
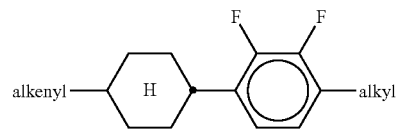

CY4
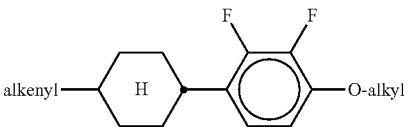

CY5
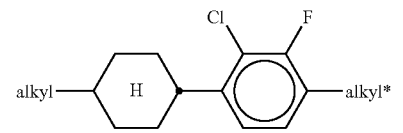

CY6
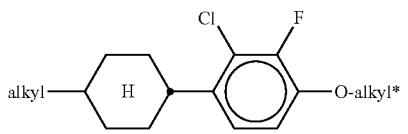

CY7
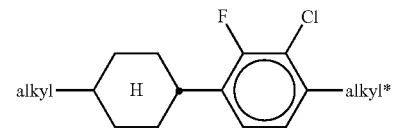

CY8
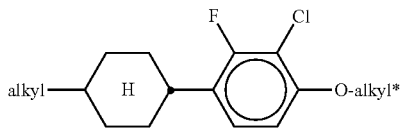

CY9
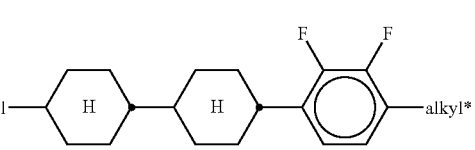

-continued

CY10
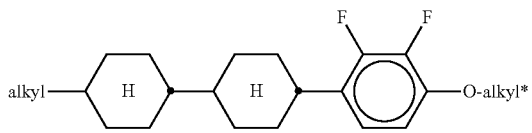

CY11
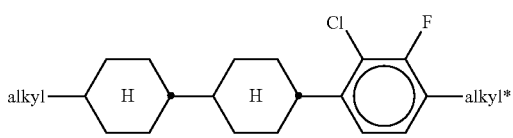

CY12
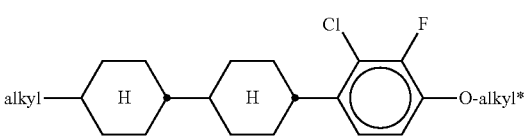

CY13
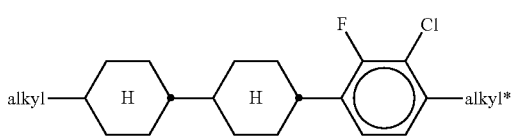

CY14
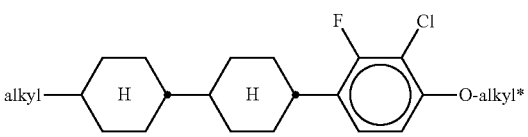

CY15
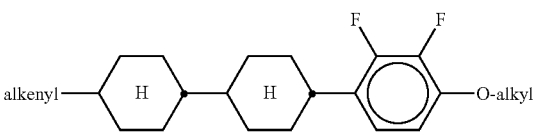

CY16
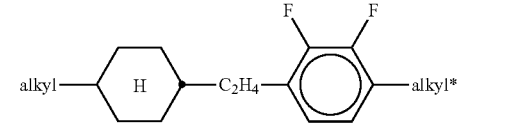

CY17
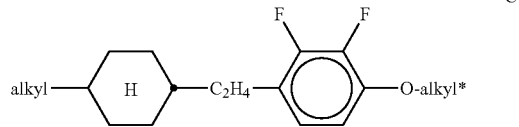

CY18
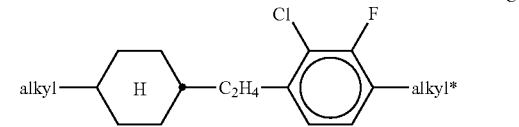

CY19
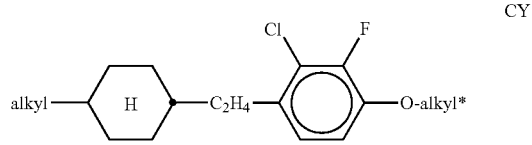

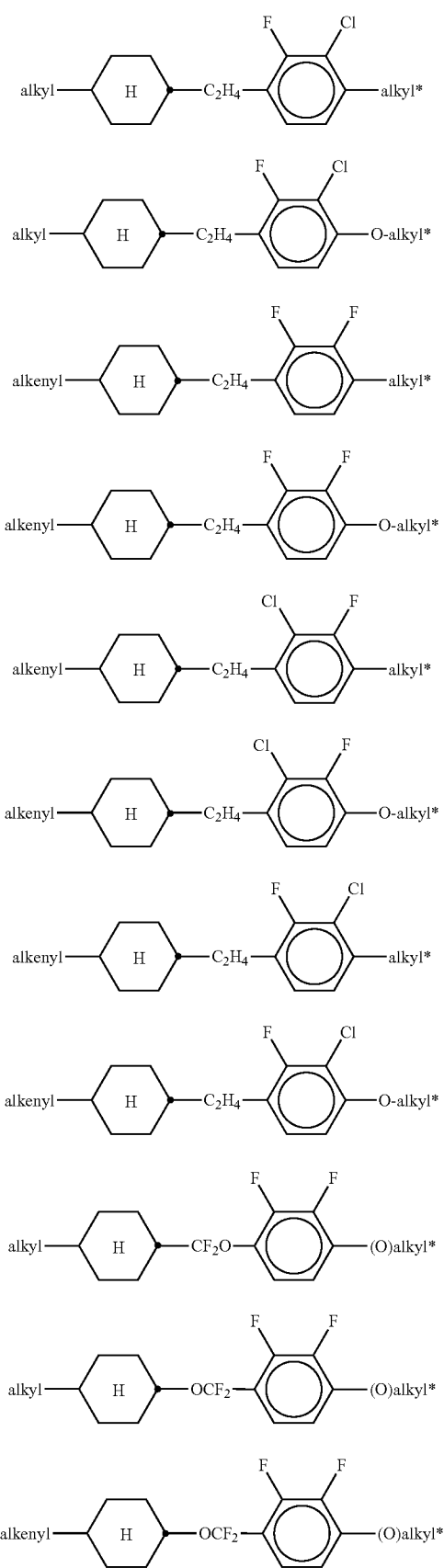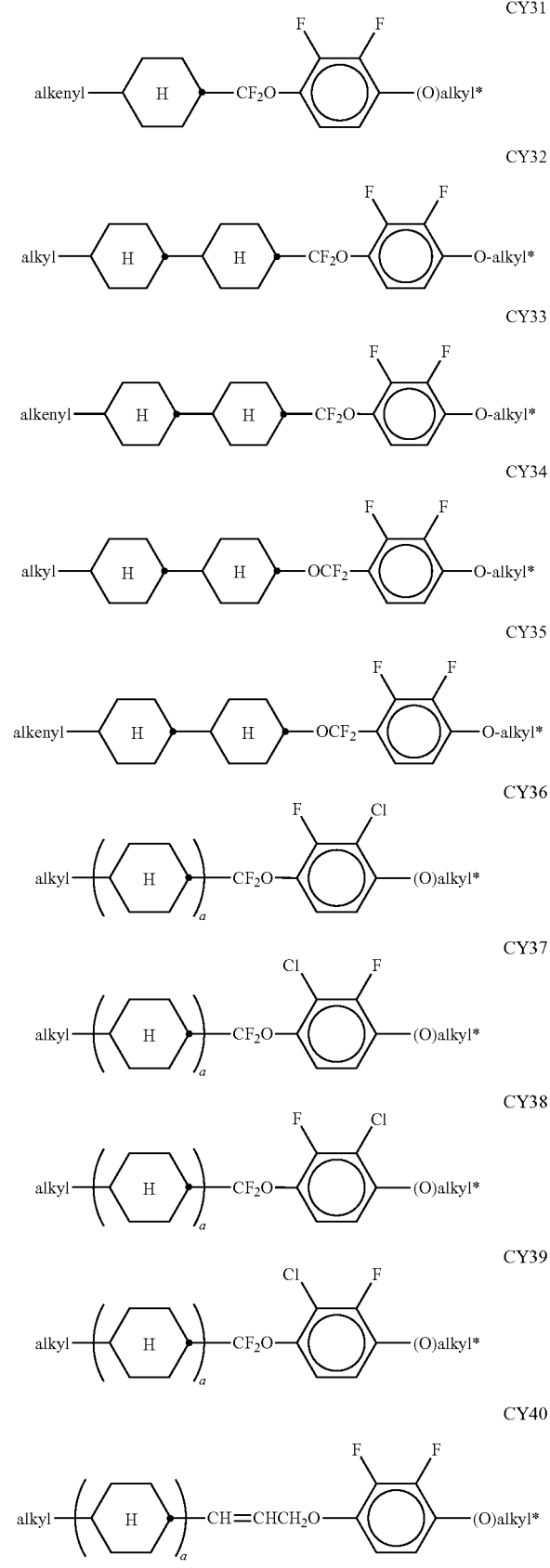

CY41
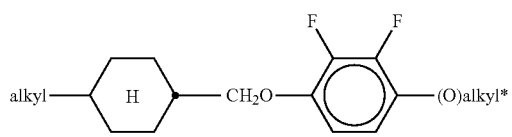
CY42
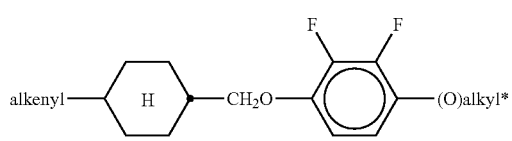
CY43
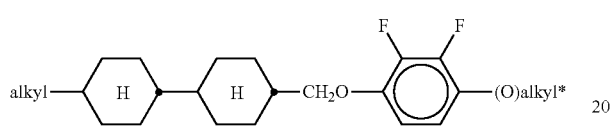
CY44
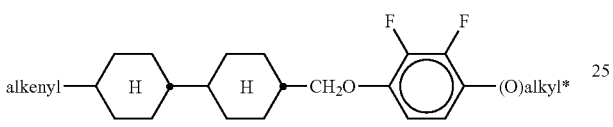
CY45
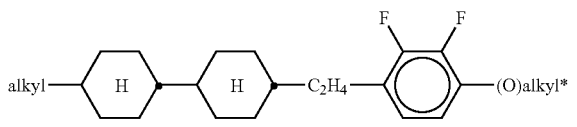
CY46
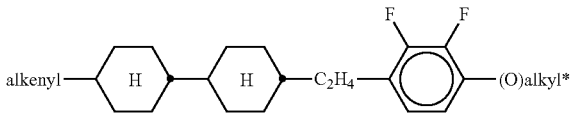
CY47
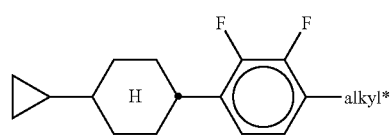
CY48
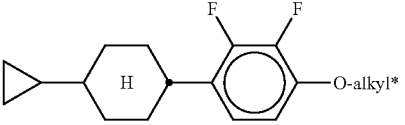
CY49
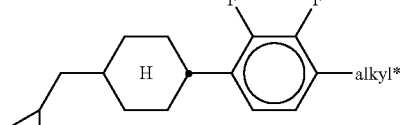
CY50
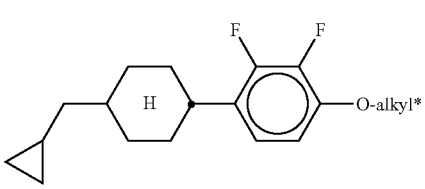
CY51
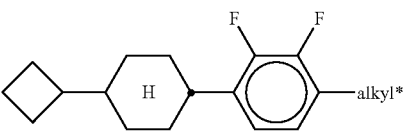
CY52
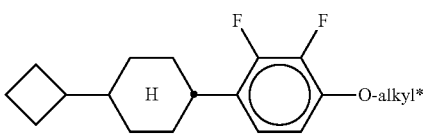
CY53
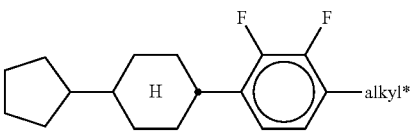
CY54
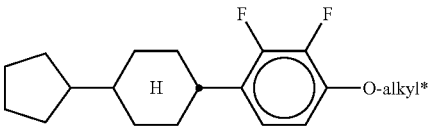
CY55
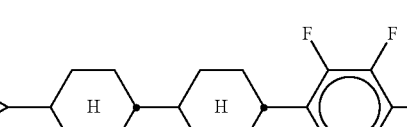
CY56
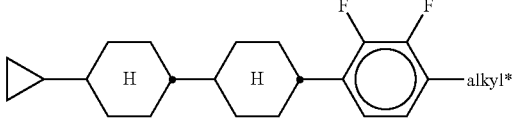
CY57
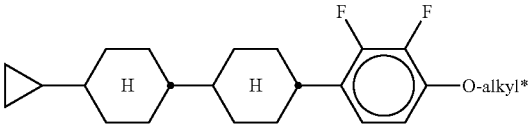
CY58
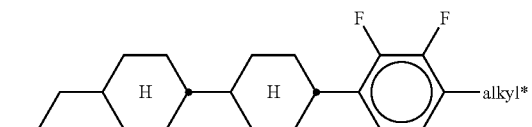
CY59
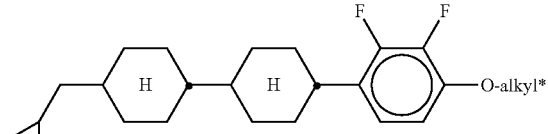
CY60
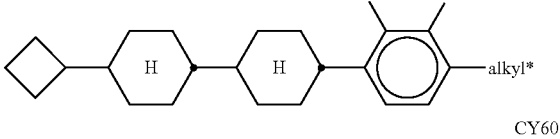

CY61
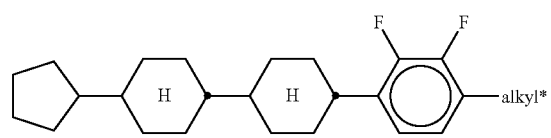

CY62
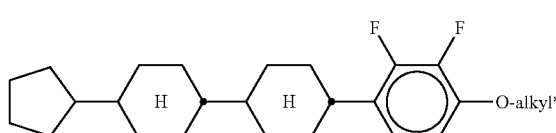

CY63
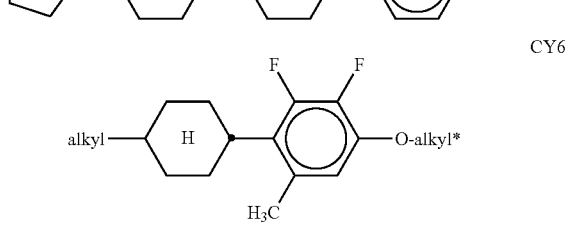

CY64
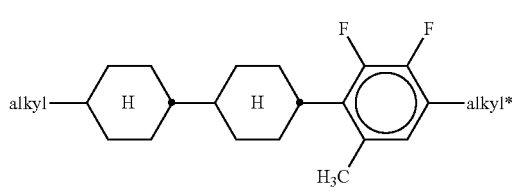

CY65
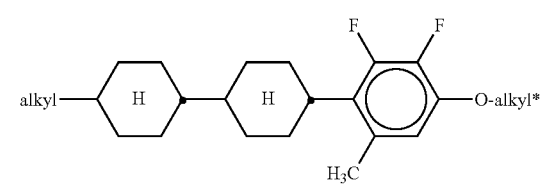

CY66
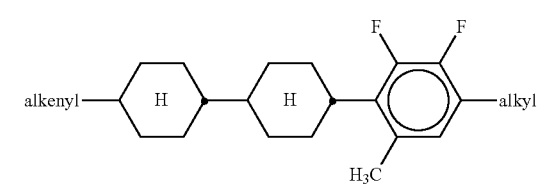

CY67
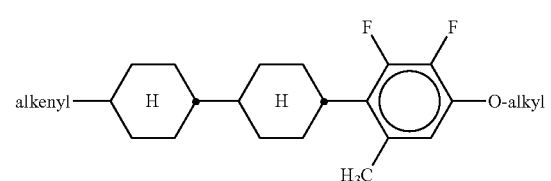

CY68
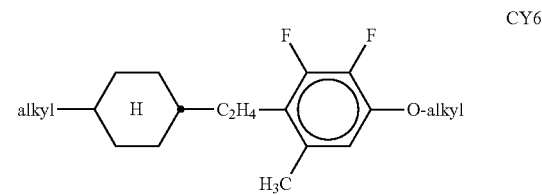

CY69
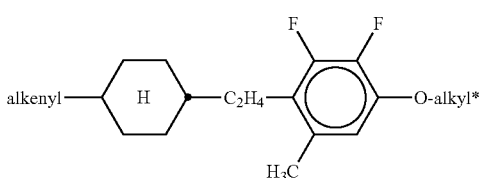

CY70
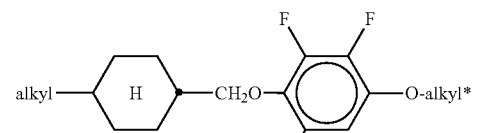

CY71
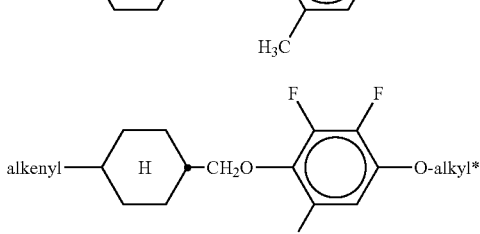

CY72
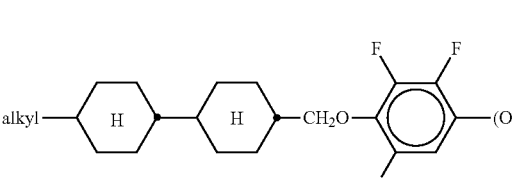

CY73
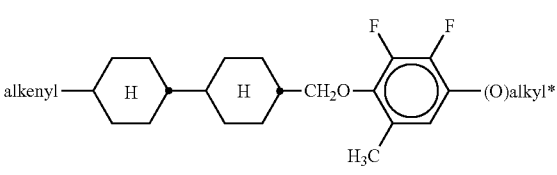

CY74
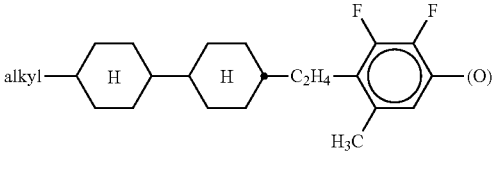

CY75
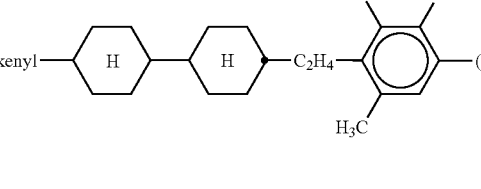

in which a denotes 1 or 2, alkyl and alkyl* each, independently of one another, denote a straight-chain alkyl radical having 1-6 C atoms, (O) denotes an oxygen atom or a single bond, and alkenyl denotes a straight-chain alkenyl radical having 2-7 C atoms, and preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

The compounds of the formula PY are preferably selected from the group consisting of the following sub-formulae:

-continued

-continued

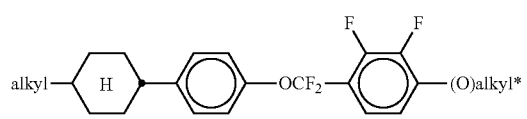
PY22

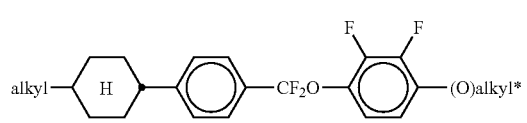
PY23

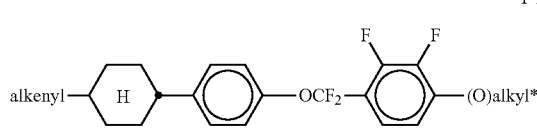
PY24

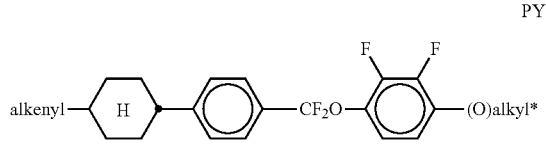
PY25

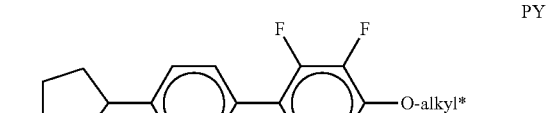
PY26

PY27

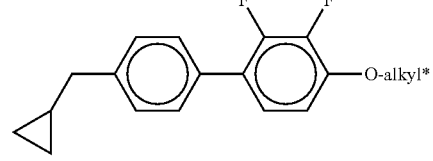

in which alkyl and alkyl* each, independently of one another, denote a straight-chain alkyl radical having 1-6 C atoms, (O) denotes an oxygen atom or a single bond, and alkenyl denotes a straight-chain alkenyl radical having 2-7 C atoms, and preferably denotes $CH_2=CH-$, $CH_2=CHCH_2CH_2-$, $OH_3-CH=CH-$, $OH_3-OH_2-CH=CH-$, $OH_3-(OH_2)_2-CH=CH-$, $OH_3-(OH_2)_3-CH=CH-$ or $OH_3-CH=CH-(OH_2)_2-$.

b) The LC medium comprises one or more compounds of the following formula:

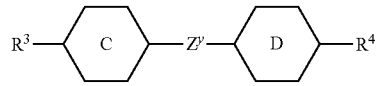
ZK in which the individual radicals have the following meanings:

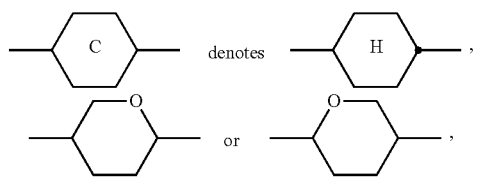

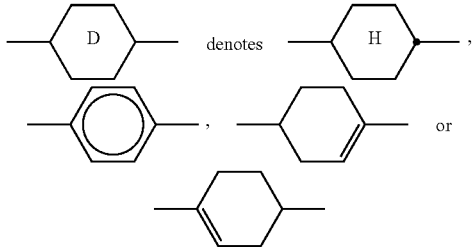

$R^3$ and $R^4$ each, independently of one another, have the meanings given for $R^1$ indicated above, and preferably denote alkyl having 1 to 12 C atoms, in which, in addition, one or two non-adjacent $CH_2$ groups may be replaced by —O—, —CH=CH—, —CO—, —O—CO— or —CO—O— in such a way that O atoms are not linked directly to one another, $Z^y$ denotes —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond.

The compounds of the formula ZK are preferably selected from the group consisting of the following sub-formulae:

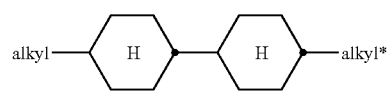
ZK1

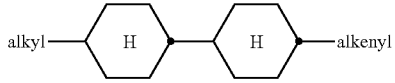
ZK2

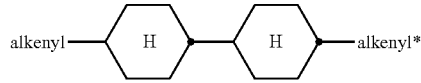
ZK3

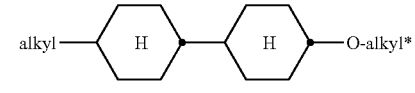
ZK4

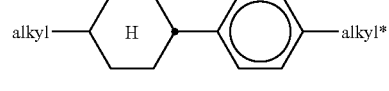
ZK5

ZK6

ZK7

ZK8

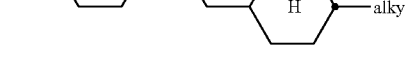
ZK9

-continued

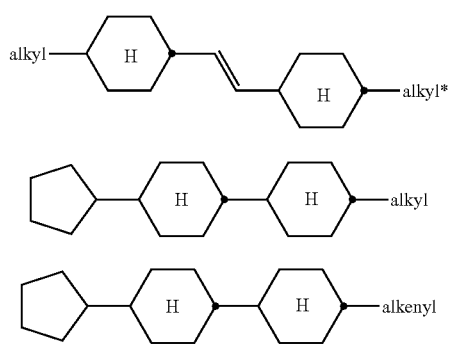

ZK10

ZK11

ZK12 in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms, and preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds of formula ZK1, ZK2 and ZK3.

Very preferred compounds of the formula ZK are selected from the following sub-formulae:

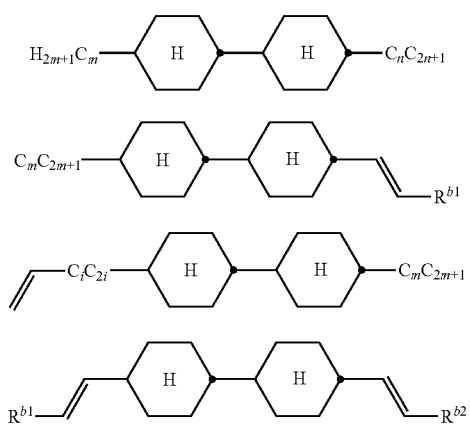

ZK1a

ZK2a

ZK2b

ZK3a in which m and n independently of each other denote 1, 2, 3, 4, 5 or 6, i denotes 0, 1, 2 or 3, and $R^{b1}$ and $R^{b2}$ independently of each other denote H, $CH_3$ or $C_2H_5$.

Particularly preferred compounds of formula ZK are selected from the following sub-formulae:

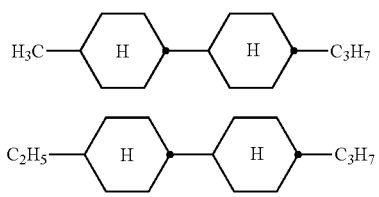

ZK1a1

ZK1a2

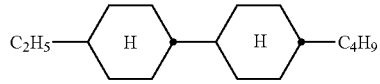

ZK1a3

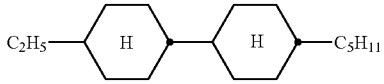

ZK1a4

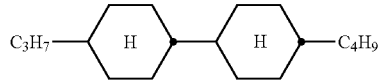

ZK1a5

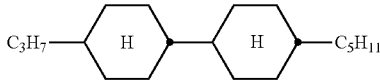

ZK1a6

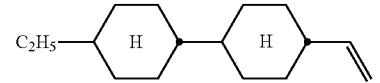

ZK2a1

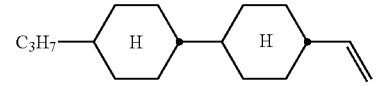

ZK2a2

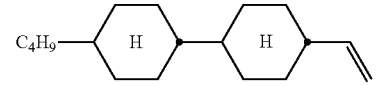

ZK2a3

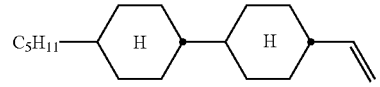

ZK2a4

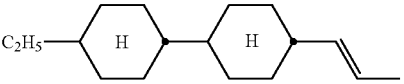

ZK2a5

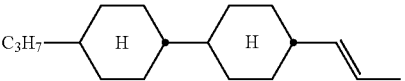

ZK2a6

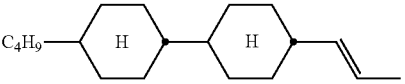

ZK2a7

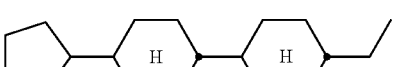

ZK11a

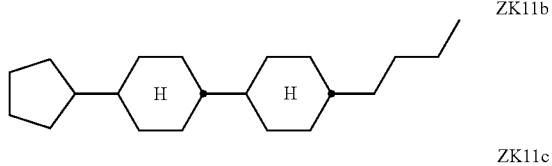

ZK11b

ZK11c

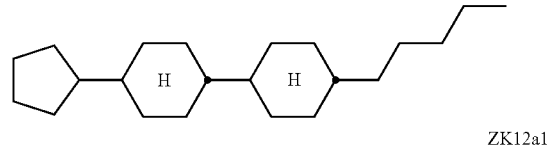

ZK12a1

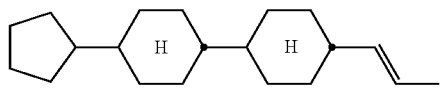

ZK12a2 wherein the propyl, butyl and pentyl groups are straight-chain groups.

Most preferred are compounds of formula ZK1a1, ZK2a1 and ZK2a6.

Preferably the LC medium or LC host mixture contains 1 to 5, preferably 1, 2 or 3 compounds selected of formula ZK or its subformulae.

The proportion of the compounds of formula ZK in the LC medium is preferably from 5 to 70%, more preferably from 10 to 60%, most preferably from 20 to 60%.

c) The LC medium comprises one or more compounds of the following formula:

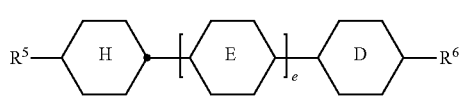

DK in which the individual radicals on each occurrence, identically or differently, have the following meanings:

$R^5$ and $R^6$ each, independently of one another, denote alkyl having 1 to 12 C atoms, where, in addition, one or two non-adjacent $CH_2$ groups may be replaced independently of one another, by

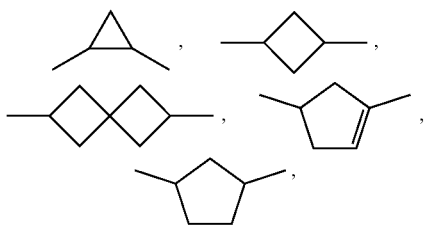

—C≡C—, —CF$_2$O—, —OCF$_2$—, —CH=CH—, —O—, —CO—O— or —O—CO in such a way that O atoms are not linked directly to one another, preferably alkyl or alkoxy having 1 to 6 C atoms,

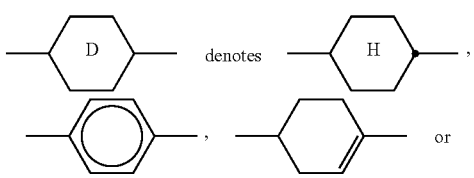

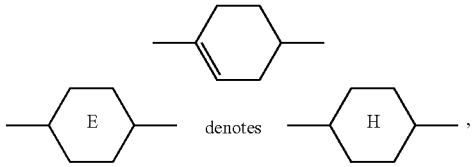

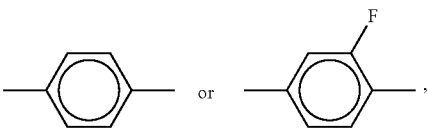

e denotes 1 or 2.

The compounds of the formula DK are preferably selected from the group consisting of the following sub-formulae:

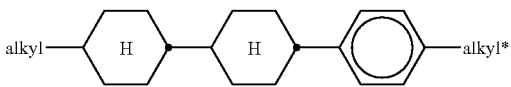

DK1

DK2

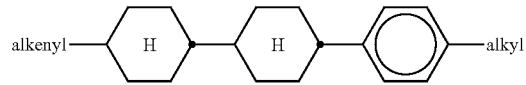

DK3

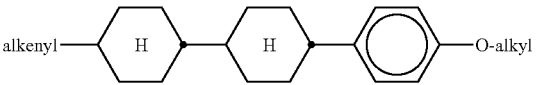

DK4

DK5

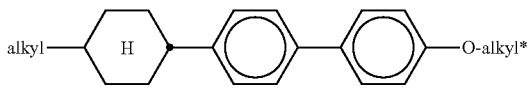

DK6

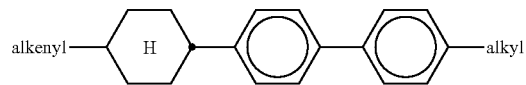

DK7

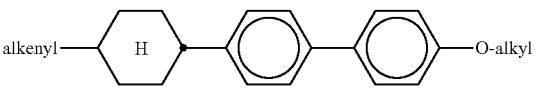

DK8

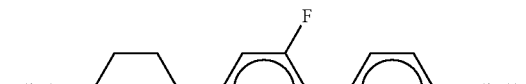

DK9

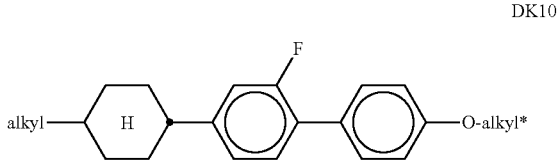

DK10

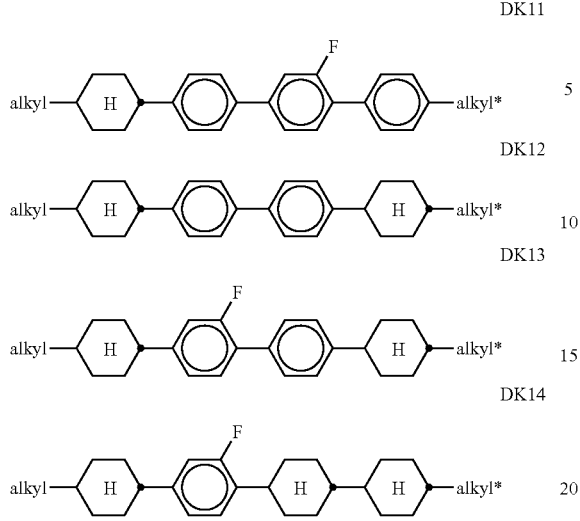

DK11

DK12

DK13

DK14 in which alkyl and alkyl* each, independently of one another, denote a straight-chain alkyl radical having 1-6 C atoms, and alkenyl denotes a straight-chain alkenyl radical having 2-7 C atoms, and preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds of formula DK1 and DK3.

Very preferred compounds of the formula DK are selected from the following sub-formulae:

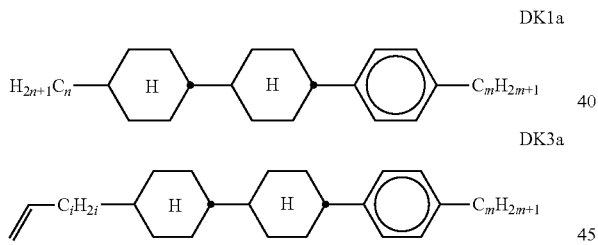

DK1a

DK3a in which m denotes 1, 2, 3, 4, 5 or 6, i denotes 0, 1, 2 or 3, and n denotes 1, 2, 3, 4, 5 or 6.

Very particularly preferred compounds of the formula DK are selected from the following sub-formulae:

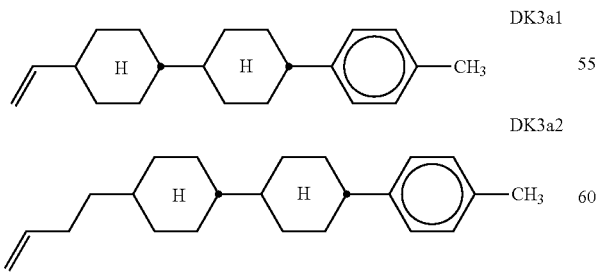

DK3a1

DK3a2 d) The LC medium comprises one or more biphenyl compounds selected from the group consisting of the following formulae:

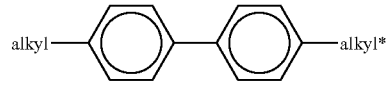

B-1

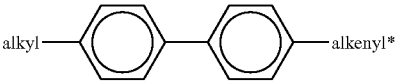

B-2

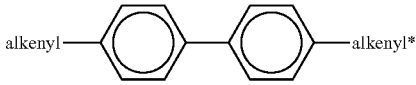

B-3 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The proportion of the biphenyls of the formulae B-1 to B-3 in the LC mixture is preferably at least 3% by weight, in particular 5% by weight.

The compounds of the formula B-2 are particularly preferred.

The compounds of the formulae B-1 to B-3 are preferably selected from the group consisting of the following sub-formulae:

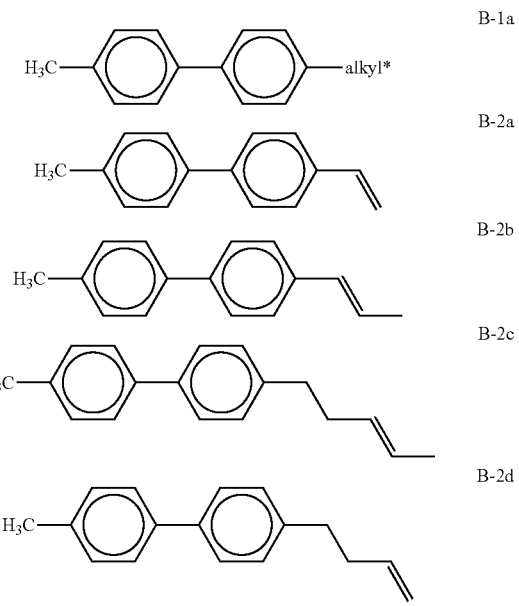

B-1a

B-2a

B-2b

B-2c

B-2d in which alkyl* denotes an alkyl radical having 1-6 C atoms. The medium according to the invention particularly preferably comprises one or more compounds of the formulae B-1a and/or B-2c.

e) The LC medium comprises one or more compounds of the following formula DY:

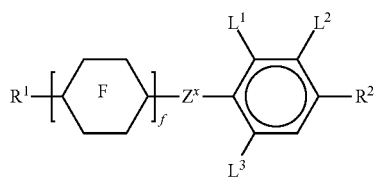 DY in which the individual radicals have the following meanings:

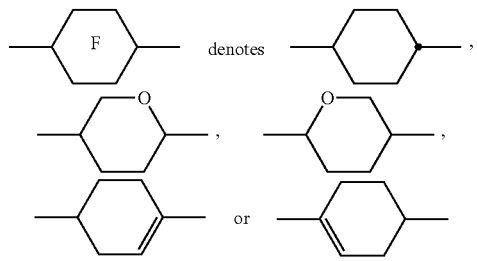 denotes with at least one ring F being different from cyclohexylene,
f denotes 1 or 2,
$R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another,
$Z^x$ denotes —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond.
$L^1$ and $L^2$ each, independently of one another, denote F, Cl, $OCF_3$, $CF_3$, $CH_3$, $CH_2F$, $CHF_2$, and
$L^3$ denotes H or $CH_3$.

Preferably, both radicals $L^1$ and $L^2$ denote F or one of the radicals $L^1$ and $L^2$ denotes F and the other denotes Cl. $L^3$ preferably denotes H.

The compounds of the formula DY are preferably selected from the group consisting of the following sub-formulae:

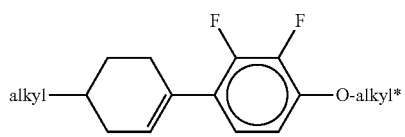 DY1

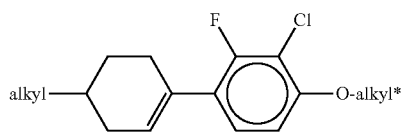 DY2

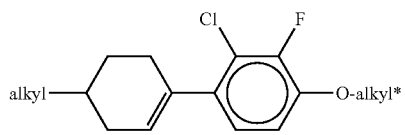 DY3

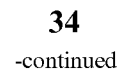 -continued

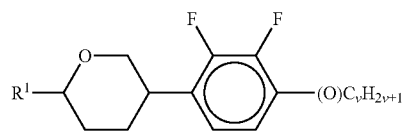 DY4

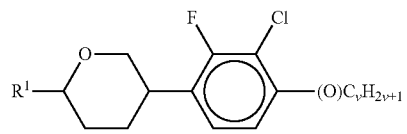 DY5

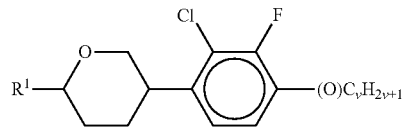 DY6

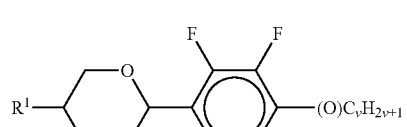 DY7

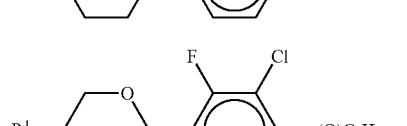 DY8

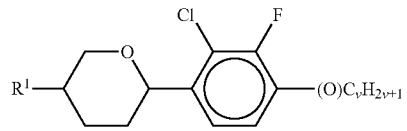 DY9

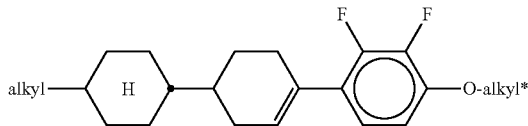 DY10

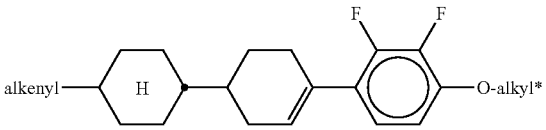 DY11

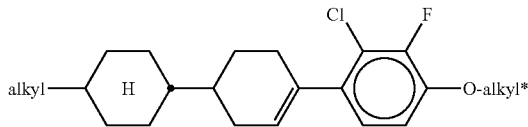 DY12

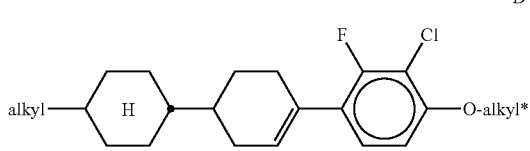 DY13

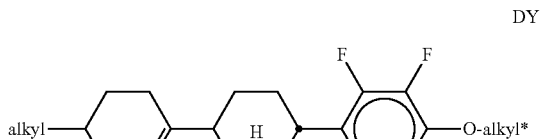 DY14

DY15
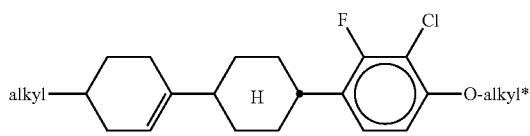

DY16
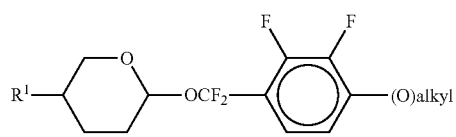

DY17
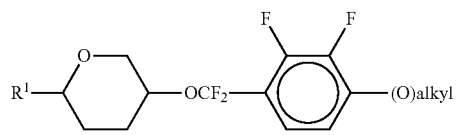

DY18
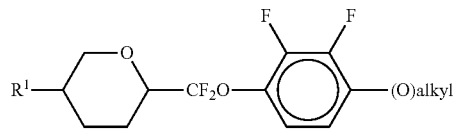

DY19
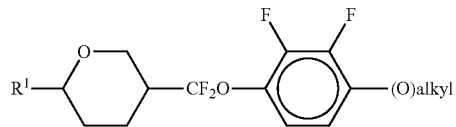

DY20
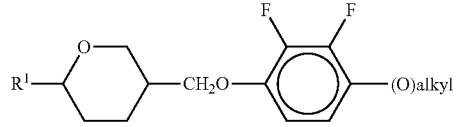

DY21
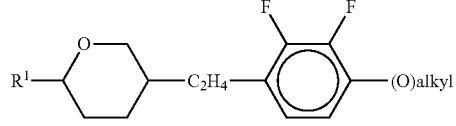

DY22
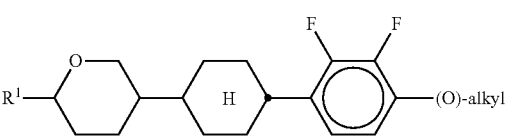

DY23
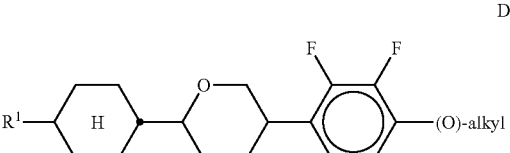

DY24
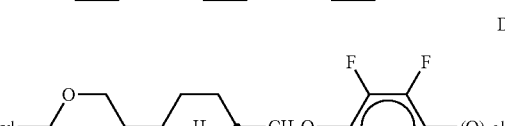

DY25
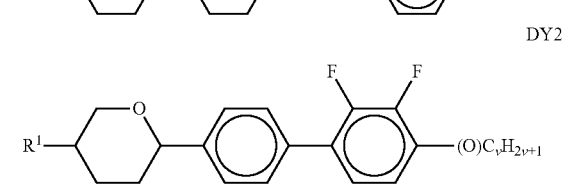

DY26
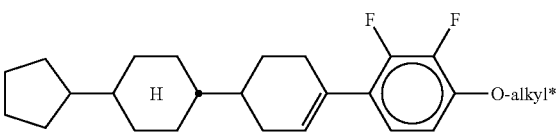

DY27
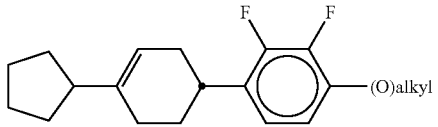

DY28
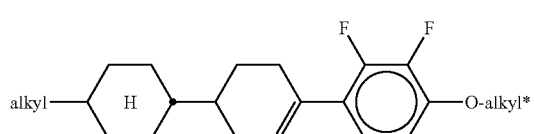

DY29
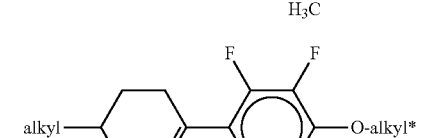

DY30
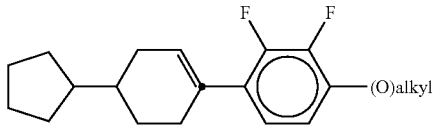

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, $n\text{-}C_3H_7$, $n\text{-}C_4H_9$, $n\text{-}C_5H_{11}$, $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$ or a cylcopentyl ring.

f) The LC medium comprises one or more compounds of the following formula:

T
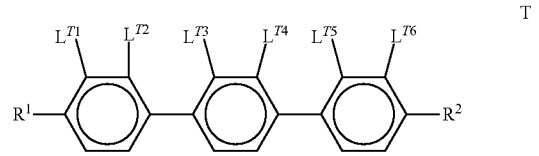

in which the individual radicals, on each occurrence identically or differently, and each, independently of one another, have the following meaning:

$R^1$, $R^2$ have the meanings given for $R^1$ indicated above, preferably denote alkyl, alkoxy, oxaalkyl or alkoxyalkyl having 1 to 9 C atoms or alkenyl or alkenyloxy having 2 to 9 C atoms, all of which are optionally fluorinated, $L^{T1}$-$L^{T6}$ denote H, F or Cl, with at least one of $L^{T1}$ to $L^{T6}$ being F or Cl.

The compounds of the formula T are preferably selected from the group consisting of the following sub-formulae:
T1
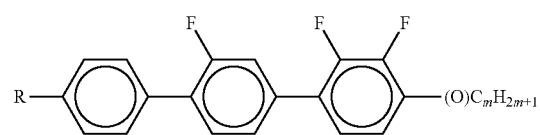
T2
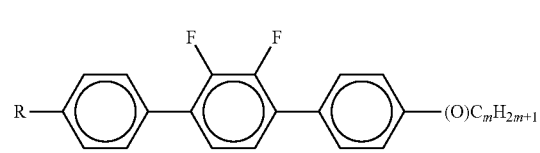
T3
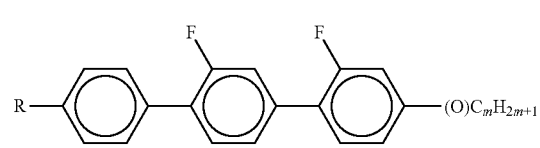
T4
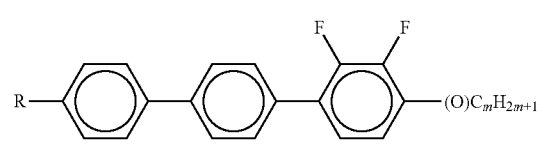
T5
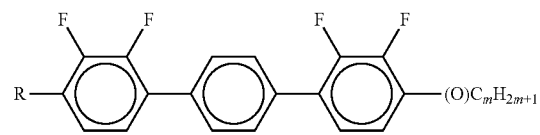
T6
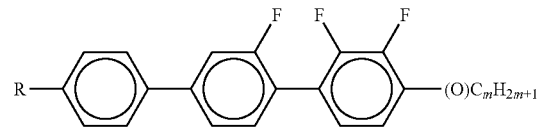
T7
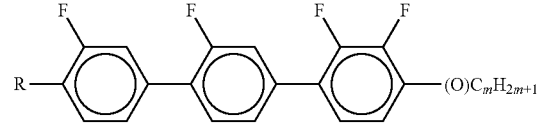
T8
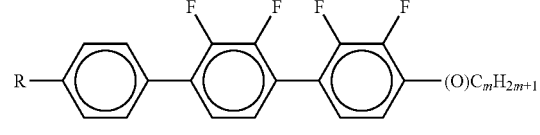
T9
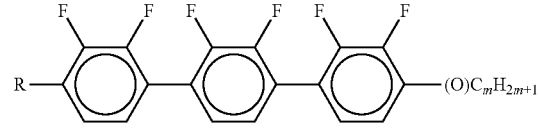
T10
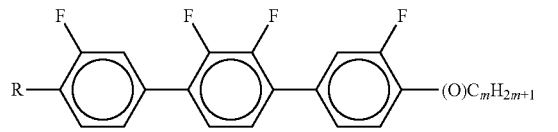
T11
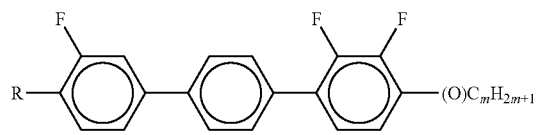
T12
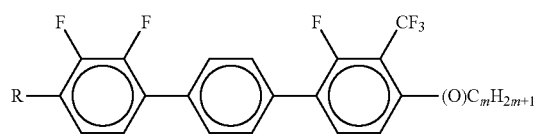
T13
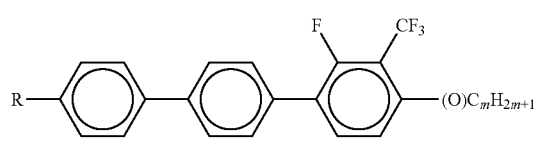
T14
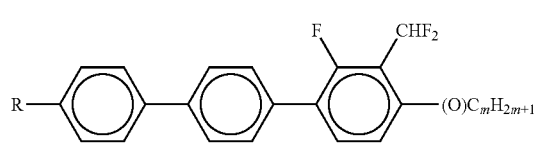
T15
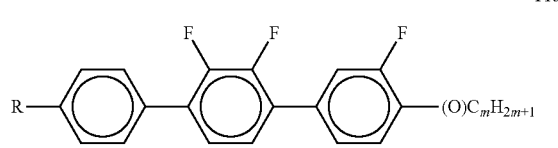
T16
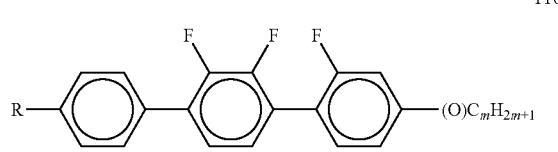
T17
T18
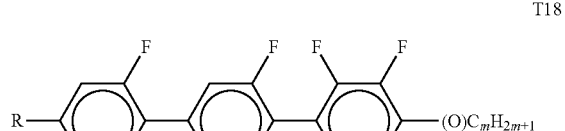
T19

-continued

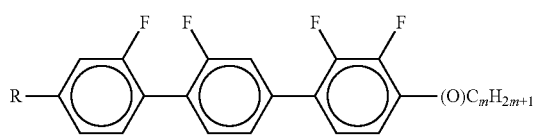

T20

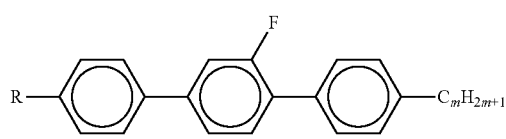

T21

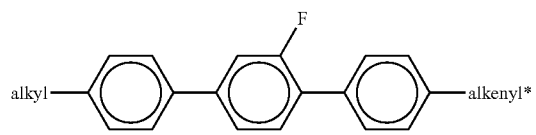

T22

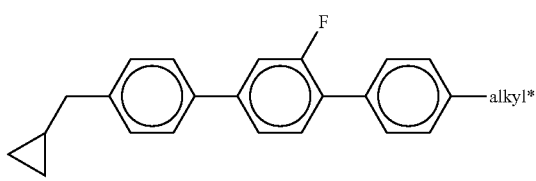

T23

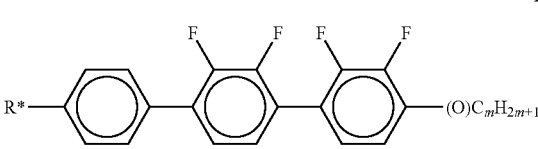

T24

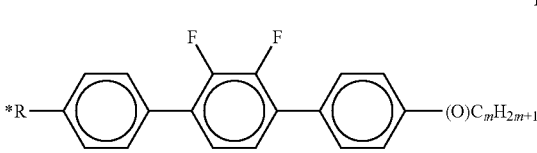

T25

in which R preferably denotes a straight-chain alkyl or alkoxy radical having 1-7 C atoms or an cylclopenty ring, R* preferably denotes a straight-chain alkenyl radical having 2-7 C atoms, (O) denotes an oxygen atom or a single bond, and m denotes an integer from 1 to 6. R* preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

R and R* preferably denote methyl, ethyl, propyl, butyl, pentyl, hexyl, methoxy, ethoxy, propoxy, butoxy or pentoxy.

alkyl and alkyl* independently denote methyl, ethyl, propyl, butyl, pentyl and hexyl.

alkenyl and alkenyl* independently denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Very preferred are compounds of formulae T1, T2, T21, T22 and T25.

Very preferred are compounds of formula T1 wherein (O) denotes an oxygen atom, m is 1, 2, 3, 4 or 5 and R is methyl, ethyl, propyl, butyl or pentyl or hexyl, which are preferably straight-chained.

Further preferred are compounds of formula T2 wherein (O) denotes a single bond, m is 1, 2, 3, 4 or 5 and R is methyl, ethyl, propyl, butyl or pentyl or hexyl, which are preferably straight-chained.

Preferably, the LC medium does not contain more than 15% of compounds of formula T or T1-T25 or any other compounds with a terphenyl group.

Preferably the proportion of compounds of formula T or T1-T25 or any other compounds with a terphenyl group in the LC medium is at least 5%, very preferably from 5 to 15%, most preferably from 5 to 10%.

Preferably the LC medium contains 1 to 5, very preferably 1 or 2 compounds of formula T or T1-T25.

g) The LC medium comprises one or more compounds selected from the group consisting of the following formulae:

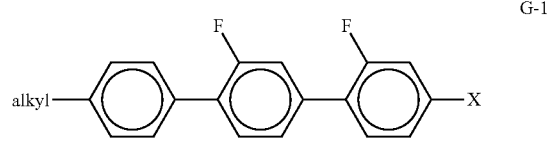

G-1

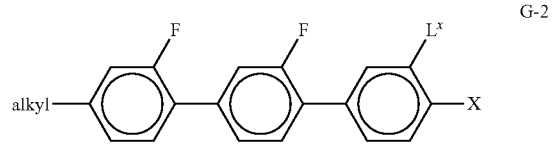

G-2

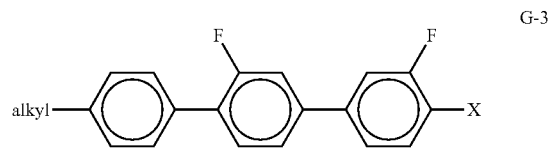

G-3

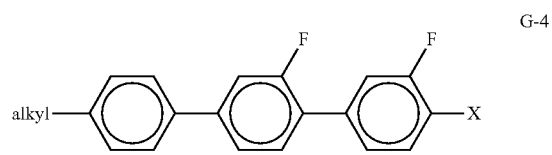

G-4 in which alkyl denotes C$_{1-6}$-alkyl, Lx denotes H or F, and X denotes F, Cl, OCF$_3$, OCHF$_2$ or OCH=CF$_2$. Particular preference is given to compounds of the formula G-1 in which X denotes F.

h) The LC medium comprises one or more compounds selected from the group consisting of the following formulae:

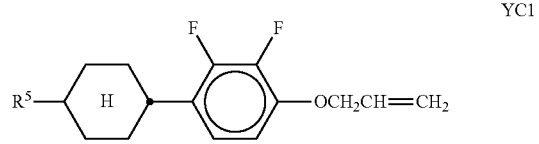

YC1

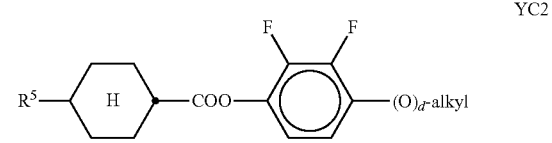

YC2

-continued

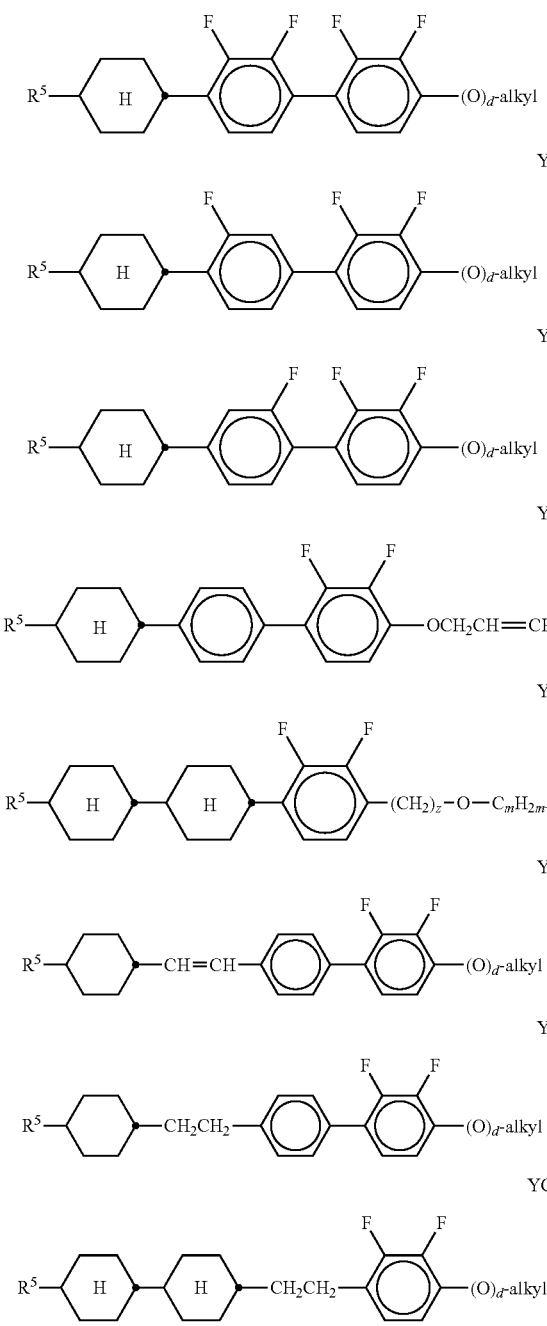

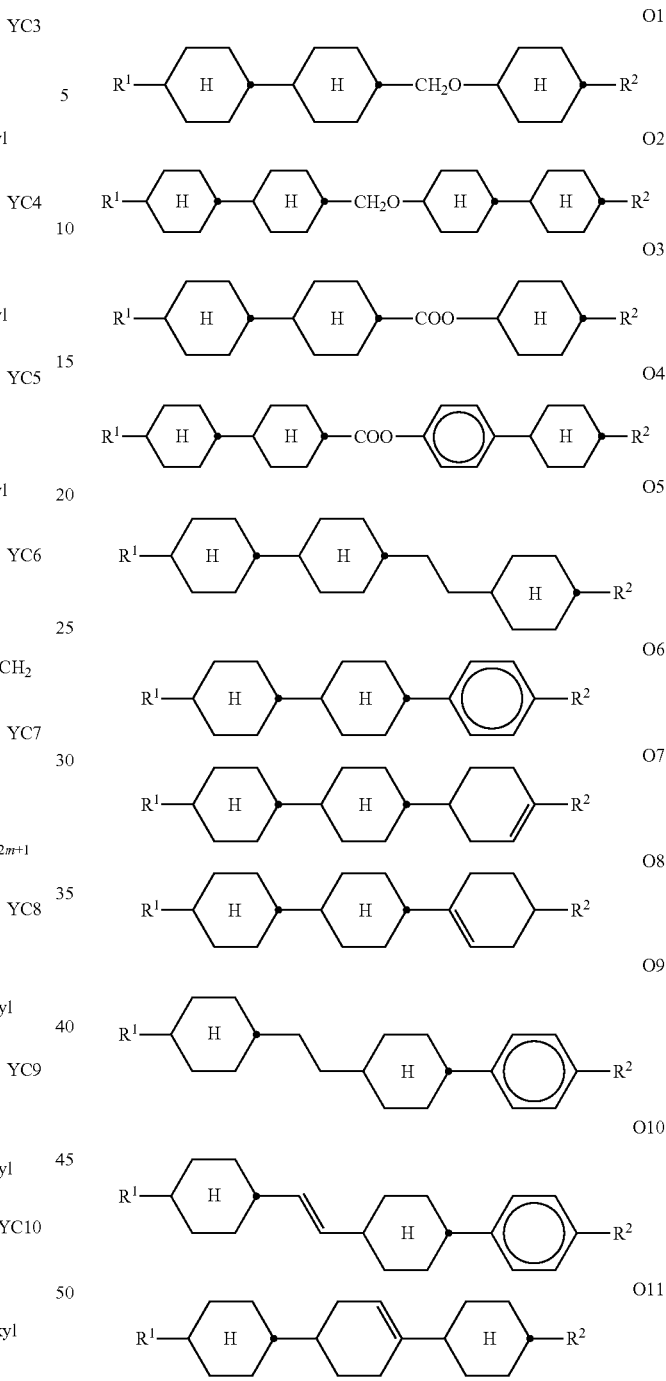

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of 5% by weight.

i) The LC medium comprises one or more compounds selected from the group consisting of the following formulae:

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3, O4 and O-6.

Very particularly preferred embodiments are indicated below.

The medium according to the invention comprises at least three compounds selected from the group of the compounds of the formulae

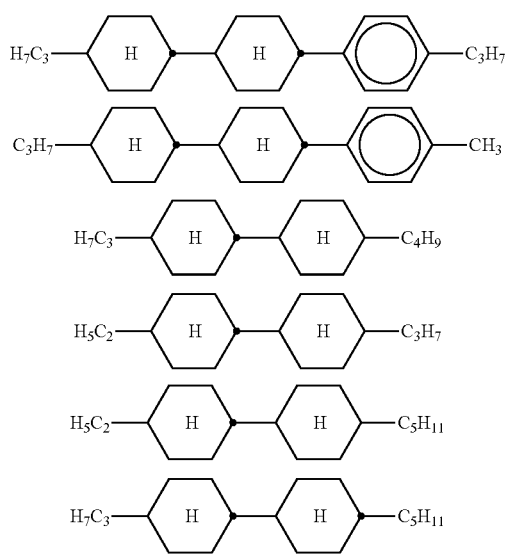

preferably in amounts of 8-50%.

The medium according to the invention comprises the two compounds of the formulae

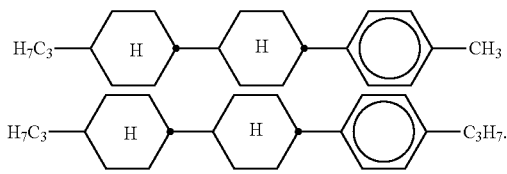

The medium according to the invention comprises the two compounds of the formulae

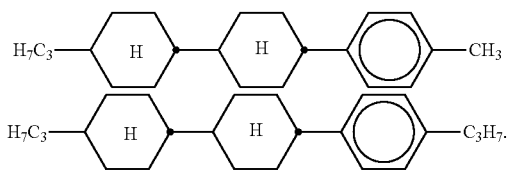

in combination with one or more compounds of the formula

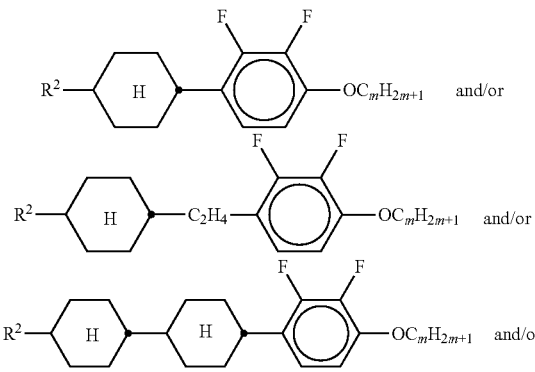

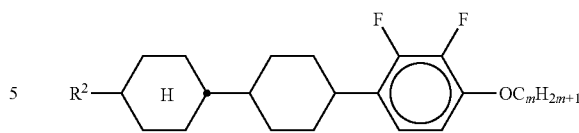

in which m denotes an integer from 1 to 6.

k) The LC medium comprises one or more compounds of the following formula:

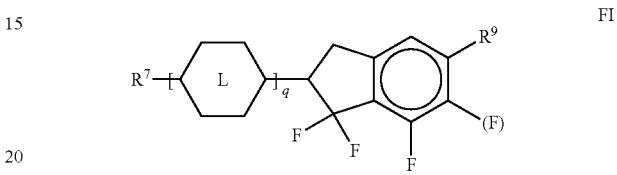

in which

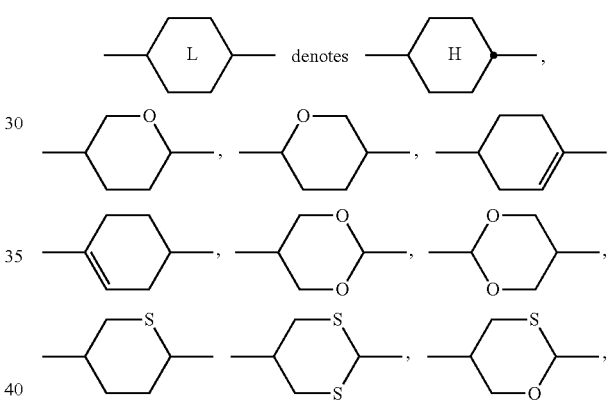

$R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular 5% by weight and very particularly preferably 5-30% by weight.

Particularly preferred compounds of the formula FI are selected from the group consisting of the following sub-formulae:

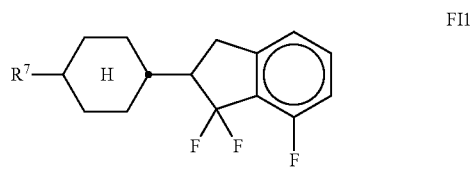

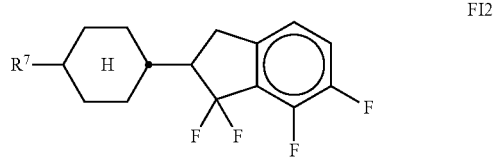

FI3
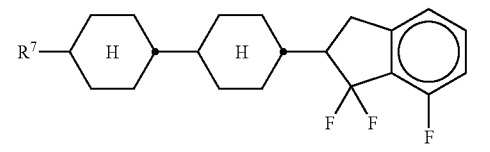

FI4
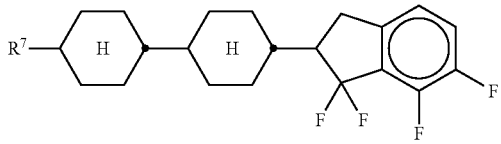

FI5
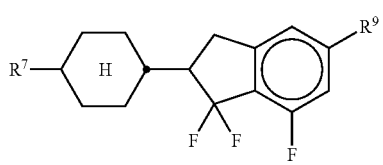

FI6
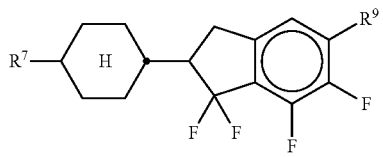

FI7
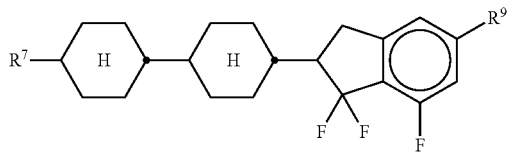

FI8
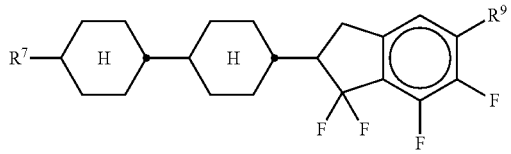

in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

l) The LC medium comprises one or more compounds selected from the group consisting of the following formulae:

VK1
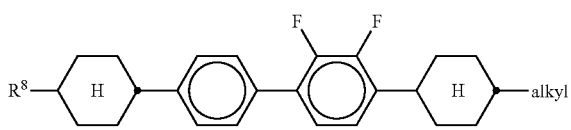

VK2
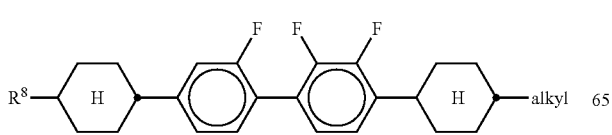

VK3
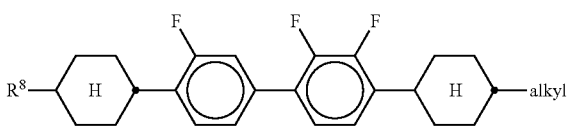

VK4
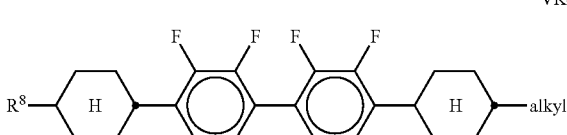

in which $R^8$ has the meaning indicated for $R^1$, and alkyl denotes a straight-chain alkyl radical having 1-6 C atoms.

m) The LC medium comprises one or more compounds which contain a tetrahydronaphthyl or naphthyl unit, such as, for example, the compounds selected from the group consisting of the following formulae:

N1
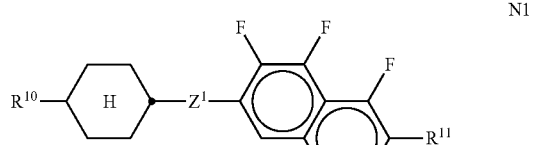

N2
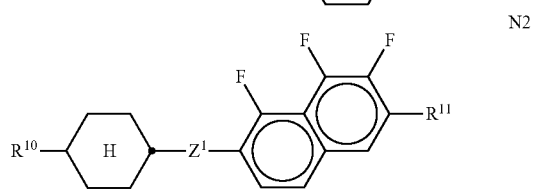

N3
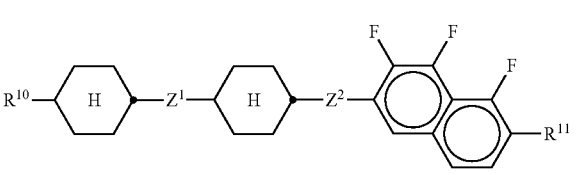

N4
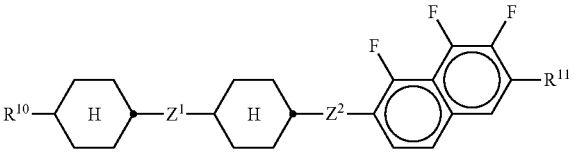

N5
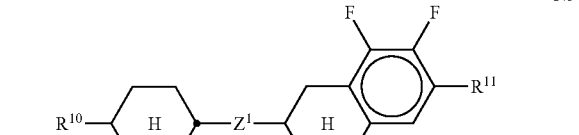

N6
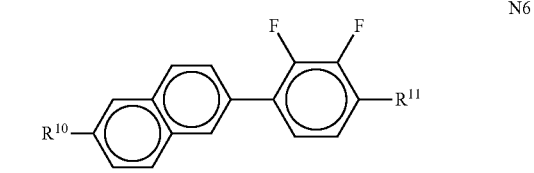

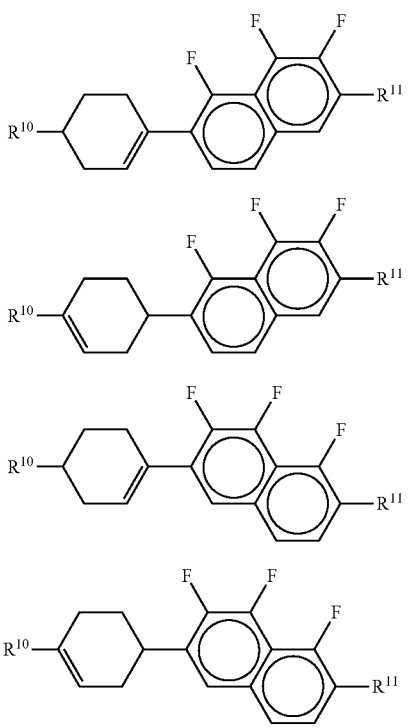

in which
R[10] and R[11] each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms, and R[10] and R[11] preferably denote straight-chain alkyl or alkoxy having 1 to 6 C atoms or straight-chain alkenyl having 2 to 6 C atoms, and Z$^1$ and Z$^2$ each, independently of one another, denote —C$_2$H$_4$—, —CH=CH—, —(CH$_2$)$_4$—, —(CH$_2$)$_{3O}$—, —O(CH$_2$)$_3$—, —CH=CH—CH$_2$CH$_2$—, —CH$_2$CH$_2$CH=CH—, —CH$_2$O—, —OCH$_2$—, —CO—O—, —O—CO—, —C$_2$F$_4$—, —CF=CF—, —CF=CH—, —CH=CF—, —CH$_2$— or a single bond.

n) The LC medium comprises one or more difluorodibenzochromans and/or chromans of the following formulae:

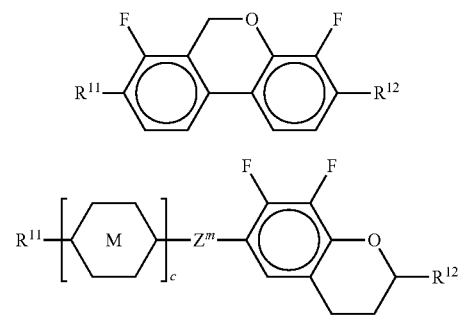

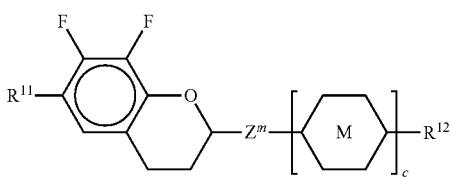

in which
R[11] and R[12] each, independently of one another, have one of the meanings indicated above for R[11], ring M is trans-1,4-cyclohexylene or 1,4-phenylene, Z$^m$ —C$_2$H$_4$—, —CH$_2$O—, —OCH$_2$—, —CO—O— or —O—CO—, c is 0, 1 or 2, preferably in amounts of 3 to 20% by weight, in particular in amounts of 3 to 15% by weight.

Particularly preferred compounds of the formulae BC, CR and RC are selected from the group consisting of the following sub-formulae:

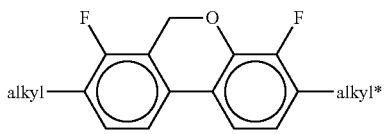

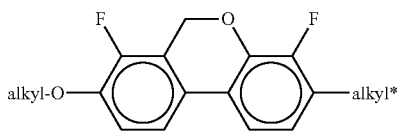

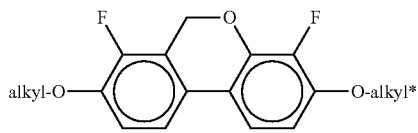

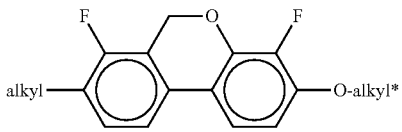

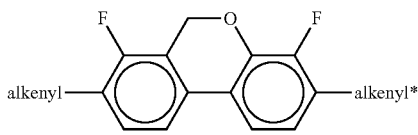

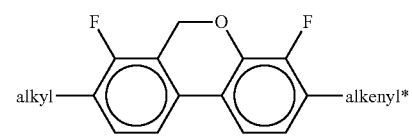

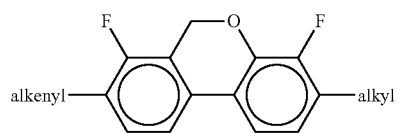

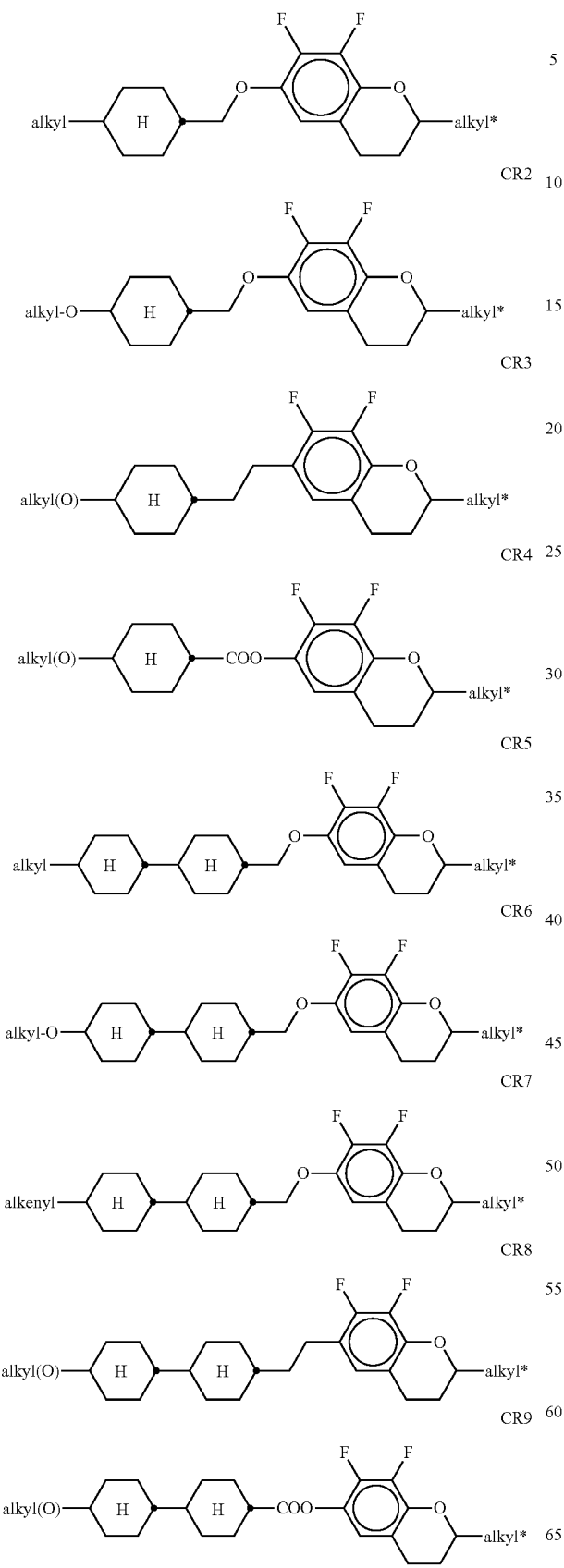

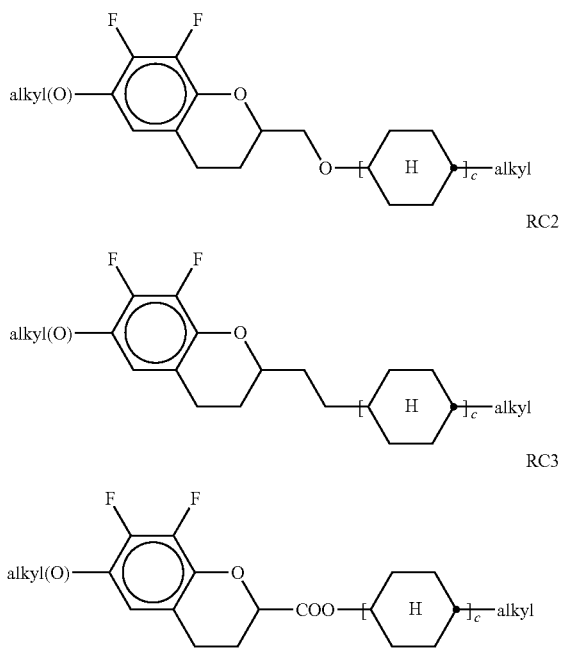

in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

Very particular preference is given to mixtures comprising one, two or three compounds of the formula BC-2.

o) The LC medium comprises one or more fluorinated phenanthrenes of the following formula:

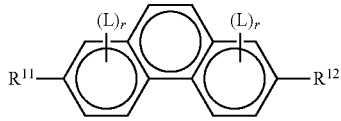

PH in which $R^{11}$ and $R^{12}$ each, independently of one another, have one of the meanings indicated above for $R^{11}$, L denotes F, and r denotes 1, 2 or 3.

Particularly preferred compounds of the formulae PH are selected from the group consisting of the following sub-formulae:

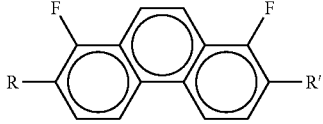

PH1

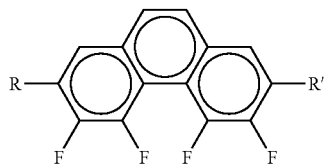

PH2 in which R and R' each, independently of one another, denote a straight-chain alkyl or alkoxy radical having 1-7 C atoms.

p) The LC medium comprises one or more fluorinated dibenzofurans and/or dibenzothiophenes of the following formulae:

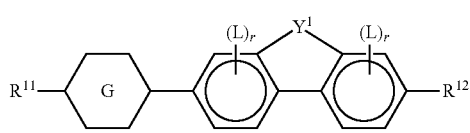

BF in which the individual radicals have the following meanings:

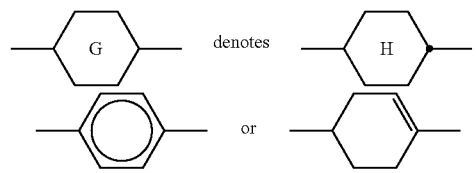

$R^{11}$ and $R^{12}$ each, independently of one another, have one of the meanings indicated above for $R^{11}$, $Y^1$ denotes O or S, L denotes F, and r denotes 1, 2 or 3.

Particularly preferred compounds of the formula BF are selected from the group consisting of the following sub-formulae:

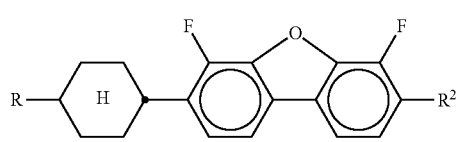

BF1

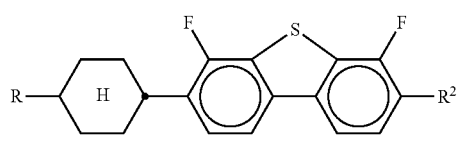

BF2

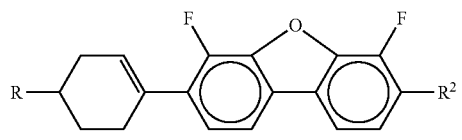

BF3

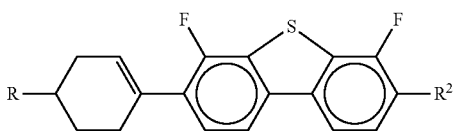

BF4

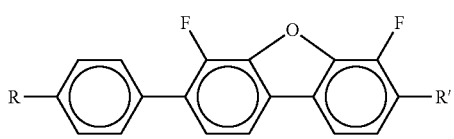

BF5

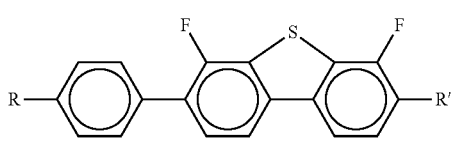

BF6 in which R and R' each, independently of one another, have the meanings of $R^1$ in formula B, preferably denote a straight-chain alkyl or alkoxy radical having 1-7 C atoms.

q) The LC medium comprises one or more monocyclic compounds of the following formula

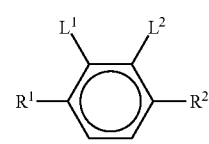

Y wherein $R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, The compounds of the formula Y are preferably selected from the group consisting of the following sub-formulae:

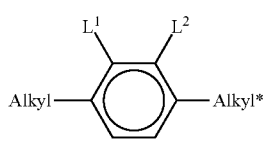

Y1

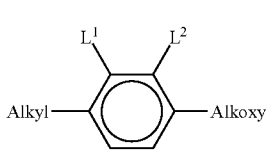

Y2

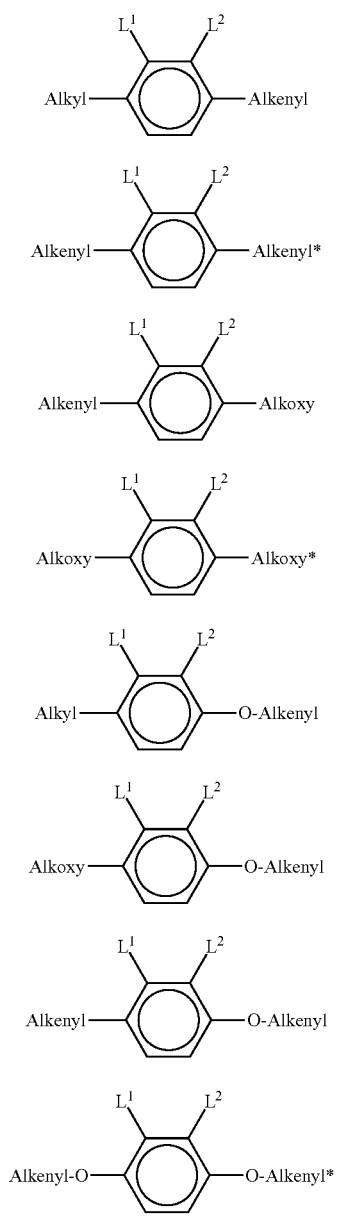

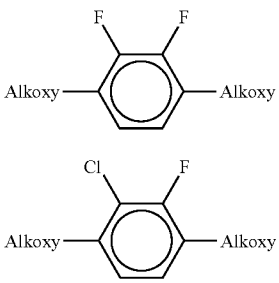

in which, Alkyl and Alkyl* each, independently of one another, denote a straight-chain alkyl radical having 1-6 C atoms, Alkoxy denotes a straight-chain alkoxy radical having 1-6 C atoms, and Alkenyl and Alkenyl* each, independently of one another, denote a straight-chain alkenyl radical having 2-6 C atoms. Alkenyl and Alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred compounds of the formula Y are selected from the group consisting of the following subformulae:

wherein Alkoxy preferably denotes straight-chain alkoxy with 3, 4, or 5 C atoms, very preferably butoxy. Most preferred are compounds of formula Y6A.

r) The LC medium contains 1 to 8, preferably 1 to 5, compounds of formula CY and/or PY, preferably selected from the group consisting of the formulae CY1, CY2, CY9, CY10, CY41, CY43, CY45, PY1, PY2, PY9, PY10 and DY10, very preferably from the group consisting of the formulae CY1, CY2, CY9, CY10, PY9 and PY10. The proportion of these compounds in the mixture as a whole is preferably 5 to 60%, very preferably 10 to 50%. In another preferred embodiment the proportion of these compounds in the mixture as a whole is preferably 3 to 20%, very preferably 5 to 15%. The content of each individual compound is preferably 2 to 20%.

s) The LC medium contains 1 to 10, preferably 1 to 5, compounds of the formula ZK, preferably selected from the group consisting of the formulae ZK1, ZK2 and ZK3, very preferably from the group consisting of formulae ZK1a1, ZK2a1, ZK2a2 and ZK3a1, most preferably from the group consisting of formulae ZK1a1 to ZK1a6 and ZK2a1 to ZK2a7. The proportion of these compounds in the mixture as a whole is preferably 5 to 70%, more preferably 10 to 65%, most preferably 20 to 60%. The content of each individual compound is preferably 2 to 20%.

t) The LC medium contains 1 to 10, preferably 1 to 5, compounds of the formula DK, preferably selected from the formulae DK1 and DK3, more preferably from the formulae DK1a and DK3a, most preferably from the formulae DK3a1 and DK3a2. The proportion of these compounds in the mixture as a whole is preferably 1 to 20%, very preferably 2 to 15%. The content of each individual compound is preferably 1 to 5%.

u) The LC medium contains 1 to 5, preferably 1 or 2, compounds selected from the group consisting of the formula B-1, B-2 and B-3, preferably selected from the formulae B-1 and B-2, more preferably from the formulae B-1a, B-2a, B-2c and B-2d. The proportion of these compounds in the mixture as a whole is preferably 1 to 10%, very preferably 1 to 5%. The content of each individual compound is preferably 1 to 5%.

v) The LC medium contains 1 to 5, preferably 1, 2 or 3, compounds of formula T, preferably selected from the formulae T1, T2 and T23. The proportion of these compounds in the mixture as a whole is preferably 2 to 30%, very preferably 2 to 25. The content of each individual compound is preferably 2 to 15%.

w) The LC medium contains 1 to 3, preferably 1, compounds of the formula Y, preferably selected of formula Y6, very preferably of formula Y6A. The proportion of these compounds in the mixture as a whole is preferably 2 to 20%, particularly preferably 3 to 15%.

x) The LC medium contains one or more compounds containing an alkenyl group, preferably selected from the group consisting of formula CY, PY, DY and T, wherein one or both of $R^1$ and $R^2$ denote straight-chain alkenyl having 2-6 C atoms, formula ZK and DK, wherein one or both of $R^3$ and $R^4$ or one or both of $R^5$ and $R^6$ denote straight-chain alkenyl having 2-6 C atoms, and formula B2 and B3, very preferably selected from the group consisting of formulae CY3, CY4, CY15, CY24, CY32, PY7, PY8, PY15, PY16, DY13, ZK1, ZK2, ZK3, DK1, DK3, B2 and T23, most preferably selected from the group consisting of formulae ZK1, ZK2, ZK3, DK1, DK3, B2 and T23. The concentration of these compounds in the LC host mixture is preferably from 2 to 70%, very preferably from 3 to 55%.

Particularly preferred mixture concepts are indicated below: (the acronyms used are explained in Table A. n and m here each denote, independently of one another, 1-6).

The mixtures according to the invention preferably comprise

CPY-n-Om, in particular CPY-2-O2, CPY-3-O2 and/or CPY-5-O2, preferably in concentrations >5%, in particular 10-30%, based on the mixture as a whole, and/or CY-n-Om, preferably CY-3-O2, CY-3-O4, CY-5-O2 and/or CY-5-O4, preferably in concentrations >5%, in particular 15-50%, based on the mixture as a whole, and/or CCY-n-Om, preferably CCY-4-O2, CCY-3-O2, CCY-3-O3 and/or CCY-5-O2, preferably in concentrations >5%, in particular 10-30%, based on the mixture as a whole, and/or CLY-n-Om, preferably CLY-2-O4, CLY-3-O2 and/or CLY-3-O3, preferably in concentrations >5%, in particular 10-30%, based on the mixture as a whole, and/or CK-n-F, preferably CK-3-F, CK-4-F and/or CK-5-F, preferably in concentrations of >5%, in particular 5-25%, based on the mixture as a whole, where the proportion of all mesogenic compounds in the liquid-crystalline mixture according to the invention is 100%.

Preference is furthermore given to mixtures according to the invention which comprise the following mixture concepts:

(n and m each denote, independently of one another, 1-6.)

CPY-n-Om and CY-n-Om, preferably in concentrations of 10-80%, based on the mixture as a whole, and/or CPY-n-Om and CK-n-F, preferably in concentrations of 10-70%, based on the mixture as a whole, and/or CPY-n-Om and CK-n-F and CLY-n-Om, preferably in concentrations of 10-80%, based on the mixture as a whole, where the proportion of all mesogenic compounds in the liquid-crystalline mixture according to the invention is ≤100%.

The combination of compounds of the preferred embodiments mentioned above with the polymerised compounds described above causes low threshold voltages, low rotational viscosities and very good low-temperature stabilities in the LC media according to the invention at the same time as constantly high clearing points and high VHR values.

The use of LC media containing polymerisable compounds allows the rapid establishment of a particularly low pretilt angle in PSA displays. In particular, the LC media exhibit significantly shortened response times, in particular also the grey-shade response times, in PSA displays compared with the media from the prior art.

The LC media and LC host mixtures of the present invention preferably have a nematic phase range of at least 80 K, particularly preferably at least 100 K, and a rotational viscosity ≤150 mPa·s, preferably ≤100 mPa·s, at 20° C.

In the VA-type displays according to the invention, the molecules in the layer of the LC medium in the switched-off state are aligned perpendicular to the electrode surfaces (homeotropically) or have a a tilted homeotropic alignment. On application of an electrical voltage to the electrodes, a re-alignment of the LC molecules takes place with the longitudinal molecular axes parallel to the electrode surfaces.

The LC media according to the invention are preferably based on compounds with negative dielectric anisotropy, are in particular suitable for use in displays of the VA, UB-FFS, PS-VA and PS-UB-FFS type, and preferably have a negative dielectric anisotropy Δε, very preferably from −0.5 to −10, most preferably from −2.0 to −7.5, at 20° C. and 1 kHz.

The birefringence □n in LC media according to the invention, especially for use in displays of the VA, UB-FFS, PS-VA and PS-UB-FFS type, is preferably below 0.16, particularly preferably from 0.06 to 0.14, very particularly preferably from 0.07 to 0.13.

The LC media according to the invention may also comprise further additives which are known to the person skilled in the art and are described in the literature, such as, for example, polymerisation initiators, inhibitors, stabilisers, surface-active substances or chiral dopants. These may be polymerisable or non-polymerisable.

In a preferred embodiment of the present invention the LC medium additionally comprises one or more polymerisable compounds.

The polymerisable compounds are preferably selected from formula M

M in which the individual radicals, on each occurrence identically or differently, and each, independently of one another, have the following meaning:

$R^a$ and $R^b$ P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^0$)═C(R$^{00}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P a polymerisable group, Sp a spacer group or a single bond, $B^1$ and $B^2$ an aromatic, heteroaromatic, alicyclic or heterocyclic group, preferably having 4 to 25 ring atoms, which may also contain fused rings, and which is unsubstituted, or mono- or polysubstituted by L, $Z^b$ —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, R$^0$ and R$^{00}$ each, independently of one another, denote H or alkyl having 1 to 12 C atoms, m denotes 0, 1, 2, 3 or 4, n1 denotes 1, 2, 3 or 4, L denotes P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P and Sp have the meanings indicated above, Y$^1$ denotes halogen, R$^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or hetero-aryloxy group having 2 to 40 C atoms.

Particularly preferred compounds of the formula I are those in which B$^1$ and B$^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by 0 and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Particularly preferred compounds of the formula M are those in which B$^1$ and B$^2$ each, independently of one another, denote 1,4-phenylene, 1,3-phenylene, naphthalene-1,4-diyl or naphthalene-2,6-diyl, Very preferred compounds of formula M are selected from the following formulae:

M1
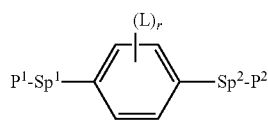

M2
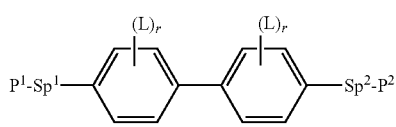

M3
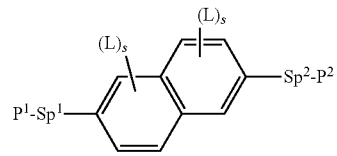

M4
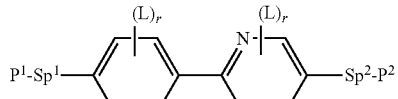

M5
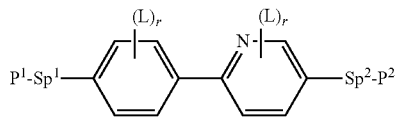

M6
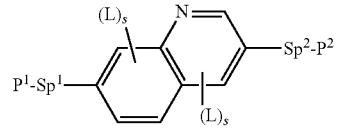

M7
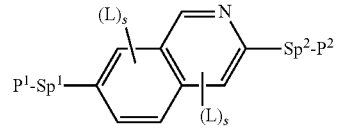

M8
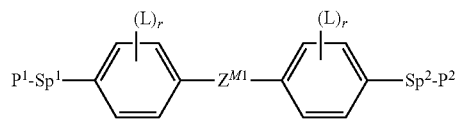

M9
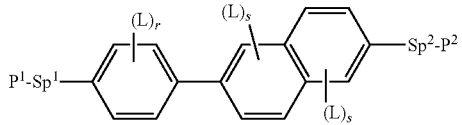

M10
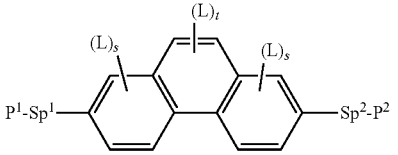

M11
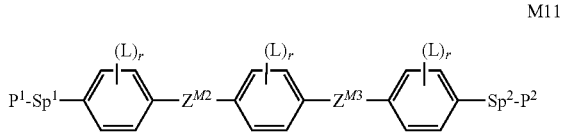

M12
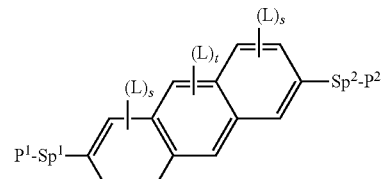

M13
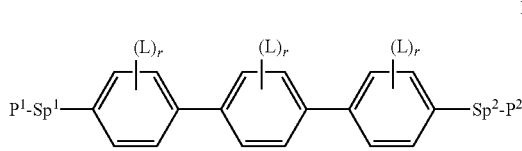

M14
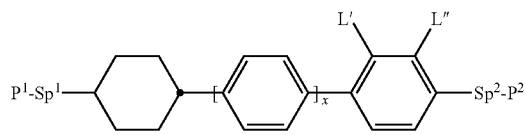
M15
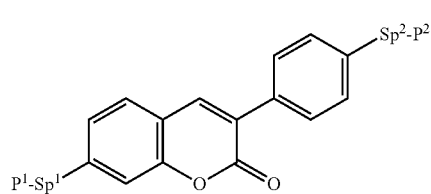
M16
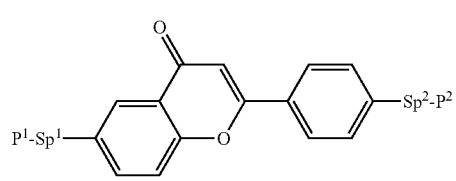
M17
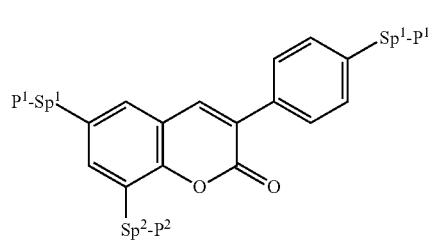
M18
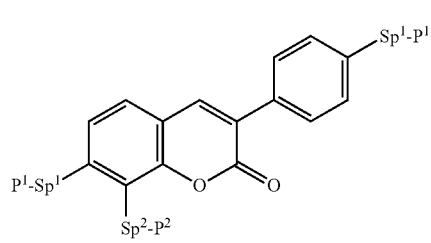
M19
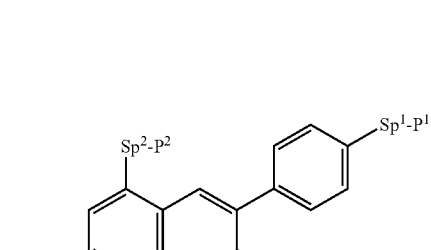
M20
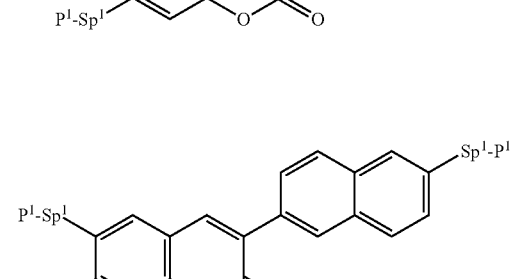
M21
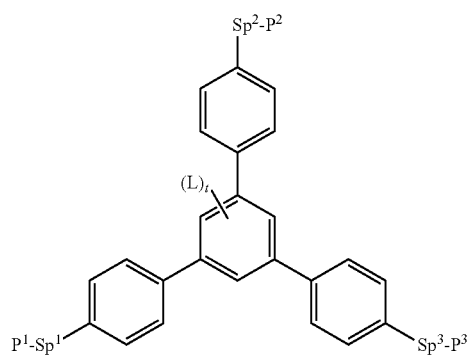
M22
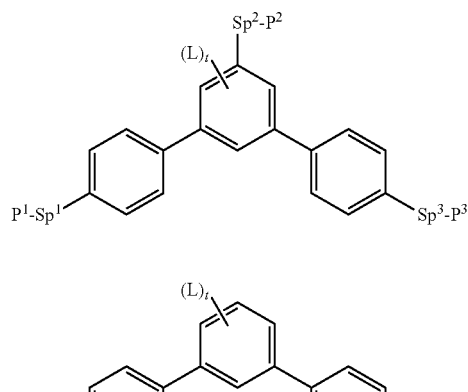
M23
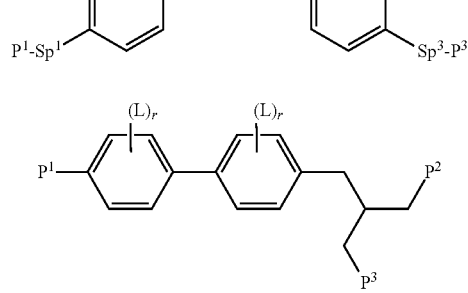
M24
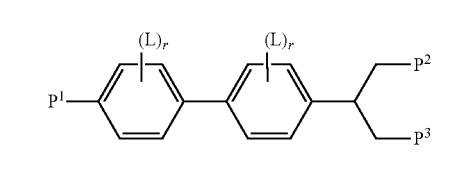
M25
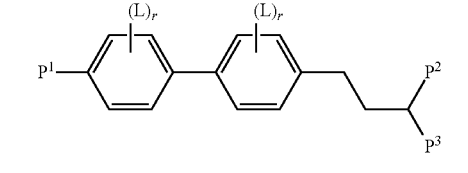
M26
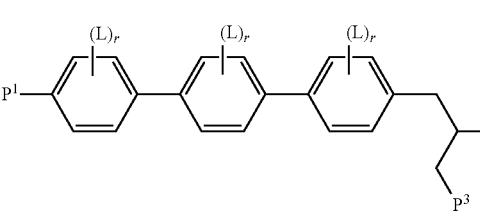
M27

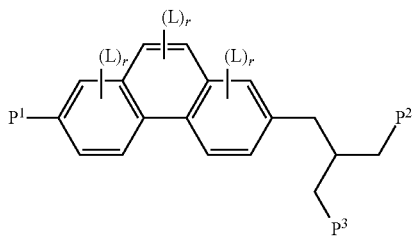
M28

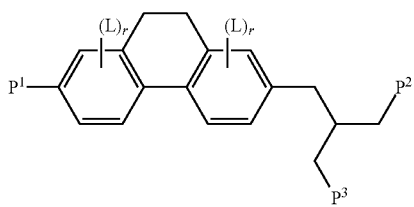
M29

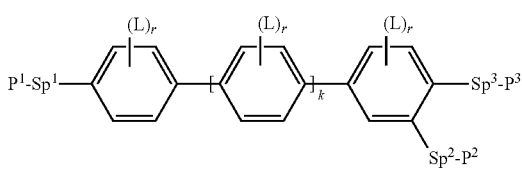
M30

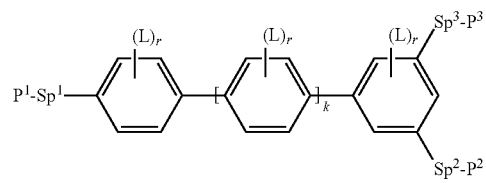
M31

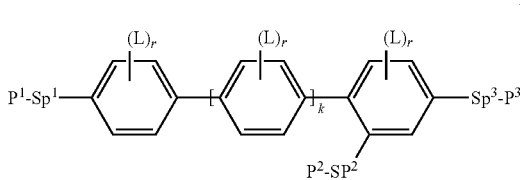
M32 in which the individual radicals, on each occurrence identically or differently, and each, independently of one another, have the following meaning:

$P^1$, $P^2$, $P^3$ a polymerisable group, preferably selected from vinyloxy, acrylate, methacrylate, fluoroacrylate, chloroacrylate, oxetane and epoxy, $Sp^1$, $Sp^2$, $Sp^3$ a single bond or a spacer group where, in addition, one or more of the radicals $P^1$-$Sp^1$-, $P^1$-$Sp^2$- and $P^3$—$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, preferably —$(CH_2)_{p1}$—, —$(CH_2)_{p1}$—, —O—, —$(CH_2)_{p1}$—CO—O— or —$(CH_2)_{p1}$—O—CO—O—, wherein p1 is an integer from 1 to 12, $R^{aa}$ H, F, Cl, CN or straight-chain or branched alkyl having 1 to 25 C atoms, in which, in addition, one or more non-adjacent $CH_2$ groups may each be replaced, independently of one another, by —C($R^0$)=C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P'-Sp'-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ H or alkyl having 1 to 12 C atoms, $R^y$ and $R^z$ H, F, $CH_3$ or $CF_3$, $Z^{M1}$ —O—, —CO—, —C($R^Y R^Z$)— or —$CF_2 CF_2$—, $Z^{M2}$, $Z^{M3}$ —CO—O—, —O—CO—, —$CH_2$O—, —$OCH_2$—, —$CF_2$O—, —$OCF_2$— or —$(CH_2)_n$—, where n is 2, 3 or 4, L F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L', L" H, F or Cl, k 0 or 1, r 0, 1, 2, 3 or 4, s 0, 1, 2 or 3, t 0, 1 or 2, x 0 or 1.

Especially preferred are compounds of formulae M2 and M13.

Further preferred are trireactive compounds M15 to M31, in particular M17, M18, M19, M22, M23, M24, M25, M30, M31 and M32.

In the compounds of formulae M1 to M32 the group

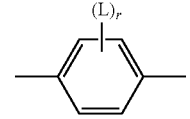

is preferably

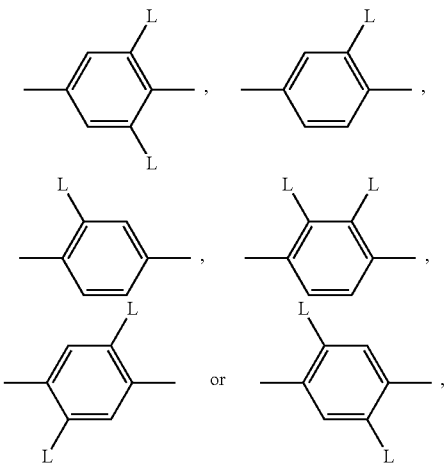

wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ oder $OCF_3$, especially F or $CH_3$.

Preferred compounds of formulae M1 to M32 are those wherein $P^1$, $P^2$ and $P^3$ denote an acrylate, methacrylate, oxetane or epoxy group, very preferably an acrylate or methacrylate group.

Further preferred compounds of formulae M1 to M32 are those wherein Sp', $Sp^2$ and $Sp^3$ are a single bond.

Further preferred compounds of formulae M1 to M32 are those wherein one of $Sp^1$, $Sp^2$ and $Sp^3$ is a single bond and another one of $Sp^1$, $Sp^2$ and $Sp^3$ is different from a single bond.

Further preferred compounds of formulae M1 to M32 are those wherein those groups $Sp^1$, $Sp^2$ and $Sp^3$ that are different from a single bond denote —$(CH_2)_{s1}$—X"—, wherein s1 is an integer from 1 to 6, preferably 2, 3, 4 or 5, and X" is the linkage to the benzene ring and is —O—, —O—CO—, —CO—O—, —O—CO—O— or a single bond.

Particular preference is given to LC media comprising one, two or three polymerisable compounds of formula M, preferably selected from formulae M1 to M32.

Further preferred polymerisable compounds are listed in Table D below.

Preferably the proportion of polymerisable compounds in the LC medium is from 0.01 to 5%, very preferably from 0.05 to 1%, most preferably from 0.1 to 0.5%.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from the group consisting of $CH_2$=$CW^1$—CO—O—, $CH_2$=$CW^1$—CO—,

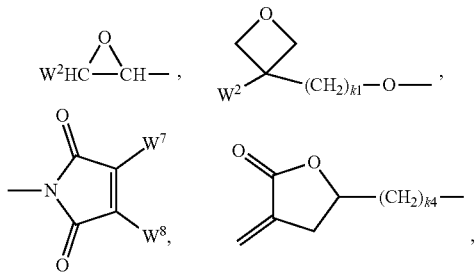

$CH_2$=$CW^2$—$(O)_{k3}$—, $CW^1$=CH—CO—$(O)_{k3}$—, $CW^1$=CH—CO—NH—, $CH_2$=$CW^1$—CO—NH—, $CH_3$—CH=CH—O—, $(CH_2$=CH$)_2$CH—OCO—, $(CH_2$=CH—$CH_2)_2$CH—OCO—, $(CH_2$=CH$)_2$CH—O—, $(CH_2$=CH—$CH_2)_2$N—, $(CH_2$=CH—$CH_2)_2$N—CO—, HO—$CW^2W^3$—, HS—$CW^2W^3$—, H$W^2$N—, HO—$CW^2W^3$—NH—, $CH_2$=$CW^1$—CO—NH—, $CH_2$=CH—$(COO)_{k1}$-Phe-$(O)_{k2}$—, $CH_2$=CH—$(CO)_{k1}$-Phe-$(O)_{k2}$—, Phe-CH=CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2$=$CW^1$—CO—O—, $CH_2$=$CW^1$—CO—,

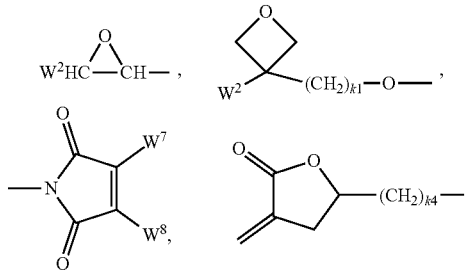

$CH_2$=$CW^2$—O—, $CH_2$=$CW^2$—, $CW^1$=CH—CO—$(O)_{k3}$—, $CW^1$=CH—CO—NH—, $CH_2$=$CW^1$—CO—NH—, $(CH_2$=CH$)_2$CH—OCO—, $(CH_2$=CH—$CH_2)_2$CH—OCO—, $(CH_2$=CH$)_2$CH—O—, $(CH_2$=CH—$CH_2)_2$N—, $(CH_2$=CH—$CH_2)_2$N—CO—, $CH_2$=$CW^1$—CO—NH—, $CH_2$=CH—$(COO)_{k1}$-Phe-$(O)_{k2}$—, $CH_2$=CH—$(CO)_{k1}$-Phe-$(O)_{k2}$—, Phe-CH=CH— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2$=$CW^1$—CO—O—, in particular $CH_2$=CH—CO—O—, $CH_2$=C($CH_3$)—CO—O— and $CH_2$=CF—CO—O—, furthermore $CH_2$=CH—O—, $(CH_2$=CH$)_2$CH—O—CO—, $(CH_2$=CH$)_2$CH—O—,

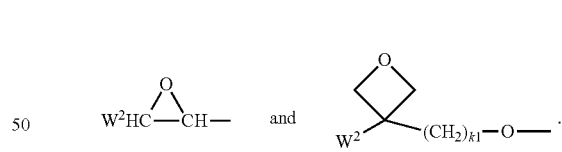

Further preferred polymerisable groups P are selected from the group consisting of vinyloxy, acrylate, methacrylate, fluoroacrylate, chloroacrylate, oxetane and epoxide, most preferably from acrylate and methacrylate.

If Sp is different from a single bond, it is preferably of the formula Sp"-X", so that the respective radical P-Sp- conforms to the formula P-Sp"-X"—, wherein Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$)—CP—O—, —O—CO—N(R⁰)—, —N(R⁰)—CO—N(R⁰⁰)—, —CH=CH— or —C≡C— in such a way that O and/or S atoms are not linked directly to one another, X" denotes —O—, —S—, —CO—, —CO—O—, —O—CO—, —O—CO—O—, —CO—N(R⁰)—, —N(R⁰)—CO—, —N(R⁰)—CO—N(R⁰⁰)—, —OCH₂—, —CH₂O—, —SCH₂—, —CH₂S—, —CF₂O—, —COF₂—, —CF₂S—, —SCF₂—, —CF₂CH₂—, —CH₂CF₂—, —CF₂CF₂—, —CH=N—, —N=CH—, —N=N—, —CH=CR⁰—, —CY²=CY³—, —CC—, —CH=CH—CO—O—, —O—CO—CH=CH— or a single bond, R⁰ and R⁰⁰ each, independently of one another, denote H or alkyl having 1 to 20 C atoms, and Y² and Y³ each, independently of one another, denote H, F, Cl or CN.

X" is preferably —O—, —S—, —CO—, —COO—, —OCO—, —O—COO—, —CO—NR⁰—, —NR⁰—CO—, —NR⁰—CO—NR⁰⁰— or a single bond.

Typical spacer groups Sp and -Sp"-X"— are, for example, —(CH₂)$_{p1}$—, —(CH₂CH₂O)$_{q1}$—CH₂CH₂—, —CH₂CH₂—S—CH₂CH₂—, —CH₂CH₂—NH—CH₂CH₂— or —(SiR⁰R⁰⁰—O)$_{p1}$—, in which p1 is an integer from 1 to 12, q1 is an integer from 1 to 3, and R⁰ and R⁰⁰ have the meanings indicated above.

Particularly preferred groups Sp and -Sp"-X"— are —(CH₂)$_{p1}$—, —(CH₂)$_{p1}$—O—, —(CH₂)$_{p1}$—O—CO—, —(CH₂)$_{p1}$—CO—O—, —(CH₂)$_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

For the production of PSA or PS-VA displays, the polymerisable compounds contained in the LC medium are polymerised or crosslinked (if one compound contains two or more polymerisable groups) by in-situ polymerisation in the LC medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

Preferably the proportion of the polymerisable compounds in the LC medium is from >0 to <5%, very preferably from >0 to <1%, most preferably from 0.01 to 0.5%.

Optionally one or more polymerisation initiators are added to the LC medium. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If a polymerisation initiator is employed, its proportion is preferably 0.001 to 5% by weight, particularly preferably 0.001 to 1% by weight.

In another preferred embodiment the LC medium does not contain a polymerisation initiator.

The LC medium may also comprise one or more stabilisers. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion is preferably 10-500,000 ppm, more preferably 50-5,000 ppm, very preferably 50-1,000 ppm.

In another preferred embodiment of the present invention the LC medium contains one or more stabilisers selected from Table C below.

In another preferred embodiment of the present invention the LC medium contains one or more stabilisers selected from the group consisting of the following formulae

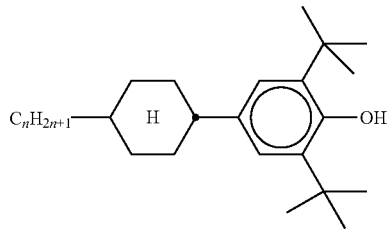

S1

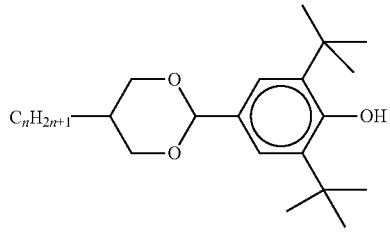

S2

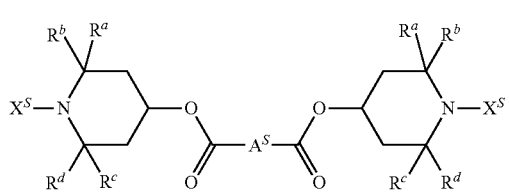

S3 wherein the individual radicals, independently of each other and on each occurrence identically or differently, have the following meanings R$^{a\text{-}d}$ straight-chain or branched alkyl with 1 to 10, preferably 1 to 6, very preferably 1 to 4 C atoms, most preferably methyl, X$^S$ H, CH₃, OH or O', A$^S$ straight-chain, branched or cyclic alkylene with 1 to 20 C atoms which is optionally substituted, n an integer from 1 to 6, preferably 3.

Preferred stabilisers of formula S3 are selected from formula S3A

S3A
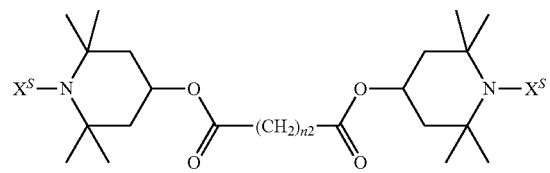
wherein n2 is an integer from 1 to 12, and wherein one or more H atoms in the group $(CH_2)_{n2}$ are optionally replaced by methyl, ethyl, propyl, butyl, pentyl or hexyl.
Very preferred stabilisers are selected from the group consisting of the following formulae
S1-1
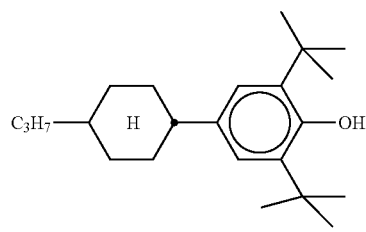
S2-1
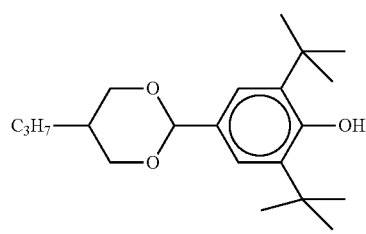
S3-1
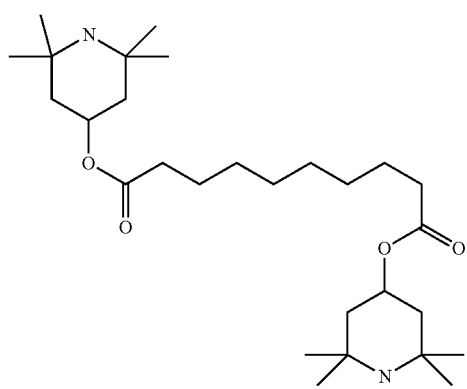
S3-2
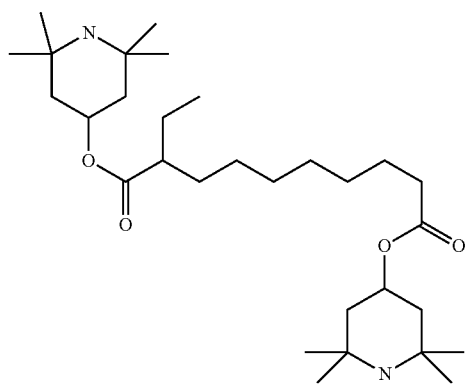
S3-3
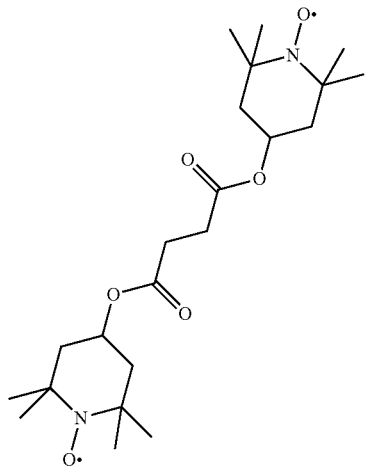
S3-4
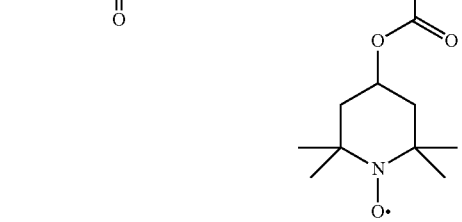
S3-5
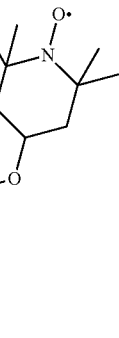
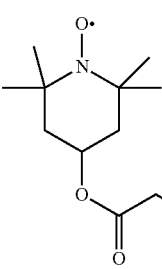

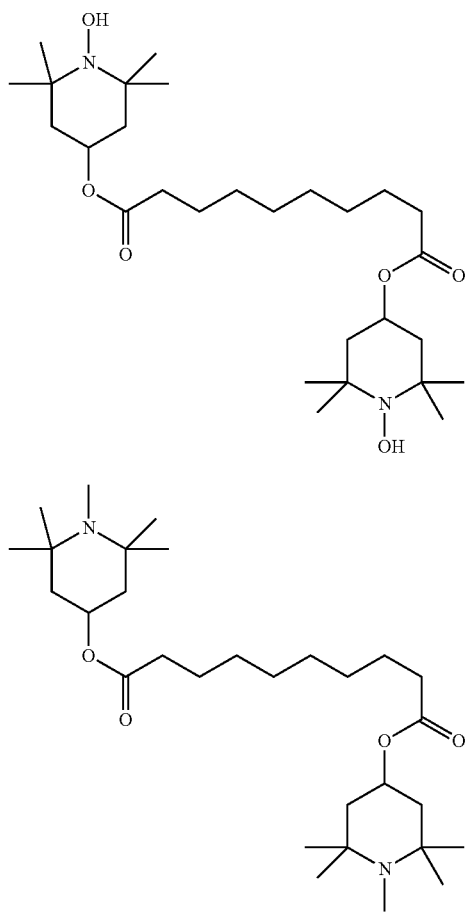

In a preferred embodiment the liquid-crystalline medium comprises one or more stabilisers selected from the group consisting of formulae S1-1, S2-1, S3-1, S3-1 and S3-3.

In a preferred embodiment the liquid-crystalline medium comprises one or more stabilisers selected from Table C below.

Preferably the proportion of stabilisers, like those of formula S1-S3, in the liquid-crystalline medium is from 10 to 500 ppm, very preferably from 20 to 100 ppm.

In another preferred embodiment the LC medium according to the present invention contains one or more SA additives selected from formula II or its subformulae. The concentration of the SA additives in the LC medium is preferably from 0.1 to 5%, very preferably from 0.2 to 3%, most preferably from 0.2 to 1.5%.

In a preferred embodiment the LC medium or display according to the present invention contains one or more SA additives selected from Table F below.

In another preferred embodiment the SA-VA or SA-FFS display according to the present invention does not contain a polyimide alignment layer.

Preference is given to LC media which have a nematic LC phase, and preferably have no chiral liquid crystal phase.

In another preferred embodiment the LC media contain one or more chiral dopants, preferably in a concentration from 0.01 to 1%, very preferably from 0.05 to 0.5%. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The construction of an LC display according to the invention from polarisers, electrode base plates and surface-treated electrodes corresponds to the usual design for displays of this type. The term usual design is broadly drawn here and also encompasses all derivatives and modifications of the LC display, in particular including matrix display elements based on poly-Si TFTs or MIM.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

Above and below, percentage data denote percent by weight; all temperatures are indicated in degrees Celsius.

Throughout the patent application, 1,4-cyclohexylene rings and 1,4-phenylene rings are depicted as follows:

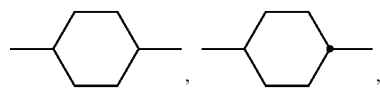

-continued

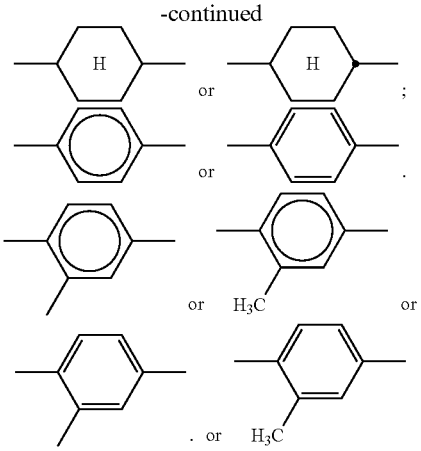

The cyclohexylene rings are trans-1,4-cyclohexylene rings.

Throughout the patent application and in the working examples, the structures of the liquid-crystal compounds are indicated by means of acronyms. Unless indicated otherwise, the transformation into chemical formulae takes place in accordance with Tables I-III. All radicals $C_nH_{2n+1}$, $C_mH_{2m+1}$, $C_nH_{2n}$, $C_mH_{2m}$ and $C_kH_{2k}$ are straight-chain alkyl radicals or alkenyl radicals respectively, in each case having n, m or k C atoms; n and m each, independently of one another, denote 1, 2, 3, 4, 5, 6, 7, 8, 9, 10, 11 or 12, preferably 1, 2, 3, 4, 5 or 6, and k is 0, 1, 2, 3, 4, 5 or 6. In Table I the ring elements of the respective compound are coded, in Table II the bridging members are listed and in Table III the meanings of the symbols for the left-hand and right-hand side chains of the compounds are indicated.

TABLE I

| Ring elements |
|---|
| A |
| AI |
| B |
| B(S) |

TABLE I-continued

| Ring elements |
|---|
| C |
| D |
| DI |
| F |
| FI |
| G |
| GI |
| 1G |
| G1 |

TABLE I-continued

Ring elements

K (indane with F, F, F substituents)

L (cyclohexane)

LI (cyclohexene)

M (pyrimidine-2,5-diyl)

MI (pyrimidine-2,5-diyl, alternate)

N (pyridine)

NI (pyridine, alternate)

P (phenyl)

S (thiophene)

U (difluorophenyl)

UI (trifluorophenyl)

Y (difluorophenyl)

Y(F,Cl) (fluoro-chloro phenyl)

Y(Cl,F) (chloro-fluoro phenyl)

1Y (difluoro-methyl phenyl)

Y1 (difluoro-methyl phenyl)

TABLE II

| | Bridging members | | |
|---|---|---|---|
| E | —CH₂CH₂— | | |
| V | —CH═CH— | | |
| T | —C≡C— | | |
| W | —CF₂CF₂— | | |
| Z | —COO— | ZI | —OCO— |
| O | —CH₂O— | OI | —OCH₂— |
| Q | —CF₂O— | QI | —OCF₂— |

TABLE III

| Side chains | | | |
|---|---|---|---|
| Left-hand side chain | | Right-hand side chain | |
| n— | $C_nH_{2n+1}$— | —n | —$C_nH_{2n+1}$ |
| nO— | $C_nH_{2n+1}$—O— | —On | —O—$C_nH_{2n+1}$ |
| V— | $CH_2$=CH— | —V | —CH=$CH_2$ |
| nV— | $C_nH_{2n+1}$—CH=CH— | —nV | —$C_nH_{2n}$—CH=$CH_2$ |
| Vn— | $CH_2$=CH—$C_nH_{2n}$— | —Vn | —CH=CH—$C_nH_{2n+1}$ |
| nVm— | $C_nH_{2n+1}$—CH=CH—$C_mH_{2m}$— | —nVm | —$C_nH_{2n}$—CH=CH—$C_mH_{2m+1}$ |
| N— | N≡C— | —N | —C≡N |
| F— | F— | —F | —F |
| Cl— | Cl— | —Cl | —Cl |
| M— | $CFH_2$— | —M | —$CFH_2$ |
| D— | $CF_2H$— | —D | —$CF_2H$ |
| T— | $CF_3$— | —T | —$CF_3$ |
| MO— | $CFH_2O$— | —OM | —$OCFH_2$ |
| DO— | $CF_2HO$— | —OD | —$OCF_2H$ |
| TO— | $CF_3O$— | —OT | —$OCF_3$ |
| T— | $CF_3$— | —T | —$CF_3$ |
| A— | H—C≡C— | —A | —C≡C—H |
| FXO— | $CF_2$=CHO— | —OXF | —OCH=$CF_2$ |
| 3Cy— | △— | —Cy3 | —△ |
| 3Cy1— | △—/ | —1Cy3 | /—△ |
| 4Cy— | ◇— | —Cy4 | —◇ |
| 5Cy— | ⬠— | —Cy5 | —⬠ |
| 3Cy1O— | △—$CH_2O$— | —O1Cy3 | —$OCH_2$—△ |
| 4Cy1O— | ◇—$CH_2O$— | —O1Cy4 | —$OCH_2$—◇ |
| 5Cy1O— | ⬠—$CH_2O$— | —O1Cy5 | —$OCH_2$—⬠ |

Preferred mixture components are shown in Table A. In a preferred embodiment the mixtures according to the present invention contain one or more compounds selected from the Table A.

TABLE A

In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.

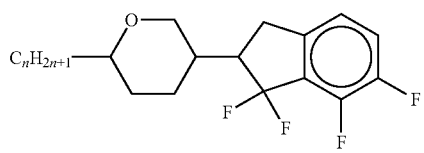

AIK-n-F

TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
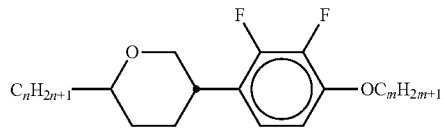
AIY-n-Om
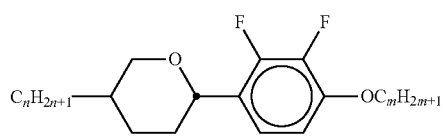
AY-n-Om
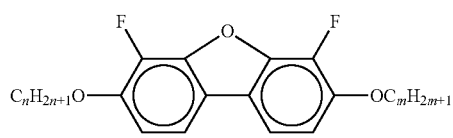
B-nO-Om
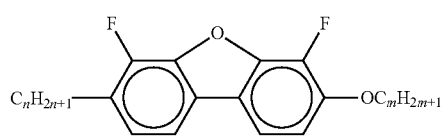
B-n-Om
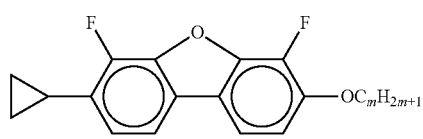
B-3Cy-Om
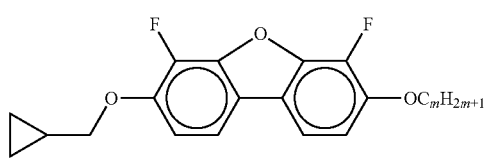
B-3Cy1O-Om
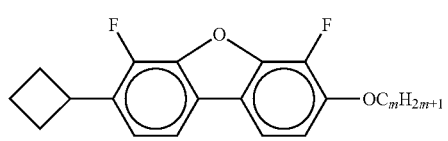
B-4Cy-Om
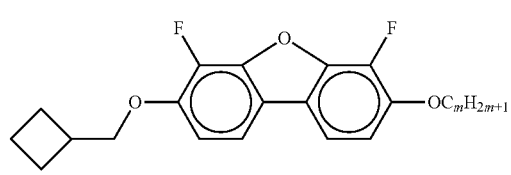
B-4Cy1O-Om TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
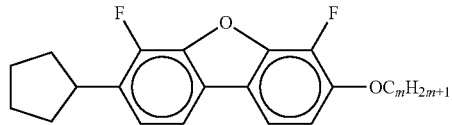
B-5Cy-Om
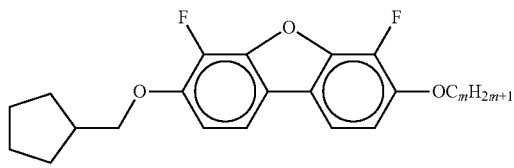
B-5Cy1O-Om
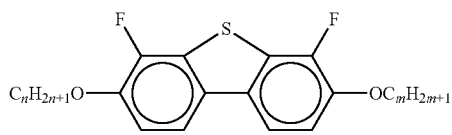
B(S)-nO-Om
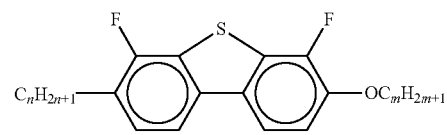
B(S)-n-Om
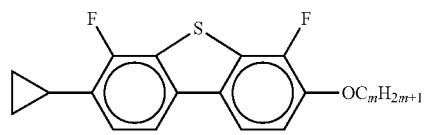
B(S)-3Cy-Om
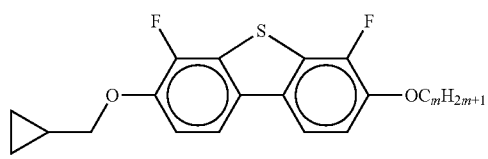
B(S)-3Cy1O-Om
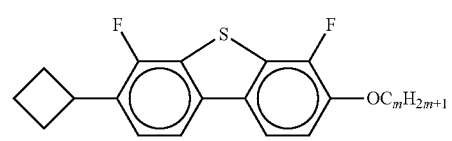
B(S)-4Cy-Om
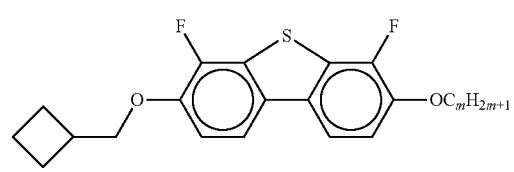
B(S)-4Cy1O-Om TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
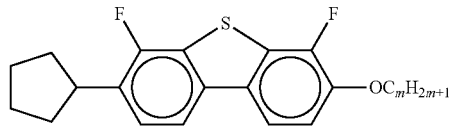
B(S)-5Cy-Om
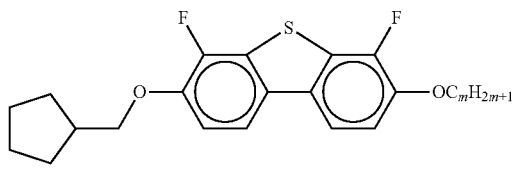
B(S)-5Cy1O-Om
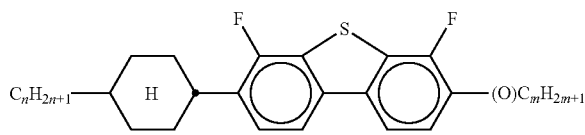
CB(S)-n-(O)m
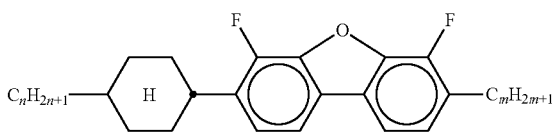
CB-n-m
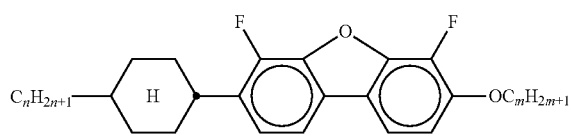
CB-n-Om
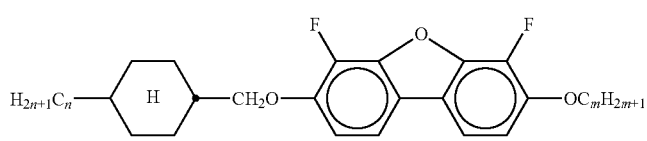
COB-n-Om
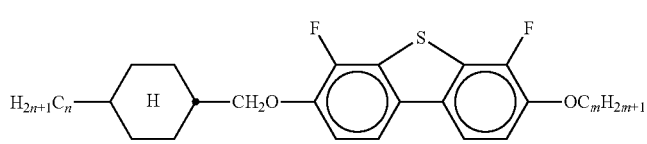
COB(S)-n-Om
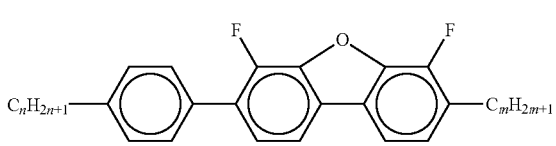
PB-n-m TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
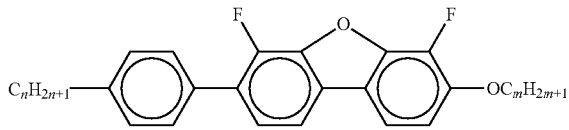
PB-n-Om
BCH-nm
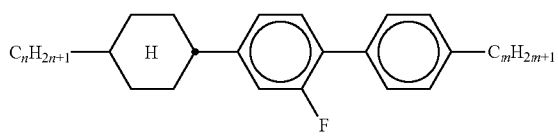
BCH-nmF
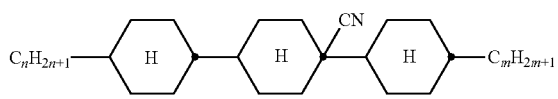
BCN-nm
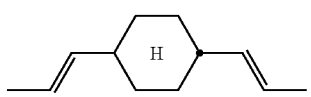
C-1V-V1
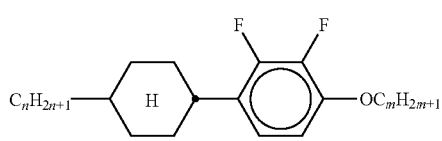
CY-n-Om
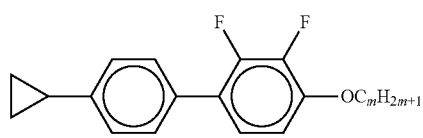
CY-3Cy-Om
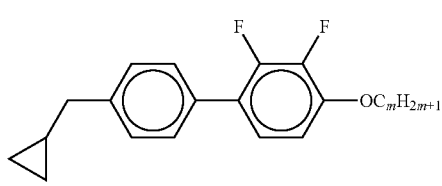
CY-3Cy1-Om
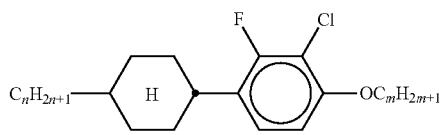
CY(F,Cl)-n-Om TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
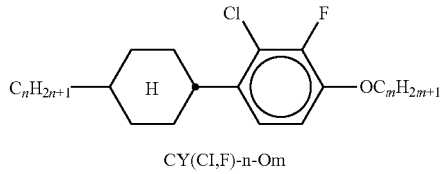
CY(Cl,F)-n-Om
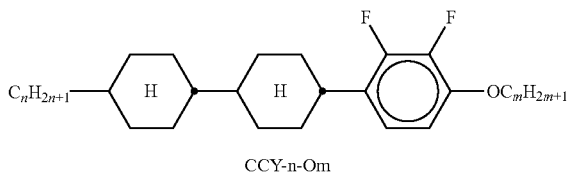
CCY-n-Om
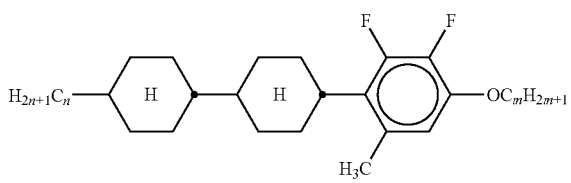
CC1Y-n-Om
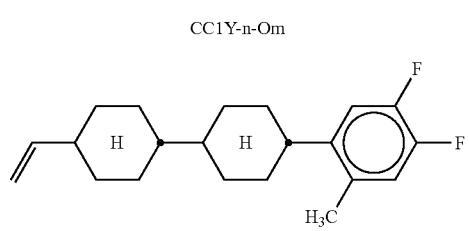
CC1G-V-F
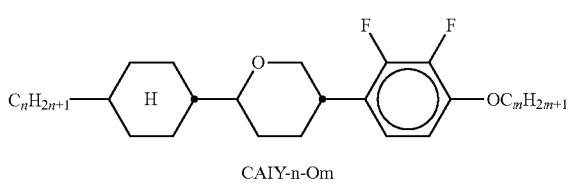
CAIY-n-Om
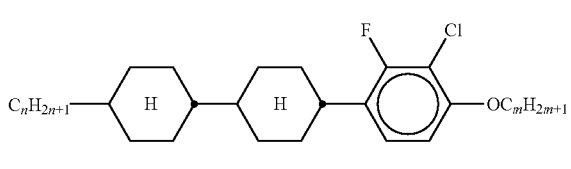
CCY(F,Cl)-n-Om
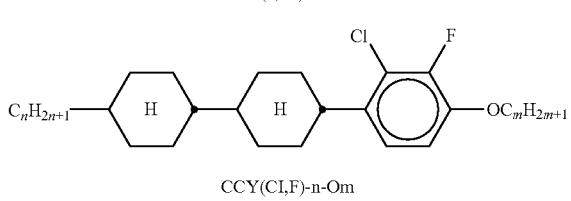
CCY(Cl,F)-n-Om
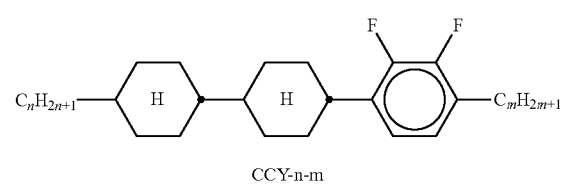
CCY-n-m TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
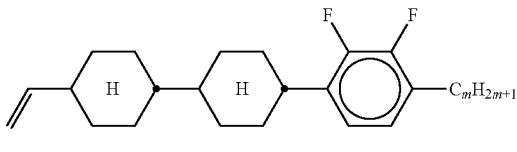
CCY-V-m
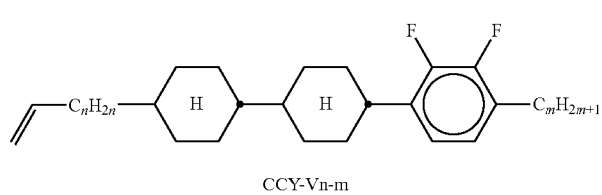
CCY-Vn-m
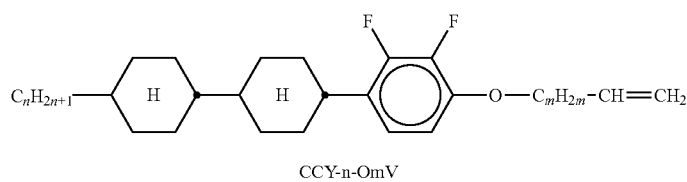
CCY-n-OmV
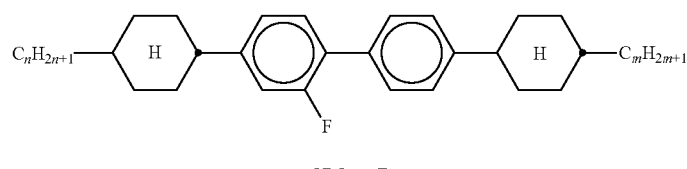
CBC-nmF
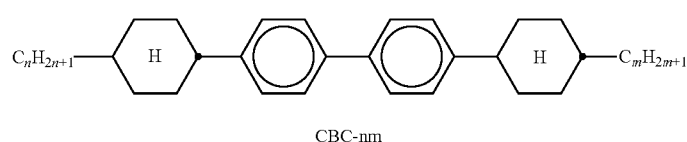
CBC-nm
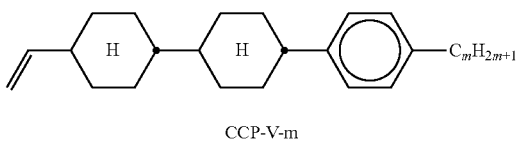
CCP-V-m
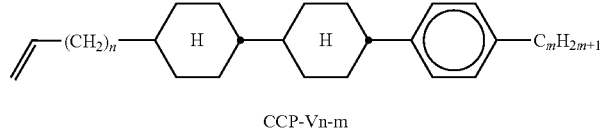
CCP-Vn-m
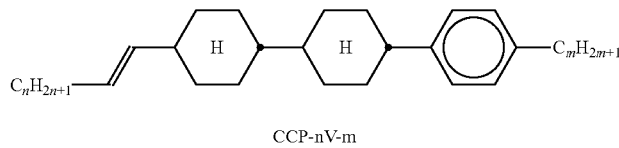
CCP-nV-m
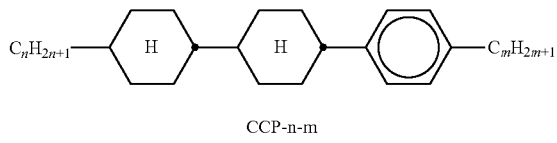
CCP-n-m TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
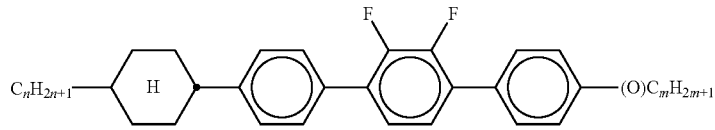
CPYP-n-(O)m
CYYC-n-m
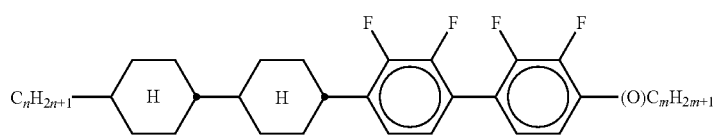
CCYY-n-(O)m
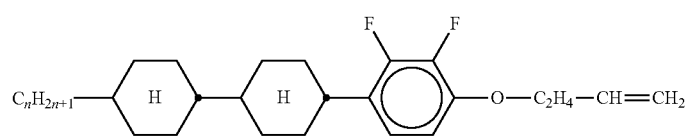
CCY-n-O2V
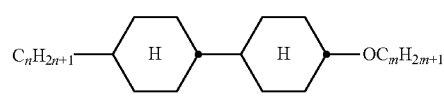
CCH-nOm, CC-n-Om
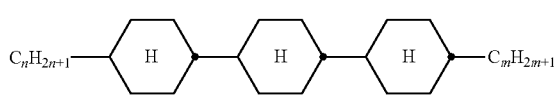
CCC-n-m
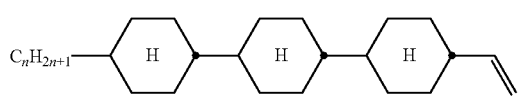
CCC-n-V
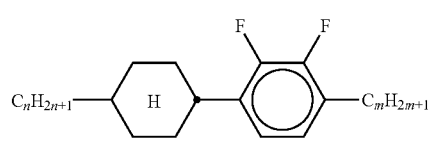
CY-n-m
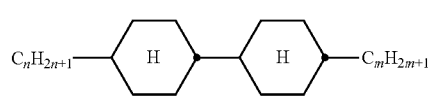
CCH-nm, CC-n-m TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
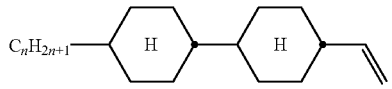
CC-n-V
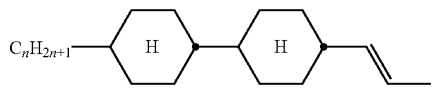
CC-n-V1
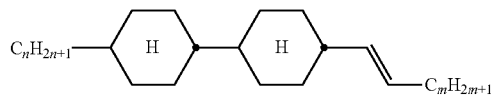
CC-n-Vm
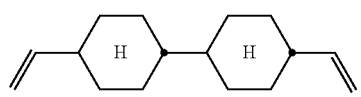
CC-V-V
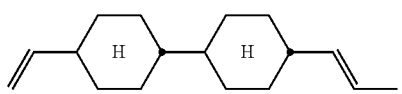
CC-V-V1
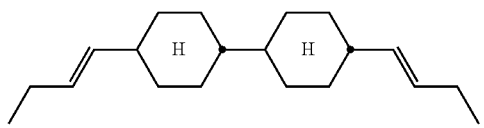
CC-2V-V2
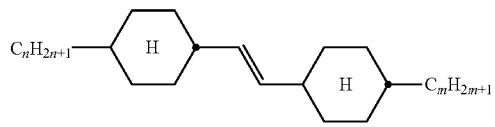
CVC-n-m
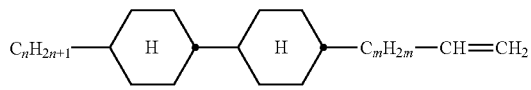
CC-n-mV
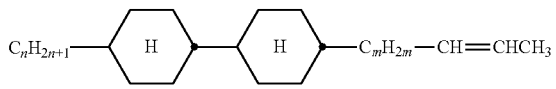
CC-n-mV1
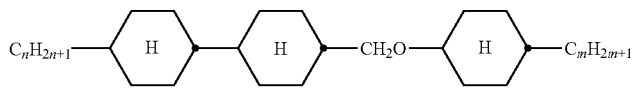
CCOC-n-m TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
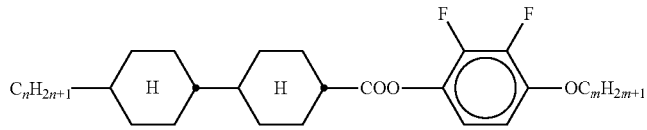
CP-nOmFF
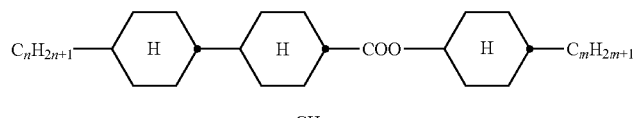
CH-nm
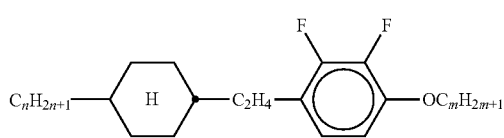
CEY-n-Om
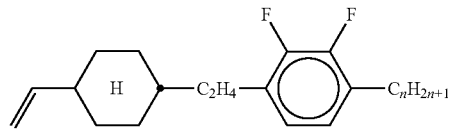
CEY-V-n
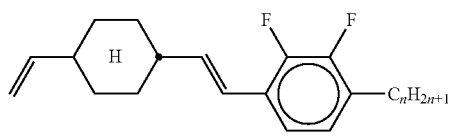
CVY-V-n
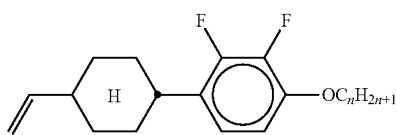
CY-V-On
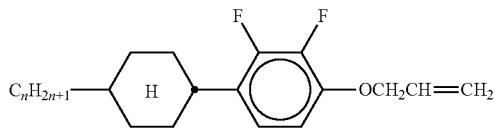
CY-n-O1V
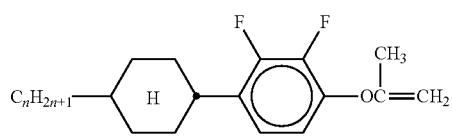
CY-n-OC(CH$_3$)=CH$_2$
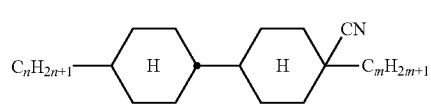
CCN-nm TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
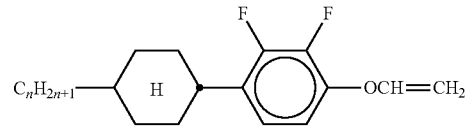
CY-n-OV
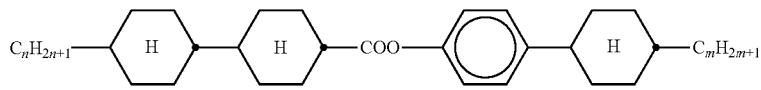
CCPC-nm
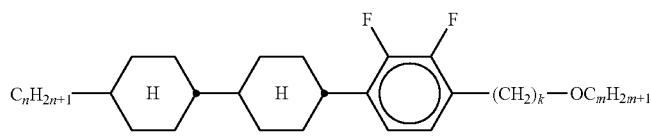
CCY-n-kOm
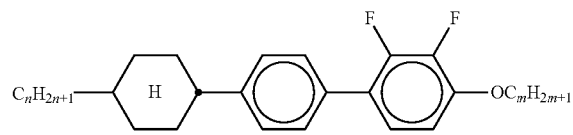
CPY-n-Om
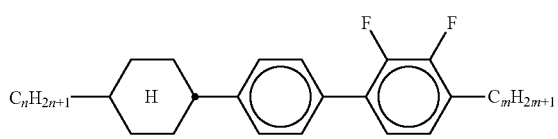
CPY-n-m
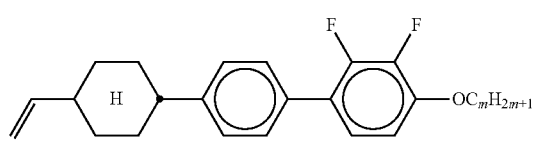
CPY-V-Om
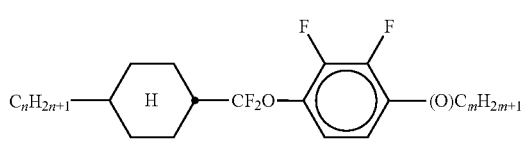
CQY-n-(O)m
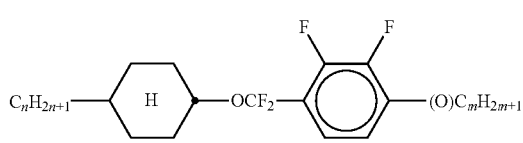
CQIY-n-(O)m TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
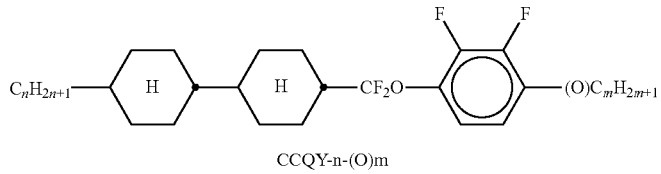
CCQY-n-(O)m
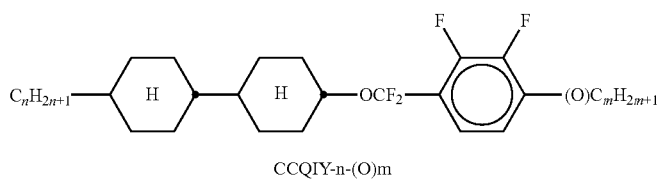
CCQIY-n-(O)m
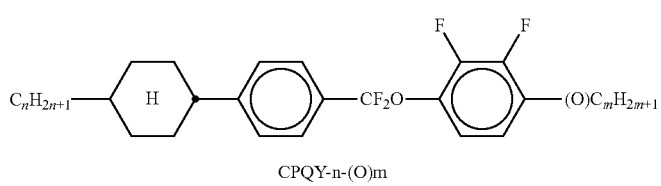
CPQY-n-(O)m
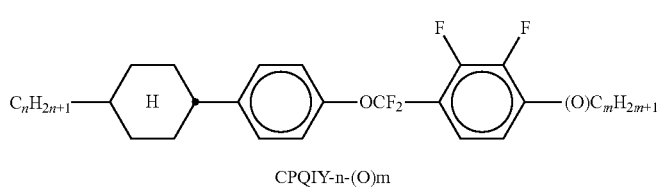
CPQIY-n-(O)m
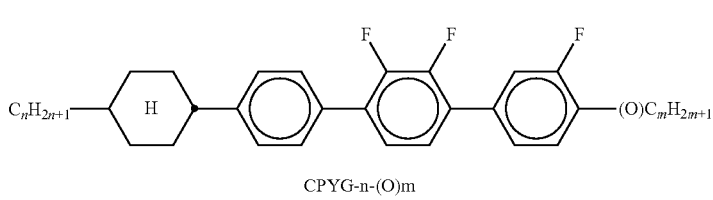
CPYG-n-(O)m
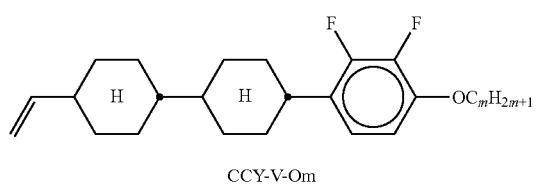
CCY-V-Om
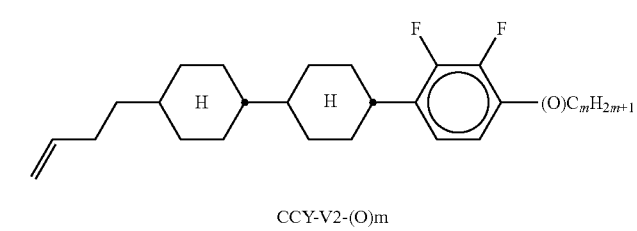
CCY-V2-(O)m
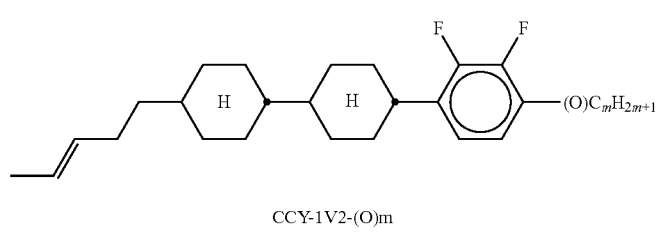
CCY-1V2-(O)m TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
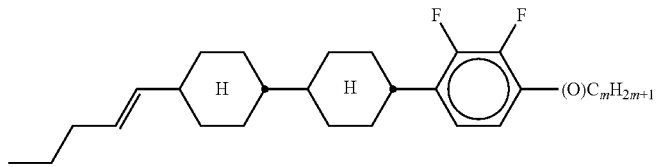
CCY-3V-(O)m
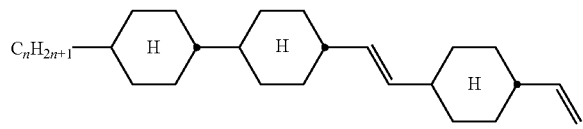
CCVC-n-V
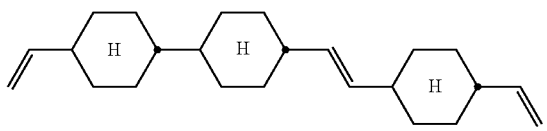
CCVC-V-V
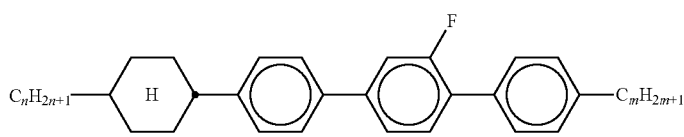
CPGP-n-m
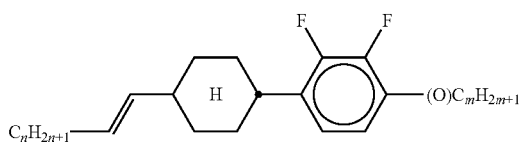
CY-nV-(O)m
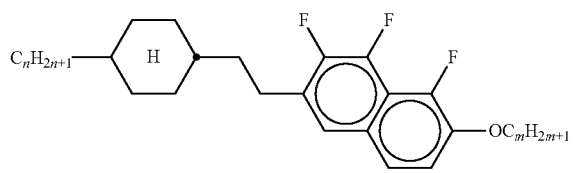
CENaph-n-Om
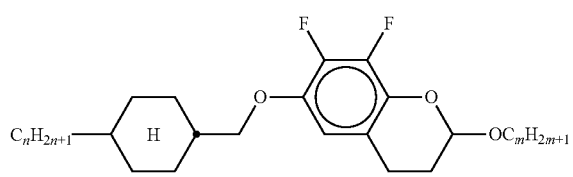
COChrom-n-Om TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
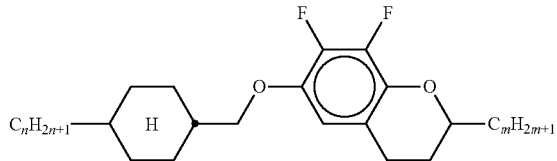
COChrom-n-m
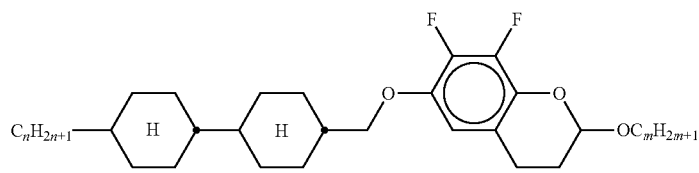
CCOChrom-n-Om
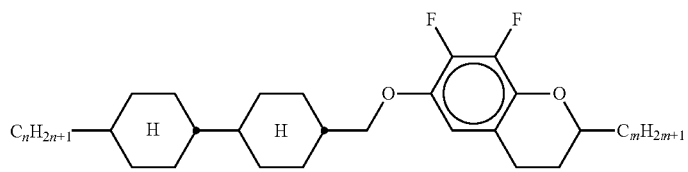
CCOChrom-n-m
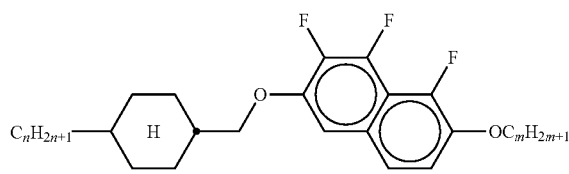
CONaph-n-Om
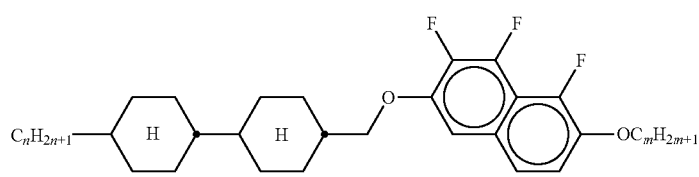
CCONaph-n-Om
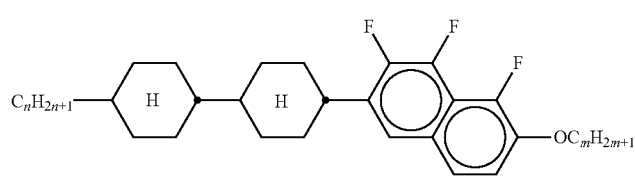
CCNaph-n-Om
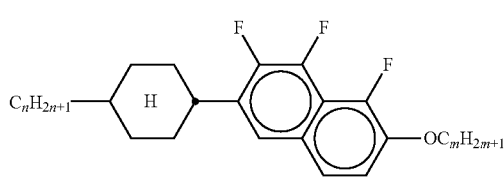
CNaph-n-Om TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
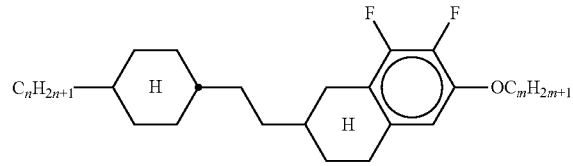
CETNaph-n-Om
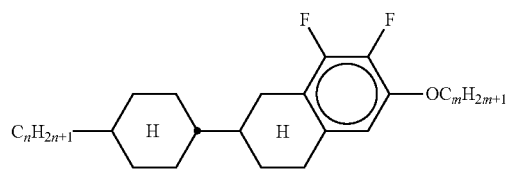
CTNaph-n-Om
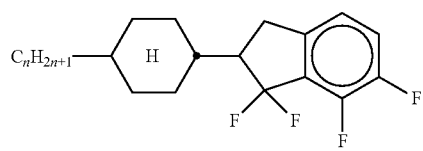
CK-n-F
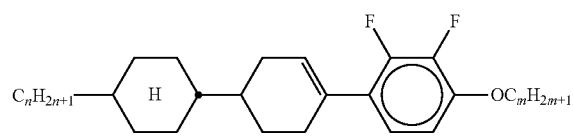
CLY-n-Om
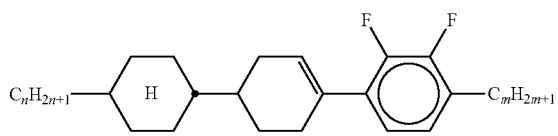
CLY-n-m
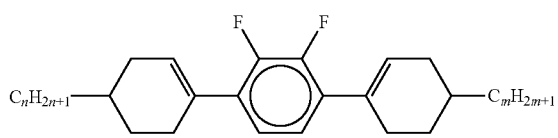
LYLI-n-m
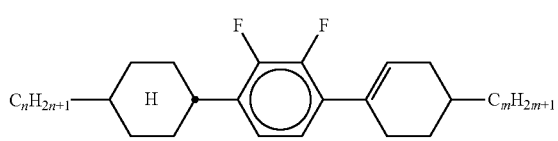
CYLI-n-m
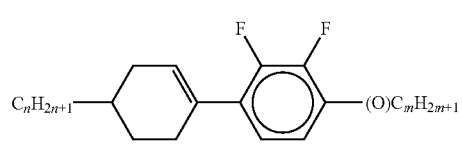
LY-n-(O)m TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
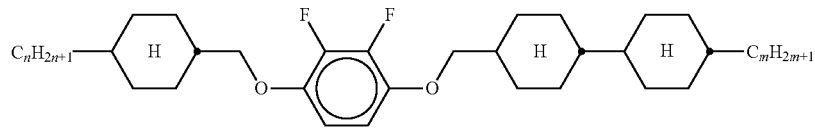
COYOICC-n-m
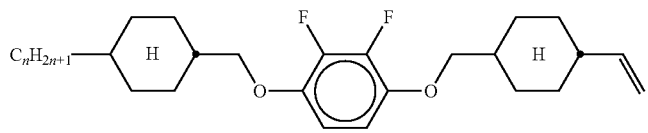
COYOIC-n-V
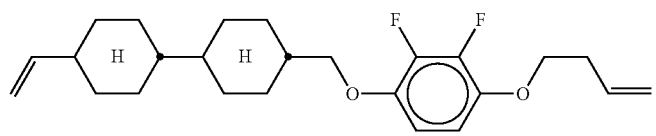
CCOY-V-O2V
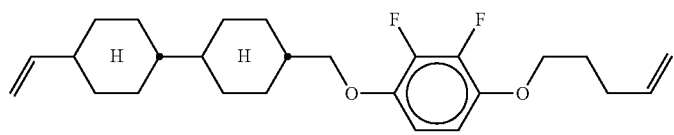
CCOY-V-O3V
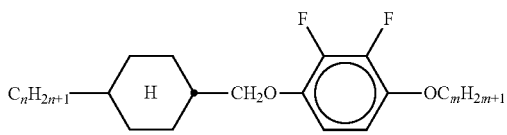
COY-n-Om
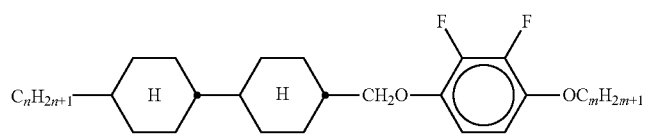
CCOY-n-Om
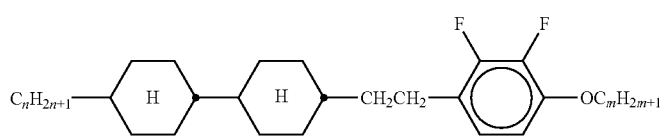
CCEY-n-Om
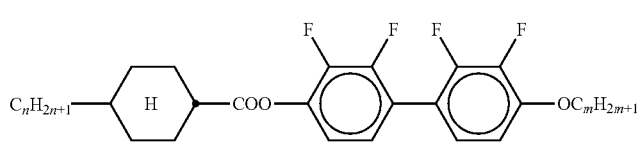
CZYY-n-Om TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
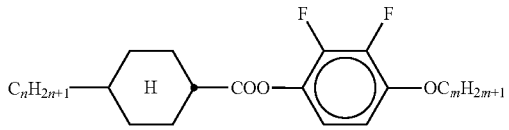
D-nOmFF
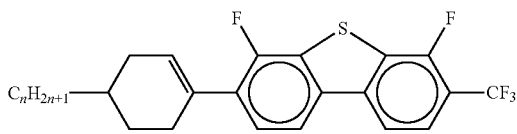
LB(S)-n-T
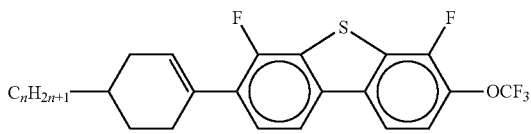
LB(S)-n-OT
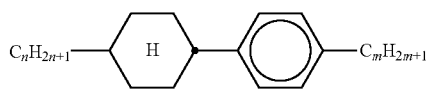
PCH-nm, CP-n-m
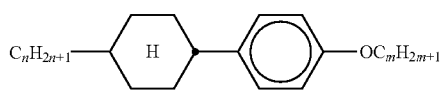
PCH-nOm, CP-n-Om
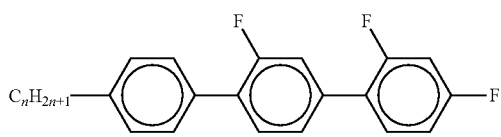
PGIGI-n-F
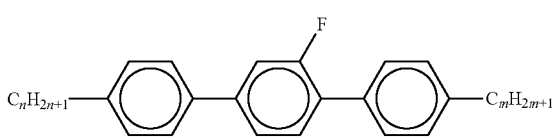
PGP-n-m
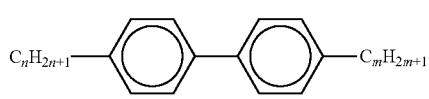
PP-n-m
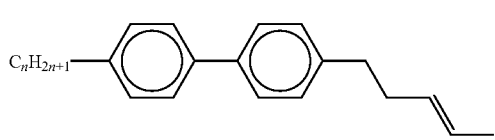
PP-n-2V1

TABLE A-continued
In the formulae below m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
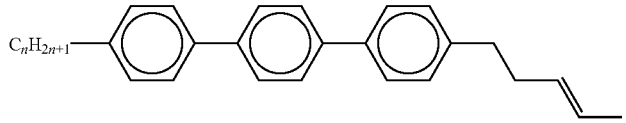
PPP-n-2V1
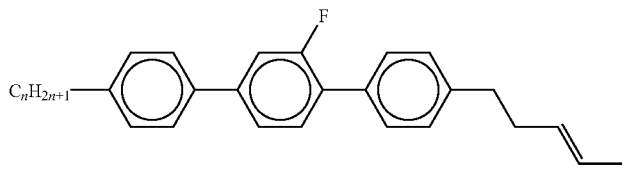
PGP-n-2V1
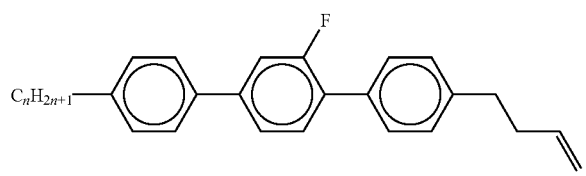
PGP-n-2V
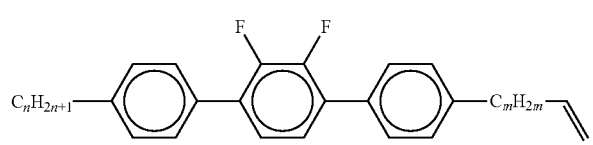
PYP-n-mV
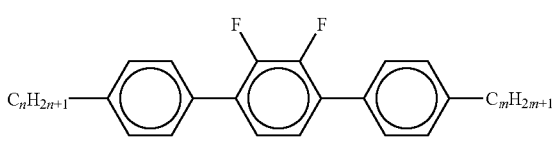
PYP-n-m
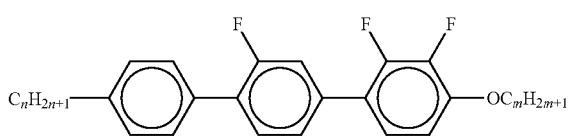
PGIY-n-Om
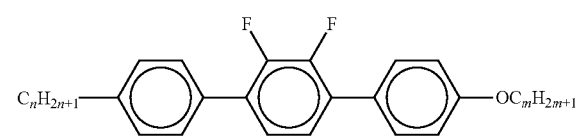
PYP-n-Om
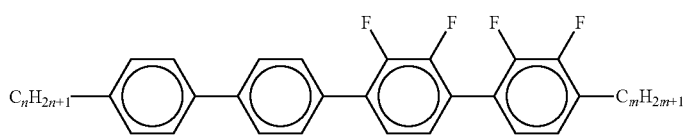
PPYY-n-m TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
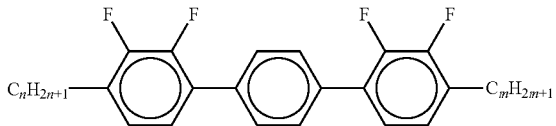
YPY-n-m
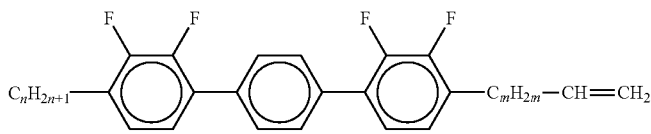
YPY-n-mV
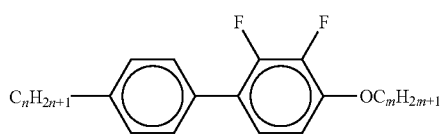
PY-n-Om
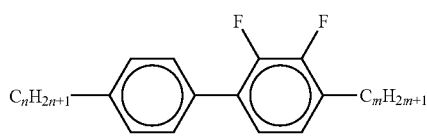
PY-n-m
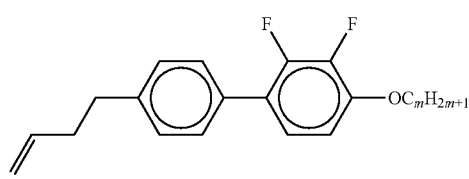
PY-V2-Om
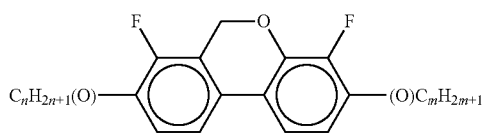
DFDBC-n(O)-(O)m
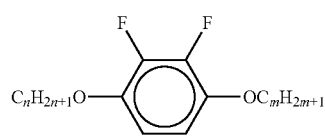
Y-nO-Om
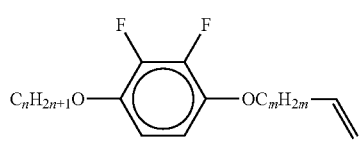
Y-nO-OmV TABLE A-continued
In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
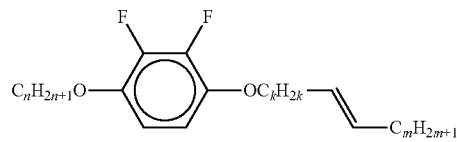
Y-nO-OkVm
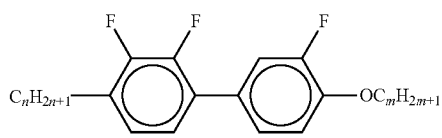
YG-n-Om
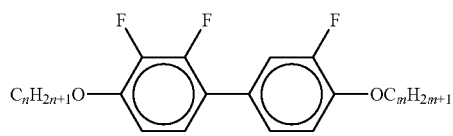
YG-nO-Om
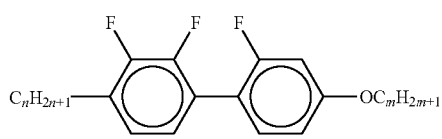
YGI-n-Om
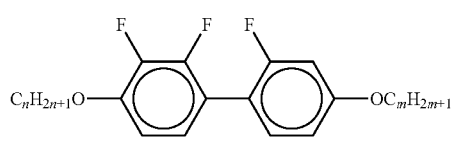
YGI-nO-Om
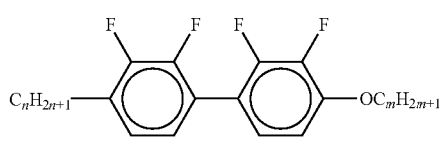
YY-n-Om
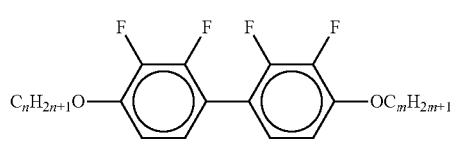
YY-nO-Om TABLE A-continued In the formulae below m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.

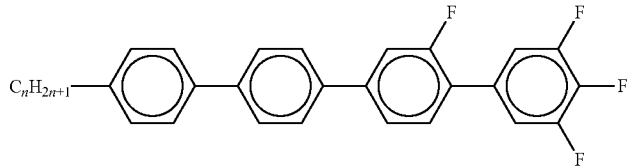

PPGU-n-F

Particular preference is given to liquid-crystalline mixtures which comprise at least one, two, three, four or more compounds from Table A.

Table B indicates possible dopants which are generally added to the mixtures according to the invention. The mixtures preferably comprise 0-10% by weight, in particular 0.001-5% by weight and particularly preferably 0.001-3% by weight, of dopants.

TABLE B

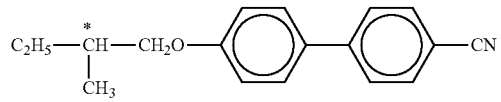

C 15

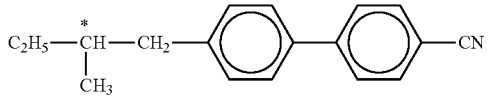

CB 15

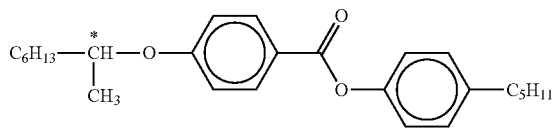

CM 21

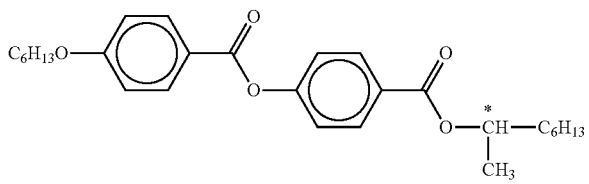

R/S-811

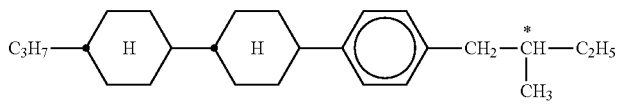

CM 44

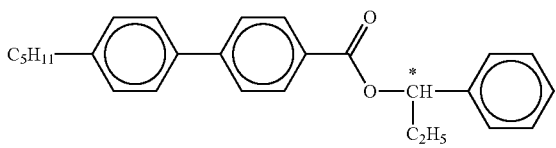

TABLE B-continued
CM 45
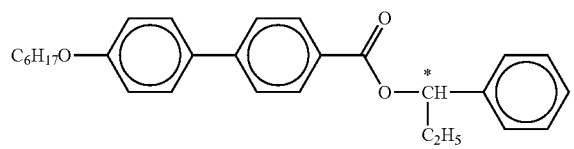
CM 47
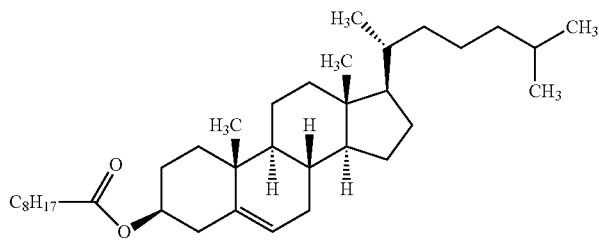
CN
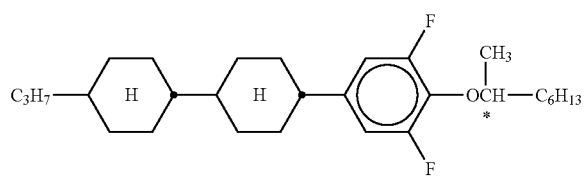
R/S-2011
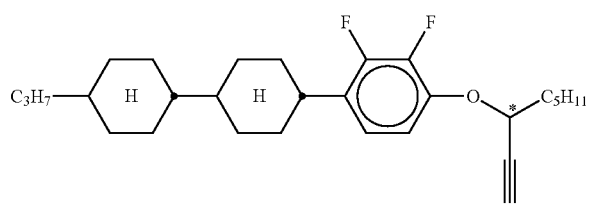
R/S-3011
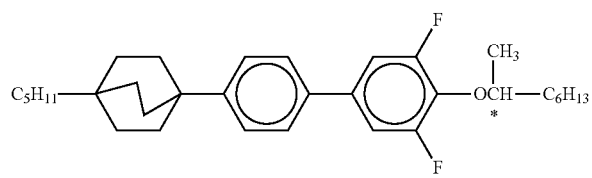
R/S-4011
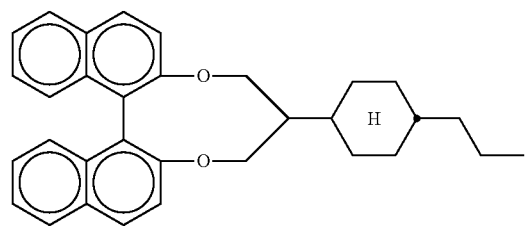
R/S-5011

TABLE B-continued
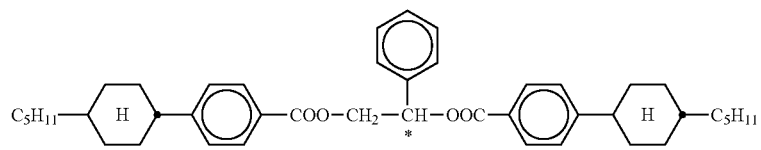
R/S-1011
TABLE C
Stabilisers which can be added, for example, to the mixtures according to the invention in amounts of 0-10% by weight are mentioned below.
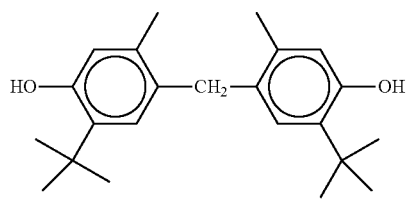
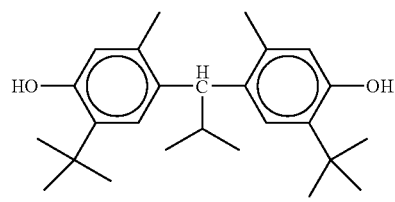
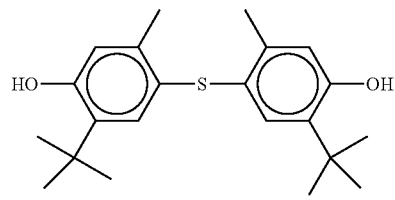
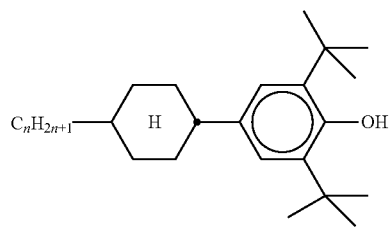
n = 1, 2, 3, 4, 5, 6 or 7
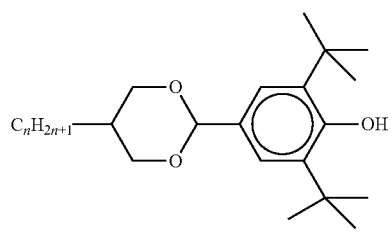
n = 1, 2, 3, 4, 5, 6 or 7

TABLE C-continued
Stabilisers which can be added, for example, to the mixtures according to the invention in amounts of 0-10% by weight are mentioned below.
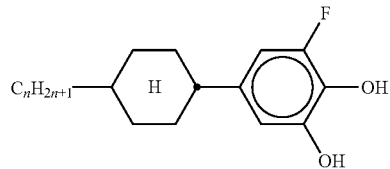
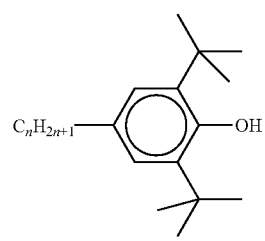
n = 1, 2, 3, 4, 5, 6 or 7
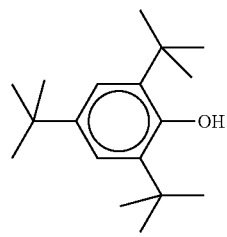
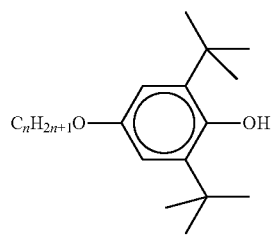
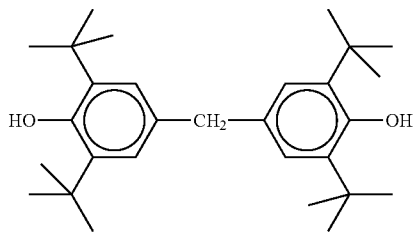
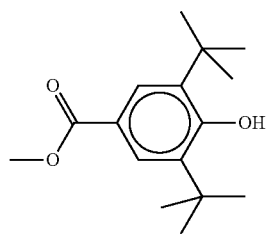

TABLE C-continued
Stabilisers which can be added, for example, to the mixtures according to the invention in amounts of 0-10% by weight are mentioned below.
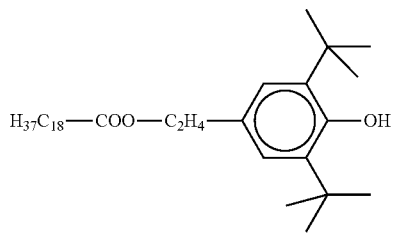
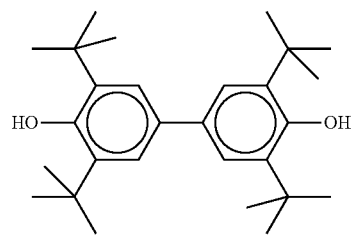
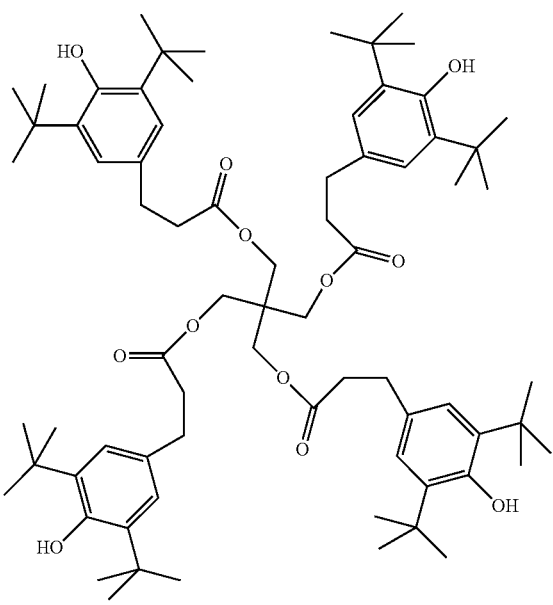 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
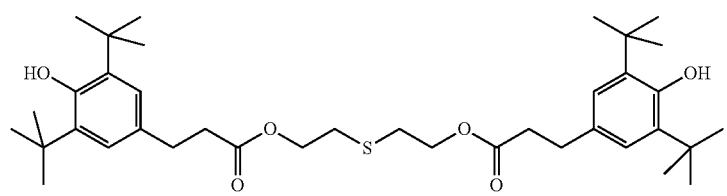 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE C-continued
Stabilisers which can be added, for example, to the mixtures according to the invention in amounts of 0-10% by weight are mentioned below.
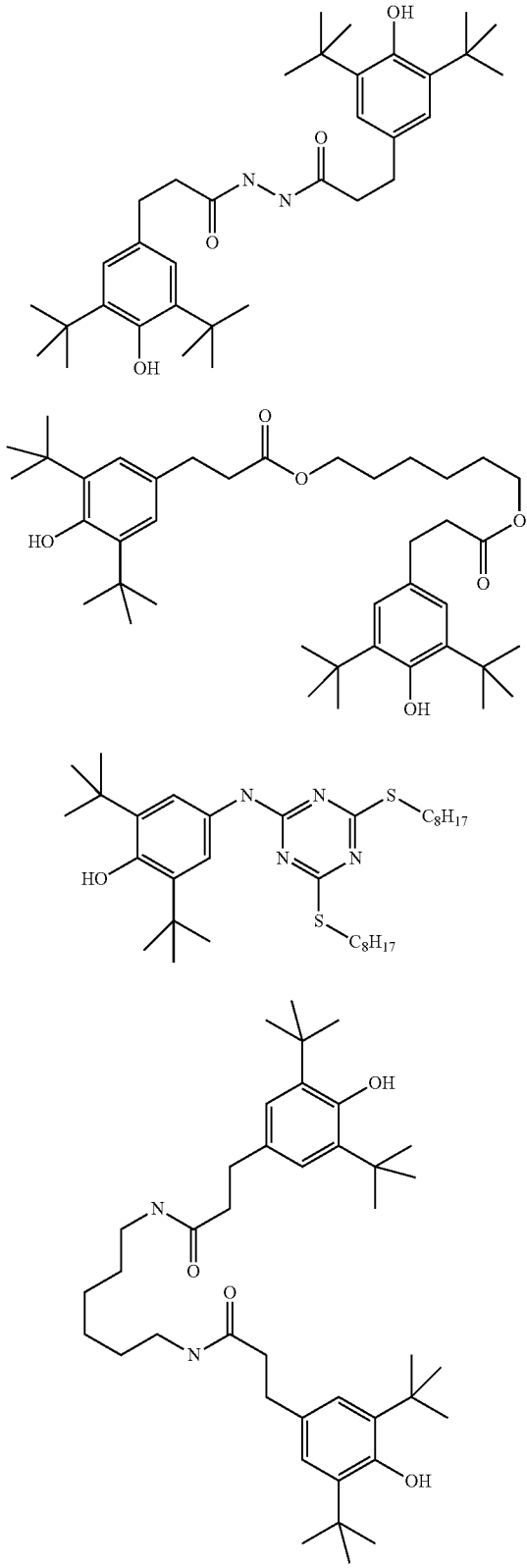

TABLE C-continued
Stabilisers which can be added, for example, to the mixtures according to the invention in amounts of 0-10% by weight are mentioned below.
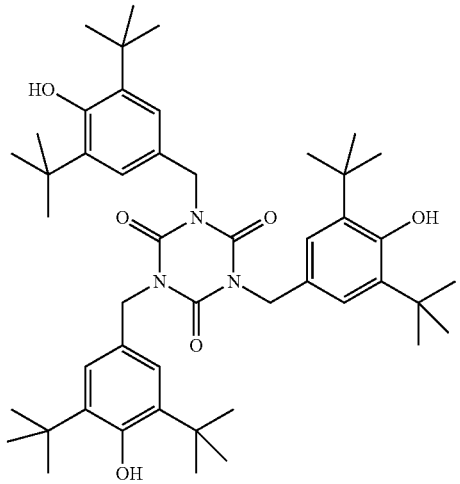 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
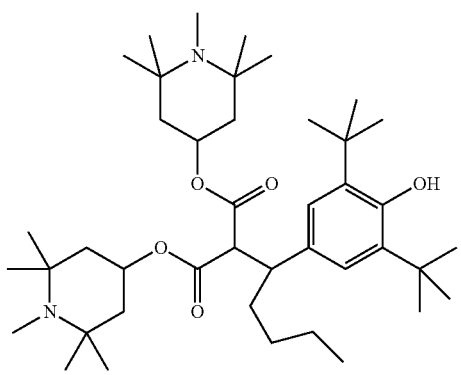 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
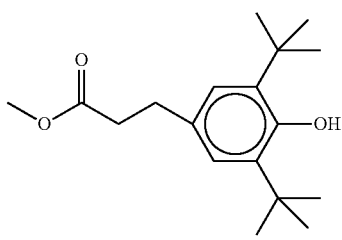
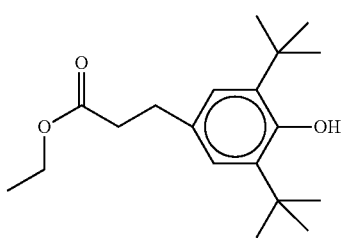
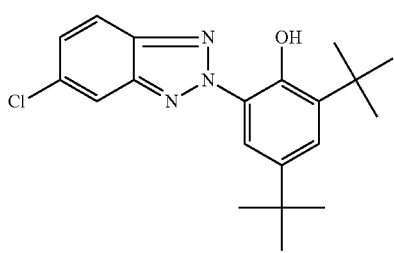 [SMILES: CC(C)(C)c1cc(-n2nc3ccc(Cl)cc3n2)c(O)c(C(C)(C)C)c1]

TABLE C-continued
Stabilisers which can be added, for example, to the mixtures according to the invention in amounts of 0-10% by weight are mentioned below.
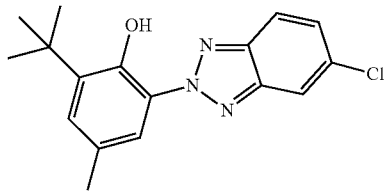 [SMILES: Cc1cc(-n2nc3ccc(Cl)cc3n2)c(O)c(C(C)(C)C)c1]
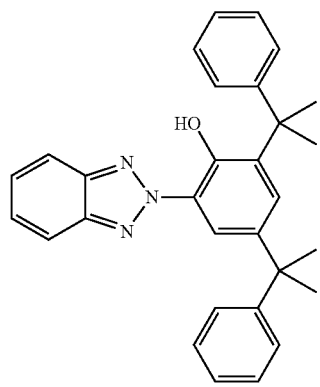 [SMILES: CC(C)(c1ccccc1)c1cc(-n2nc3ccccc3n2)c(O)c(C(C)(C)c2ccccc2)c1]
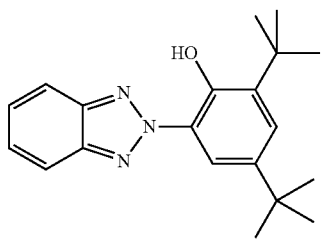 [SMILES: CC(C)(C)c1cc(-n2nc3ccccc3n2)c(O)c(C(C)(C)C)c1]
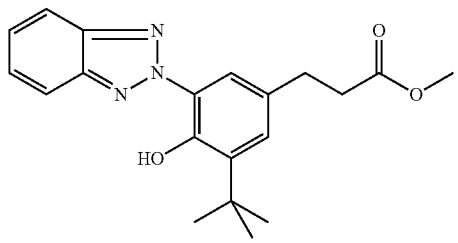 [SMILES: COC(=O)CCc1cc(-n2nc3ccccc3n2)c(O)c(C(C)(C)C)c1]
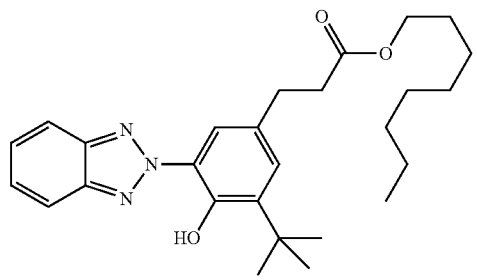 [SMILES: CCCCCCCCOC(=O)CCc1cc(-n2nc3ccccc3n2)c(O)c(C(C)(C)C)c1]

TABLE C-continued
Stabilisers which can be added, for example, to the mixtures according to the invention in amounts of 0-10% by weight are mentioned below.
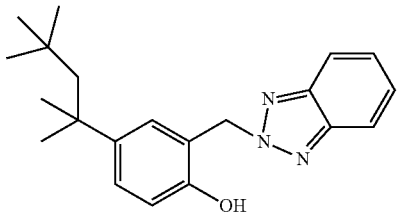 [SMILES: CC(C)(C)CC(C)(C)c1ccc(O)c(Cn2nc3ccccc3n2)c1]
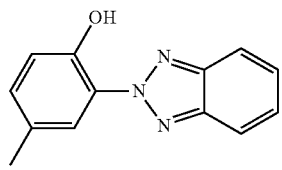 [SMILES: Cc1ccc(O)c(-n2nc3ccccc3n2)c1]
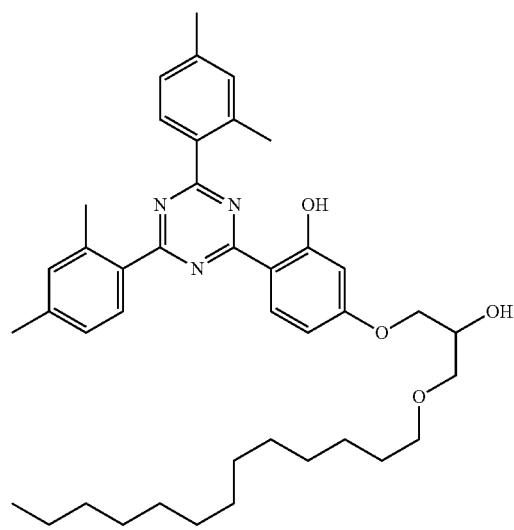 [SMILES: CCCCCCCCCCCCCOCC(O)COc1ccc(-c2nc(-c3ccc(C)cc3C)nc(-c3ccc(C)cc3C)n2)c(O)c1]
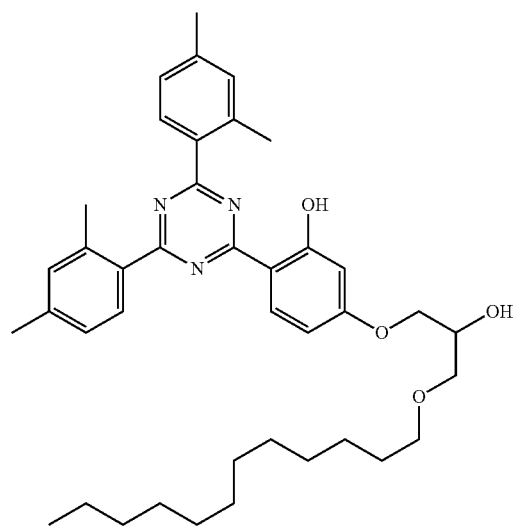 [SMILES: CCCCCCCCCCCCOCC(O)COc1ccc(-c2nc(-c3ccc(C)cc3C)nc(-c3ccc(C)cc3C)n2)c(O)c1]

TABLE C-continued
Stabilisers which can be added, for example, to the mixtures according to the invention in amounts of 0-10% by weight are mentioned below.
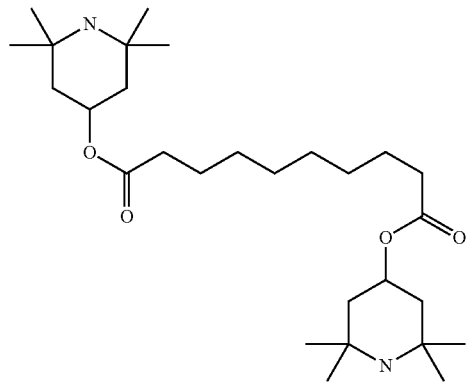
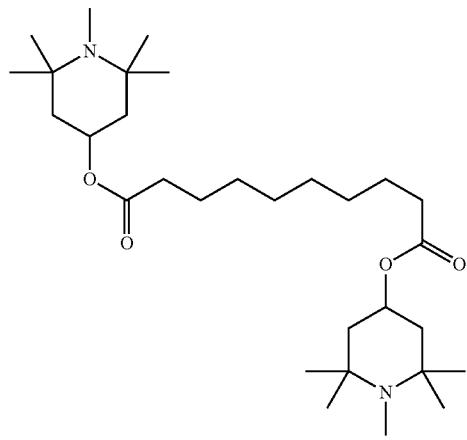
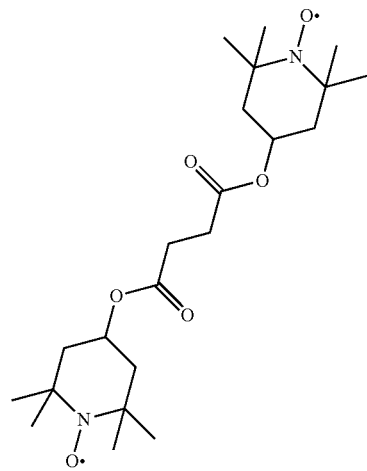

TABLE C-continued
Stabilisers which can be added, for example, to the mixtures according to the invention in amounts of 0-10% by weight are mentioned below.
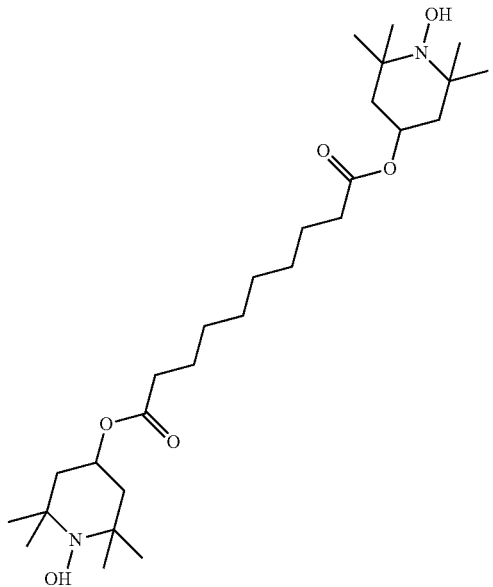
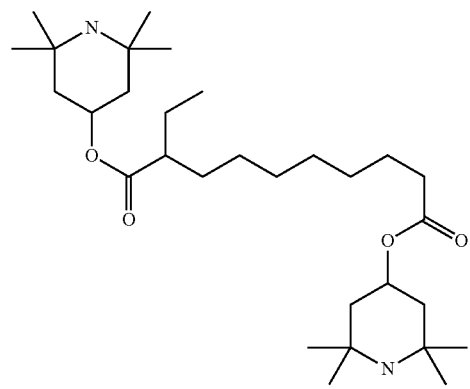
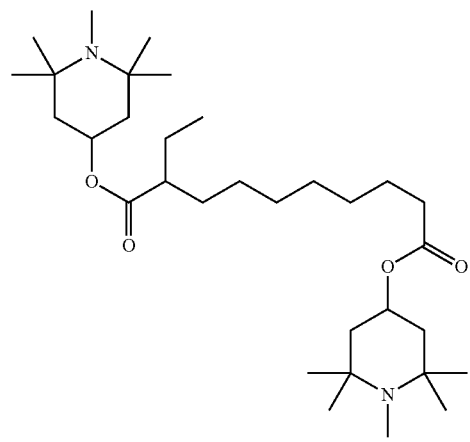

TABLE C-continued
Stabilisers which can be added, for example, to the mixtures according to the invention in amounts of 0-10% by weight are mentioned below.
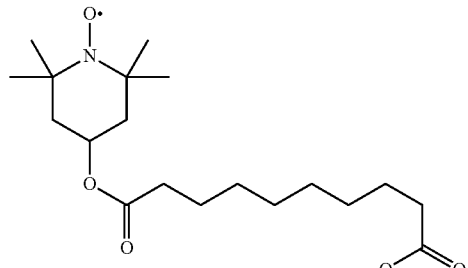
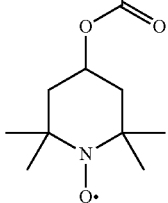
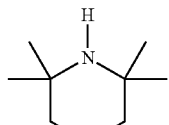
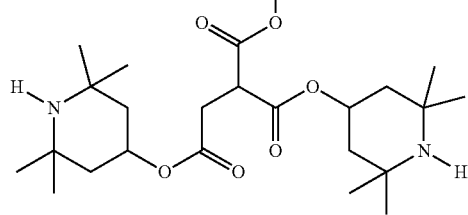
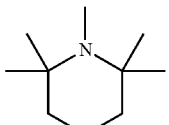
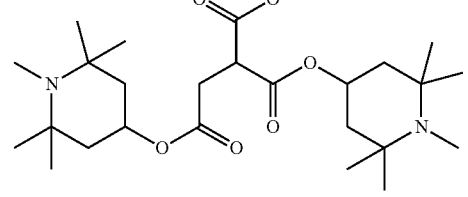
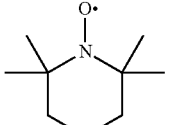
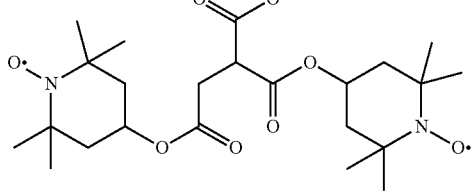

TABLE C-continued
Stabilisers which can be added, for example, to the mixtures according to the invention in amounts of 0-10% by weight are mentioned below.
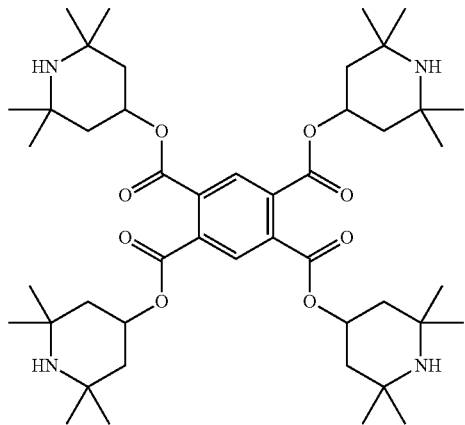
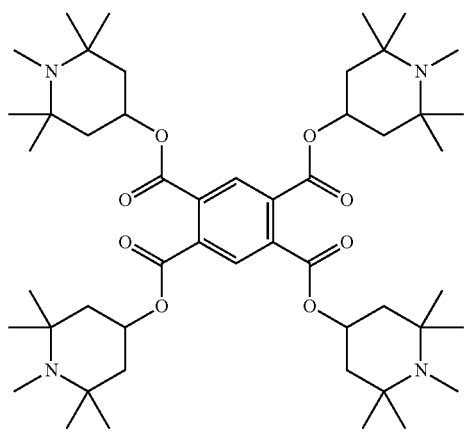
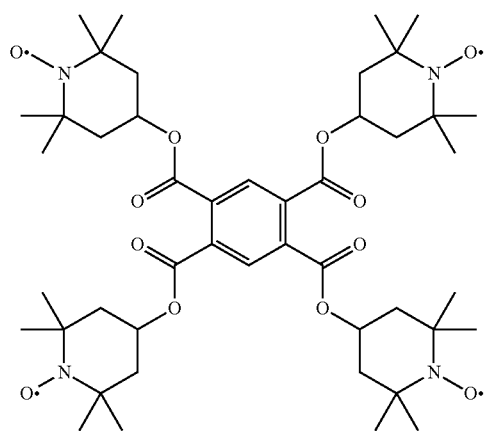

TABLE C-continued

Stabilisers which can be added, for example, to the mixtures according to the invention in amounts of 0-10% by weight are mentioned below.

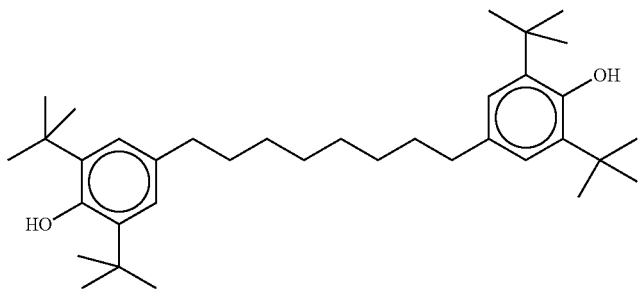

TABLE D

Table D shows illustrative reactive mesogenic compounds which can be used in the LC media in accordance with the present invention. In a preferred embodiment the mixtures according to the present inventin contain one or more reactive mesogens of the following table:

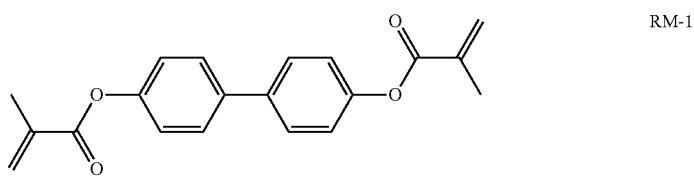

RM-1

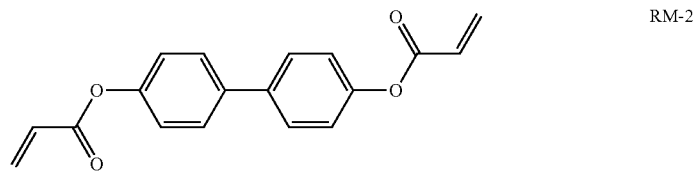

RM-2

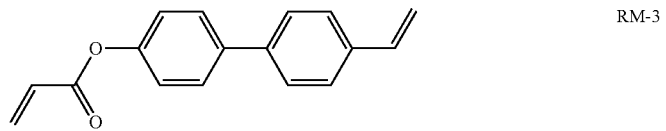

RM-3

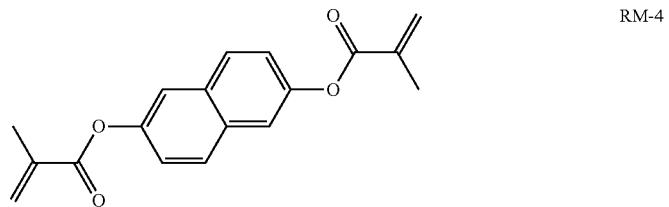

RM-4

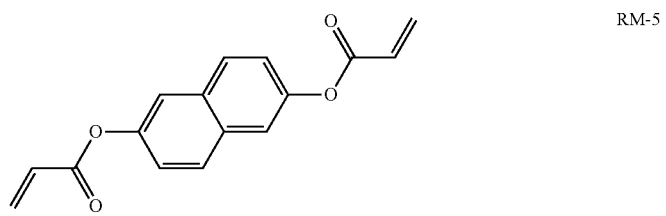

RM-5

TABLE D-continued
Table D shows illustrative reactive mesogenic compounds which can be used in the LC media in accordance with the present invention. In a preferred embodiment the mixtures according to the present inventin contain one or more reactive mesogens of the following table:
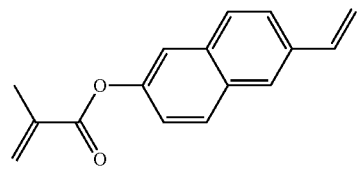 [SMILES: C=Cc1ccc2cc(OC(=O)C(=C)C)ccc2c1] RM-6
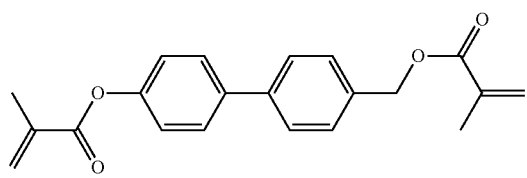 RM-7
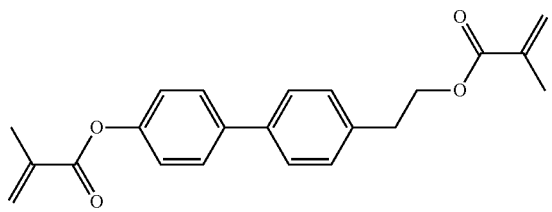 [SMILES: C=C(C)C(=O)OCCc1ccc(-c2ccc(OC(=O)C(=C)C)cc2)cc1] RM-8
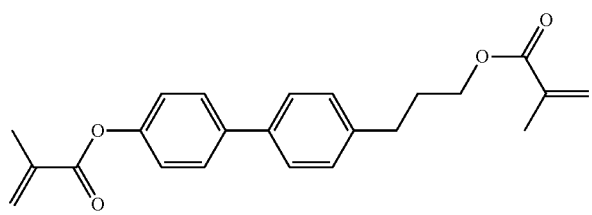 [SMILES: C=C(C)C(=O)OCCCc1ccc(-c2ccc(OC(=O)C(=C)C)cc2)cc1] RM-9
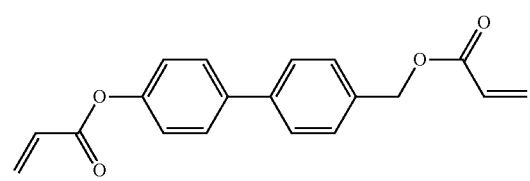 [SMILES: C=CC(=O)OCc1ccc(-c2ccc(OC(=O)C=C)cc2)cc1] RM-10
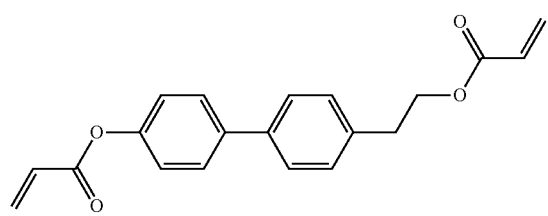 [SMILES: C=CC(=O)OCCc1ccc(-c2ccc(OC(=O)C=C)cc2)cc1] RM-11
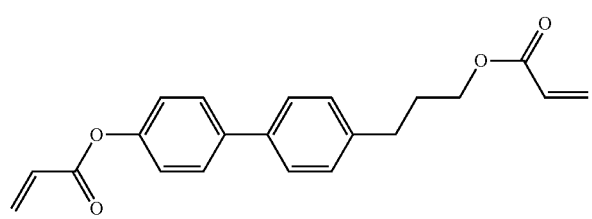 [SMILES: C=CC(=O)OCCCc1ccc(-c2ccc(OC(=O)C=C)cc2)cc1] RM-12

TABLE D-continued
Table D shows illustrative reactive mesogenic compounds which can be used in the LC media in accordance with the present invention. In a preferred embodiment the mixtures according to the present inventin contain one or more reactive mesogens of the following table:
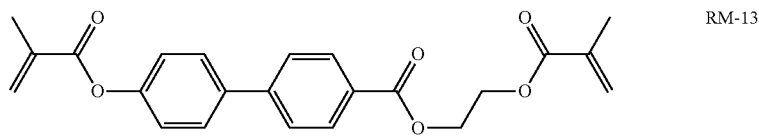 RM-13
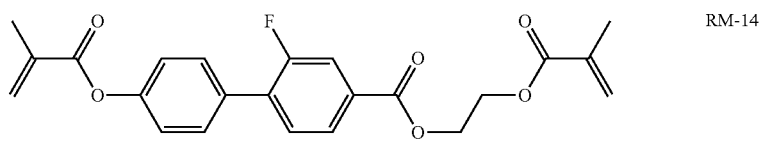 RM-14
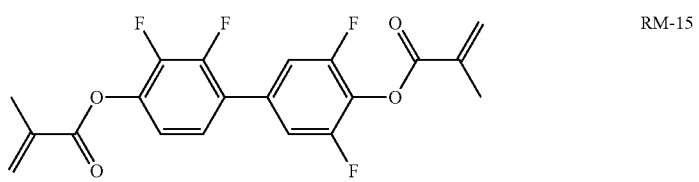 RM-15
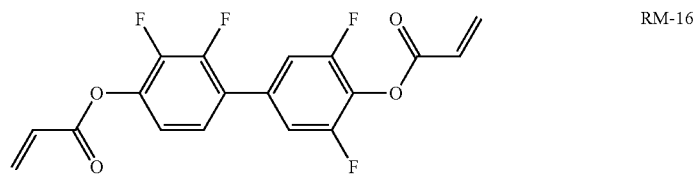 RM-16
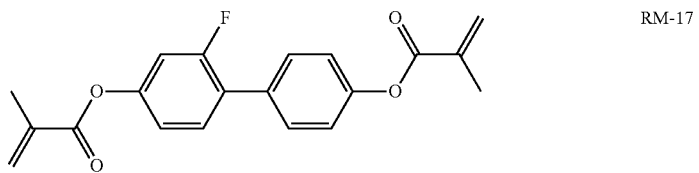 RM-17
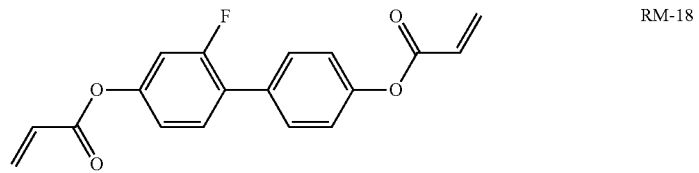 RM-18
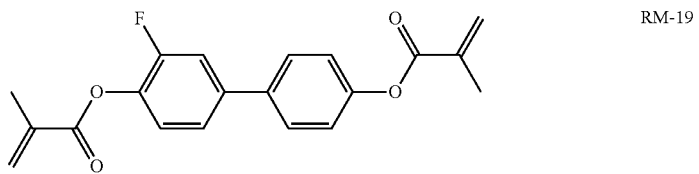 RM-19
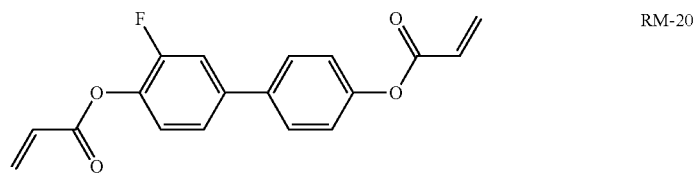 RM-20

TABLE D-continued
Table D shows illustrative reactive mesogenic compounds which can be used in the LC media in accordance with the present invention. In a preferred embodiment the mixtures according to the present inventin contain one or more reactive mesogens of the following table:
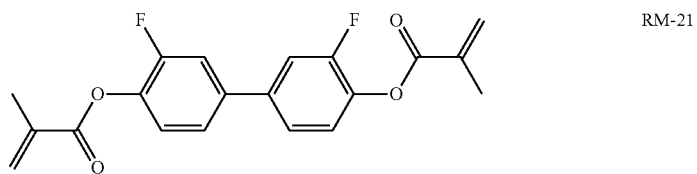
RM-21
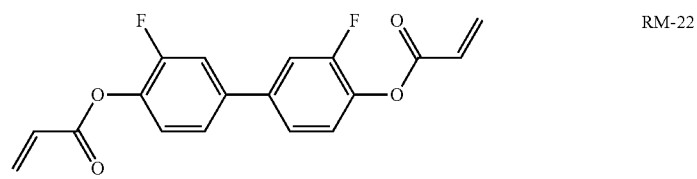
RM-22
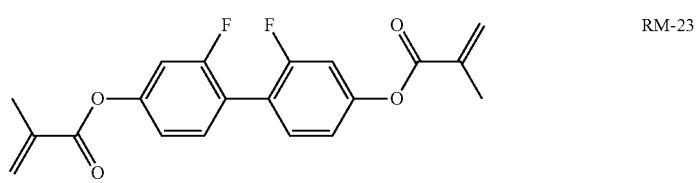
RM-23
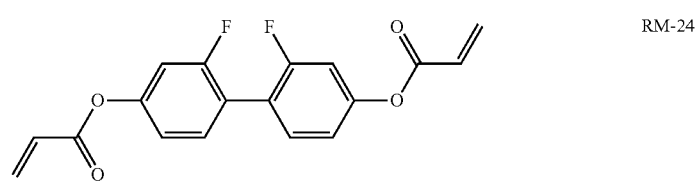
RM-24
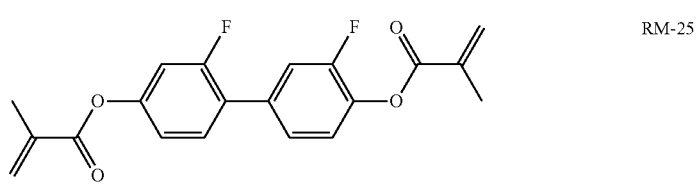
RM-25
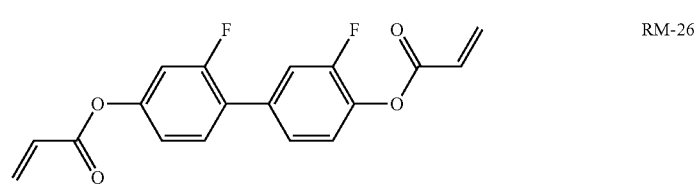
RM-26
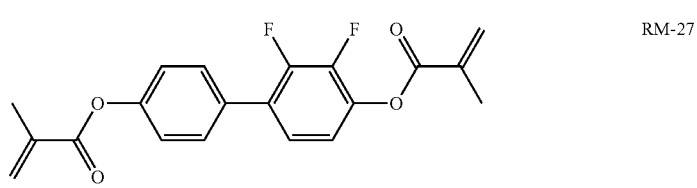
RM-27
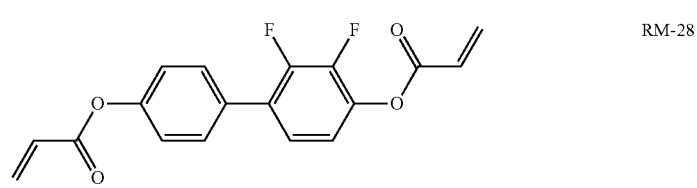
RM-28

TABLE D-continued
Table D shows illustrative reactive mesogenic compounds which can be used in the LC media in accordance with the present invention. In a preferred embodiment the mixtures according to the present inventin contain one or more reactive mesogens of the following table:
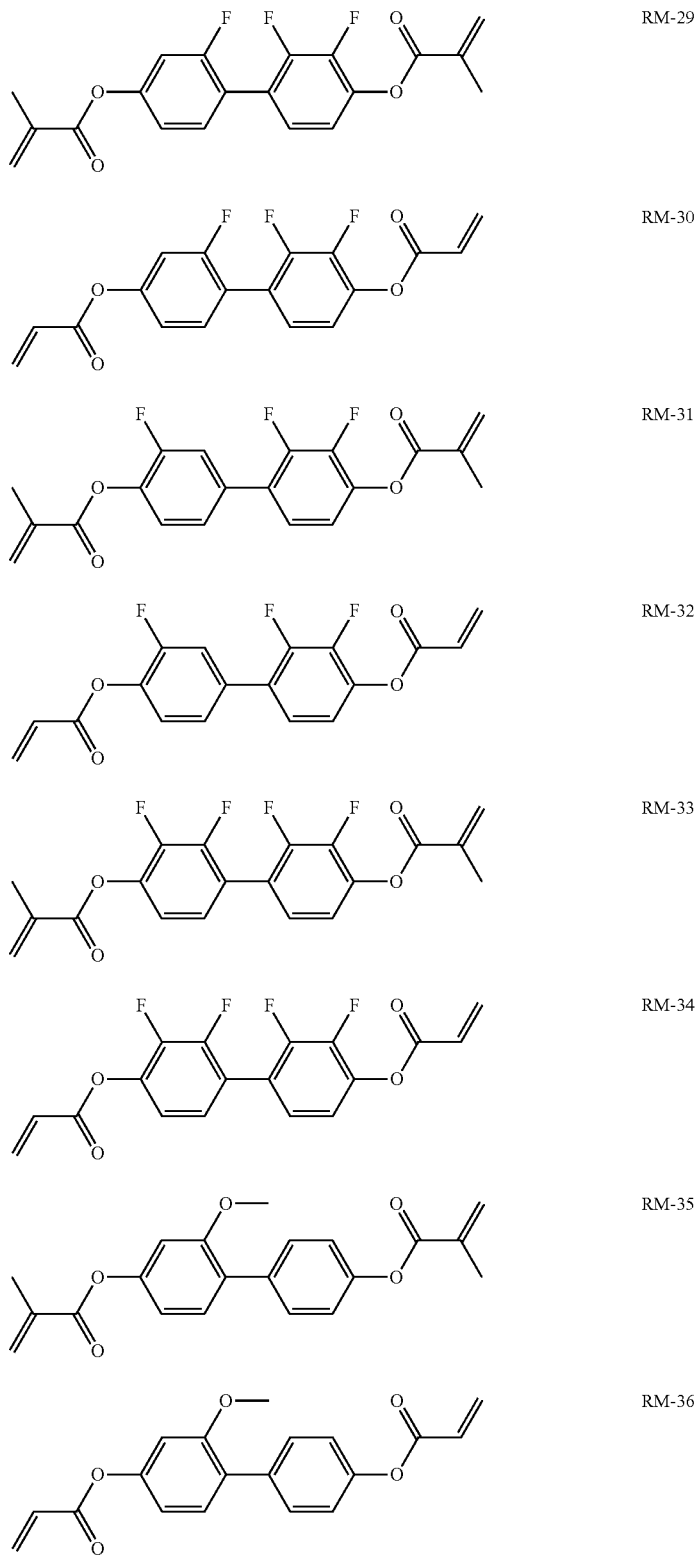
RM-29
RM-30
RM-31
RM-32
RM-33
RM-34
RM-35
RM-36

TABLE D-continued
Table D shows illustrative reactive mesogenic compounds which can be used in the LC media in accordance with the present invention. In a preferred embodiment the mixtures according to the present inventin contain one or more reactive mesogens of the following table:
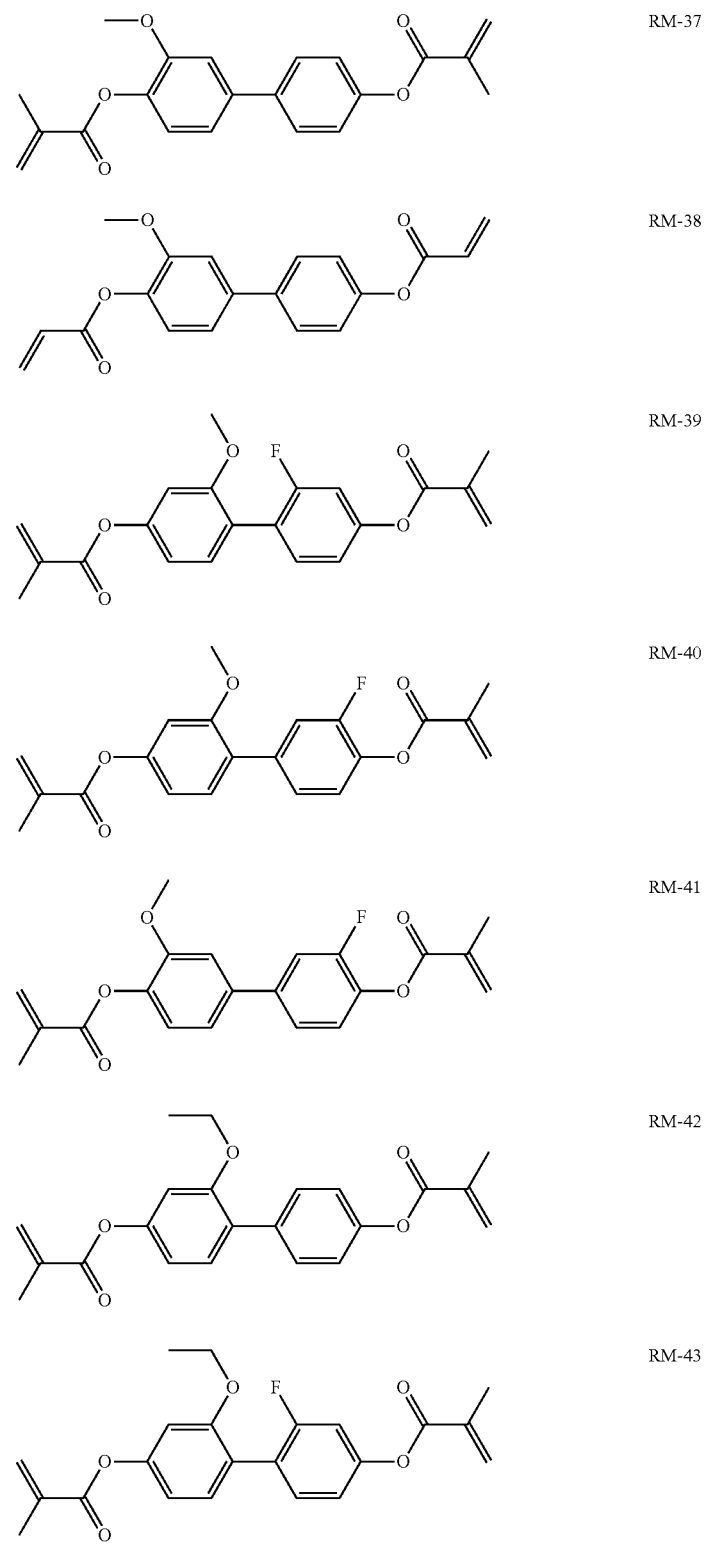
RM-37
RM-38
RM-39
RM-40
RM-41
RM-42
RM-43

TABLE D-continued
Table D shows illustrative reactive mesogenic compounds which can be used in the LC media in accordance with the present invention. In a preferred embodiment the mixtures according to the present inventin contain one or more reactive mesogens of the following table:
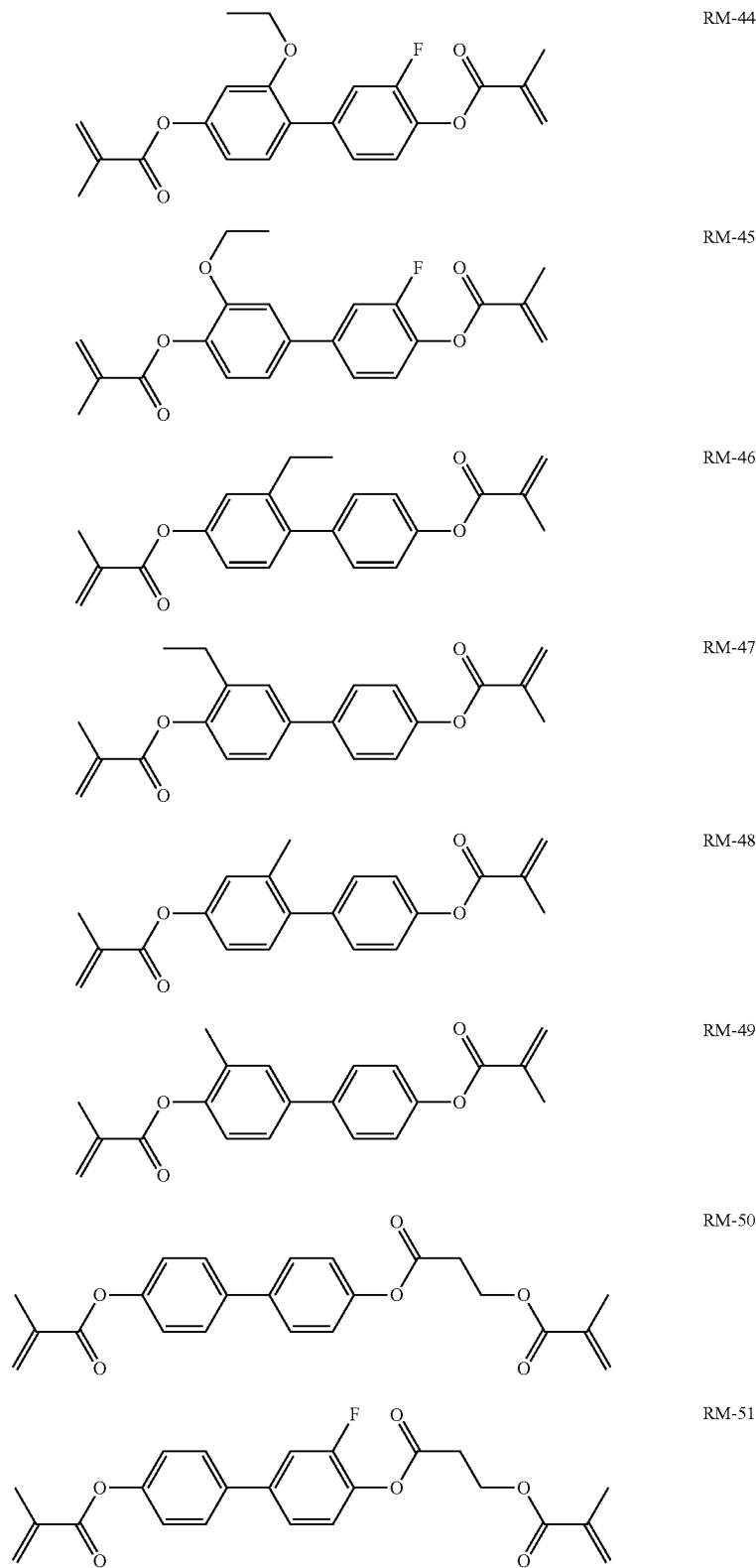
RM-44
RM-45
RM-46
RM-47
RM-48
RM-49
RM-50
RM-51

TABLE D-continued
Table D shows illustrative reactive mesogenic compounds which can be used in the LC media in accordance with the present invention. In a preferred embodiment the mixtures according to the present inventin contain one or more reactive mesogens of the following table:
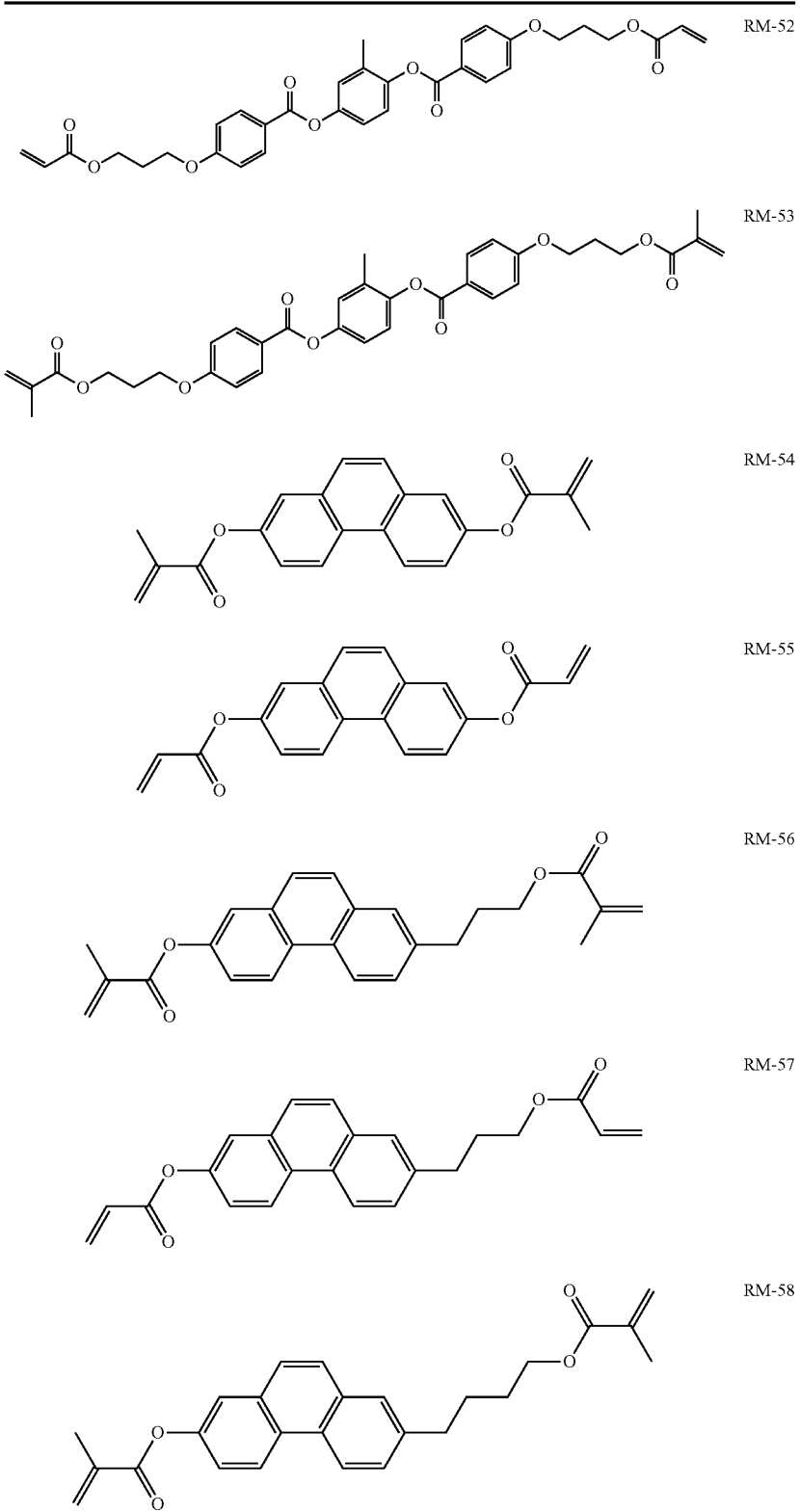
RM-52
RM-53
RM-54
RM-55
RM-56
RM-57
RM-58

TABLE D-continued
Table D shows illustrative reactive mesogenic compounds which can be used in the LC media in accordance with the present invention. In a preferred embodiment the mixtures according to the present inventin contain one or more reactive mesogens of the following table:
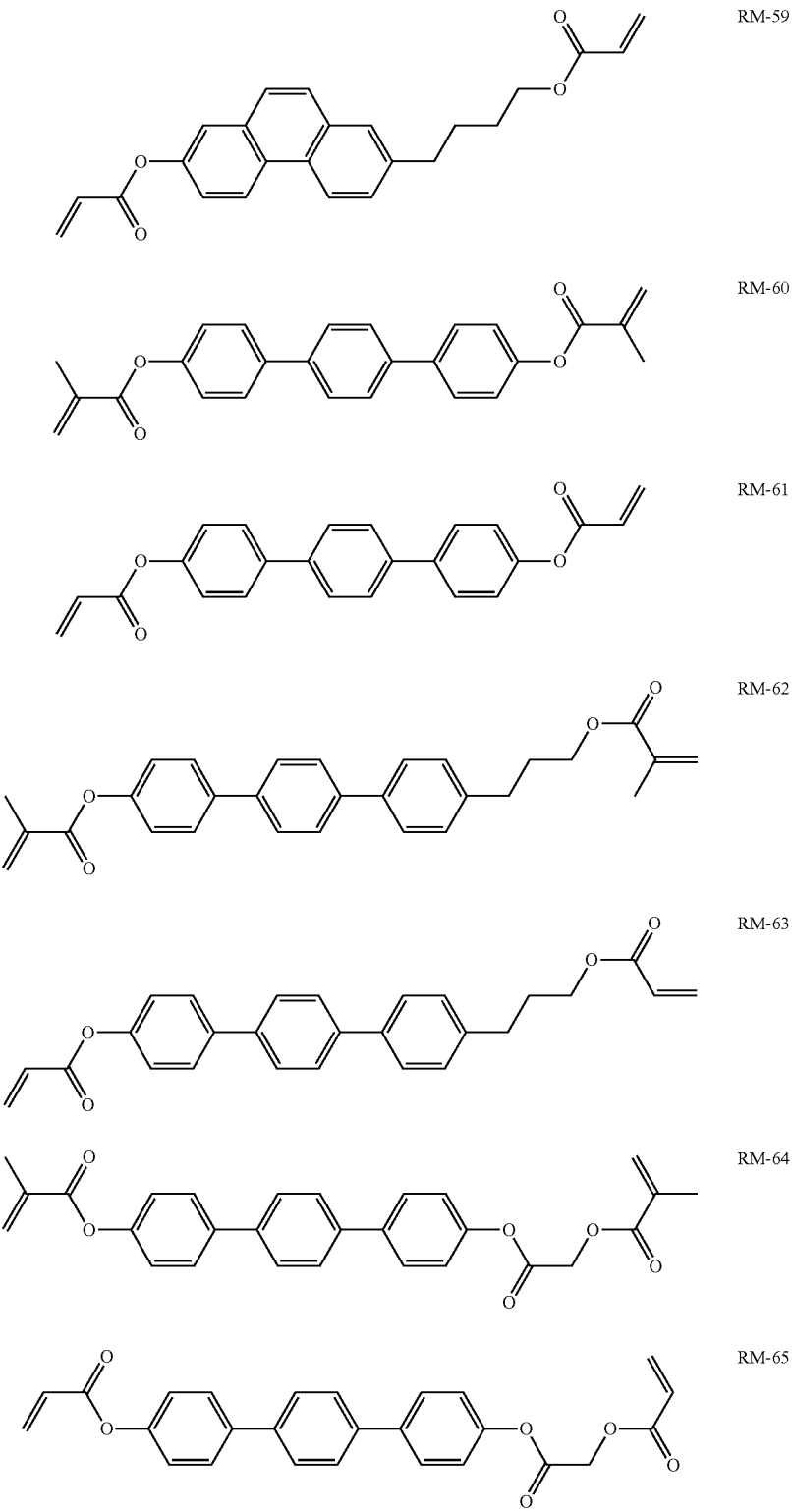
RM-59
RM-60
RM-61
RM-62
RM-63
RM-64
RM-65

TABLE D-continued
Table D shows illustrative reactive mesogenic compounds which can be used in the LC media in accordance with the present invention. In a preferred embodiment the mixtures according to the present inventin contain one or more reactive mesogens of the following table:
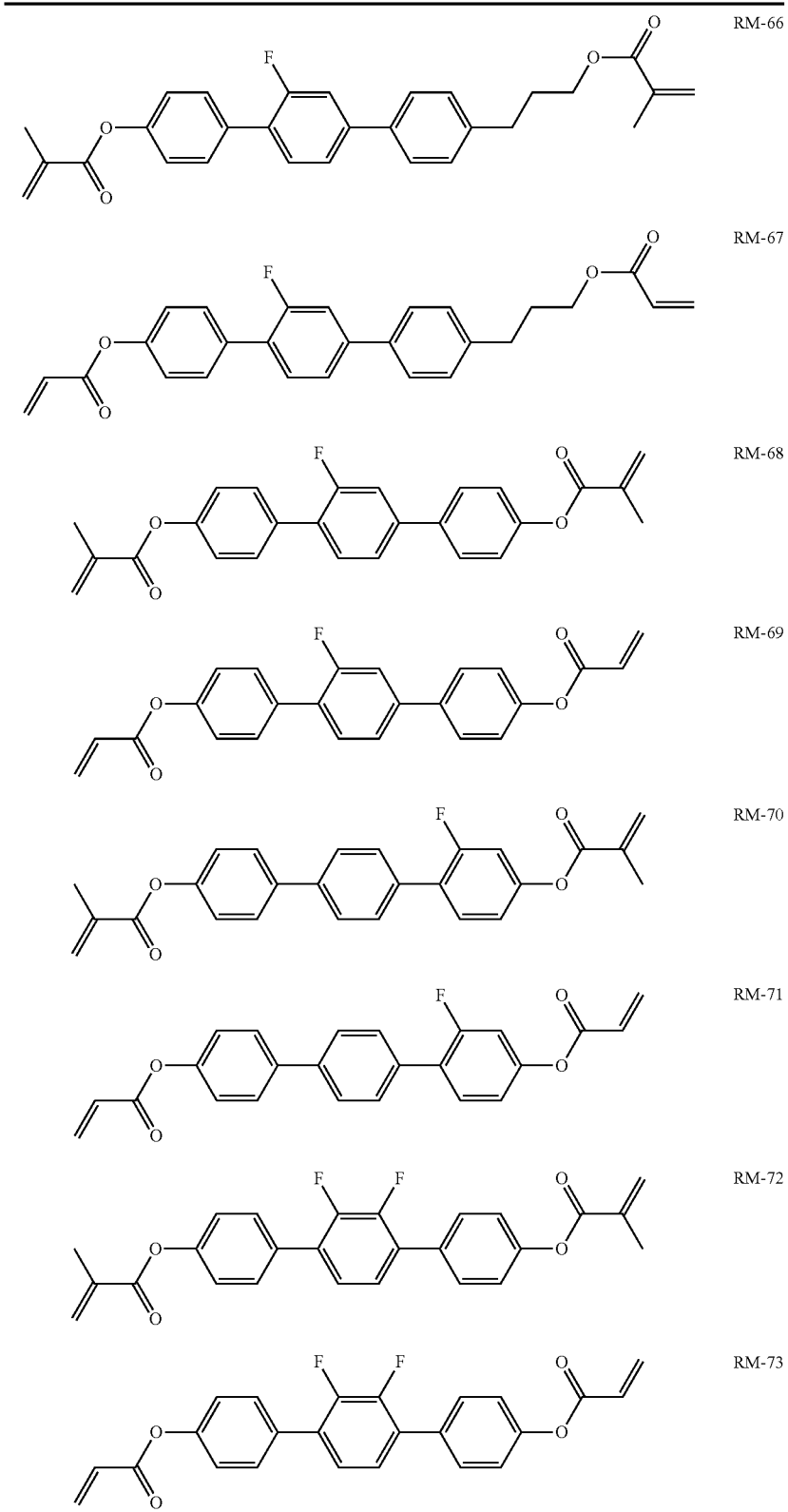

TABLE D-continued
Table D shows illustrative reactive mesogenic compounds which can be used in the LC media in accordance with the present invention. In a preferred embodiment the mixtures according to the present inventin contain one or more reactive mesogens of the following table:
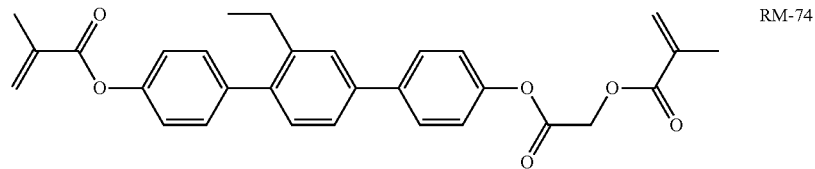 RM-74
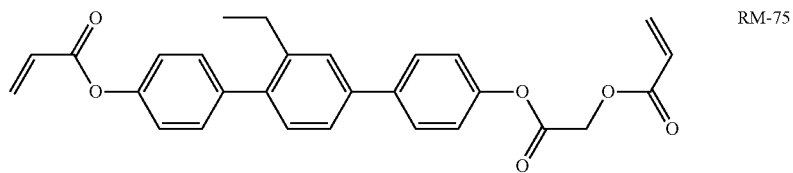 RM-75
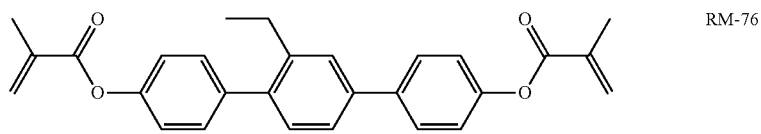 RM-76
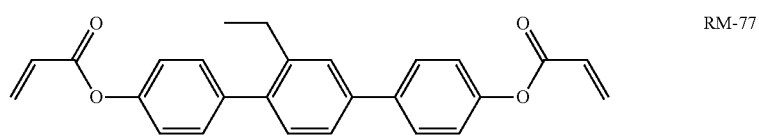 RM-77
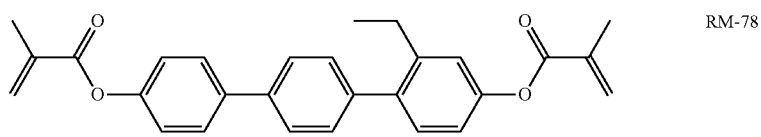 RM-78
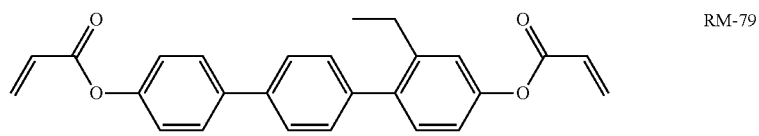 RM-79
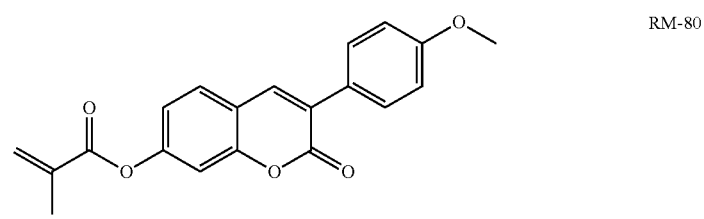 RM-80
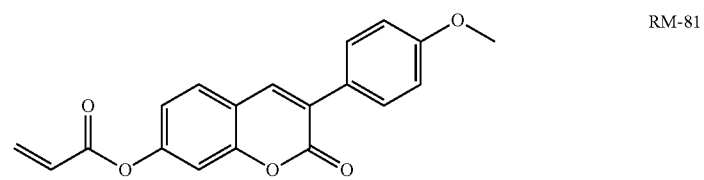 RM-81

TABLE D-continued
Table D shows illustrative reactive mesogenic compounds which can be used in the LC media in accordance with the present invention. In a preferred embodiment the mixtures according to the present inventin contain one or more reactive mesogens of the following table:
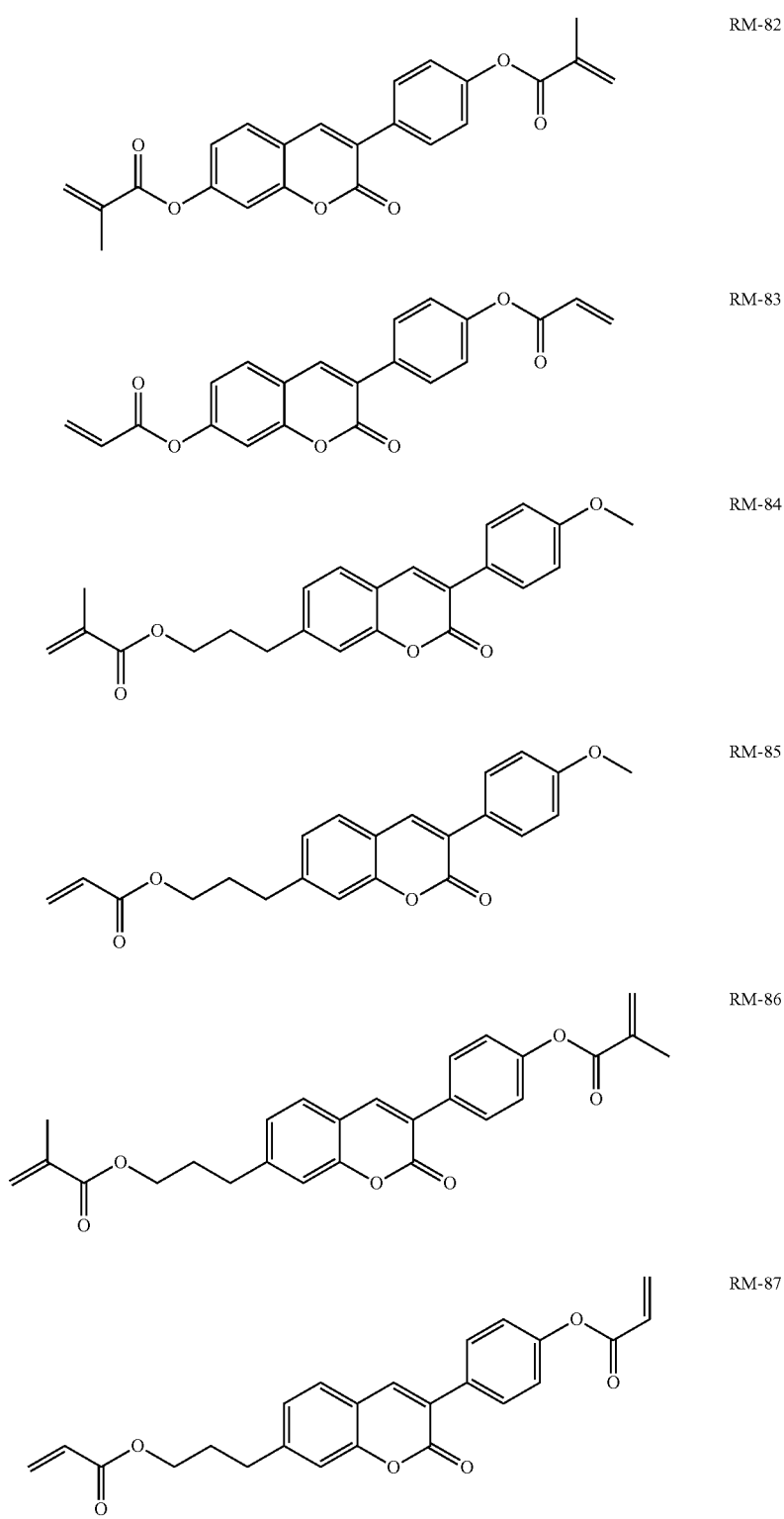
RM-82
RM-83
RM-84
RM-85
RM-86
RM-87

TABLE D-continued
Table D shows illustrative reactive mesogenic compounds which can be used in the LC media in accordance with the present invention. In a preferred embodiment the mixtures according to the present inventin contain one or more reactive mesogens of the following table:
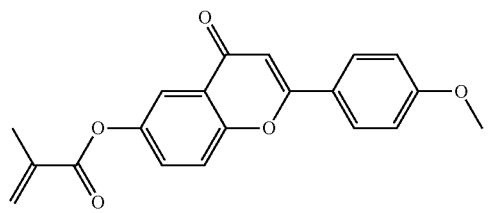 [SMILES: C=C(C)C(=O)Oc1ccc2oc(-c3ccc(OC)cc3)cc(=O)c2c1]
RM-88
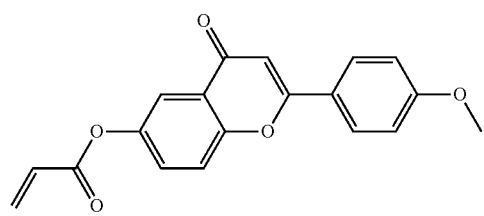 [SMILES: C=CC(=O)Oc1ccc2oc(-c3ccc(OC)cc3)cc(=O)c2c1]
RM-89
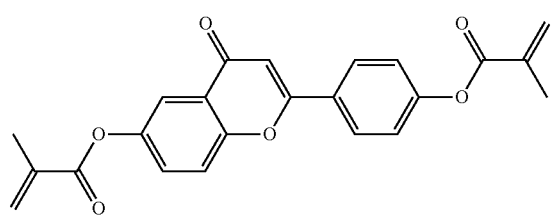 [SMILES: C=C(C)C(=O)Oc1ccc(-c2cc(=O)c3cc(OC(=O)C(=C)C)ccc3o2)cc1]
RM-90
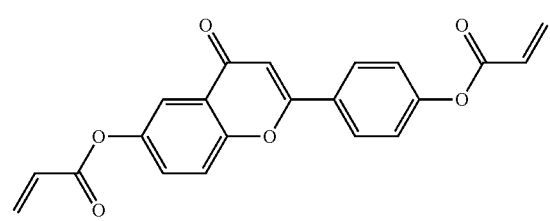 [SMILES: C=CC(=O)Oc1ccc(-c2cc(=O)c3cc(OC(=O)C=C)ccc3o2)cc1]
RM-91
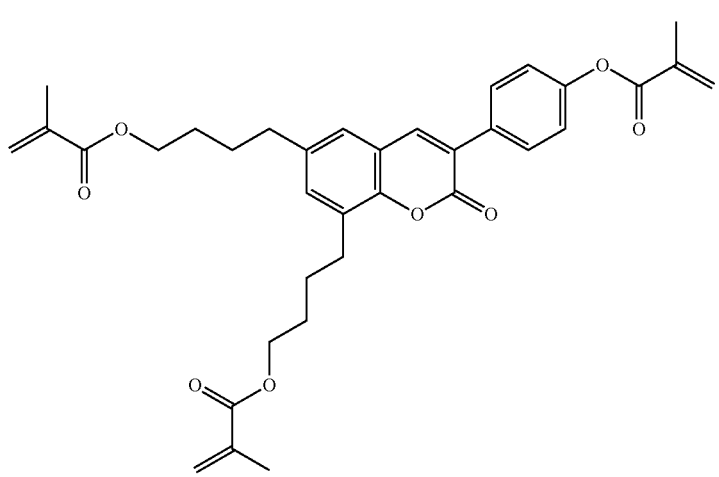 [SMILES: C=C(C)C(=O)OCCCCc1cc(CCCCOC(=O)C(=C)C)c2oc(=O)c(-c3ccc(OC(=O)C(=C)C)cc3)cc2c1]
RM-92

TABLE D-continued
Table D shows illustrative reactive mesogenic compounds which can be used in the LC media in accordance with the present invention. In a preferred embodiment the mixtures according to the present inventin contain one or more reactive mesogens of the following table:
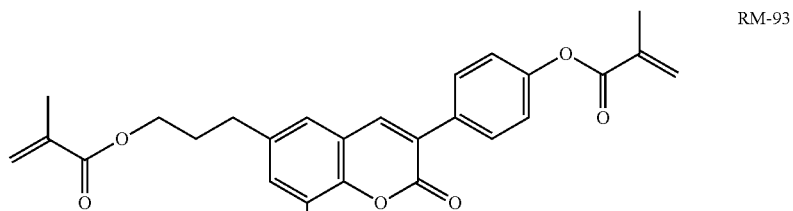
RM-93
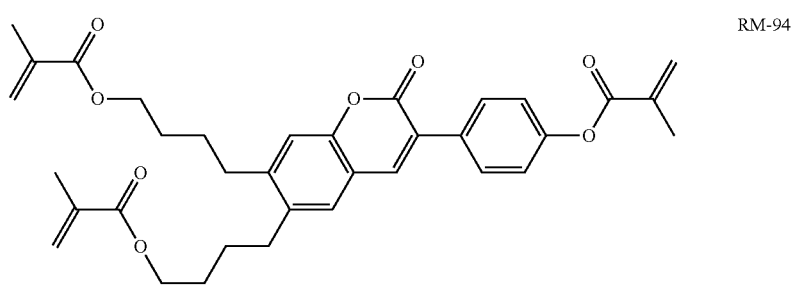
RM-94
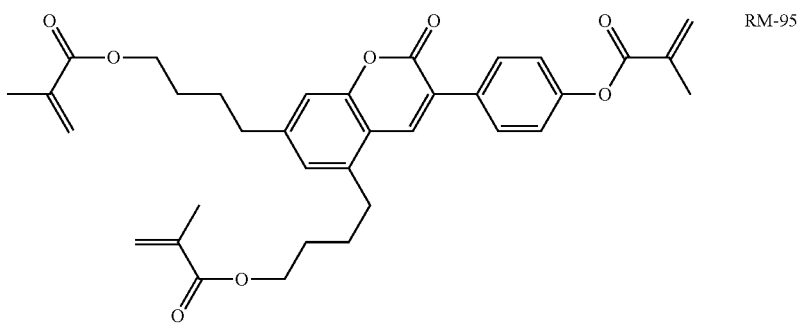
RM-95
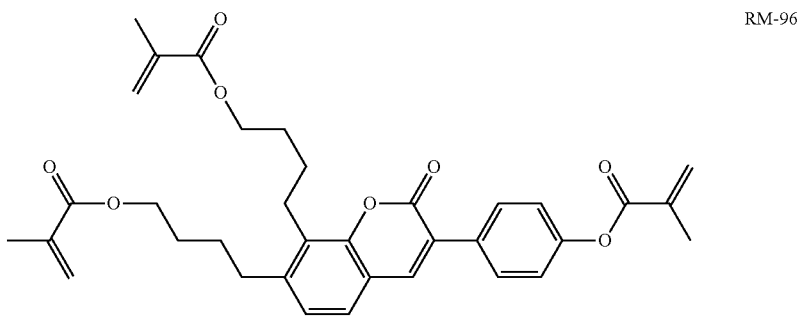
RM-96

TABLE D-continued
Table D shows illustrative reactive mesogenic compounds which can be used in the LC media in accordance with the present invention. In a preferred embodiment the mixtures according to the present inventin contain one or more reactive mesogens of the following table:
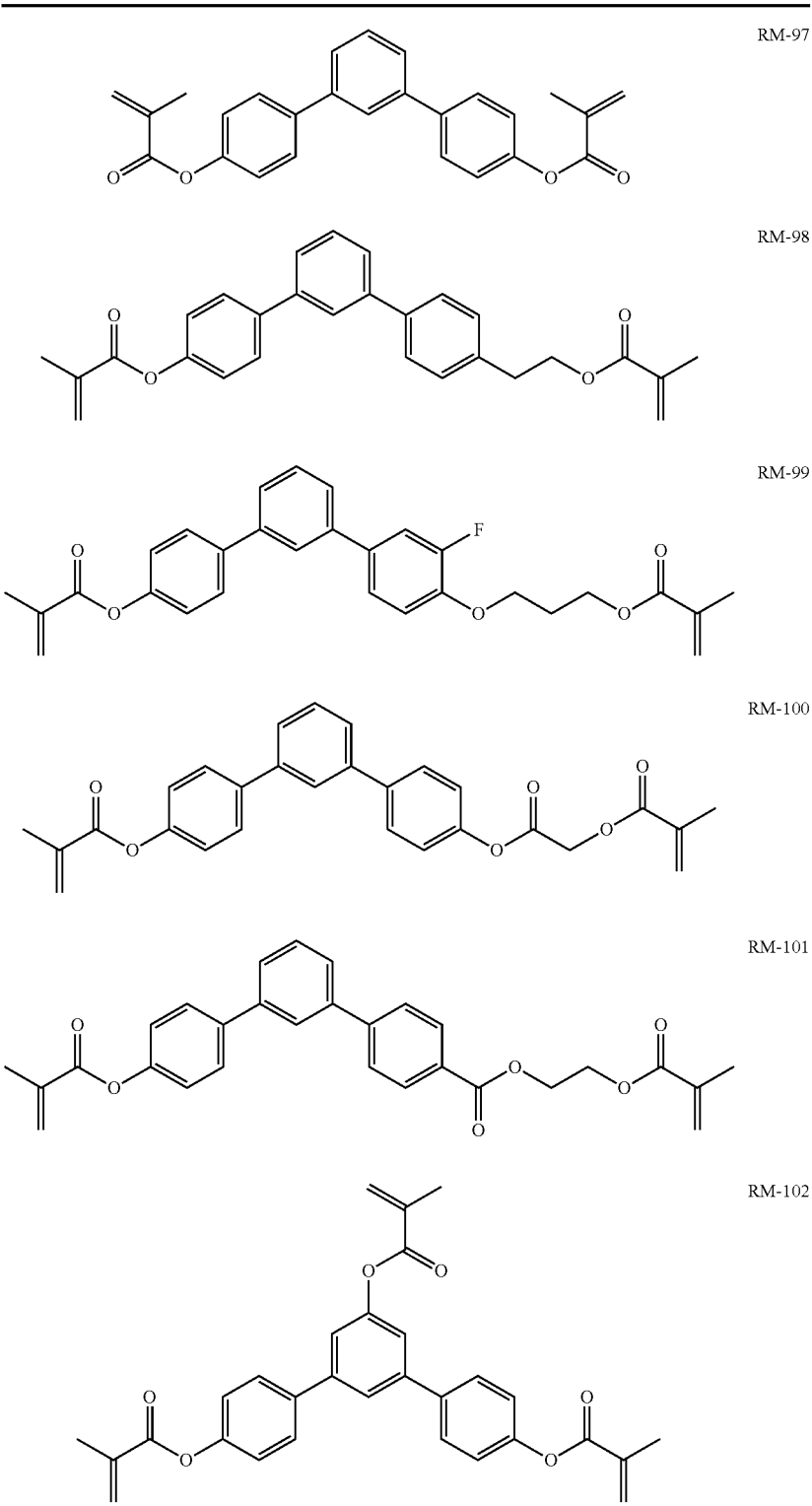
RM-97
RM-98
RM-99
RM-100
RM-101
RM-102

TABLE D-continued
Table D shows illustrative reactive mesogenic compounds which can be used in the LC media in accordance with the present invention. In a preferred embodiment the mixtures according to the present inventin contain one or more reactive mesogens of the following table:
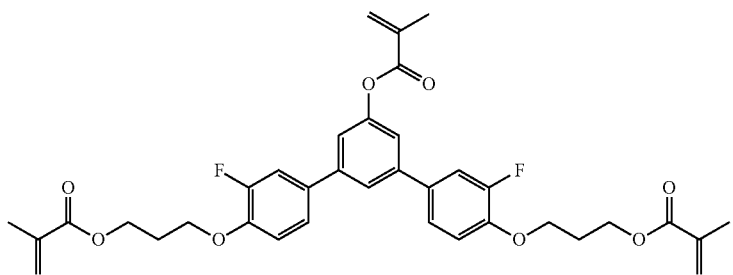 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-103
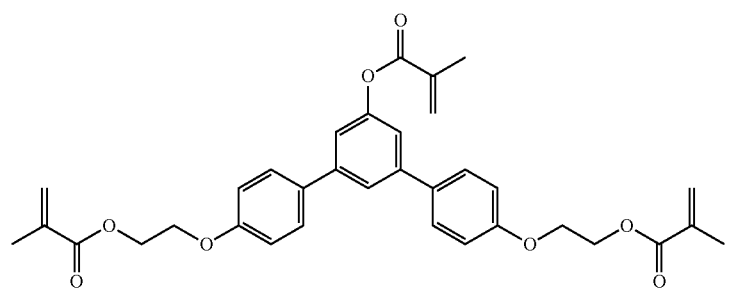 [SMILES: C=C(C)C(=O)OCCOc1ccc(-c2cc(OC(=O)C(=C)C)cc(-c3ccc(OCCOC(=O)C(=C)C)cc3)c2)cc1]
RM-104
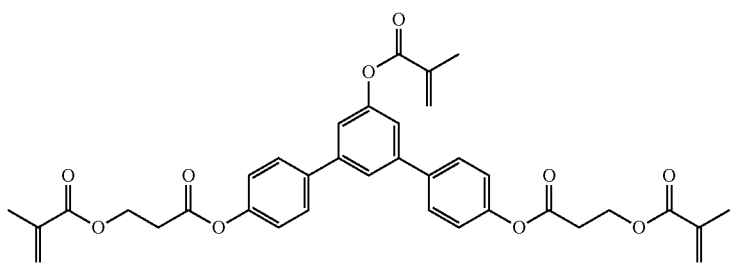 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-105
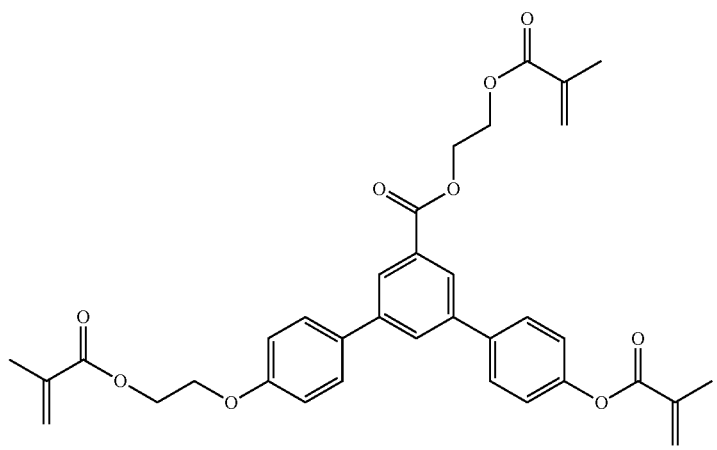 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-106

TABLE D-continued
Table D shows illustrative reactive mesogenic compounds which can be used in the LC media in accordance with the present invention. In a preferred embodiment the mixtures according to the present inventin contain one or more reactive mesogens of the following table:
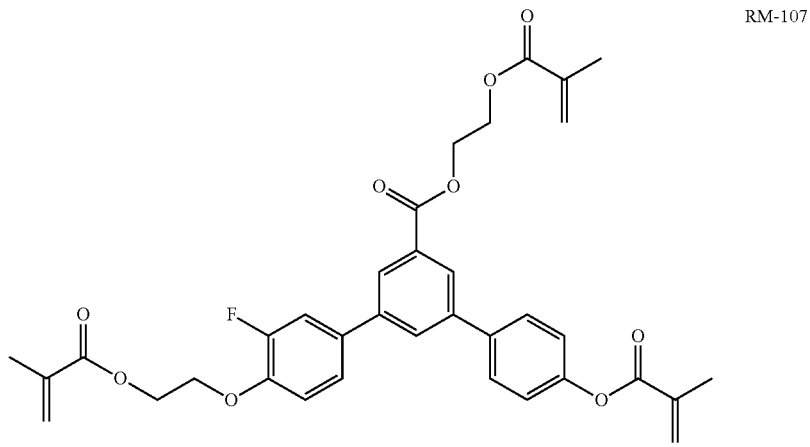
RM-107
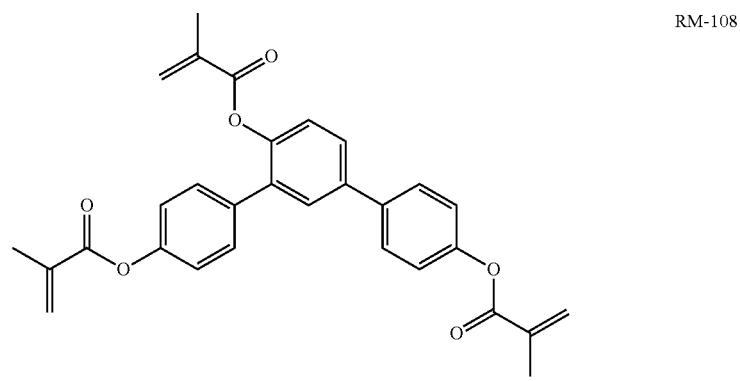
RM-108
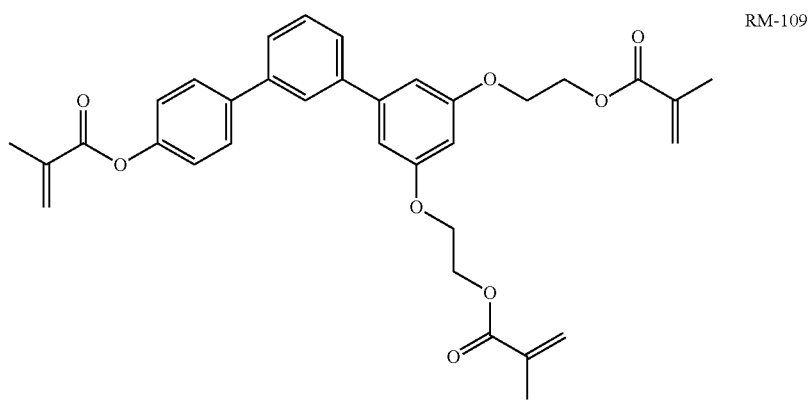
RM-109

TABLE D-continued
Table D shows illustrative reactive mesogenic compounds which can be used in the LC media in accordance with the present invention. In a preferred embodiment the mixtures according to the present inventin contain one or more reactive mesogens of the following table:
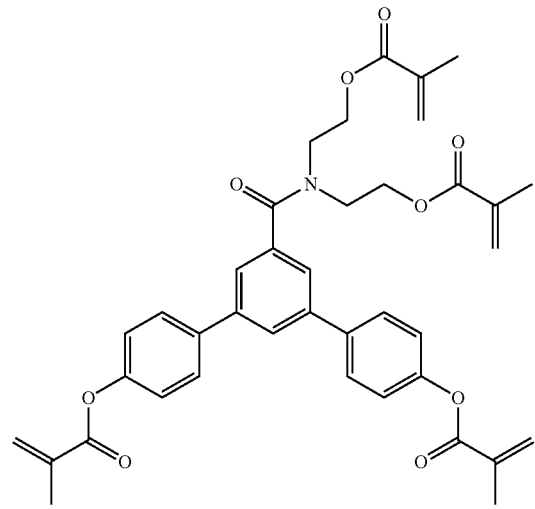 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-110
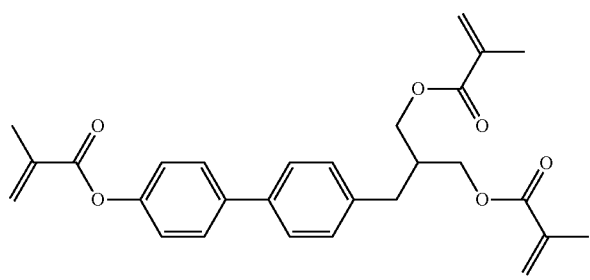 [SMILES: C=C(C)C(=O)OCC(COC(=O)C(=C)C)Cc1ccc(-c2ccc(OC(=O)C(=C)C)cc2)cc1]
RM-111
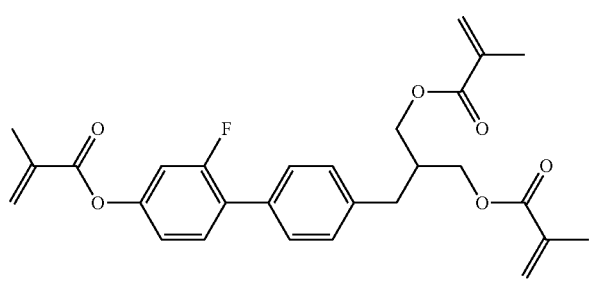 [SMILES: C=C(C)C(=O)OCC(COC(=O)C(=C)C)Cc1ccc(-c2ccc(OC(=O)C(=C)C)cc2F)cc1]
RM-112
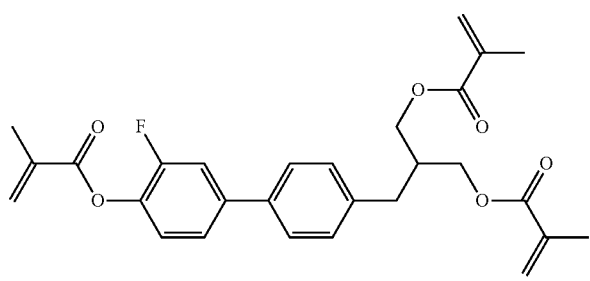
RM-113

TABLE D-continued
Table D shows illustrative reactive mesogenic compounds which can be used in the LC media in accordance with the present invention. In a preferred embodiment the mixtures according to the present inventin contain one or more reactive mesogens of the following table:
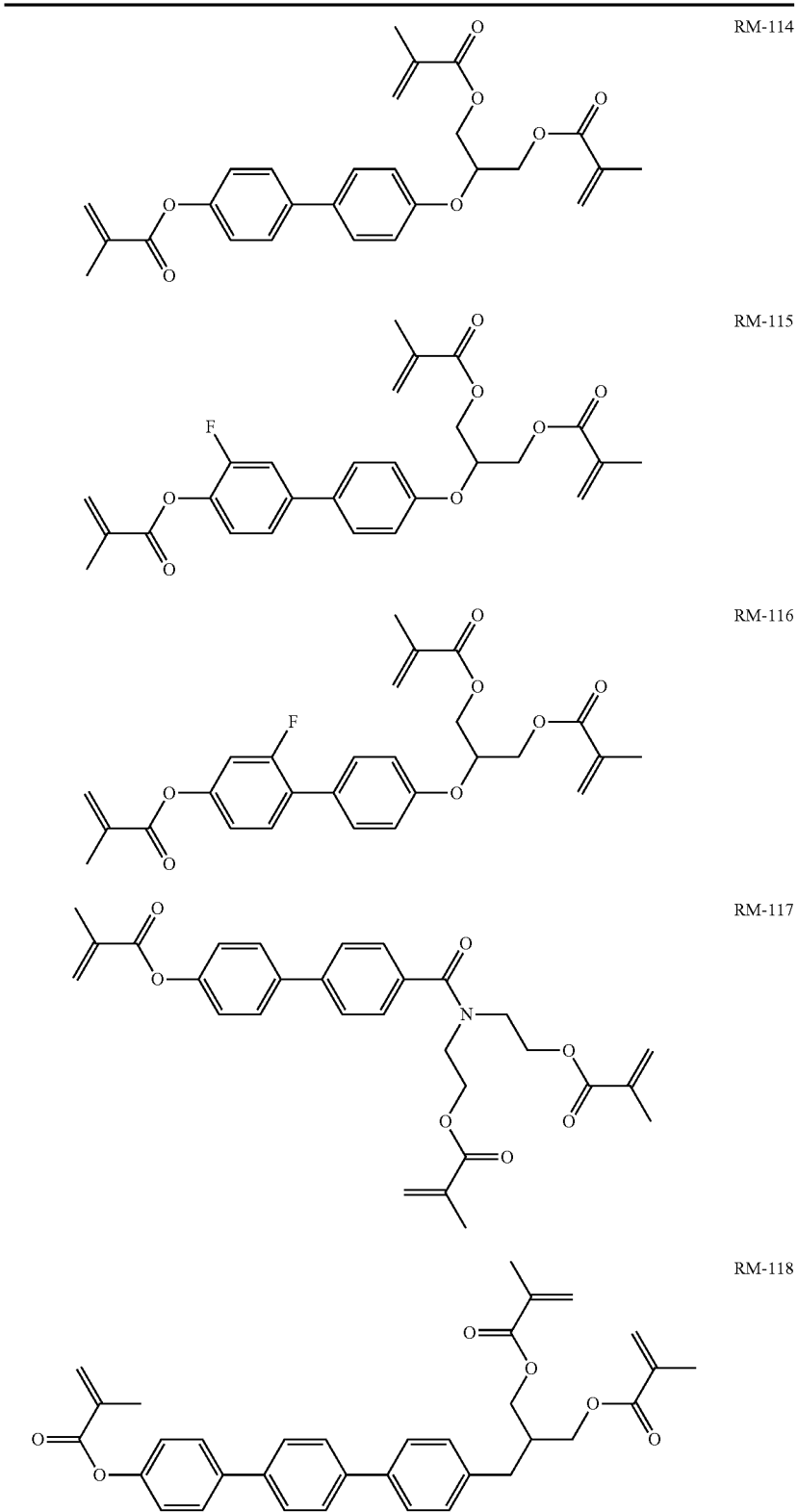
RM-114
RM-115
RM-116
RM-117
RM-118

TABLE D-continued
Table D shows illustrative reactive mesogenic compounds which can be used in the LC media in accordance with the present invention. In a preferred embodiment the mixtures according to the present inventin contain one or more reactive mesogens of the following table:
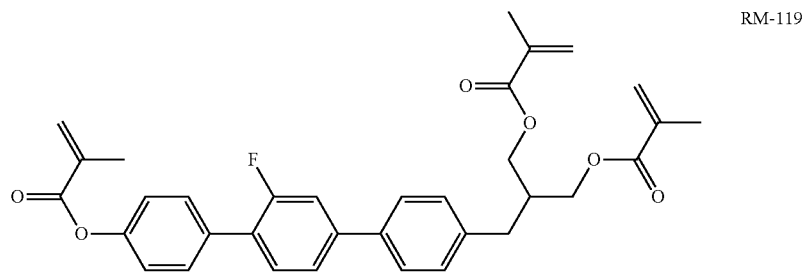
RM-119
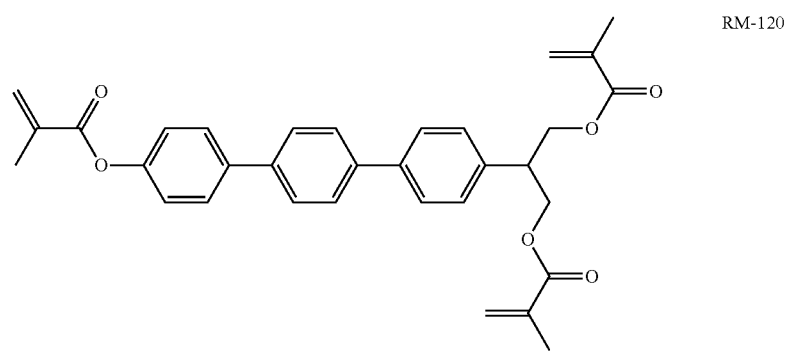
RM-120
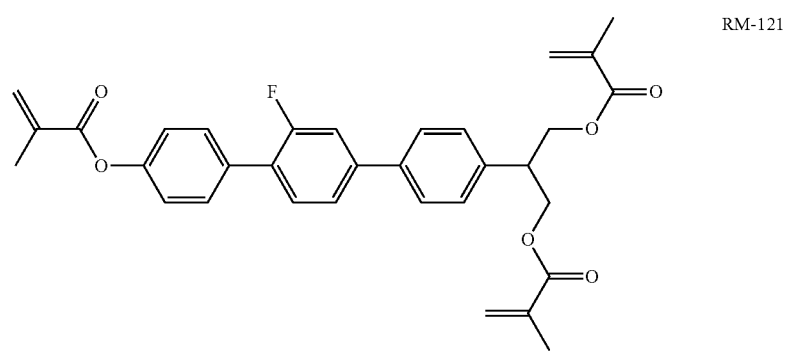
RM-121
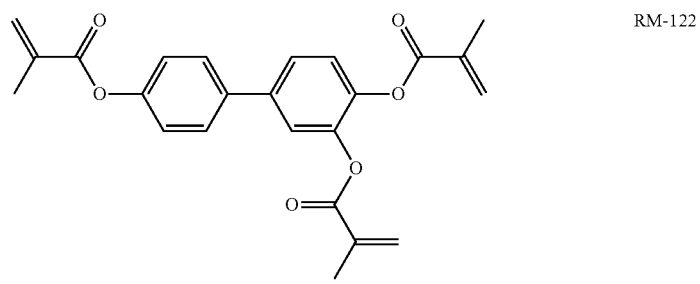
RM-122

TABLE D-continued
Table D shows illustrative reactive mesogenic compounds which can be used in the LC media in accordance with the present invention. In a preferred embodiment the mixtures according to the present inventin contain one or more reactive mesogens of the following table:
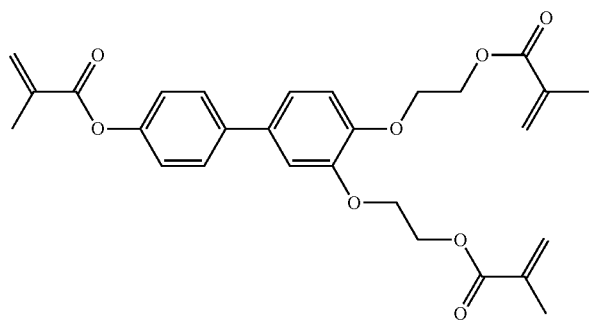 [SMILES: C=C(C)C(=O)OCCOc1ccc(-c2ccc(OC(=O)C(=C)C)cc2)cc1OCCOC(=O)C(=C)C]
RM-123
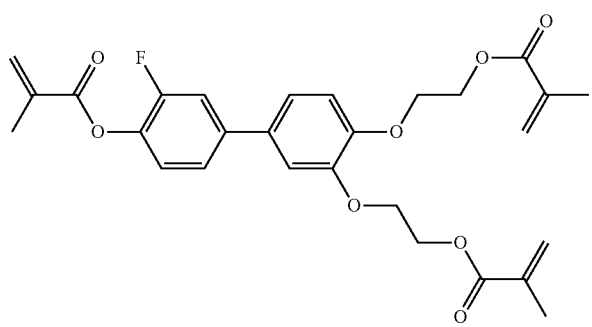 [SMILES: C=C(C)C(=O)OCCOc1ccc(-c2ccc(OC(=O)C(=C)C)c(F)c2)cc1OCCOC(=O)C(=C)C]
RM-124
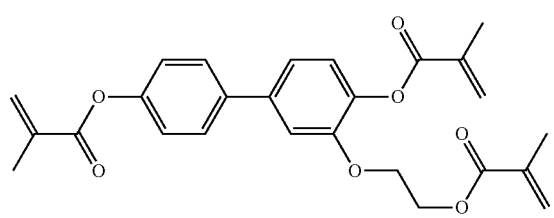
RM-125
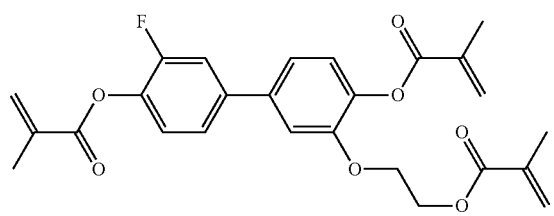 [SMILES: C=C(C)C(=O)OCCOc1cc(-c2ccc(OC(=O)C(=C)C)c(F)c2)ccc1OC(=O)C(=C)C]
RM-126
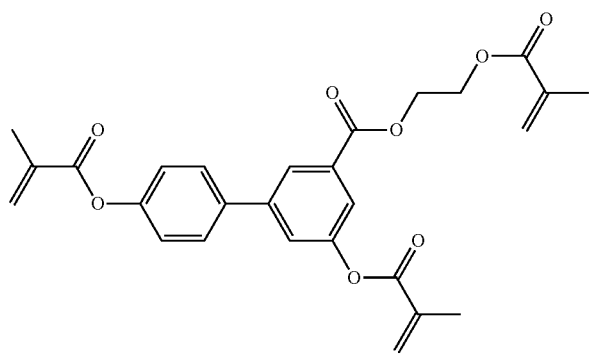 [SMILES: C=C(C)C(=O)OCCOC(=O)c1cc(OC(=O)C(=C)C)cc(-c2ccc(OC(=O)C(=C)C)cc2)c1]
RM-127

TABLE D-continued
Table D shows illustrative reactive mesogenic compounds which can be used in the LC media in accordance with the present invention. In a preferred embodiment the mixtures according to the present inventin contain one or more reactive mesogens of the following table:
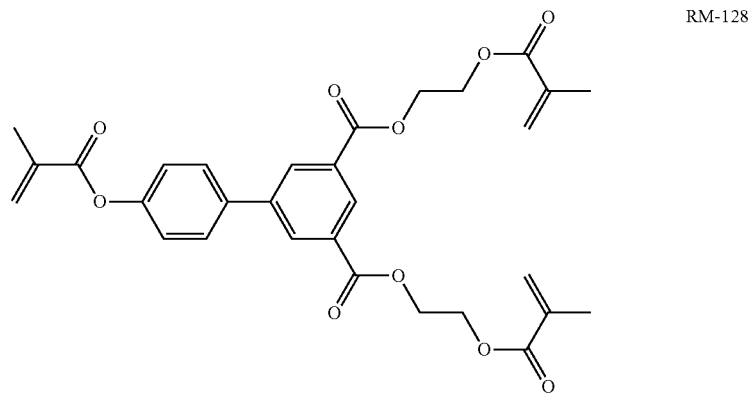
RM-128
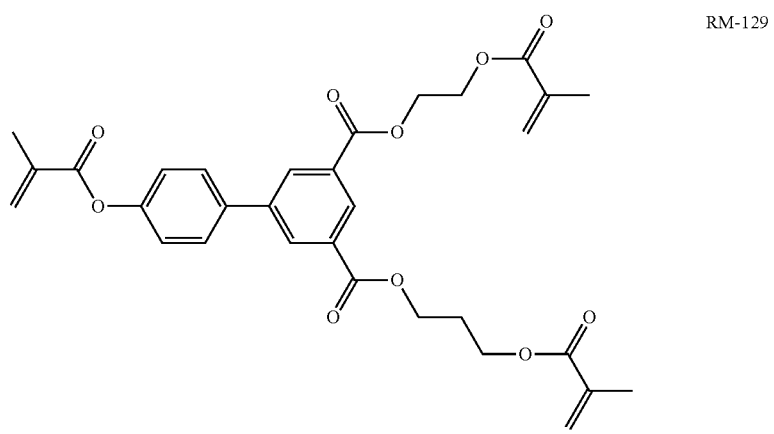
RM-129
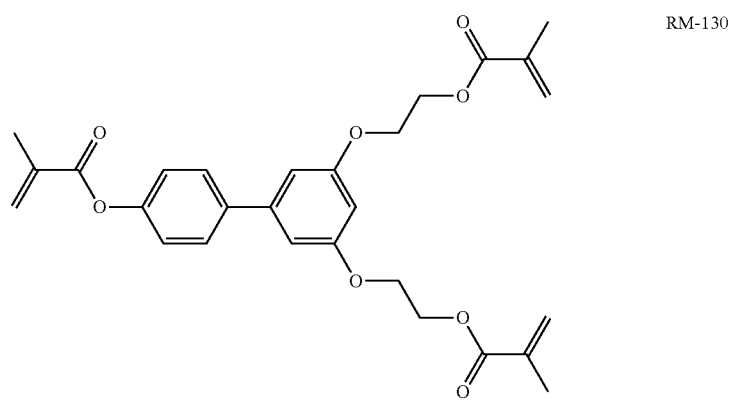
RM-130

TABLE D-continued
Table D shows illustrative reactive mesogenic compounds which can be used in the LC media in accordance with the present invention. In a preferred embodiment the mixtures according to the present inventin contain one or more reactive mesogens of the following table:
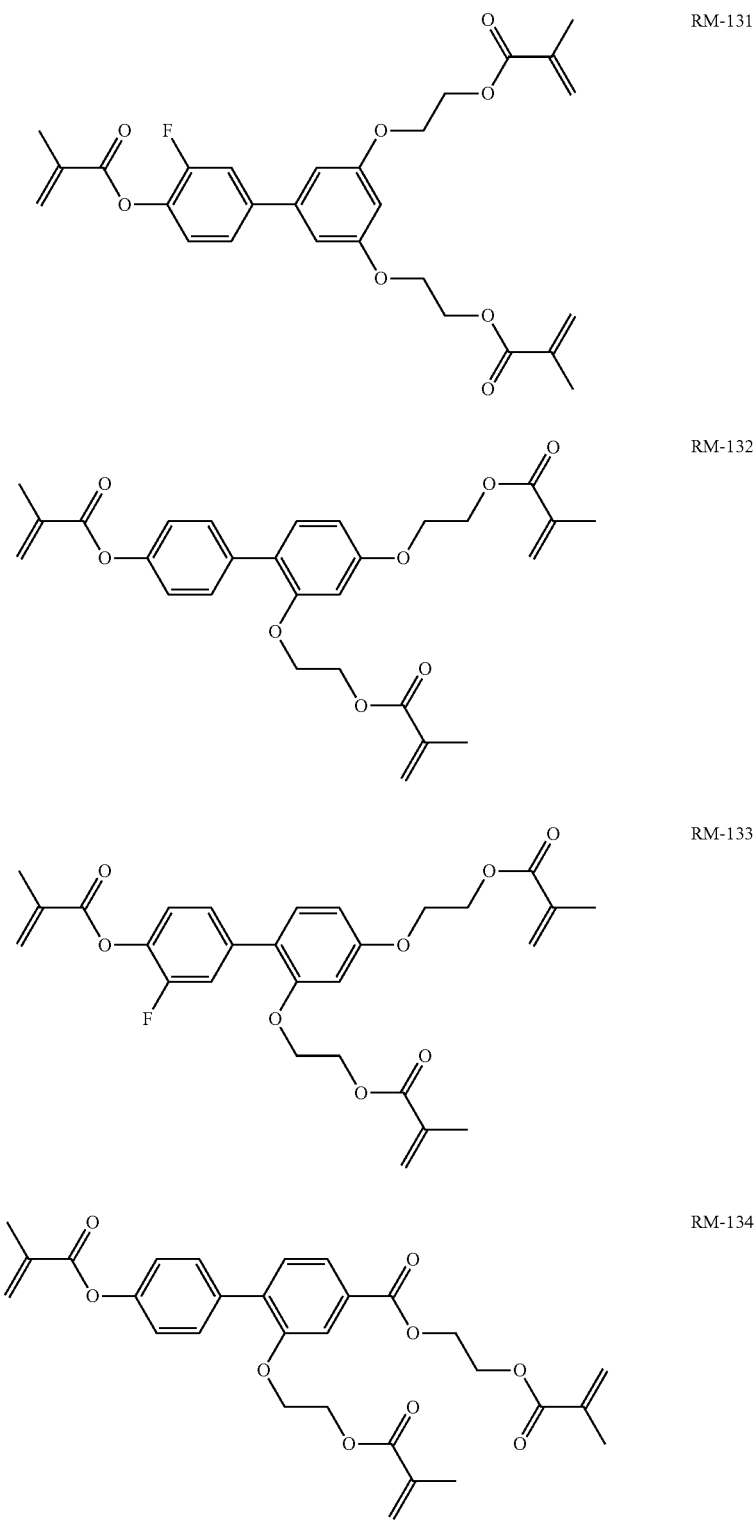
RM-131
RM-132
RM-133
RM-134

TABLE D-continued
Table D shows illustrative reactive mesogenic compounds which can be used in the LC media in accordance with the present invention. In a preferred embodiment the mixtures according to the present inventin contain one or more reactive mesogens of the following table:
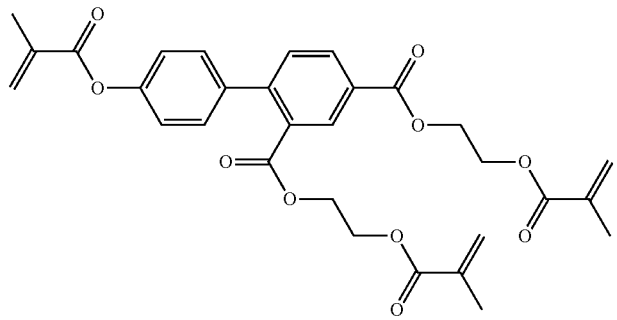 [SMILES: C=C(C)C(=O)OCCOC(=O)c1ccc(-c2ccc(OC(=O)C(=C)C)cc2)c(C(=O)OCCOC(=O)C(=C)C)c1]
RM-135
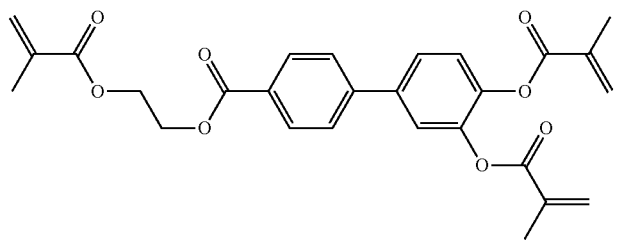 [SMILES: C=C(C)C(=O)OCCOC(=O)c1ccc(-c2ccc(OC(=O)C(=C)C)c(OC(=O)C(=C)C)c2)cc1]
RM-136
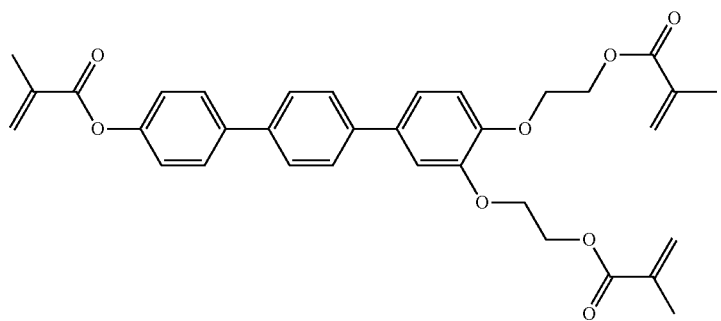 [SMILES: C=C(C)C(=O)OCCOc1ccc(-c2ccc(-c3ccc(OC(=O)C(=C)C)cc3)cc2)cc1OCCOC(=O)C(=C)C]
RM-137
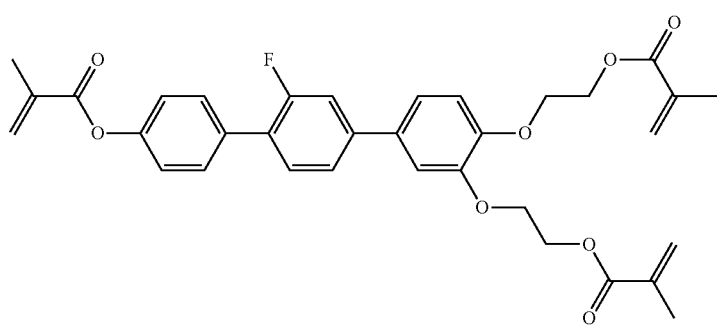 [SMILES: C=C(C)C(=O)OCCOc1ccc(-c2ccc(-c3ccc(OC(=O)C(=C)C)cc3)c(F)c2)cc1OCCOC(=O)C(=C)C]
RM-138

TABLE D-continued
Table D shows illustrative reactive mesogenic compounds which can be used in the LC media in accordance with the present invention. In a preferred embodiment the mixtures according to the present inventin contain one or more reactive mesogens of the following table:
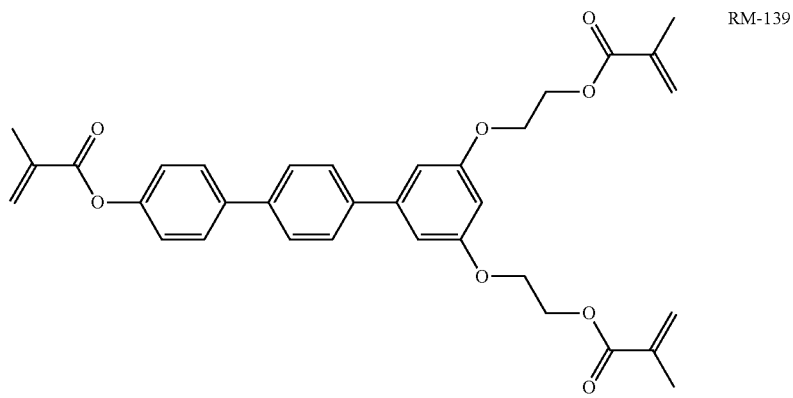
RM-139
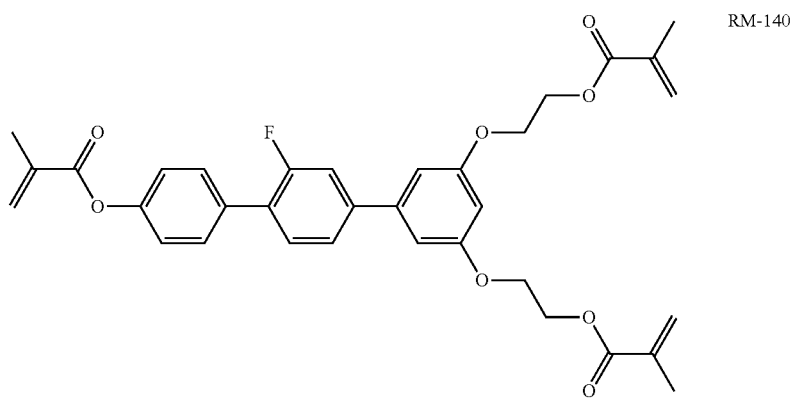
RM-140
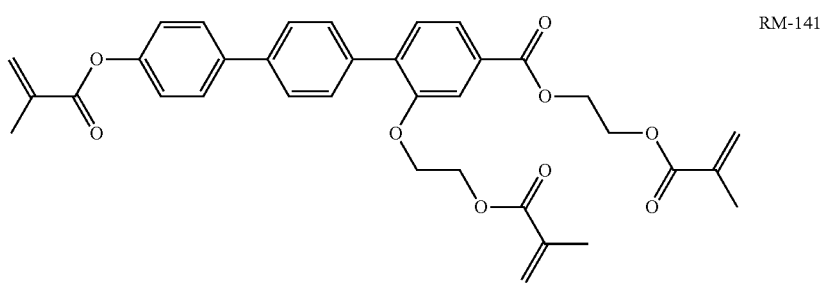
RM-141
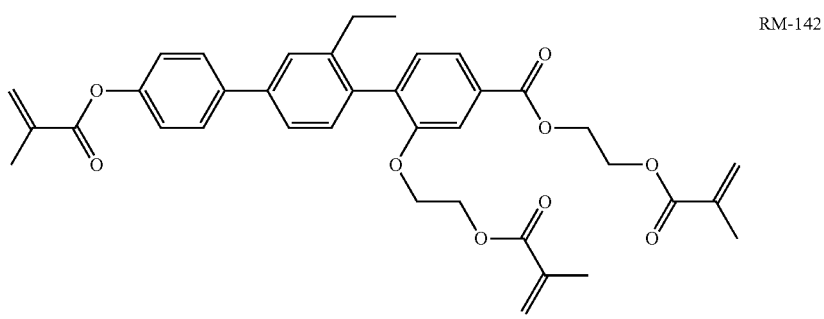
RM-142

TABLE D-continued
Table D shows illustrative reactive mesogenic compounds which can be used in the LC media in accordance with the present invention. In a preferred embodiment the mixtures according to the present inventin contain one or more reactive mesogens of the following table:
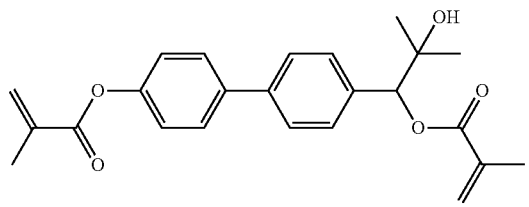 [SMILES: C=C(C)C(=O)Oc1ccc(-c2ccc(C(OC(=O)C(=C)C)C(C)(C)O)cc2)cc1]
RM-143
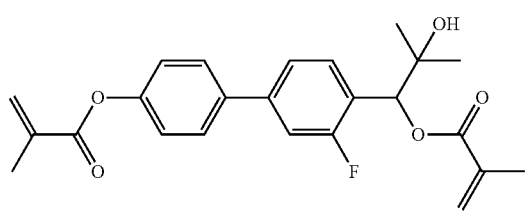 [SMILES: C=C(C)C(=O)Oc1ccc(-c2ccc(C(OC(=O)C(=C)C)C(C)(C)O)c(F)c2)cc1]
RM-144
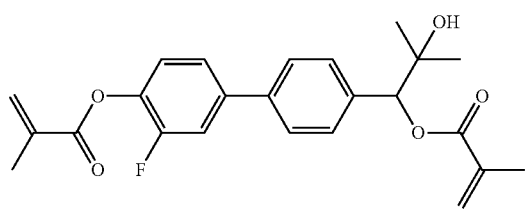 [SMILES: C=C(C)C(=O)Oc1ccc(-c2ccc(C(OC(=O)C(=C)C)C(C)(C)O)cc2)cc1F]
RM-145
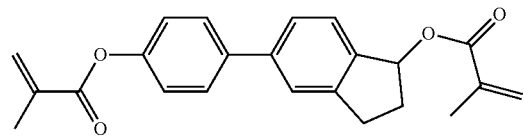 [SMILES: C=C(C)C(=O)Oc1ccc(-c2ccc3c(c2)CCC3OC(=O)C(=C)C)cc1]
RM-146
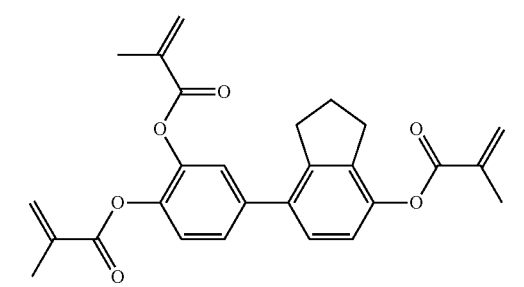 [SMILES: C=C(C)C(=O)Oc1ccc(-c2ccc(OC(=O)C(=C)C)c3c2CCC3)cc1OC(=O)C(=C)C]
RM-147
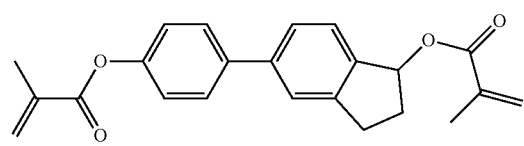 [SMILES: C=C(C)C(=O)Oc1ccc(-c2ccc3c(c2)CCC3OC(=O)C(=C)C)cc1]
RM-148
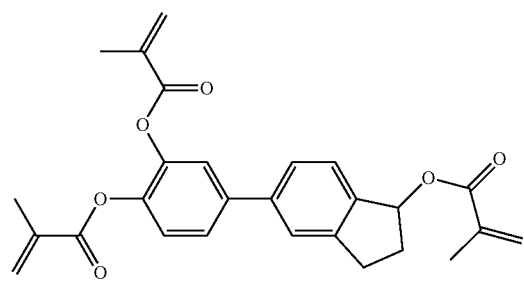 [SMILES: C=C(C)C(=O)Oc1ccc(-c2ccc3c(c2)CCC3OC(=O)C(=C)C)cc1OC(=O)C(=C)C]
RM-149

TABLE D-continued
Table D shows illustrative reactive mesogenic compounds which can be used in the LC media in accordance with the present invention. In a preferred embodiment the mixtures according to the present inventin contain one or more reactive mesogens of the following table:
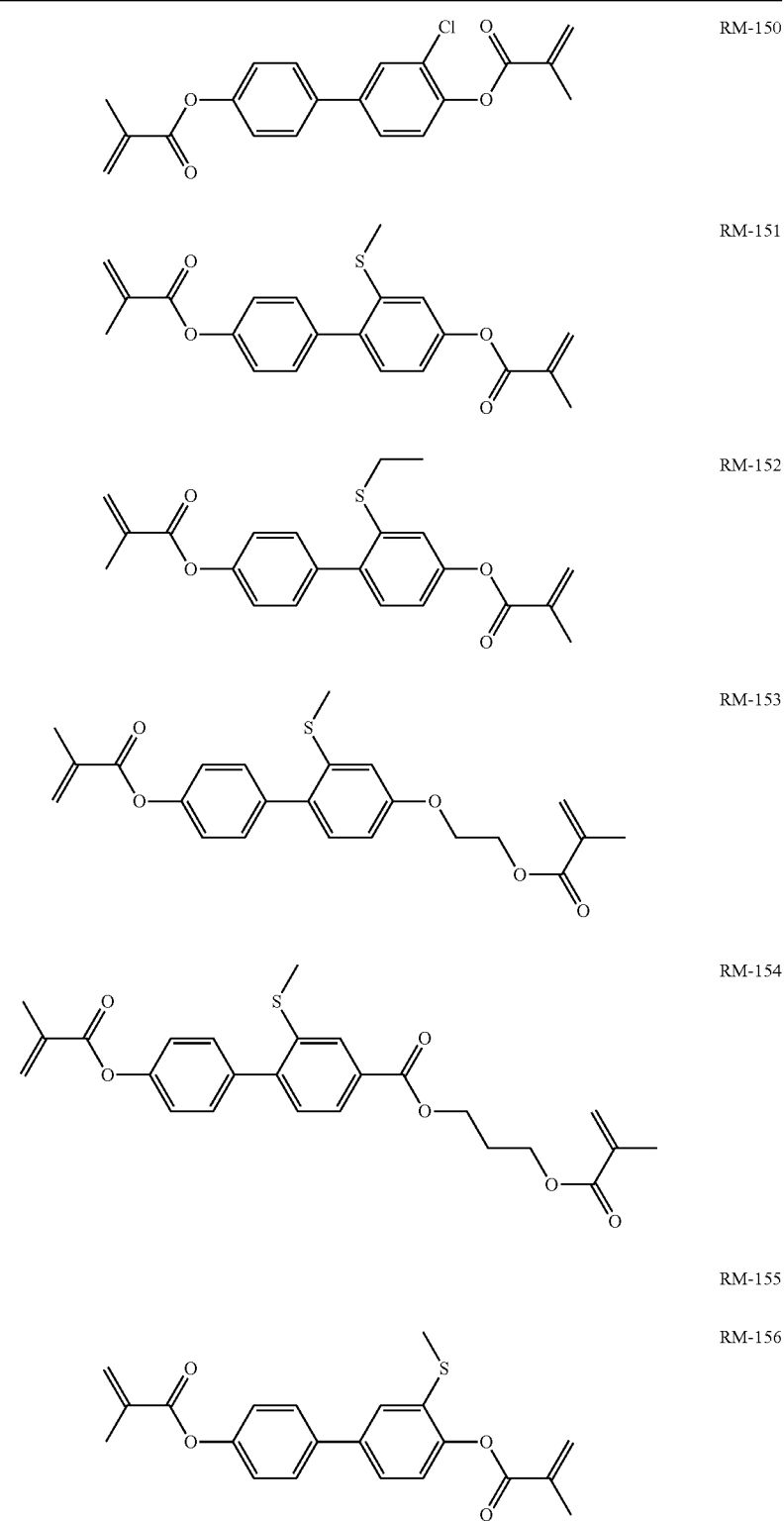
RM-150
RM-151
RM-152
RM-153
RM-154
RM-155
RM-156

TABLE D-continued
Table D shows illustrative reactive mesogenic compounds which can be used in the LC media in accordance with the present invention. In a preferred embodiment the mixtures according to the present inventin contain one or more reactive mesogens of the following table:
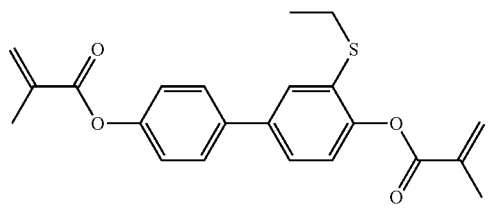 [SMILES: C=C(C)C(=O)Oc1ccc(-c2ccc(OC(=O)C(=C)C)c(SCC)c2)cc1]
RM-157
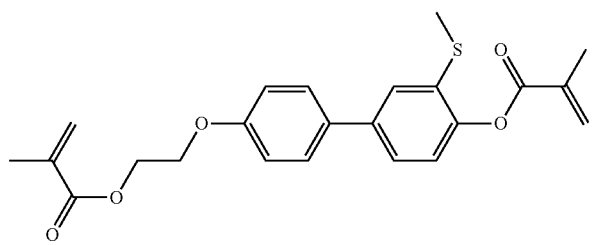 [SMILES: C=C(C)C(=O)OCCOc1ccc(-c2ccc(OC(=O)C(=C)C)c(SC)c2)cc1]
RM-158
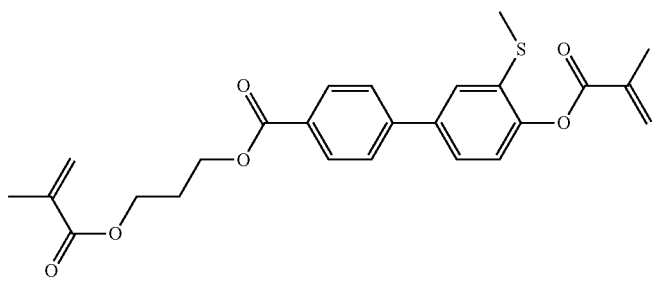 [SMILES: C=C(C)C(=O)OCCCOC(=O)c1ccc(-c2ccc(OC(=O)C(=C)C)c(SC)c2)cc1]
RM-159
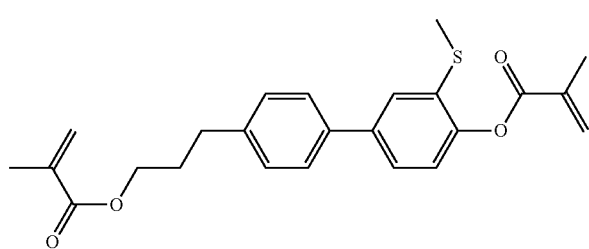
RM-160
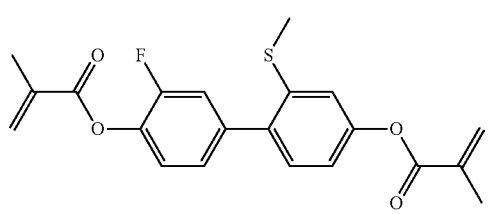 [SMILES: C=C(C)C(=O)Oc1ccc(-c2ccc(OC(=O)C(=C)C)c(F)c2)c(SC)c1]
RM-161
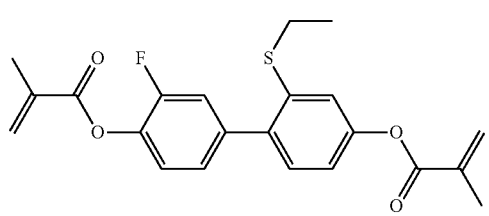 [SMILES: C=C(C)C(=O)Oc1ccc(-c2ccc(OC(=O)C(=C)C)c(F)c2)c(SCC)c1]
RM-162

TABLE D-continued
Table D shows illustrative reactive mesogenic compounds which can be used in the LC media in accordance with the present invention. In a preferred embodiment the mixtures according to the present inventin contain one or more reactive mesogens of the following table:
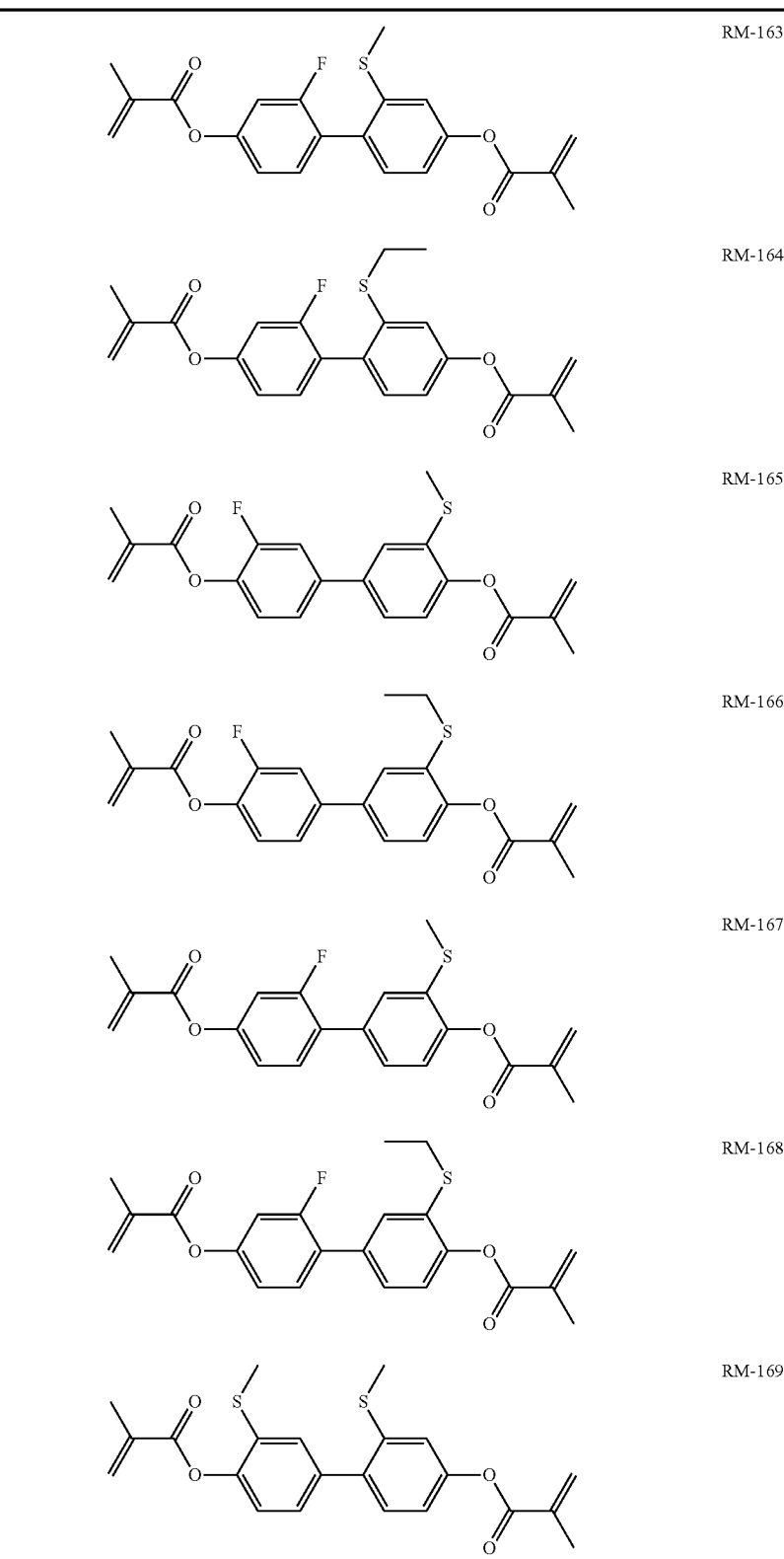
RM-163
RM-164
RM-165
RM-166
RM-167
RM-168
RM-169

TABLE D-continued
Table D shows illustrative reactive mesogenic compounds which can be used in the LC media in accordance with the present invention. In a preferred embodiment the mixtures according to the present inventin contain one or more reactive mesogens of the following table:
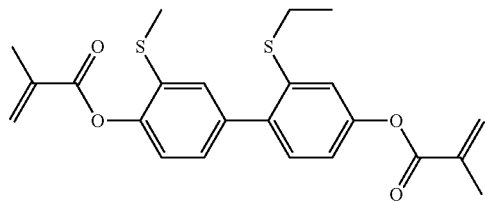
RM-170
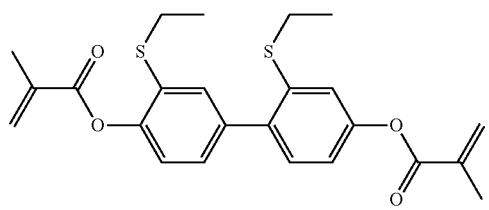 [SMILES: C=C(C)C(=O)Oc1ccc(-c2ccc(OC(=O)C(=C)C)c(SCC)c2)c(SCC)c1]
RM-171
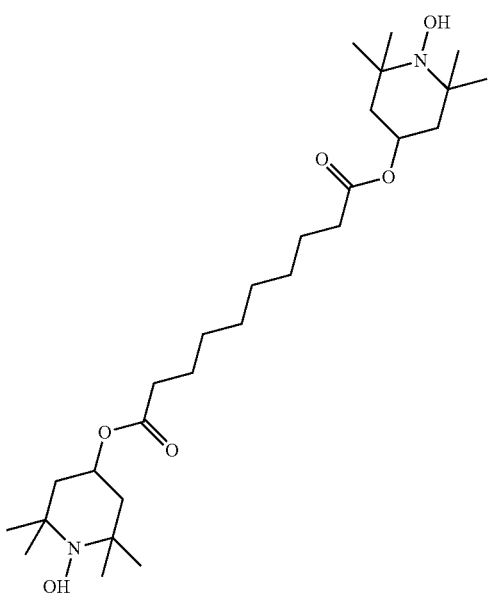
RM-172
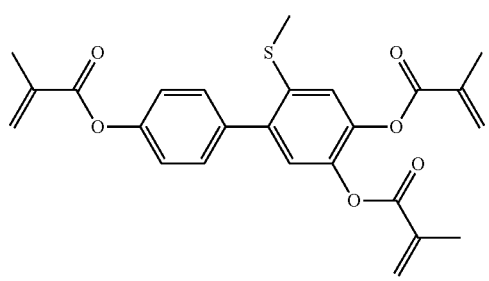 [SMILES: C=C(C)C(=O)Oc1ccc(-c2cc(OC(=O)C(=C)C)c(OC(=O)C(=C)C)cc2SC)cc1]
RM-173

TABLE D-continued
Table D shows illustrative reactive mesogenic compounds which can be used in the LC media in accordance with the present invention. In a preferred embodiment the mixtures according to the present inventin contain one or more reactive mesogens of the following table:
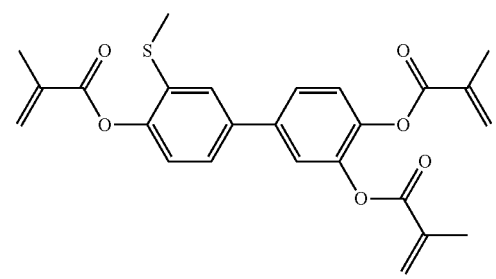 [SMILES: C=C(C)C(=O)Oc1ccc(-c2ccc(OC(=O)C(=C)C)c(SC)c2)cc1OC(=O)C(=C)C]
RM-174
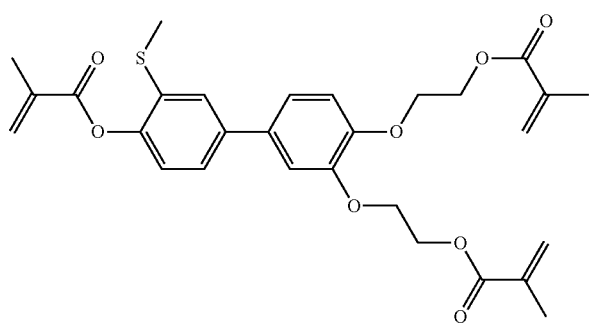 [SMILES: C=C(C)C(=O)OCCOc1ccc(-c2ccc(OC(=O)C(=C)C)c(SC)c2)cc1OCCOC(=O)C(=C)C]
RM-175
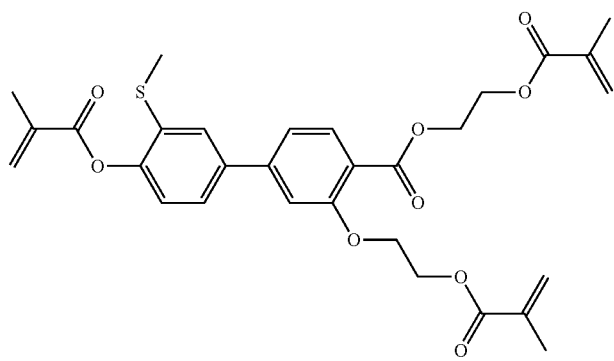 [SMILES: C=C(C)C(=O)OCCOC(=O)c1ccc(-c2ccc(OC(=O)C(=C)C)c(SC)c2)cc1OCCOC(=O)C(=C)C]
RM-176
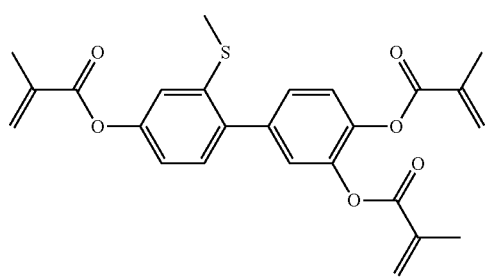 [SMILES: C=C(C)C(=O)Oc1ccc(-c2ccc(OC(=O)C(=C)C)c(OC(=O)C(=C)C)c2)c(SC)c1]
RM-177

TABLE D-continued
Table D shows illustrative reactive mesogenic compounds which can be used in the LC media in accordance with the present invention. In a preferred embodiment the mixtures according to the present inventin contain one or more reactive mesogens of the following table:
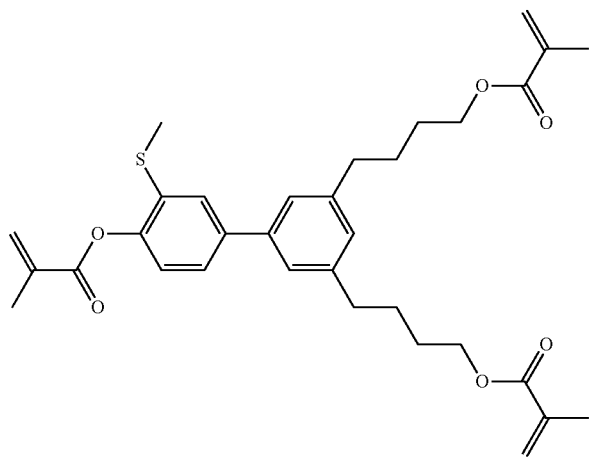 [SMILES: C=C(C)C(=O)OCCCCc1cc(CCCCOC(=O)C(=C)C)cc(-c2ccc(OC(=O)C(=C)C)c(SC)c2)c1]
RM-178
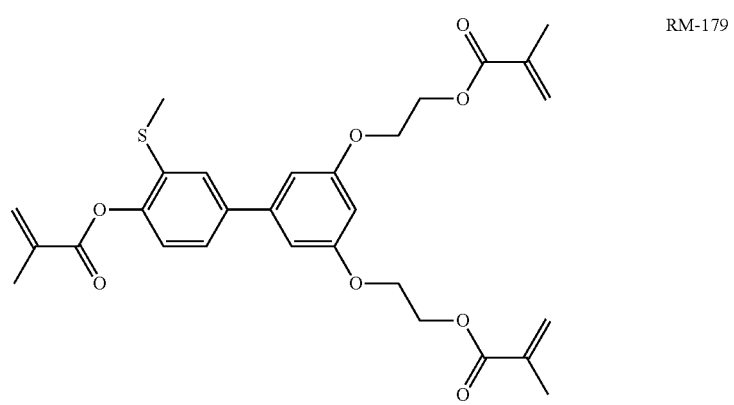
RM-179
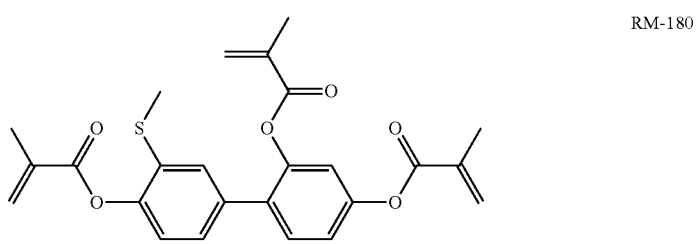
RM-180
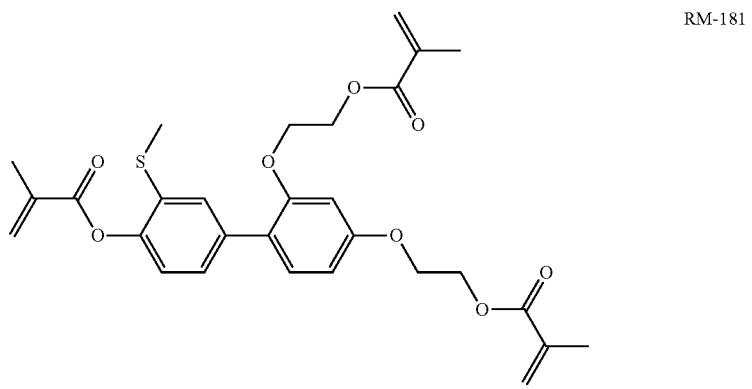
RM-181

TABLE D-continued
Table D shows illustrative reactive mesogenic compounds which can be used in the LC media in accordance with the present invention. In a preferred embodiment the mixtures according to the present inventin contain one or more reactive mesogens of the following table:
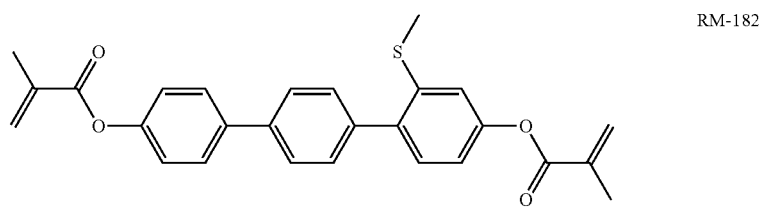
RM-182
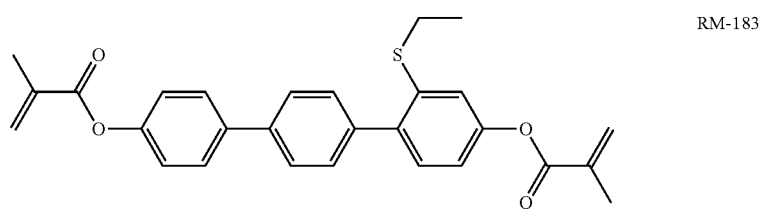
RM-183
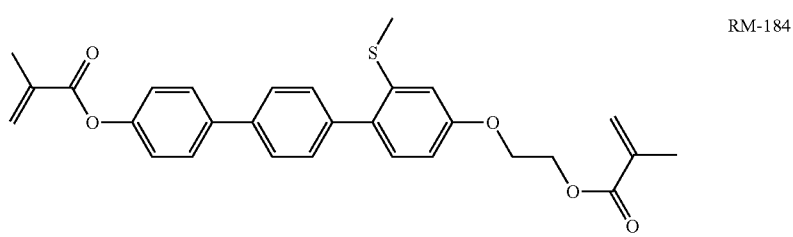
RM-184
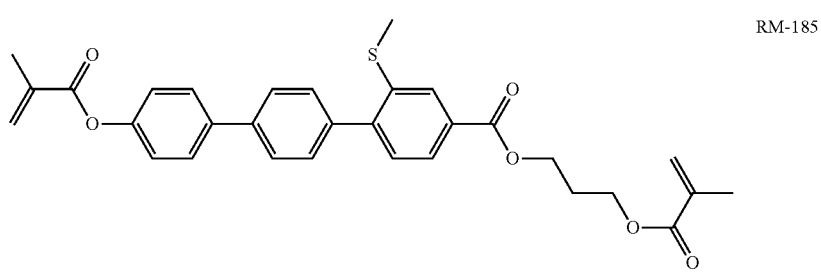
RM-185
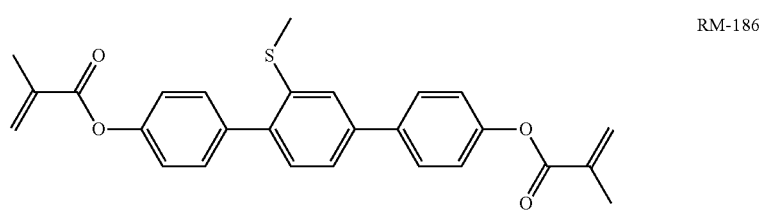
RM-186
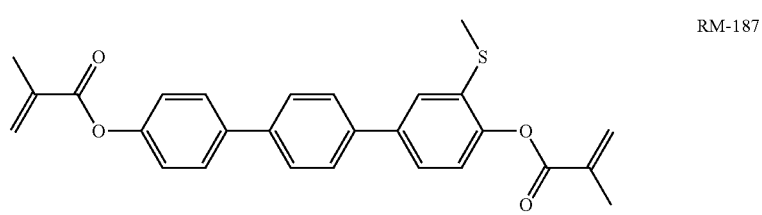
RM-187

TABLE D-continued
Table D shows illustrative reactive mesogenic compounds which can be used in the LC media in accordance with the present invention. In a preferred embodiment the mixtures according to the present inventin contain one or more reactive mesogens of the following table:
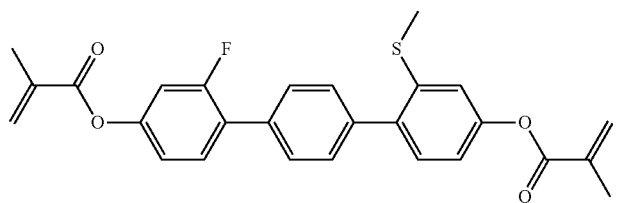 [SMILES: C=C(C)C(=O)Oc1ccc(-c2ccc(-c3ccc(OC(=O)C(=C)C)cc3SC)cc2)c(F)c1]
RM-188
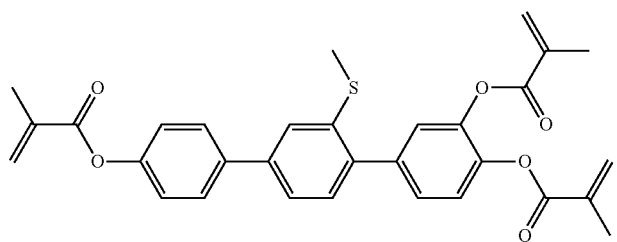 [SMILES: C=C(C)C(=O)Oc1ccc(-c2ccc(-c3ccc(OC(=O)C(=C)C)c(OC(=O)C(=C)C)c3)c(SC)c2)cc1]
RM-189
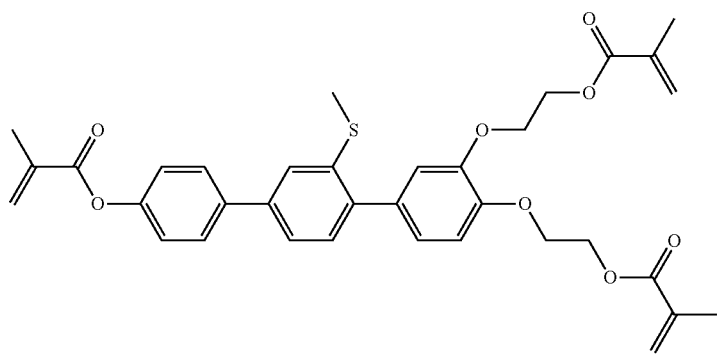 [SMILES: C=C(C)C(=O)OCCOc1ccc(-c2ccc(-c3ccc(OC(=O)C(=C)C)cc3)cc2SC)cc1OCCOC(=O)C(=C)C]
RM-190
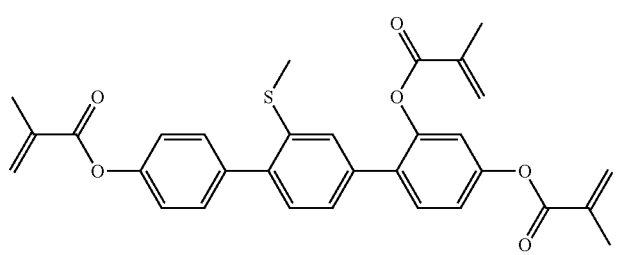 [SMILES: C=C(C)C(=O)Oc1ccc(-c2ccc(-c3ccc(OC(=O)C(=C)C)cc3OC(=O)C(=C)C)cc2SC)cc1]
RM-191
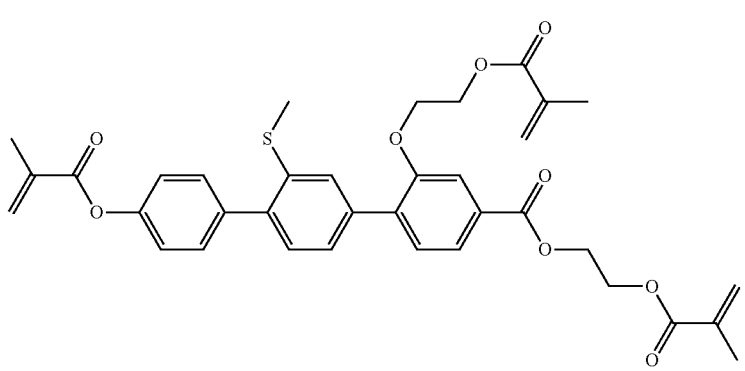 [SMILES: C=C(C)C(=O)OCCOC(=O)c1ccc(-c2ccc(-c3ccc(OC(=O)C(=C)C)cc3)c(SC)c2)c(OCCOC(=O)C(=C)C)c1]
RM-192

In a preferred embodiment, the mixtures according to the invention comprise one or more polymerizable compounds, preferably selected from the polymerizable compounds of the formulae RM-1 to RM-140. Of these, compounds RM-1, RM-4, RM-8, RM-17, RM-19, RM-35, RM-37, RM-39, RM-40, RM-41, RM-42, RM-50, RM-53, RM-54, RM-56, RM-59, RM-66, RM-76, RM-78, RM-90, RM-93, RM-104, RM-105, RM-111, RM-119, RM-122, RM-123 and RM-124 are particularly preferred.

TABLE E

Table E shows self-alignment additives for vertical alignment which can be used in LC media for SA-VA and SA-FFS displays according to the present invention. In a preferred embodiment the mixtures according to the present invention contain at least one additive selected from the following group of compounds:

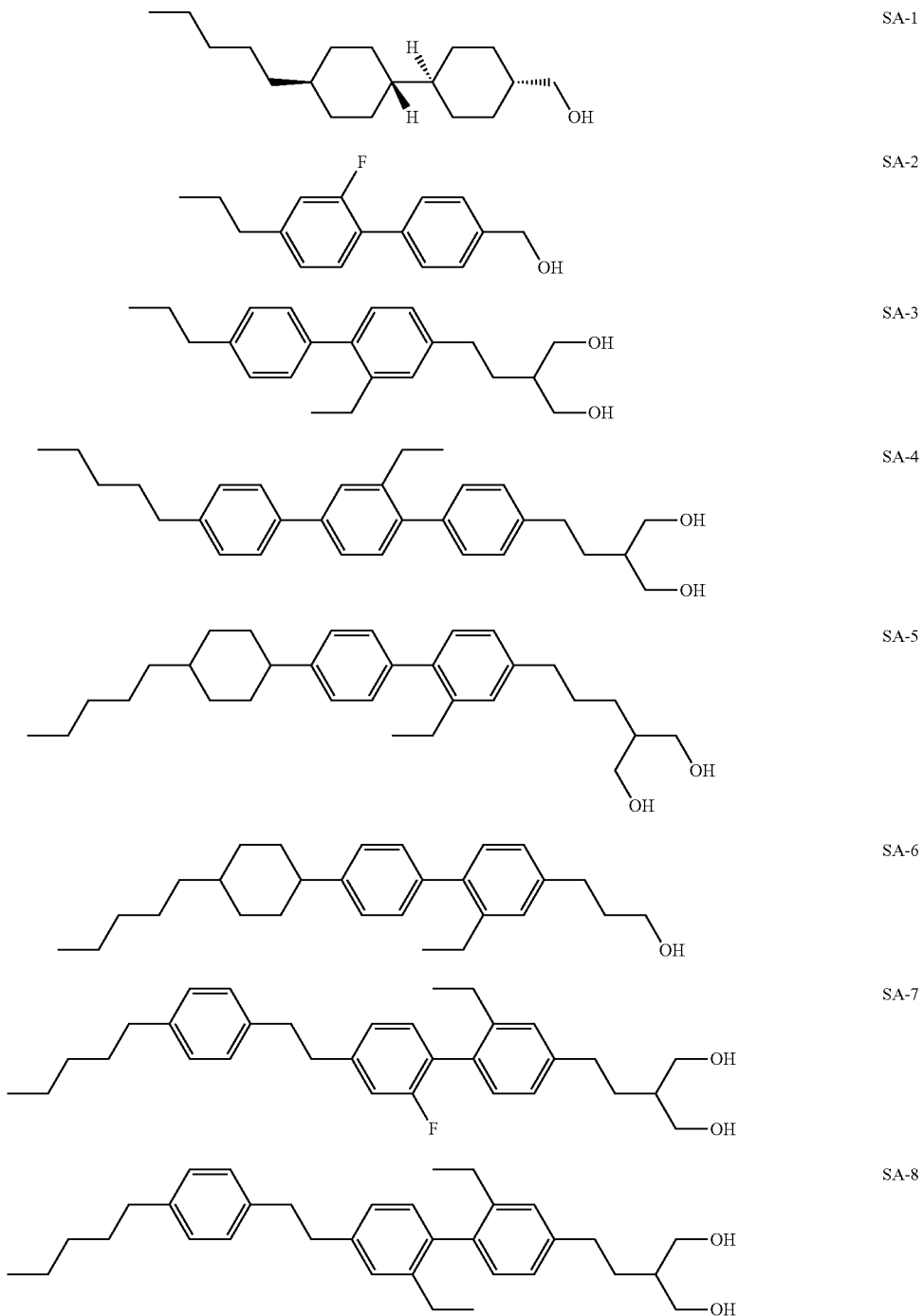

TABLE E-continued
Table E shows self-alignment additives for vertical alignment which can be used in LC media for SA-VA and SA-FFS displays according to the present invention. In a preferred embodiment the mixtures according to the present invention contain at least one additive selected from the following group of compounds:
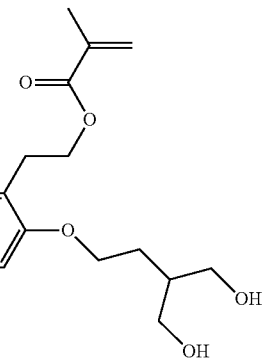
SA-9
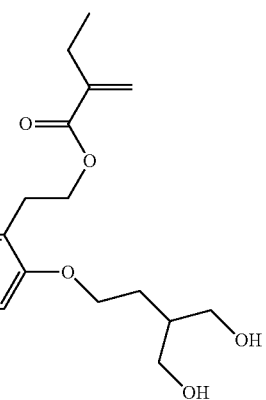
SA-10
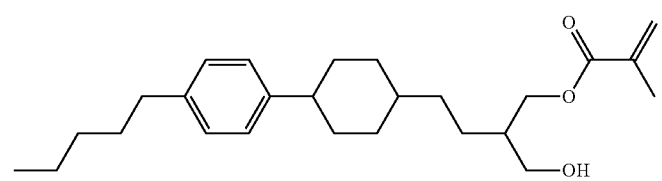 [SMILES: C=C(C)C(=O)OCC(CO)CCC1CCC(c2ccc(CCCCC)cc2)CC1]
SA-11
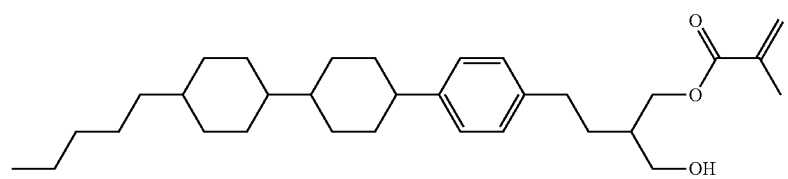
SA-12
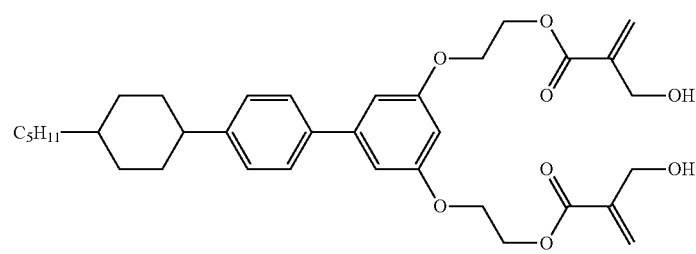
SA-13

TABLE E-continued
Table E shows self-alignment additives for vertical alignment which can be used in LC media for SA-VA and SA-FFS displays according to the present invention. In a preferred embodiment the mixtures according to the present invention contain at least one additive selected from the following group of compounds:
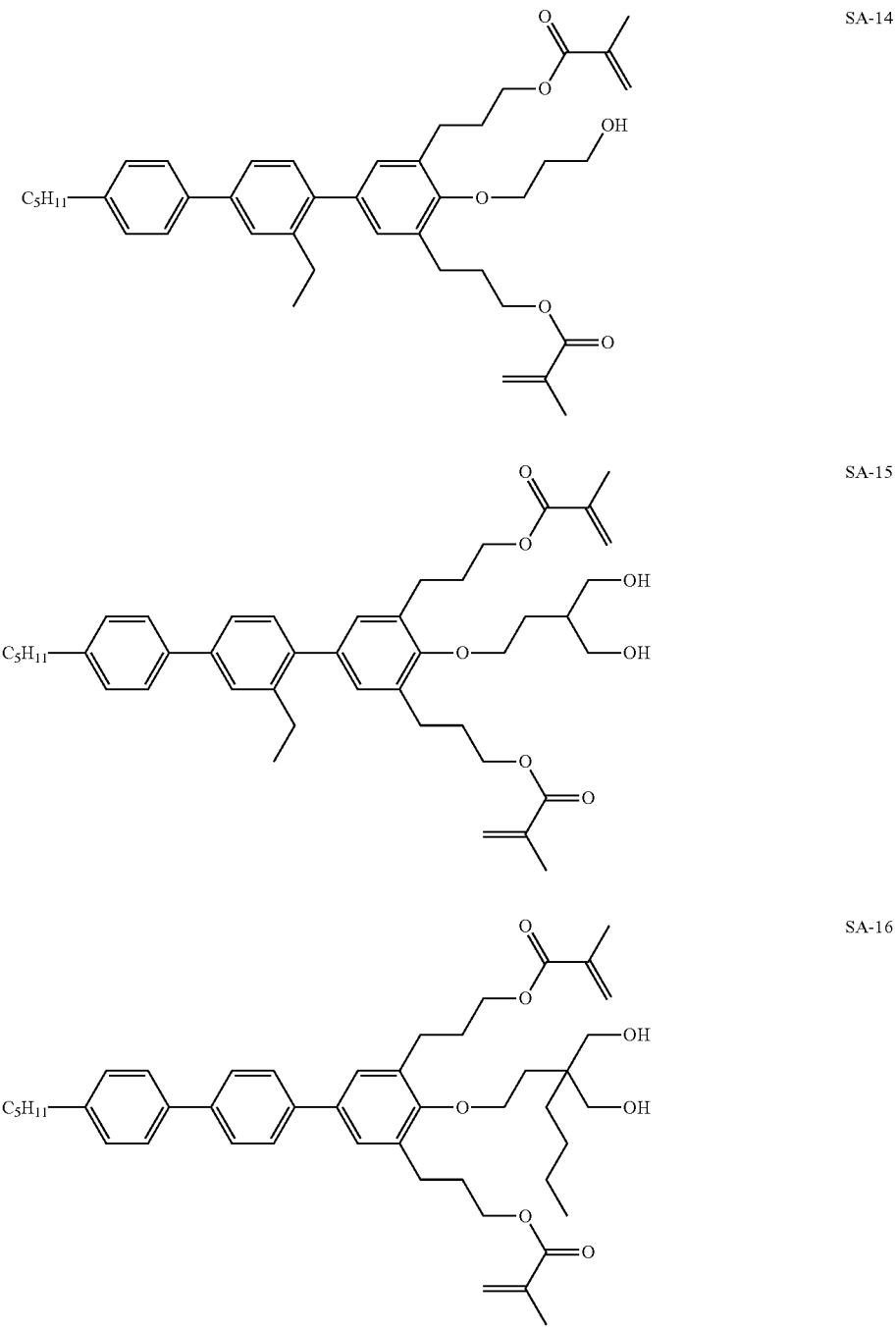
SA-14
SA-15
SA-16

TABLE E-continued
Table E shows self-alignment additives for vertical alignment which can be used in LC media for SA-VA and SA-FFS displays according to the present invention. In a preferred embodiment the mixtures according to the present invention contain at least one additive selected from the following group of compounds:
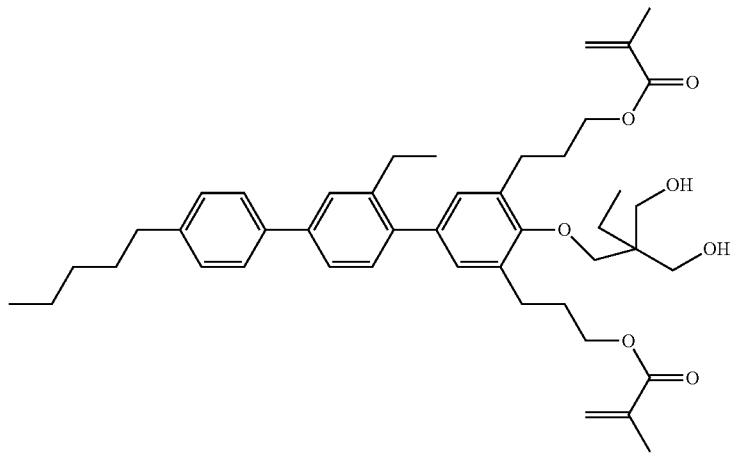 [SMILES: C=C(C)C(=O)OCCCc1cc(-c2ccc(-c3ccc(CCCCC)cc3)cc2CC)cc(CCCOC(=O)C(=C)C)c1OCC(CC)(CO)CO]
SA-17
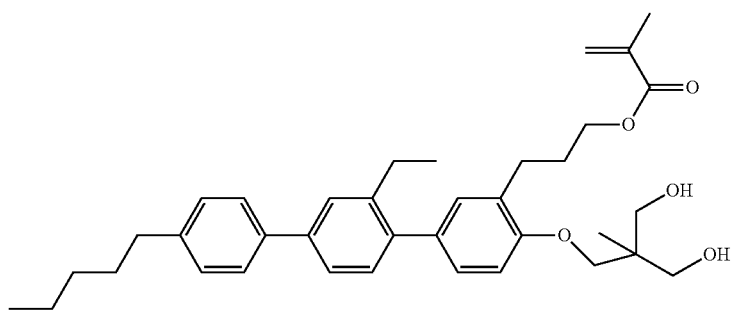 [SMILES: C=C(C)C(=O)OCCCc1cc(-c2ccc(-c3ccc(CCCCC)cc3)cc2CC)ccc1OCC(C)(CO)CO]
SA-18
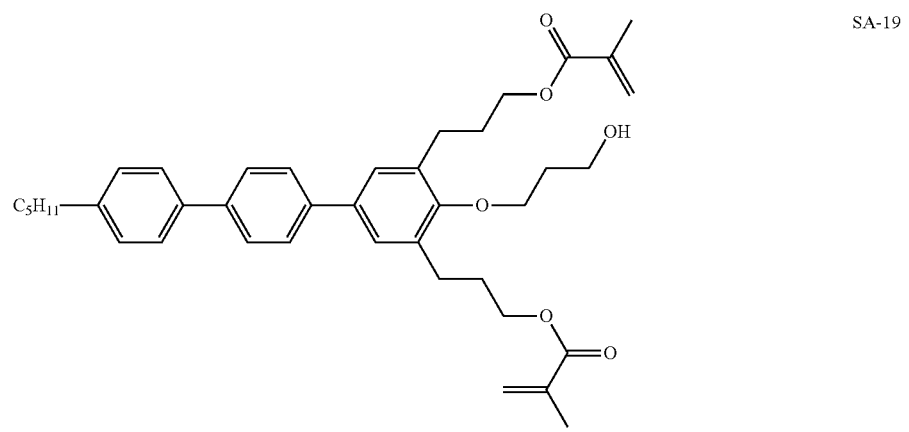
SA-19

TABLE E-continued
Table E shows self-alignment additives for vertical alignment which can be used in LC media for SA-VA and SA-FFS displays according to the present invention. In a preferred embodiment the mixtures according to the present invention contain at least one additive selected from the following group of compounds:
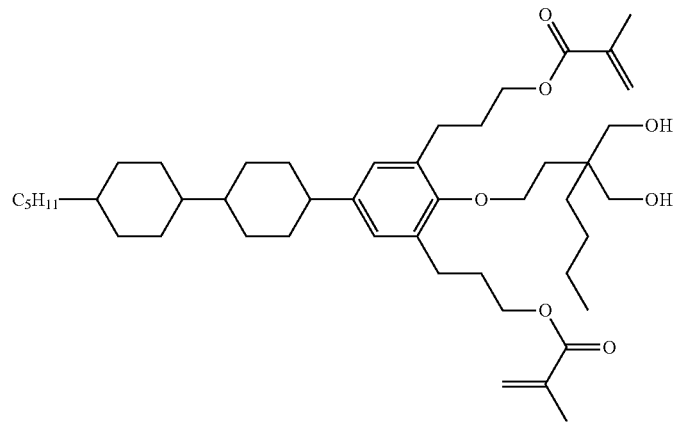
SA-20
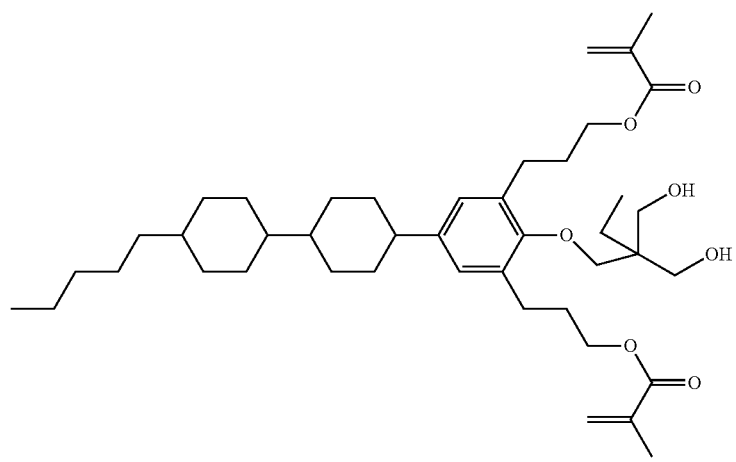 [SMILES: C=C(C)C(=O)OCCCc1cc(C2CCC(C3CCC(CCCCC)CC3)CC2)cc(CCCOC(=O)C(=C)C)c1OCC(CC)(CO)CO]
SA-21
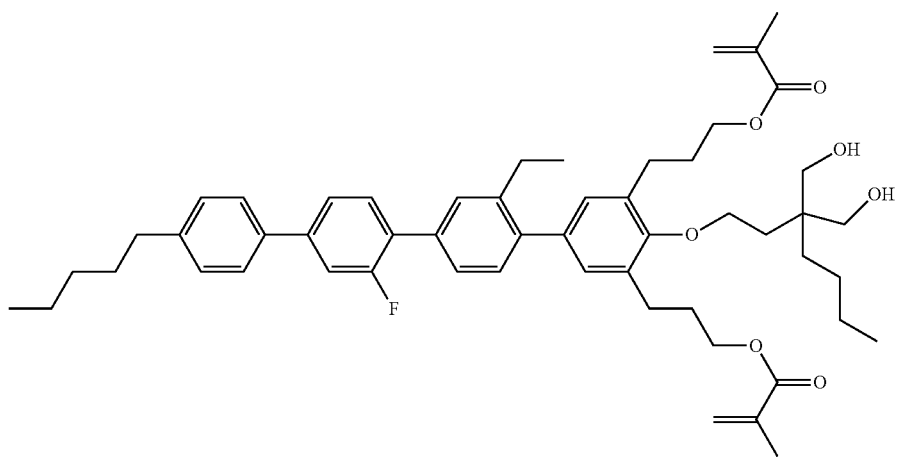 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC]
SA-22

TABLE E-continued
Table E shows self-alignment additives for vertical alignment which can be used in LC media for SA-VA and SA-FFS displays according to the present invention. In a preferred embodiment the mixtures according to the present invention contain at least one additive selected from the following group of compounds:
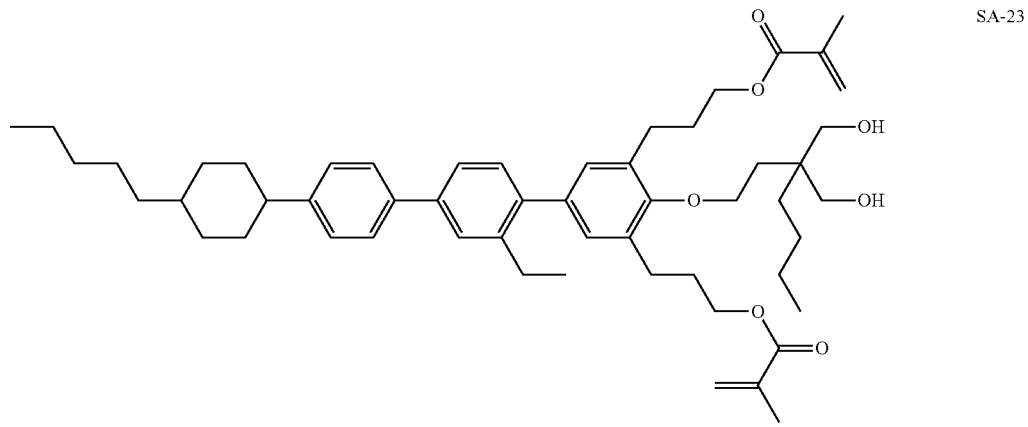
SA-23
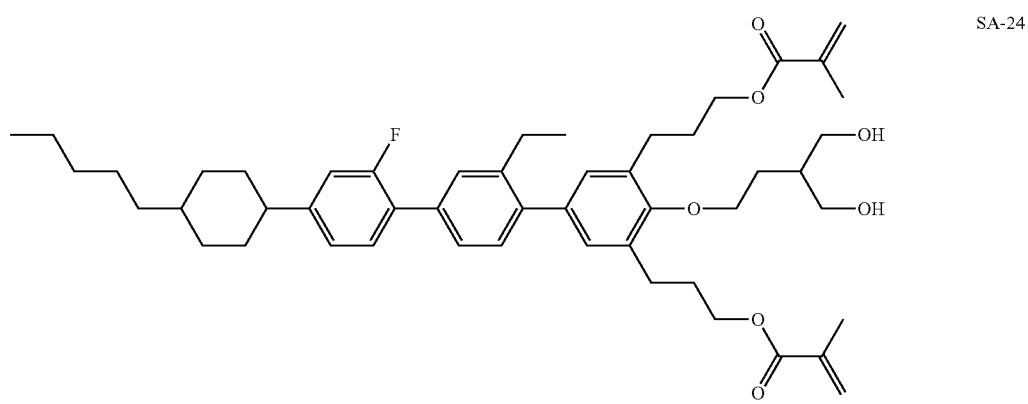
SA-24
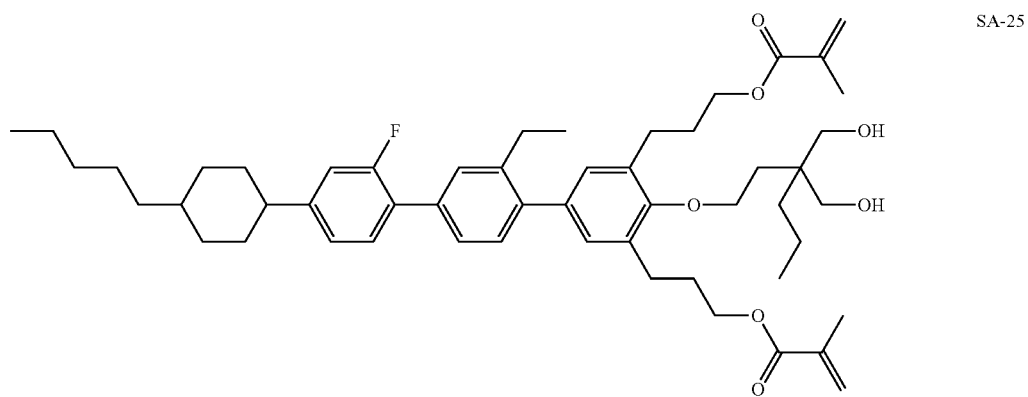
SA-25

TABLE E-continued
Table E shows self-alignment additives for vertical alignment which can be used in LC media for SA-VA and SA-FFS displays according to the present invention. In a preferred embodiment the mixtures according to the present invention contain at least one additive selected from the following group of compounds:
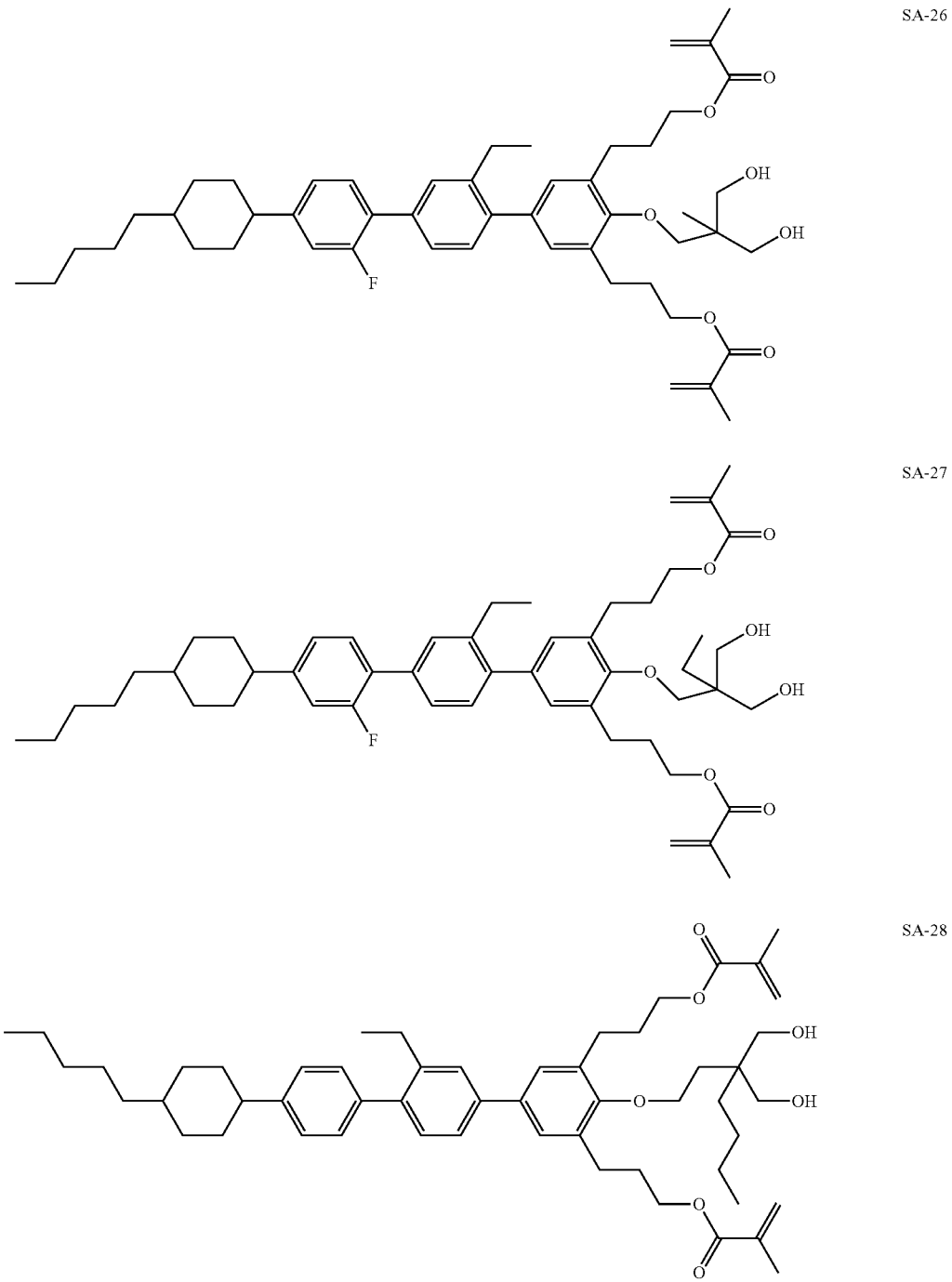
SA-26
SA-27
SA-28

TABLE E-continued
Table E shows self-alignment additives for vertical alignment which can be used in LC media for SA-VA and SA-FFS displays according to the present invention. In a preferred embodiment the mixtures according to the present invention contain at least one additive selected from the following group of compounds:
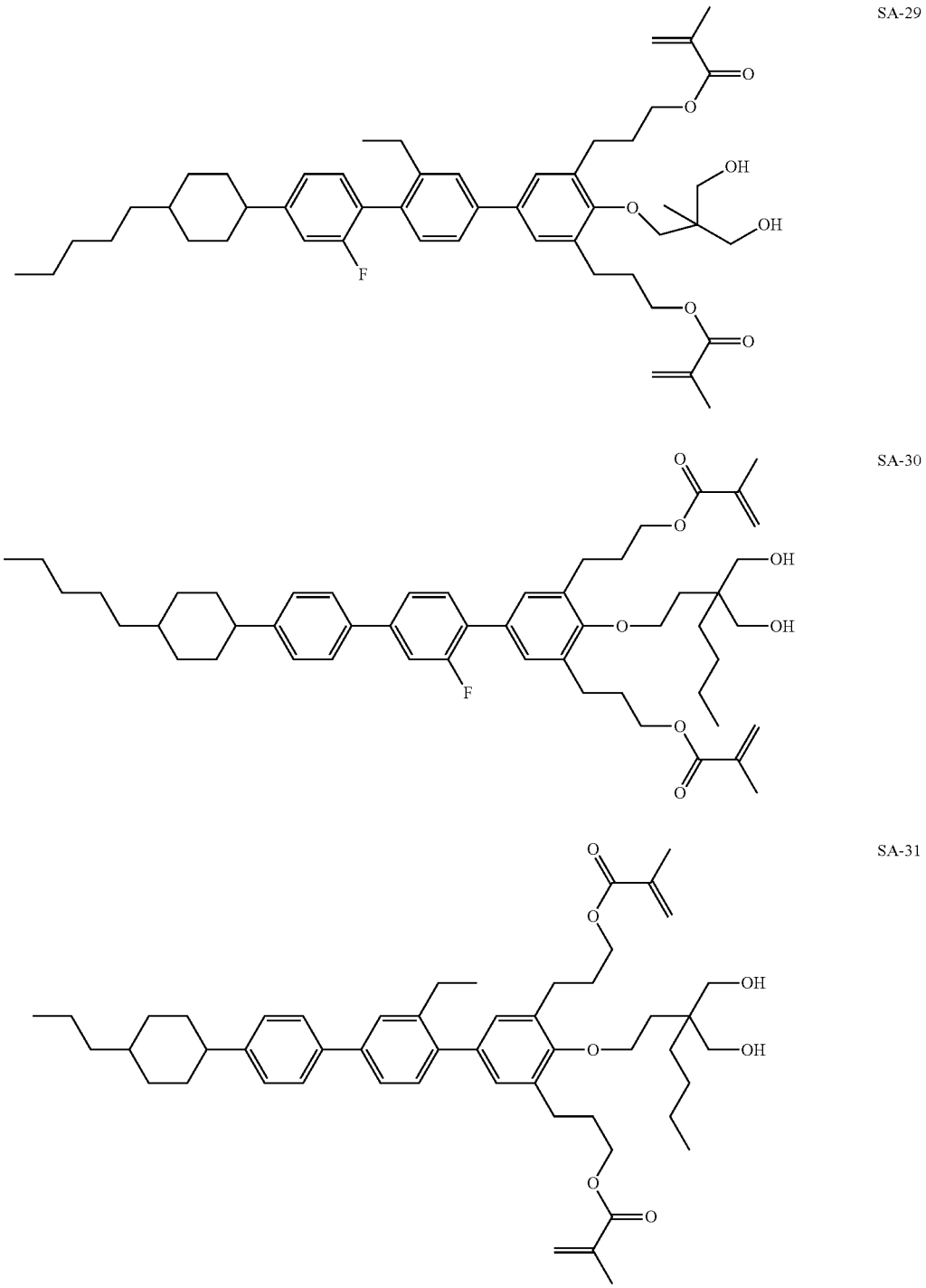
SA-29
SA-30
SA-31

TABLE E-continued
Table E shows self-alignment additives for vertical alignment which can be used in LC media for SA-VA and SA-FFS displays according to the present invention. In a preferred embodiment the mixtures according to the present invention contain at least one additive selected from the following group of compounds:
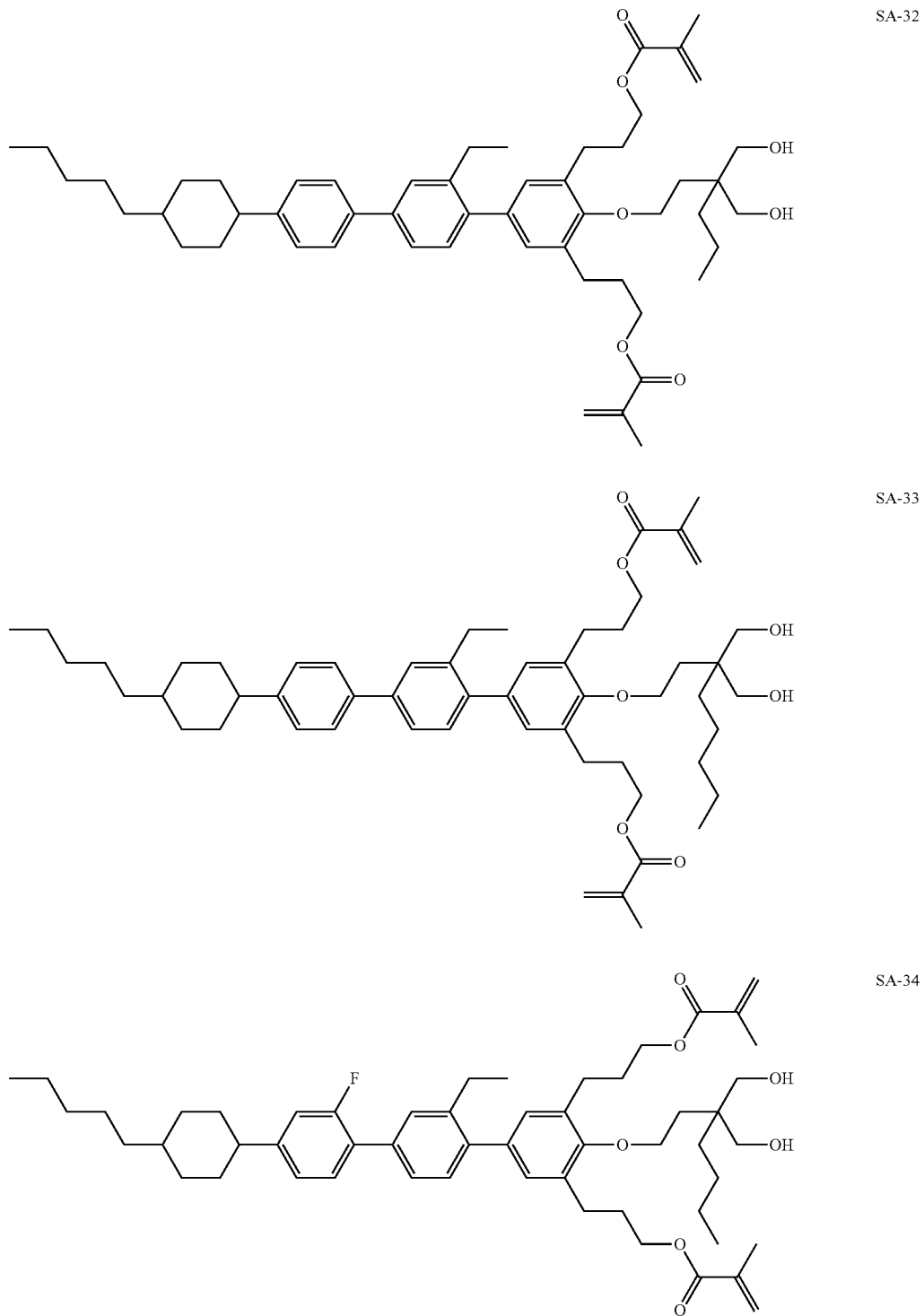
SA-32
SA-33
SA-34

TABLE E-continued
Table E shows self-alignment additives for vertical alignment which can be used in LC media for SA-VA and SA-FFS displays according to the present invention. In a preferred embodiment the mixtures according to the present invention contain at least one additive selected from the following group of compounds:
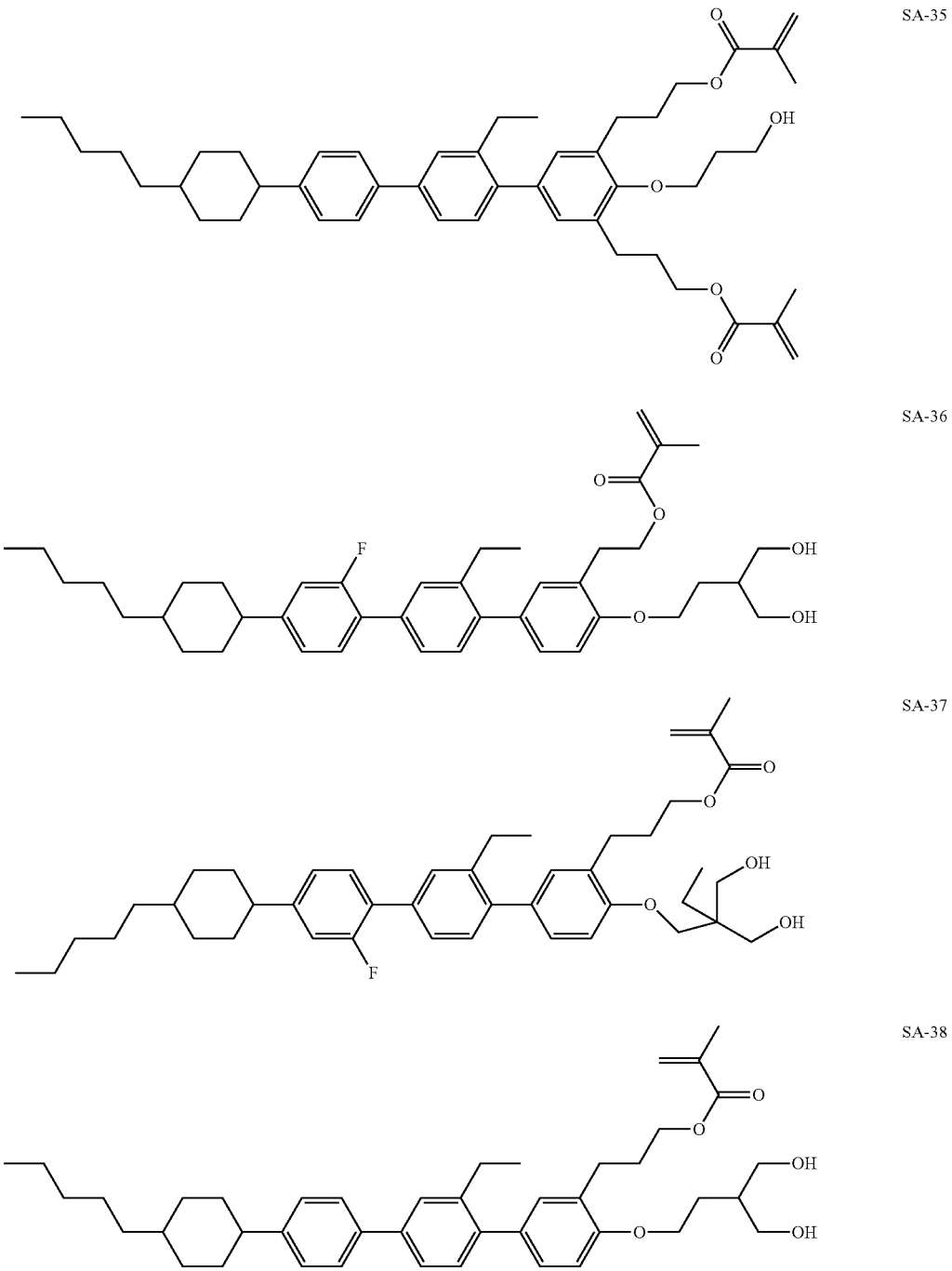

TABLE E-continued
Table E shows self-alignment additives for vertical alignment which can be used in LC media for SA-VA and SA-FFS displays according to the present invention. In a preferred embodiment the mixtures according to the present invention contain at least one additive selected from the following group of compounds:
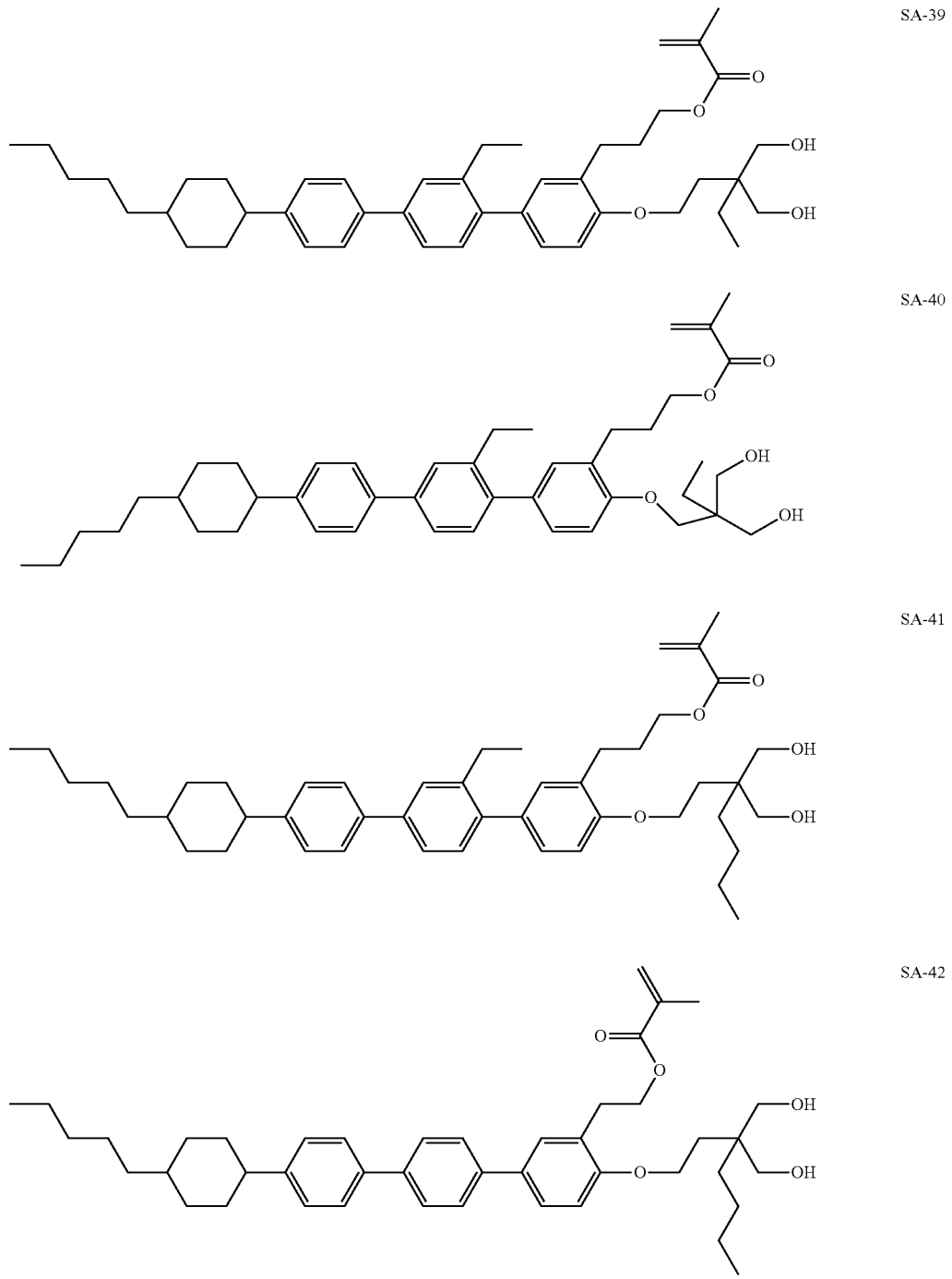
SA-39
SA-40
SA-41
SA-42

TABLE E-continued
Table E shows self-alignment additives for vertical alignment which can be used in LC media for SA-VA and SA-FFS displays according to the present invention. In a preferred embodiment the mixtures according to the present invention contain at least one additive selected from the following group of compounds:
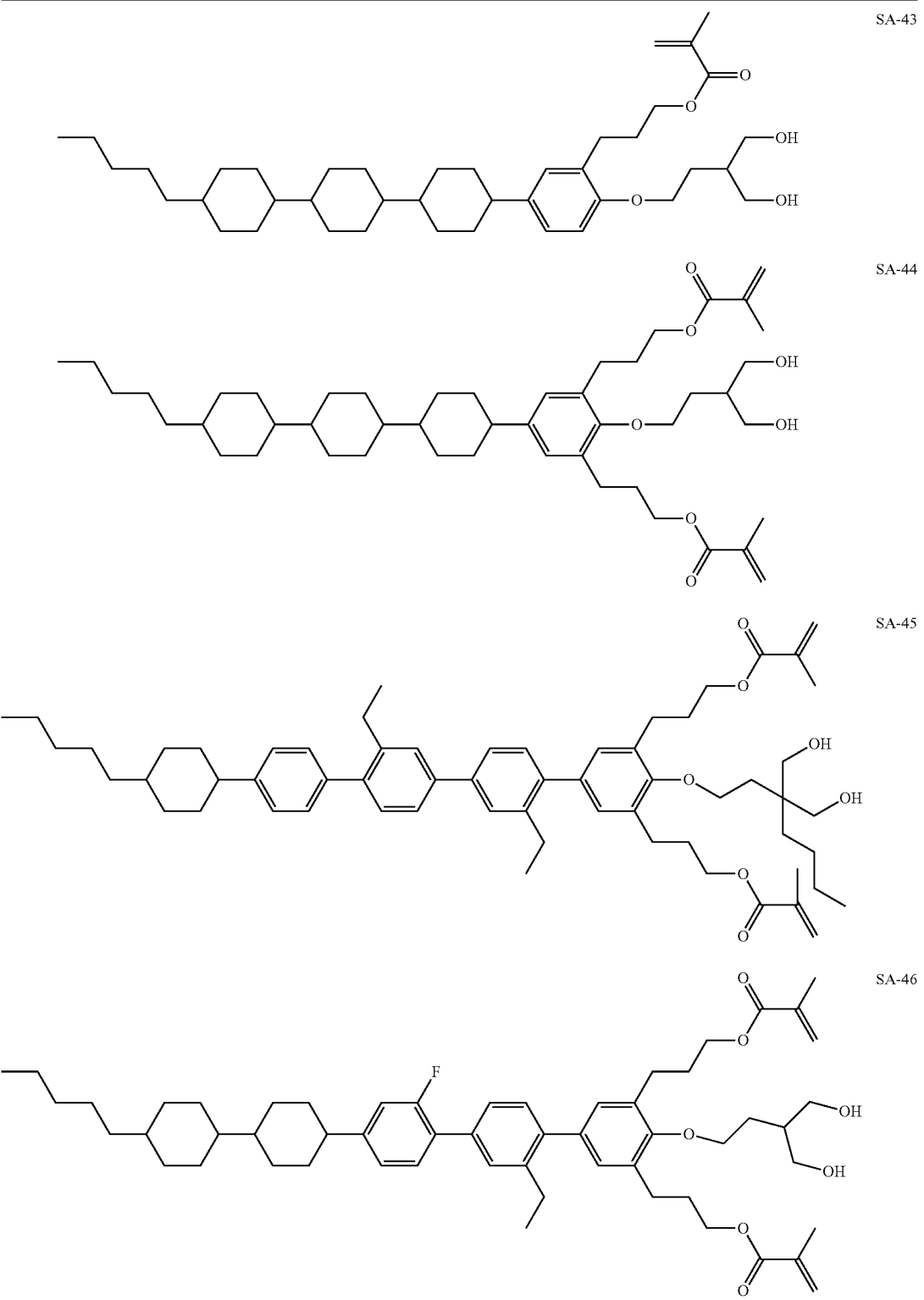

TABLE E-continued

Table E shows self-alignment additives for vertical alignment which can be used in LC media for SA-VA and SA-FFS displays according to the present invention. In a preferred embodiment the mixtures according to the present invention contain at least one additive selected from the following group of compounds:

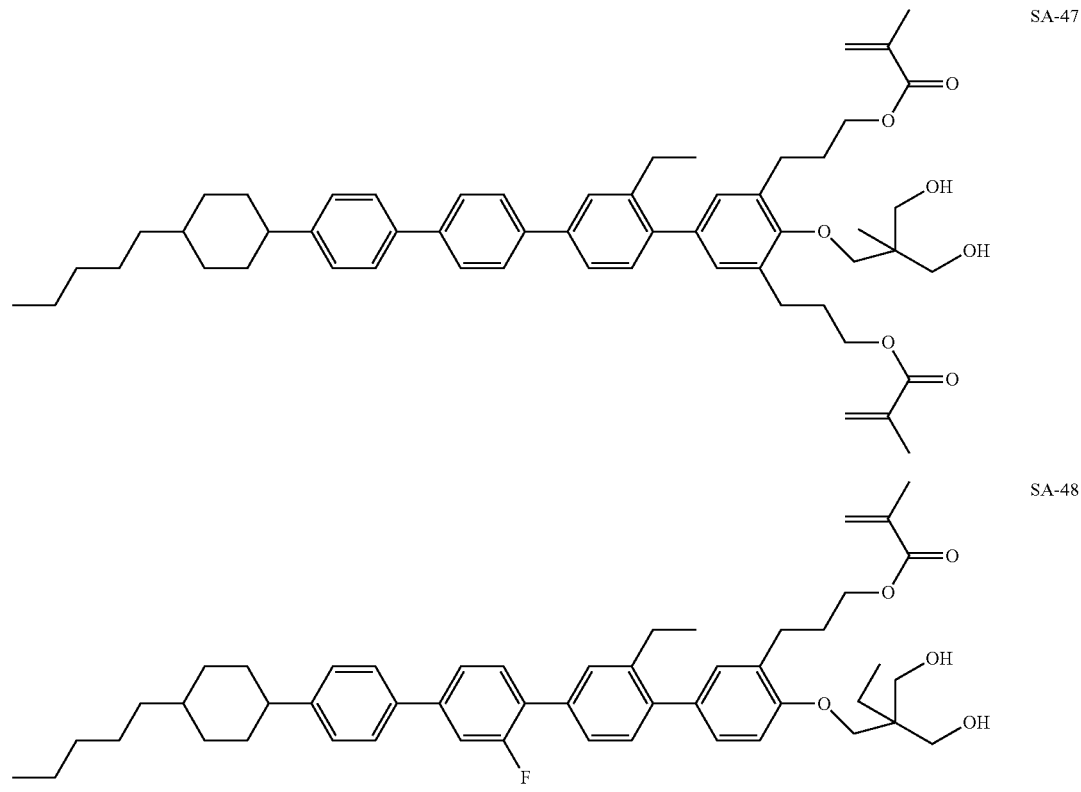

In a preferred embodiment, the LC media and displays according to the present invention comprise one or more SA additives selected from formulae SA-1 to SA-48, preferably from formulae SA-14 to SA-48, very preferably from formulae SA-20 to SA-34 and SA-48, preferably in combination with one or more RMs of formula M.

The following examples are intended to explain the invention without limiting it.

Above and below, unless explicitly noted otherwise, all percentage data denote percent by weight, and relate to the corresponding mixture as a whole, comprising all solid or liquid-crystalline components, without solvents. Furthermore, unless explicitly noted otherwise, all temperatures are indicated in in degrees Celsius (° C.). m.p. denotes melting point, cl.p.=clearing point. Furthermore, C=crystalline state, N=nematic phase, S=smectic phase and I=isotropic phase. The data between these symbols represent the transition temperatures.

In addition, the following abbreviations and symbols are used:

$V_0$ threshold voltage, capacitive [V] at 20° C.,
$n_e$ extraordinary refractive index at 20° C. and 589 nm,
$n_0$ ordinary refractive index at 20° C. and 589 nm,
Δn optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
Δε dielectric anisotropy at 20° C. and 1 kHz,
cl.p., $T_{ni}$ clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

All physical properties are and have been determined in accordance with "Merck Liquid Crystals, Physical Properties of Liquid Crystals", Status November 1997, Merck KGaA, Germany, and apply for a temperature of 20° C. unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates at a separation of 25 μm, each of which has on the inside an electrode layer and an unrubbed polyimide alignment layer on top, which effect a homeotropic edge alignment of the liquid-crystal molecules.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 20150435.4, filed Jan. 7, 2020, are incorporated by reference herein.

COMPARISON EXAMPLE 1.1

The nematic LC host mixture C11 is formulated as follows.

| | | | |
|---|---|---|---|
| B(S)-2O-4O | 2.00% | cl.p. | 74.0 |
| B(S)-2O-O5 | 4.00% | $\Delta n$ | 0.1092 |
| CC-3-V | 35.00% | $\Delta \varepsilon$ | -3.4 |
| CC-3-V1 | 3.00% | $\varepsilon_{\parallel}$ | 3.6 |
| CCP-V-1 | 2.00% | $\gamma_1$ | 89 |
| CCY-3-O2 | 7.50% | $K_1$ | 13.9 |
| CPY-2-O2 | 6.50% | $K_3$ | 16.1 |
| CPY-3-O2 | 18.00% | $V_0$ | 2.30 |
| CY-3-O2 | 15.50% | | |
| PP-1-2V1 | 6.50% | | |

COMPARISON EXAMPLE 1.2

The nematic LC host mixture C12 is formulated as follows.

| | | | |
|---|---|---|---|
| B(S)-2O-O4 | 4.00% | cl.p. | 75.0 |
| B(S)-2O-O5 | 4.00% | $\Delta n$ | 0.1097 |
| CC-3-V | 40.00% | $\Delta \varepsilon$ | -3.4 |
| CCP-3F.F.F | 3.00% | $\varepsilon_{\parallel}$ | 4.1 |
| CPY-2-O2 | 18.50% | $\gamma_1$ | 89 |
| CPY-3-O2 | 15.00% | $K_1$ | 13.1 |
| CY-3-O2 | 14.50% | $K_3$ | 14.3 |
| PP-1-2V1 | 2.00% | $V_0$ | 2.16 |

COMPARISON EXAMPLE 1.3

The nematic LC host mixture C13 is formulated as follows.

| | | | |
|---|---|---|---|
| B(S)-2O-O4 | 4.00% | cl.p. | 74.0 |
| B(S)-2O-O5 | 4.00% | $\Delta n$ | 0.1093 |
| CC-3-V | 39.00% | $\Delta \varepsilon$ | -3.5 |
| CCP-3OCF$_3$ | 3.50% | $\varepsilon_{\parallel}$ | 4.0 |
| CPY-2-O2 | 18.00% | $\gamma_1$ | 87 |
| CPY-3-O2 | 15.00% | $K_1$ | 13.2 |
| CY-3-O2 | 14.50% | $K_3$ | 14.3 |
| PP-1-2V1 | 2.00% | $V_0$ | 2.13 |

COMPARISON EXAMPLE 1.4

The nematic LC host mixture C14 is formulated as follows.

| | | | |
|---|---|---|---|
| B(S)-2O-O4 | 4.00% | cl.p. | 74.5 |
| B(S)-2O-O5 | 4.00% | $\Delta n$ | 0.1099 |
| CC-3-V | 41.50% | $\Delta \varepsilon$ | -3.5 |
| DLGU-3-F | 1.00% | $\varepsilon_{\parallel}$ | 4.0 |
| CPY-2-O2 | 20.00% | $\gamma_1$ | 89 |
| CPY-3-O2 | 15.00% | $K_1$ | 12.9 |
| CY-3-O2 | 13.50% | $K_3$ | 14.3 |
| PP-1-2V1 | 1.00% | $V_0$ | 2.12 |

EXAMPLE 1.1

The nematic LC host mixture N11 is formulated as follows.

| | | | |
|---|---|---|---|
| B(S)-2O-O4 | 4.00% | cl.p. | 74.0 |
| B(S)-2O-O5 | 4.00% | cl.p. | 0.1097 |
| CC-3-V | 34.50% | $\Delta n$ | -3.5 |
| CCP-V-1 | 1.50% | $\Delta \varepsilon$ | 4.0 |
| CCG-V-F | 5.00% | $\varepsilon_{\parallel}$ | 89 |
| CCY-3-O2 | 10.00% | $\gamma_1$ | 13.7 |
| CPY-2-O2 | 10.00% | $K_1$ | 15.1 |
| CPY-3-O2 | 10.00% | $K_3$ | 2.20 |
| CY-3-O2 | 15.50% | | |
| PP-1-2V1 | 5.50% | | |

The mixture contains compound CCG-V-F of formula G.

EXAMPLE 1.2

The nematic LC host mixture N12 is formulated as follows.

| | | | |
|---|---|---|---|
| B(S)-2O-O4 | 4.00% | cl.p. | 75.0 |
| B(S)-2O-O5 | 4.00% | cl.p. | 0.1097 |
| CC-3-V | 37.50% | $\Delta n$ | -3.5 |
| CCG-3-F | 5.00% | $\Delta \varepsilon$ | 4.2 |
| CPY-2-O2 | 20.00% | $\varepsilon_{\parallel}$ | 91 |
| CPY-3-O2 | 13.50% | $\gamma_1$ | 13.0 |
| CY-3-O2 | 14.50% | $K_1$ | 14.2 |
| PP-1-2V1 | 1.50% | $K_3$ | 2.12 |

The mixture contains compound CCG-3-F of formula G.

EXAMPLE 1.3

The nematic LC host mixture N13 is formulated as follows.

| | | | |
|---|---|---|---|
| B(S)-2O-O4 | 4.00% | cl.p. | 74.5 |
| B(S)-2O-O5 | 4.00% | cl.p. | 0.1102 |
| CC-3-V | 37.00% | $\Delta n$ | -3.5 |
| CCQG-3-F | 5.00% | $\Delta \varepsilon$ | 4.1 |
| CPY-2-O2 | 19.00% | $\varepsilon_{\parallel}$ | 92 |
| CPY-3-O2 | 14.00% | $\gamma_1$ | 13.1 |
| CY-3-O2 | 15.00% | $K_1$ | 14.2 |
| PP-1-2V1 | 2.00% | $K_3$ | 2.11 |

The mixture contains compound CCQG-3-F of formula G.

COMPARISON EXAMPLE 2.1

The nematic LC host mixture C21 is formulated as follows.

| | | | |
|---|---|---|---|
| B(S)-2O-O4 | 4.00% | Clearing point [° C.]: | 75.0 |
| B(S)-2O-O5 | 4.00% | $\Delta n$ [589 nm, 20° C.]: | 0.1249 |

-continued

| | | | | |
|---|---|---|---|---|
| B(S)-2O-O6 | 1.00% | Δε [1 kHz, 20° C.]: | -2.2 | |
| CC-3-V | 43.50% | ε∥ [1 kHz, 20° C.]: | 3.3 | |
| CC-3-V1 | 7.50% | γ₁ [mPa s, 20° C.]: | 71 | |
| CCP-V-1 | 1.75% | K₁ [pN, 20° C.]: | 14.4 | |
| COB(S)-2-O4 | 6.00% | K₃ [pN, 20° C.]: | 13.6 | |
| CPY-3-O2 | 6.25% | V₀ [V, 20° C.]: | 2.65 | |
| PGIY-2-O4 | 6.00% | | | |
| PP-1-2V1 | 4.25% | | | |
| PYP-2-3 | 10.00% | | | |
| PYP-2-4 | 5.75% | | | |

EXAMPLE 2.1

The nematic LC host mixture N21 is formulated as follows.

| | | | |
|---|---|---|---|
| B(S)-2O-O4 | 4.00% | Clearing point [° C.]: | 76.0 |
| B(S)-2O-O5 | 4.00% | Δn [589 nm, 20° C.]: | 0.1248 |
| B(S)-2O-O6 | 1.00% | Δε [1 kHz, 20° C.]: | -2.1 |
| CC-3-V | 45.00% | ε∥ [1 kHz, 20° C.]: | 3.7 |
| CCG-V-F | 5.50% | γ₁ [mPa s, 20° C.]: | 73 |
| CCP-V-1 | 1.00% | K₁ [pN, 20° C.]: | 14.5 |
| COB(S)-2-O4 | 6.00% | K₃ [pN, 20° C.]: | 13.7 |
| CPY-3-O2 | 10.00% | V₀ [V, 20° C.]: | 2.72 |
| PGIY-2-O4 | 6.00% | LTS [bulk; -20° C.]: | >1000 h |
| PP-1-2V1 | 7.50% | | |
| PYP-2-3 | 10.00% | | |

The mixture contains compound CCG-V-F of formula G.

The mixtures N11 to N13 and N21 according to the present invention contain a positive polar compound of formula G having a terminal 3,4-difluorophenyl group. In contrast thereto, the reference mixtures C11 to C14 and C21 do not contain a compound of formula G. Instead these reference mixtures do either not contain any positive polar compound at all (C11, C21), or contain a positive polar compound CCP-3F.F.F or DLGU-3-F with a terminal 3,4,5-trifluorophenyl group (C12, C14), or a positive polar compound CCP-3OCF₃ with a terminal 4-trifluoromethoxy-phenyl group (C13).

White Flicker

The white flicker values of the above mixtures were measured at 25° C., 10 Hz in UB-FFS test cells. The flicker level was determined for voltages at grey levels 64, 127 and in the fully switched state V100 (corresponding to grey level 255).

Table 1 shows the results for mixtures C11 to C14 and N11 to N13, which were formulated to achieve the physical parameter target values cl.p.~75° C., Δn~0.11, Δε~-3.4.

TABLE 1

| Mixture No. | Positive polar compound | Flicker at GL64 [%] | Flicker at GL127 [%] | Flicker at V100 [%] |
|---|---|---|---|---|
| C11 | None | 2.9 | 1.6 | 3.8 |
| C12 | CCP-3F.F.F | 3.0 | 2.0 | 3.6 |
| C13 | CCP-3OCF₃ | 3.4 | 1.9 | 3.7 |
| C14 | DLGU-3-F | 3.2 | 1.6 | 4.4 |
| N11 | CCG-V-F | 2.7 | 1.5 | 2.6 |
| N12 | CCG-3-F | 2.9 | 1.7 | 2.7 |
| N13 | CCQG-3-F | 3.0 | 1.7 | 2.9 |

From Table 1 it can be seen that the mixtures N11 to N13 according to the present invention which contain a compound of formula G show significantly reduced flicker at V100, compared to the reference mixtures C11 to C14 which do not contain a compound of formula G.

Table 2 shows the results for the mixtures C21 and N21, which were formulated to achieve the physical parameter target values cl.p.~75° C., Δn~0.125, Δε~-2.2.

TABLE 2

| Mixture No. | Positive polar compound | Flicker at GL64 [%] | Flicker at GL127 [%] | Flicker at V100 [%] |
|---|---|---|---|---|
| C21 | None | 8.2 | 4.8 | 12.4 |
| N21 | CCG-V-F | 6.3 | 3.3 | 8.2 |

From Table 2 it can be seen that the mixture N21 according to the present invention which contains a compound of formula G shows significantly reduced flicker at all grey levels, compared to the reference mixture C21 which does not contain a compound of formula G.

The results demonstrate that the use of compounds of formula B and/or C in combination with compounds of formula G in dielectrically negative LC mixtures allows to reduce the flicker level while maintaining low viscosities and thus enabling short response times.

EXAMPLE 3

| | | | |
|---|---|---|---|
| B(S)-2O-O4 | 4.0% | Clearing point [° C.]: | 75 |
| B(S)-2O-O5 | 4.0% | Δn [589 nm, 20° C.]: | 0.1098 |
| CC-3-V | 34.5% | ε∥ [1 kHz, 20° C.]: | 4.1 |
| CCP-V-1 | 1.5% | ε⊥ [1 kHz, 20° C.]: | 7.5 |
| CCG-4-OT | 4.0% | Δε [1 kHz, 20° C.]: | -3.4 |
| CLY-3-O2 | 10.0% | K₁ [pN, 20° C.]: | 14.0 |
| CPY-2-O2 | 10.0% | K₃ [pN, 20° C.]: | 14.9 |
| CPY-3-O2 | 10.5% | V₀ [V, 20° C.]: | 2.19 |
| CY-3-O2 | 16.0% | γ₁ [mPa s, 20° C.]: | 91 |
| PP-1-2V1 | 5.5% | | |
| Σ | 100.0% | | |

EXAMPLE 4

| | | | |
|---|---|---|---|
| B(S)-2O-O4 | 4.0% | Clearing point [° C.]: | 74 |
| B(S)-2O-O5 | 4.0% | Δn [589 nm, 20° C.]: | 0.1103 |
| CC-3-V | 35.5% | ε∥ [1 kHz, 20° C.]: | 4.2 |
| CCP-V-1 | 1.0% | ε⊥ [1 kHz, 20° C.]: | 7.6 |
| BCH-3OCF₃.F | 4.0% | Δε [1 kHz, 20° C.]: | -3.5 |
| CLY-3-O2 | 10.0% | K₁ [pN, 20° C.]: | 13.7 |
| CPY-2-O2 | 10.0% | K₃ [pN, 20° C.]: | 14.9 |
| CPY-3-O2 | 11.0% | V₀ [V, 20° C.]: | 2.19 |
| CY-3-O2 | 16.5% | γ₁ [mPa s, 20° C.]: | 90 |
| PP-1-2V1 | 4.0% | | |
| Σ | 100.0% | | |

EXAMPLE 5

| | | | |
|---|---|---|---|
| B(S)-2O-O4 | 4.0% | Clearing point [° C.]: | 74 |
| B(S)-2O-O5 | 4.0% | Δn [589 nm, 20° C.]: | 0.1101 |
| CC-3-V | 34.5% | ε∥ [1 kHz, 20° C.]: | 4.0 |
| CCP-V-1 | 1.5% | ε⊥ [1 kHz, 20° C.]: | 7.6 |
| CCG-V-OT | 4.0% | Δε [1 kHz, 20° C.]: | -3.5 |

-continued

| | | | |
|---|---|---|---|
| CLY-3-O2 | 10.0% | $K_1$ [pN, 20° C.]: | 13.9 |
| CPY-2-O2 | 10.0% | $K_3$ [pN, 20° C.]: | 14.9 |
| CPY-3-O2 | 10.5% | $V_0$ [V, 20° C.]: | 2.17 |
| CY-3-O2 | 16.0% | $\gamma_1$ [mPas, 20° C.]: | 90 |
| PP-1-2V1 | 5.5% | | |
| Σ | 100.0% | | |

EXAMPLE 6

| | | | |
|---|---|---|---|
| B(S)-2O-O4 | 4.0% | Clearing point [° C.]: | 75 |
| B(S)-2O-O5 | 4.0% | Δn [589 nm, 20° C.]: | 0.1091 |
| CC-3-V | 35.5% | $\varepsilon_\parallel$ [1 kHz, 20° C.]: | 4.1 |
| CCP-V-1 | 1.0% | $\varepsilon_\perp$ [1 kHz, 20° C.]: | 7.6 |
| CLG-3-OT | 4.0% | Δε [1 kHz, 20° C.]: | −3.5 |
| CLY-3-O2 | 10.0% | $K_1$ [pN, 20° C.]: | 14.0 |
| CPY-2-O2 | 10.0% | $K_3$ [pN, 20° C.]: | 15.0 |
| CPY-3-O2 | 11.0% | $V_0$ [V, 20° C.]: | 2.18 |
| CY-3-O2 | 16.5% | $\gamma_1$ [mPas, 20° C.]: | 92 |
| PP-1-2V1 | 4.0% | LTS [bulk; −20° C.]: | >1000 h |
| Σ | 100.0% | | |

EXAMPLE 7

| | | | |
|---|---|---|---|
| B(S)-2O-O4 | 4.0% | Clearing point [° C.]: | 74.5 |
| B(S)-2O-O5 | 4.0% | Δn [589 nm, 20° C.]: | 0.1105 |
| CC-3-V | 34.0% | $\varepsilon_\parallel$ [1 kHz, 20° C.]: | 4.2 |
| CCP-V-1 | 2.0% | $\varepsilon_\perp$ [1 kHz, 20° C.]: | 7.7 |
| CCG-V-T | 4.0% | Δε [1 kHz, 20° C.]: | −3.5 |
| CLY-3-O2 | 10.0% | $K_1$ [pN, 20° C.]: | 14.1 |
| CPY-2-O2 | 10.0% | $K_3$ [pN, 20° C.]: | 15.1 |
| CPY-3-O2 | 11.0% | $V_0$ [V, 20° C.]: | 2.18 |
| CY-3-O2 | 16.5% | $\gamma_1$ [mPas, 20° C.]: | 95 |
| PP-1-2V1 | 4.5% | | |
| Σ | 100.0% | | |

EXAMPLE 8

| | | | |
|---|---|---|---|
| CC-3-V | 34.0% | Clearing point [° C.]: | 82.9 |
| CY-3-O2 | 14.0% | Δn [589 nm, 20° C.]: | |
| CCY-3-O1 | 5.0% | $\varepsilon_\parallel$ [1 kHz, 20° C.]: | 4.0 |
| CCY-3-O2 | 6.0% | $\varepsilon_\perp$ [1 kHz, 20° C.]: | 8.3 |
| CLY-3-O2 | 7.0% | Δε [1 kHz, 20° C.]: | −4.4 |
| CPY-2-O2 | 8.0% | $K_1$ [pN, 20° C.]: | 14.4 |
| CPY-3-O2 | 8.0% | $K_3$ [pN, 20° C.]: | 15.7 |
| PGIY-2-O4 | 2.0% | $V_0$ [V, 20° C.]: | 2.01 |
| PYP-2-3 | 4.0% | $\gamma_1$ [mPas, 20° C.]: | 111 |
| B(S)-2O-O4 | 5.0% | $\gamma_1$ [mPas, 20° C.]: | |
| B(S)-2O-O5 | 4.0% | LTS bulk [h, −10° C.]: | |
| CCG-V-F | 3.0% | LTS bulk [h, −20° C.]: | |
| Σ | 100.0% | LTS bulk [h, −30° C.]: | |

EXAMPLE 9

| | | | |
|---|---|---|---|
| B(S)-2O-O4 | 3.0% | Clearing point [° C.]: | 80.5 |
| B(S)-2O-O5 | 3.0% | Δn [589 nm, 20° C.]: | 0.1052 |
| CC-3-V | 37.5% | $\varepsilon_\parallel$ [1 kHz, 20° C.]: | 3.9 |
| CCG-V-F | 3.0% | $\varepsilon_\perp$ [1 kHz, 20° C.]: | 7.8 |
| CCY-3-O1 | 3.5% | Δε [1 kHz, 20° C.]: | −3.9 |
| CCY-3-O2 | 4.0% | $K_1$ [pN, 20° C.]: | 14.5 |
| CCY-4-O2 | 2.0% | $K_3$ [pN, 20° C.]: | 15.0 |
| CLY-2-O4 | 5.0% | $V_0$ [V, 20° C.]: | 2.07 |
| CLY-3-O2 | 7.0% | $\gamma_1$ [mPas, 20° C.]: | 102 |
| CLY-3-O3 | 6.0% | | |
| CLY-4-O2 | 5.0% | | |
| CY-3-O2 | 6.0% | | |
| PGIY-2-O4 | 4.0% | | |
| PY-1-O2 | 9.0% | | |
| PYP-2-3 | 2.0% | | |
| Σ | 100.0% | | |

EXAMPLE 10

| | | | |
|---|---|---|---|
| B(S)-2O-O4 | 4.0% | Clearing point [° C.]: | 80.6 |
| B(S)-2O-O5 | 4.0% | Δn [589 nm, 20° C.]: | 0.1043 |
| CC-3-V | 35.0% | $\varepsilon_\parallel$ [1 kHz, 20° C.]: | 4.1 |
| CCG-V-F | 5.0% | $\varepsilon_\perp$ [1 kHz, 20° C.]: | 8.1 |
| CCY-3-O1 | 3.5% | Δε [1 kHz, 20° C.]: | −4.0 |
| CCY-3-O2 | 4.0% | $K_1$ [pN, 20° C.]: | 14.6 |
| CCY-4-O2 | 2.0% | $K_3$ [pN, 20° C.]: | 14.8 |
| CLY-2-O4 | 5.0% | $V_0$ [V, 20° C.]: | 2.02 |
| CLY-3-O2 | 7.0% | $\gamma_1$ [mPas, 20° C.]: | 105 |
| CLY-3-O3 | 6.0% | | |
| CLY-4-O2 | 5.0% | | |
| CY-3-O2 | 7.0% | | |
| PGIY-2-O4 | 2.0% | | |
| PY-3-O2 | 9.0% | | |
| PYP-2-3 | 1.5% | | |
| Σ | 100.0% | | |

EXAMPLE 11

| | | | |
|---|---|---|---|
| CC-3-V | 32.0% | Clearing point [° C.]: | 81.6 |
| CC-3-V1 | 5.0% | Δn [589 nm, 20° C.]: | 0.1086 |
| CY-3-O2 | 15.0% | $\varepsilon_\parallel$ [1 kHz, 20° C.]: | 4.0 |
| CCY-3-O1 | 2.0% | $\varepsilon_\perp$ [1 kHz, 20° C.]: | 8.5 |
| CCY-3-O2 | 8.0% | Δε [1 kHz, 20° C.]: | −4.5 |
| CLY-3-O2 | 8.0% | $K_1$ [pN, 20° C.]: | 14.9 |
| CPY-3-O2 | 10.0% | $K_3$ [pN, 20° C.]: | 16.4 |
| PGIY-2-O4 | 6.0% | $V_0$ [V, 20° C.]: | 2.02 |
| B(S)-2O-O4 | 4.0% | $\gamma_1$ [mPas, 20° C.]: | 112 |
| B(S)-2O-O5 | 4.0% | | |
| B(S)-2O-O6 | 3.0% | | |
| CCG-V-F | 3.0% | | |
| Σ | 100.0% | | |

EXAMPLE 12

| | | | |
|---|---|---|---|
| B(S)-2O-O4 | 3.0% | Clearing point [° C.]: | 80.7 |
| B(S)-2O-O5 | 3.0% | Δn [589 nm, 20° C.]: | 0.1050 |
| CC-3-V | 37.0% | $\varepsilon_\parallel$ [1 kHz, 20° C.]: | 3.9 |
| CCG-V-F | 2.0% | $\varepsilon_\perp$ [1 kHz, 20° C.]: | 7.9 |
| CCY-3-O1 | 3.5% | Δε [1 kHz, 20° C.]: | −4.0 |
| CCY-3-O2 | 4.0% | $K_1$ [pN, 20° C.]: | 14.6 |
| CCY-4-O2 | 2.0% | $K_3$ [pN, 20° C.]: | 14.6 |
| CLY-2-O4 | 5.0% | $V_0$ [V, 20° C.]: | 2.03 |
| CLY-3-O2 | 7.0% | $\gamma_1$ [mPas, 20° C.]: | 100 |
| CLY-3-O3 | 6.0% | | |
| CLY-4-O2 | 5.0% | | |

-continued

| | |
|---|---|
| CY-3-O2 | 7.0% |
| PGIY-2-O4 | 4.0% |
| PY-2-O2 | 3.5% |
| PY-3-O2 | 5.0% |
| PYP-2-3 | 2.0% |
| LB(S)-3-OT | 1.0% |
| Σ | 100.0% |

EXAMPLE 13

| | | | |
|---|---|---|---|
| CCY-3-O1 | 4.0% | Clearing point [° C.]: | 81.9 |
| CCY-3-O2 | 4.0% | Δn [589 nm, 20° C.]: | 0.1047 |
| CCY-4-O2 | 4.0% | $\varepsilon_\parallel$ [1 kHz, 20° C.]: | 4.0 |
| CLY-2-O4 | 4.0% | $\varepsilon_\perp$ [1 kHz, 20° C.]: | 7.9 |
| CLY-4-O2 | 4.0% | Δε [1 kHz, 20° C.]: | −3.9 |
| CLY-3-O2 | 6.0% | $K_1$ [pN, 20° C.]: | 14.7 |
| CLY-3-O3 | 6.0% | $K_3$ [pN, 20° C.]: | 14.9 |
| PGIY-2-O4 | 4.5% | $V_0$ [V, 20° C.]: | 2.06 |
| CC-3-V | 36.0% | $\gamma_1$ [mPas, 20° C.]: | 104 |
| CY-3-O2 | 8.5% | | |
| PY-3-O2 | 7.0% | | |
| B(S)-2O-O4 | 3.0% | | |
| B(S)-2O-O5 | 3.0% | | |
| CCG-V-F | 3.0% | | |
| LB(S)-3-OT | 1.0% | | |
| PYP-2-3 | 2.0% | | |
| Σ | 100.0% | | |

EXAMPLE 14

| | | | |
|---|---|---|---|
| B(S)-2O-O4 | 4.0% | Clearing point [° C.]: | 73.2 |
| B(S)-2O-O5 | 4.0% | Δn [589 nm, 20° C.]: | 0.1040 |
| B(S)-2O-O6 | 4.0% | $\varepsilon_\parallel$ [1 kHz, 20° C.]: | 3.8 |
| CC-3-V | 46.0% | $\varepsilon_\perp$ [1 kHz, 20° C.]: | 6.7 |
| CC-3-V1 | 3.0% | Δε [1 kHz, 20° C.]: | −2.9 |
| CCG-V-F | 5.0% | $K_1$ [pN, 20° C.]: | 13.5 |
| CLY-4-O2 | 5.0% | $K_3$ [pN, 20° C.]: | 14.0 |
| CLY-5-O2 | 4.0% | $V_0$ [V, 20° C.]: | |
| CPY-2-O2 | 5.0% | $\gamma_1$ [mPas, 20° C.]: | |
| CPY-3-O2 | 10.0% | | |
| PY-3-O2 | 10.0% | | |
| Σ | 100.0% | | |

EXAMPLE 15

| | | | |
|---|---|---|---|
| B(S)-2O-O4 | 4.0% | Clearing point [° C.]: | 74.4 |
| B(S)-2O-O5 | 4.0% | Δn [589 nm, 20° C.]: | 0.1045 |
| B(S)-2O-O6 | 4.0% | $\varepsilon_\parallel$ [1 kHz, 20° C.]: | 3.9 |
| CC-3-V | 46.5% | $\varepsilon_\perp$ [1 kHz, 20° C.]: | 7.0 |
| CCG-V-F | 5.0% | Δε [1 kHz, 20° C.]: | −3.1 |
| CLY-3-O2 | 9.0% | $K_1$ [pN, 20° C.]: | 14.2 |
| CLY-4-O2 | 5.0% | $K_3$ [pN, 20° C.]: | 14.3 |
| CLY-5-O2 | 1.5% | $V_0$ [V, 20° C.]: | 2.24 |
| CPY-2-O2 | 1.5% | $\gamma_1$ [mPas, 20° C.]: | 74 |
| CPY-3-O2 | 8.0% | | |
| PY-3-O2 | 11.5% | | |
| Σ | 100.0% | | |

EXAMPLE 16

| | | | |
|---|---|---|---|
| B(S)-2O-O4 | 4.0% | Clearing point [° C.]: | 74.2 |
| B(S)-2O-O5 | 4.0% | Δn [589 nm, 20° C.]: | 0.1053 |
| B(S)-2O-O6 | 4.0% | $\varepsilon_\parallel$ [1 kHz, 20° C.]: | 3.7 |
| CC-3-V | 51.0% | $\varepsilon_\perp$ [1 kHz, 20° C.]: | 6.8 |
| CCG-V-F | 3.0% | Δε [1 kHz, 20° C.]: | −3.1 |
| CLY-3-O2 | 8.0% | $K_1$ [pN, 20° C.]: | 13.8 |
| CLY-4-O2 | 5.0% | $K_3$ [pN, 20° C.]: | 14.2 |
| CPY-2-O2 | 1.5% | $V_0$ [V, 20° C.]: | 2.28 |
| CPY-3-O2 | 7.0% | $\gamma_1$ [mPas, 20° C.]: | 72 |
| PGIY-2-O4 | 5.0% | | |
| PY-1-O2 | 7.5% | | |
| Σ | 100.0% | | |

EXAMPLE 17

| | | | |
|---|---|---|---|
| B(S)-2O-O4 | 4.0% | Clearing point [° C.]: | 73.9 |
| B(S)-2O-O5 | 4.0% | Δn [589 nm, 20° C.]: | 0.1054 |
| B(S)-2O-O6 | 4.0% | $\varepsilon_\parallel$ [1 kHz, 20° C.]: | 3.9 |
| CC-3-V | 48.5% | $\varepsilon_\perp$ [1 kHz, 20° C.]: | 6.9 |
| CCG-V-F | 5.0% | Δε [1 kHz, 20° C.]: | −3.0 |
| CLY-3-O2 | 8.0% | $K_1$ [pN, 20° C.]: | 13.9 |
| CLY-4-O2 | 5.0% | $K_3$ [pN, 20° C.]: | 14.3 |
| CPY-2-O2 | 2.0% | $V_0$ [V, 20° C.]: | 2.28 |
| CPY-3-O2 | 8.0% | | |
| PGIY-2-O4 | 2.0% | | |
| PY-1-O2 | 9.5% | | |
| Σ | 100.0% | | |

EXAMPLE 18

| | | | |
|---|---|---|---|
| B(S)-2O-O4 | 4.0% | Clearing point [° C.]: | 74.3 |
| B(S)-2O-O5 | 4.0% | Δn [589 nm, 20° C.]: | 0.1050 |
| B(S)-2O-O6 | 4.0% | $\varepsilon_\parallel$ [1 kHz, 20° C.]: | 4.1 |
| CC-3-V | 46.0% | $\varepsilon_\perp$ [1 kHz, 20° C.]: | 7.1 |
| CCG-V-F | 7.0% | Δε [1 kHz, 20° C.]: | −3.0 |
| CLY-3-O2 | 8.0% | $K_1$ [pN, 20° C.]: | 13.8 |
| CLY-4-O2 | 5.0% | $K_3$ [pN, 20° C.]: | 14.2 |
| CPY-2-O2 | 3.5% | $V_0$ [V, 20° C.]: | 2.28 |
| CPY-3-O2 | 8.0% | $\gamma_1$ [mPas, 20° C.]: | 73 |
| PY-1-O2 | 7.0% | | |
| PY-3-O2 | 3.5% | | |
| Σ | 100.0% | | |

EXAMPLE 19

| | | | |
|---|---|---|---|
| B(S)-2O-O4 | 4.0% | Clearing point [° C.]: | 74.9 |
| B(S)-2O-O5 | 4.0% | Δn [589 nm, 20° C.]: | 0.1098 |
| B(S)-2O-O6 | 3.0% | $\varepsilon_\parallel$ [1 kHz, 20° C.]: | 3.8 |
| BCH-32 | 3.5% | $\varepsilon_\perp$ [1 kHz, 20° C.]: | 6.5 |
| CC-3-V | 48.5% | Δε [1 kHz, 20° C.]: | −2.6 |
| CCG-V-F | 5.0% | $K_1$ [pN, 20° C.]: | 13.5 |
| CLY-3-O2 | 8.0% | $K_3$ [pN, 20° C.]: | 14.3 |
| CPY-3-O2 | 10.0% | $V_0$ [V, 20° C.]: | 2.45 |
| PGIY-2-O4 | 6.0% | | |
| PY-1-O2 | 8.0% | | |
| Σ | 100.0% | | |

EXAMPLE 20

| | | | |
|---|---|---|---|
| B(S)-2O-O4 | 4.0% | Clearing point [° C.]: | 76.3 |
| B(S)-2O-O5 | 4.0% | Δn [589 nm, 20° C.]: | 0.1291 |
| B(S)-2O-O6 | 4.0% | $\varepsilon_\parallel$ [1 kHz, 20° C.]: | 4.0 |
| BCH-32 | 2.0% | $\varepsilon_\perp$ [1 kHz, 20° C.]: | 7.0 |
| CC-3-V | 40.5% | Δε [1 kHz, 20° C.]: | −3.0 |
| CCG-V-F | 5.0% | $K_1$ [pN, 20° C.]: | 14.1 |
| CLY-3-O2 | 5.5% | $K_3$ [pN, 20° C.]: | 14.0 |
| CPY-3-O2 | 10.0% | $V_0$ [V, 20° C.]: | 2.27 |
| PGIY-2-O4 | 5.0% | | |
| PY-1-O2 | 8.0% | | |
| PYP-2-3 | 10.0% | | |
| PYP-2-4 | 2.0% | | |
| Σ | 100.0% | LTS bulk [h, −30° C.]: | |

EXAMPLE 21

| | | | |
|---|---|---|---|
| B(S)-2O-O4 | 4.0% | Clearing point [° C.]: | 75.2 |
| B(S)-2O-O5 | 4.0% | Δn [589 nm, 20° C.]: | 0.1494 |
| B(S)-2O-O6 | 4.0% | $\varepsilon_\parallel$ [1 kHz, 20° C.]: | 4.1 |
| BCH-32 | 3.5% | $\varepsilon_\perp$ [1 kHz, 20° C.]: | 7.0 |
| CC-3-V | 28.5% | Δε [1 kHz, 20° C.]: | −3.0 |
| CCG-V-F | 5.0% | $K_1$ [pN, 20° C.]: | 14.5 |
| CCP-V-1 | 1.5% | $K_3$ [pN, 20° C.]: | 14.0 |
| CPY-2-O2 | 4.5% | $V_0$ [V, 20° C.]: | 2.29 |
| CPY-3-O2 | 10.0% | $\gamma_1$ [mPa s, 20° C.]: | 100 |
| PGIY-2-O4 | 5.0% | | |
| PP-1-2V1 | 8.0% | | |
| PY-1-O2 | 8.0% | | |
| PYP-2-3 | 7.0% | | |
| PYP-2-4 | 7.0% | | |
| Σ | 100.0% | | |

EXAMPLE 22

| | | | |
|---|---|---|---|
| B(S)-2O-O4 | 4.0% | Clearing point [° C.]: | 75.2 |
| B(S)-2O-O5 | 4.0% | Δn [589 nm, 20° C.]: | 0.1495 |
| B(S)-2O-O6 | 4.0% | $\varepsilon_\parallel$ [1 kHz, 20° C.]: | 4.3 |
| BCH-32 | 3.0% | $\varepsilon_\perp$ [1 kHz, 20° C.]: | 7.2 |
| CC-3-V | 23.0% | Δε [1 kHz, 20° C.]: | −3.0 |
| CCG-V-F | 7.0% | $K_1$ [pN, 20° C.]: | 14.7 |
| CCP-V-1 | 6.5% | $K_3$ [pN, 20° C.]: | 14.7 |
| CPY-2-O2 | 3.0% | $V_0$ [V, 20° C.]: | 2.34 |
| CPY-3-O2 | 10.0% | $\gamma_1$ [mPa s, 20° C.]: | 101 |
| PGIY-2-O4 | 5.0% | $\gamma_1$ [mPa s, 20° C.]: | |
| PP-1-2V1 | 10.0% | LTS bulk [h, −10° C.]: | |
| PY-1-O2 | 10.0% | LTS bulk [h, −20° C.]: | |
| PY-3-O2 | 1.5% | LTS bulk [h, −30° C.]: | |
| PYP-2-3 | 7.0% | | |
| PYP-2-4 | 2.0% | | |
| Σ | 100.0% | | |

EXAMPLE 23

| | | | |
|---|---|---|---|
| B(S)-2O-O4 | 4.0% | Clearing point [° C.]: | 75.7 |
| B(S)-2O-O5 | 4.0% | Δn [589 nm, 20° C.]: | 0.1507 |
| B(S)-2O-O6 | 4.0% | $\varepsilon_\parallel$ [1 kHz, 20° C.]: | 4.4 |
| BCH-32 | 6.5% | $\varepsilon_\perp$ [1 kHz, 20° C.]: | 7.4 |
| CC-3-V | 24.0% | Δε [1 kHz, 20° C.]: | −2.9 |
| CCG-V-F | 9.0% | $K_1$ [pN, 20° C.]: | 14.7 |
| CPY-2-O2 | 5.5% | $K_3$ [pN, 20° C.]: | 14.2 |
| CPY-3-O2 | 9.5% | $V_0$ [V, 20° C.]: | 2.31 |
| PGIY-2-O4 | 5.0% | $\gamma_1$ [mPa s, 20° C.]: | 104 |
| PP-1-2V1 | 9.0% | | |
| PY-1-O2 | 9.0% | | |
| PY-3-O2 | 2.0% | | |
| PYP-2-3 | 7.0% | | |
| PYP-2-4 | 1.5% | | |
| Σ | 100.0% | | |

EXAMPLE 24

| | | | |
|---|---|---|---|
| B(S)-2O-O4 | 4.0% | Clearing point [° C.]: | 75.1 |
| B(S)-2O-O5 | 4.0% | Δn [589 nm, 20° C.]: | 0.1048 |
| B(S)-2O-O6 | 3.0% | $\varepsilon_\parallel$ [1 kHz, 20° C.]: | 3.9 |
| CC-3-V | 44.5% | $\varepsilon_\perp$ [1 kHz, 20° C.]: | 7.4 |
| CCG-V-F | 3.0% | Δε [1 kHz, 20° C.]: | −3.5 |
| CLY-2-O4 | 1.0% | $K_1$ [pN, 20° C.]: | 14.0 |
| CLY-3-O2 | 6.0% | $K_3$ [pN, 20° C.]: | 13.8 |
| CLY-3-O3 | 2.0% | $V_0$ [V, 20° C.]: | 2.09 |
| CLY-4-O2 | 3.0% | $\gamma_1$ [mPa s, 20° C.]: | 81 |
| CPY-2-O2 | 1.5% | | |
| CPY-3-O2 | 9.5% | | |
| CY-3-O2 | 10.5% | | |
| CY-5-O2 | 1.0% | | |
| PGIY-2-O4 | 7.0% | | |
| Σ | 100.0% | | |

EXAMPLE 25

| | | | |
|---|---|---|---|
| B(S)-2O-O4 | 4.0% | Clearing point [° C.]: | 75.3 |
| B(S)-2O-O5 | 4.0% | Δn [589 nm, 20° C.]: | 0.1019 |
| B(S)-2O-O6 | 3.5% | $\varepsilon_\parallel$ [1 kHz, 20° C.]: | 3.9 |
| CC-3-V | 44.5% | $\varepsilon_\perp$ [1 kHz, 20° C.]: | 7.4 |
| CCG-V-F | 4.0% | Δε [1 kHz, 20° C.]: | −3.5 |
| CLY-3-O2 | 7.0% | $K_1$ [pN, 20° C.]: | 13.8 |
| CLY-3-O3 | 5.0% | $K_3$ [pN, 20° C.]: | 13.9 |
| CLY-4-O2 | 4.0% | $V_0$ [V, 20° C.]: | 2.10 |
| CPY-3-O2 | 5.5% | $\gamma_1$ [mPa s, 20° C.]: | 80 |
| CY-3-O2 | 10.5% | | |
| CY-5-O2 | 1.0% | | |
| PGIY-2-O4 | 7.0% | | |
| Σ | 100.0% | | |

EXAMPLE 26

| | | | |
|---|---|---|---|
| CCP-3-1 | 3.0% | Clearing point [° C.]: | 88.5 |
| CCP-V-1 | 2.5% | Δn [589 nm, 20° C.]: | 0.1061 |
| CLY-3-O2 | 8.0% | $\varepsilon_\parallel$ [1 kHz, 20° C.]: | 4.3 |
| CLY-4-O2 | 8.0% | $\varepsilon_\perp$ [1 kHz, 20° C.]: | 8.4 |
| CLY-5-O2 | 7.0% | Δε [1 kHz, 20° C.]: | −4.1 |
| CPY-3-O2 | 6.5% | $K_1$ [pN, 20° C.]: | 17.4 |
| B(S)-2O-O4 | 4.0% | $K_3$ [pN, 20° C.]: | 15.9 |
| B(S)-2O-O5 | 6.0% | $V_0$ [V, 20° C.]: | 2.08 |
| B(S)-2O-O6 | 3.0% | $\gamma_1$ [mPa s, 20° C.]: | 115 |
| CC-3-V1 | 8.0% | | |
| CC-4-V1 | 20.0% | | |
| CC-3-V | 6.0% | | |
| Y-4O-O4 | 10.0% | | |
| CCG-V-F | 8.0% | | |
| Σ | 100.0% | | |

EXAMPLE 27

| | | | |
|---|---|---|---|
| B(S)-2O-O4 | 2.0% | Clearing point [° C.]: | 61 |
| B(S)-2O-O5 | 4.0% | $\Delta n$ [589 nm, 20° C.]: | 0.1071 |
| CC-3-V | 28.0% | $\varepsilon_{\parallel}$ [1 kHz, 20° C.]: | 4.6 |
| CLY-3-O2 | 0.5% | $\varepsilon_{\perp}$ [1 kHz, 20° C.]: | 7.8 |
| CPY-2-O2 | 12.0% | $\Delta\varepsilon$ [1 kHz, 20° C.]: | −3.3 |
| CPY-3-O2 | 12.0% | $K_1$ [pN, 20° C.]: | 11.2 |
| CY-3-O2 | 25.0% | $K_3$ [pN, 20° C.]: | 12.6 |
| PP-1-2V1 | 6.5% | $V_0$ [V, 20° C.]: | 2.07 |
| CCG-V-F | 10.0% | $\gamma_1$ [mPa s, 20° C.]: | 81 |
| Σ | 100.0% | | |

EXAMPLE 28

| | | | |
|---|---|---|---|
| B(S)-2O-O4 | 2.0% | Clearing point [° C.]: | 74 |
| B(S)-2O-O5 | 4.0% | $\Delta n$ [589 nm, 20° C.]: | 0.1090 |
| CC-3-V | 34.5% | $\varepsilon_{\parallel}$ [1 kHz, 20° C.]: | 4.0 |
| CCG-V-F | 5.0% | $\varepsilon_{\perp}$ [1 kHz, 20° C.]: | 7.4 |
| CLY-3-O2 | 9.0% | $\Delta\varepsilon$ [1 kHz, 20° C.]: | −3.5 |
| CPY-2-O2 | 12.0% | $K_1$ [pN, 20° C.]: | 13.5 |
| CPY-3-O2 | 12.0% | $K_3$ [pN, 20° C.]: | 15.0 |
| CY-3-O2 | 16.5% | $V_0$ [V, 20° C.]: | 2.20 |
| PP-1-2V1 | 5.0% | $\gamma_1$ [mPa s, 20° C.]: | 91 |
| Σ | 100.0% | $\gamma_1$ [mPa s, 20° C.]: | |

EXAMPLE 29

| | | | |
|---|---|---|---|
| B(S)-2O-O4 | 2.0% | Clearing point [° C.]: | 74 |
| B(S)-2O-O5 | 4.0% | $\Delta n$ [589 nm, 20° C.]: | 0.1096 |
| CC-3-V | 36.0% | $\varepsilon_{\parallel}$ [1 kHz, 20° C.]: | 3.8 |
| CCG-V-F | 2.5% | $\varepsilon_{\perp}$ [1 kHz, 20° C.]: | 7.2 |
| CCP-V-1 | 1.0% | $\Delta\varepsilon$ [1 kHz, 20° C.]: | −3.5 |
| CLY-3-O2 | 9.0% | $K_1$ [pN, 20° C.]: | 13.6 |
| CPY-2-O2 | 12.0% | $K_3$ [pN, 20° C.]: | 15.1 |
| CPY-3-O2 | 12.0% | $V_0$ [V, 20° C.]: | 2.20 |
| CY-3-O2 | 16.0% | $\gamma_1$ [mPa s, 20° C.]: | 90 |
| PP-1-2V1 | 5.5% | | |
| Σ | 100.0% | | |

EXAMPLE 30

| | | | |
|---|---|---|---|
| B(S)-2O-O4 | 2.0% | Clearing point [° C.]: | 74 |
| B(S)-2O-O5 | 4.0% | $\Delta n$ [589 nm, 20° C.]: | 0.1098 |
| CC-3-V | 37.0% | $\varepsilon_{\parallel}$ [1 kHz, 20° C.]: | 3.7 |
| CCG-V-F | 1.0% | $\varepsilon_{\perp}$ [1 kHz, 20° C.]: | 7.1 |
| CCP-V-1 | 2.0% | $\Delta\varepsilon$ [1 kHz, 20° C.]: | −3.5 |
| CLY-3-O2 | 9.0% | $K_1$ [pN, 20° C.]: | 13.8 |
| CPY-2-O2 | 12.0% | $K_3$ [pN, 20° C.]: | 15.3 |
| CPY-3-O2 | 12.0% | $V_0$ [V, 20° C.]: | 2.21 |
| CY-3-O2 | 15.5% | $\gamma_1$ [mPa s, 20° C.]: | 89 |
| PP-1-2V1 | 5.5% | | |
| Σ | 100.0% | | |

EXAMPLE 31

| | | | |
|---|---|---|---|
| B(S)-2O-O4 | 4.0% | Clearing point [° C.]: | 74 |
| B(S)-2O-O5 | 4.0% | $\Delta n$ [589 nm, 20° C.]: | 0.1097 |
| CC-3-V | 34.5% | $\varepsilon_{\parallel}$ [1 kHz, 20° C.]: | 4.0 |
| CCP-V-1 | 1.5% | $\varepsilon_{\perp}$ [1 kHz, 20° C.]: | 7.4 |
| CCG-V-F | 5.0% | $\Delta\varepsilon$ [1 kHz, 20° C.]: | −3.5 |
| CLY-3-O2 | 10.0% | $K_1$ [pN, 20° C.]: | 13.7 |
| CPY-2-O2 | 10.0% | $K_3$ [pN, 20° C.]: | 15.0 |
| CPY-3-O2 | 10.0% | $V_0$ [V, 20° C.]: | 2.20 |
| CY-3-O2 | 15.5% | $\gamma_1$ [mPa s, 20° C.]: | 89 |
| PP-1-2V1 | 5.5% | | |
| Σ | 100.0% | | |

EXAMPLE 32

| | | | |
|---|---|---|---|
| B(S)-2O-O4 | 4.0% | Clearing point [° C.]: | 76 |
| B(S)-2O-O5 | 4.0% | $\Delta n$ [589 nm, 20° C.]: | 0.1248 |
| B(S)-2O-O6 | 1.0% | $\varepsilon_{\parallel}$ [1 kHz, 20° C.]: | 3.7 |
| CC-3-V | 45.0% | $\varepsilon_{\perp}$ [1 kHz, 20° C.]: | 5.8 |
| CCG-V-F | 5.5% | $\Delta\varepsilon$ [1 kHz, 20° C.]: | −2.1 |
| CCP-V-1 | 1.0% | $K_1$ [pN, 20° C.]: | 14.5 |
| COB(S)-2-O4 | 6.0% | $K_3$ [pN, 20° C.]: | 13.7 |
| CPY-3-O2 | 10.0% | $V_0$ [V, 20° C.]: | 2.72 |
| PGIY-2-O4 | 6.0% | $\gamma_1$ [mPa s, 20° C.]: | 73 |
| PP-1-2V1 | 7.5% | LTS bulk [h, −20° C.]: | >1000 |
| PYP-2-3 | 10.0% | | |
| Σ | 100.0% | | |

EXAMPLE 33

| | | | |
|---|---|---|---|
| B(S)-2O-O4 | 4.0% | Clearing point [° C.]: | 76 |
| B(S)-2O-O5 | 4.0% | $\Delta n$ [589 nm, 20° C.]: | 0.1099 |
| B(S)-2O-O6 | 4.0% | $\varepsilon_{\parallel}$ [1 kHz, 20° C.]: | 3.9 |
| CC-3-V | 40.0% | $\varepsilon_{\perp}$ [1 kHz, 20° C.]: | 7.3 |
| CCG-V-F | 5.0% | $\Delta\varepsilon$ [1 kHz, 20° C.]: | −3.4 |
| CLY-3-O2 | 9.0% | $K_1$ [pN, 20° C.]: | 14.2 |
| CPY-2-O2 | 7.5% | $K_3$ [pN, 20° C.]: | 15.1 |
| CPY-3-O2 | 12.0% | $V_0$ [V, 20° C.]: | 2.23 |
| CY-3-O2 | 10.0% | $\gamma_1$ [mPa s, 20° C.]: | 84 |
| PP-1-2V1 | 4.5% | | |
| Σ | 100.0% | | |

EXAMPLE 34

| | | | |
|---|---|---|---|
| B(S)-2O-O4 | 4.0% | Clearing point [° C.]: | 74 |
| B(S)-2O-O5 | 4.0% | $\Delta n$ [589 nm, 20° C.]: | 0.1098 |
| B(S)-2O-O6 | 4.0% | $\varepsilon_{\parallel}$ [1 kHz, 20° C.]: | 4.1 |
| CC-3-V | 37.0% | $\varepsilon_{\perp}$ [1 kHz, 20° C.]: | 7.4 |
| CCG-V-F | 6.5% | $\Delta\varepsilon$ [1 kHz, 20° C.]: | −3.4 |
| CLY-3-O2 | 12.0% | $K_1$ [pN, 20° C.]: | 14.1 |
| CPY-2-O2 | 5.5% | $K_3$ [pN, 20° C.]: | 15.1 |
| CPY-3-O2 | 9.0% | $V_0$ [V, 20° C.]: | 2.23 |
| CY-3-O2 | 12.0% | $\gamma_1$ [mPa s, 20° C.]: | 85 |
| PP-1-2V1 | 6.0% | | |
| Σ | 100.0% | | |

EXAMPLE 35

| | | | |
|---|---|---|---|
| B(S)-2O-O4 | 4.0% | Clearing point [° C.]: | 75 |
| B(S)-2O-O5 | 4.0% | $\Delta n$ [589 nm, 20° C.]: | 0.1095 |
| CC-3-V | 18.0% | $\varepsilon_\parallel$ [1 kHz, 20° C.]: | 4.0 |
| CC-V-V1 | 21.5% | $\varepsilon_\perp$ [1 kHz, 20° C.]: | 7.5 |
| CCG-V-F | 5.0% | $\Delta\varepsilon$ [1 kHz, 20° C.]: | −3.5 |
| CLY-3-O2 | 6.5% | $K_1$ [pN, 20° C.]: | 12.9 |
| CPY-2-O2 | 14.5% | $K_3$ [pN, 20° C.]: | 15.3 |
| CPY-3-O2 | 9.5% | $V_0$ [V, 20° C.]: | 2.22 |
| CY-3-O2 | 15.0% | $\gamma_1$ [mPa s, 20° C.]: | 87 |
| PP-1-2V1 | 2.0% | | |
| Σ | 100.0% | | |

EXAMPLE 36

| | | | |
|---|---|---|---|
| B(S)-2O-O4 | 4.0% | Clearing point [° C.]: | 75 |
| B(S)-2O-O5 | 4.0% | $\Delta n$ [589 nm, 20° C.]: | 0.1095 |
| CC-3-V | 17.5% | $\varepsilon_\parallel$ [1 kHz, 20° C.]: | 4.0 |
| CC-V-V1 | 22.5% | $\varepsilon_\perp$ [1 kHz, 20° C.]: | 7.5 |
| CCG-V-F | 4.5% | $\Delta\varepsilon$ [1 kHz, 20° C.]: | −3.5 |
| CLY-3-O2 | 6.0% | $K_1$ [pN, 20° C.]: | 13.2 |
| CPY-2-O2 | 7.5% | $K_3$ [pN, 20° C.]: | 15.9 |
| CPY-3-O2 | 16.0% | $V_0$ [V, 20° C.]: | 2.25 |
| CY-3-O2 | 16.0% | $\gamma_1$ [mPa s, 20° C.]: | 88 |
| PP-1-2V1 | 2.0% | | |
| Σ | 100.0% | | |

EXAMPLE 37

| | | | |
|---|---|---|---|
| B(S)-2O-O4 | 2.0% | Clearing point [° C.]: | 74 |
| B(S)-2O-O5 | 4.0% | $\Delta n$ [589 nm, 20° C.]: | 0.1093 |
| CC-3-V | 32.5% | $\varepsilon_\parallel$ [1 kHz, 20° C.]: | 4.2 |
| CCG-V-F | 7.5% | $\varepsilon_\perp$ [1 kHz, 20° C.]: | 7.6 |
| CLY-3-O2 | 7.0% | $\Delta\varepsilon$ [1 kHz, 20° C.]: | −3.4 |
| CPY-2-O2 | 7.5% | $K_1$ [pN, 20° C.]: | 13.3 |
| CPY-3-O2 | 17.0% | $K_3$ [pN, 20° C.]: | 15.1 |
| CY-3-O2 | 18.0% | $V_0$ [V, 20° C.]: | 2.23 |
| PP-1-2V1 | 4.5% | $\gamma_1$ [mPa s, 20° C.]: | 94 |
| Σ | 100.0% | $\gamma_1$ [mPa s, 20° C.]: | |

EXAMPLE 38

| | | | |
|---|---|---|---|
| B(S)-2O-O4 | 2.0% | Clearing point [° C.]: | 74 |
| B(S)-2O-O5 | 4.0% | $\Delta n$ [589 nm, 20° C.]: | 0.1091 |
| CC-3-V | 32.5% | $\varepsilon_\parallel$ [1 kHz, 20° C.]: | 4.3 |
| CCG-V-F | 8.5% | $\varepsilon_\perp$ [1 kHz, 20° C.]: | 7.7 |
| CLY-3-O2 | 2.5% | $\Delta\varepsilon$ [1 kHz, 20° C.]: | −3.4 |
| CPY-2-O2 | 11.0% | $K_1$ [pN, 20° C.]: | 12.8 |
| CPY-3-O2 | 18.5% | $K_3$ [pN, 20° C.]: | 14.5 |
| CY-3-O2 | 18.5% | $V_0$ [V, 20° C.]: | 2.17 |
| PP-1-2V1 | 2.5% | $\gamma_1$ [mPa s, 20° C.]: | 95 |
| Σ | 100.0% | | |

EXAMPLE 39

| | | | |
|---|---|---|---|
| B(S)-2O-O4 | 2.0% | Clearing point [° C.]: | 74 |
| B(S)-2O-O5 | 4.0% | $\Delta n$ [589 nm, 20° C.]: | 0.1093 |
| CC-3-V | 29.5% | $\varepsilon_\parallel$ [1 kHz, 20° C.]: | 4.4 |
| CCG-V-F | 10.0% | $\varepsilon_\perp$ [1 kHz, 20° C.]: | 7.8 |
| CLY-3-O2 | 7.5% | $\Delta\varepsilon$ [1 kHz, 20° C.]: | −3.4 |
| CPY-2-O2 | 2.5% | $K_1$ [pN, 20° C.]: | 13.2 |
| CPY-3-O2 | 20.0% | $K_3$ [pN, 20° C.]: | 15.5 |
| CY-3-O2 | 20.0% | $V_0$ [V, 20° C.]: | 2.25 |
| PP-1-2V1 | 4.5% | | |
| Σ | 100.0% | | |

EXAMPLE 40

| | | | |
|---|---|---|---|
| B(S)-2O-O4 | 4.0% | Clearing point [° C.]: | 75 |
| B(S)-2O-O5 | 4.0% | $\Delta n$ [589 nm, 20° C.]: | 0.1248 |
| B(S)-2O-O6 | 1.0% | $\varepsilon_\parallel$ [1 kHz, 20° C.]: | 4.1 |
| CC-3-V | 38.5% | $\varepsilon_\perp$ [1 kHz, 20° C.]: | 7.1 |
| CC-3-V1 | 5.0% | $\Delta\varepsilon$ [1 kHz, 20° C.]: | −3.0 |
| CCG-V-F | 5.0% | $K_1$ [pN, 20° C.]: | 14.2 |
| CCP-V-1 | 3.0% | $K_3$ [pN, 20° C.]: | 12.9 |
| COB(S)-2-O4 | 6.0% | $V_0$ [V, 20° C.]: | 2.20 |
| CPY-3-O2 | 7.0% | $\gamma_1$ [mPa s, 20° C.]: | 81 |
| PGIY-2-O4 | 12.0% | | |
| PY-2-O2 | 7.5% | | |
| PYP-2-3 | 2.0% | | |
| PYP-2-4 | 5.0% | | |
| Σ | 100.0% | | |

EXAMPLE 41

| | | | |
|---|---|---|---|
| B(S)-2O-O4 | 4.0% | Clearing point [° C.]: | 75.5 |
| B(S)-2O-O5 | 4.0% | $\Delta n$ [589 nm, 20° C.]: | 0.1249 |
| B(S)-2O-O6 | 1.0% | $\varepsilon_\parallel$ [1 kHz, 20° C.]: | 3.9 |
| CC-3-V | 44.5% | $\varepsilon_\perp$ [1 kHz, 20° C.]: | 6.8 |
| CCG-V-F | 5.0% | $\Delta\varepsilon$ [1 kHz, 20° C.]: | −2.9 |
| COB(S)-2-O4 | 6.0% | $K_1$ [pN, 20° C.]: | 13.7 |
| CPY-3-O2 | 12.0% | $K_3$ [pN, 20° C.]: | 13.3 |
| PGIY-2-O4 | 6.0% | $V_0$ [V, 20° C.]: | 2.26 |
| PY-3-O2 | 7.0% | $\gamma_1$ [mPa s, 20° C.]: | 80 |
| PYP-2-3 | 10.5% | | |
| Σ | 100.0% | | |

EXAMPLE 42

| | | | |
|---|---|---|---|
| B(S)-2O-O4 | 4.0% | Clearing point [° C.]: | 75.5 |
| B(S)-2O-O5 | 4.0% | $\Delta n$ [589 nm, 20° C.]: | 0.1094 |
| CC-3-V | 2.5% | $\varepsilon_\parallel$ [1 kHz, 20° C.]: | 4.0 |
| CC-V-V1 | 40.0% | $\varepsilon_\perp$ [1 kHz, 20° C.]: | 7.4 |
| CCG-V-F | 5.0% | $\Delta\varepsilon$ [1 kHz, 20° C.]: | −3.4 |
| CLY-3-O2 | 5.5% | $K_1$ [pN, 20° C.]: | 12.5 |
| CPY-2-O2 | 19.0% | $K_3$ [pN, 20° C.]: | 15.6 |
| CPY-3-O2 | 5.0% | $V_0$ [V, 20° C.]: | 2.25 |
| CY-3-O2 | 15.0% | $\gamma_1$ [mPa s, 20° C.]: | 85 |
| Σ | 100.0% | $\gamma_1$ [mPa s, 20° C.]: | |

EXAMPLE 43

| | | | |
|---|---|---|---|
| B(S)-2O-O4 | 4.0% | Clearing point [° C.]: | 75.5 |
| B(S)-2O-O5 | 4.0% | Δn [589 nm, 20° C.]: | 0.1092 |
| B(S)-2O-O6 | 4.0% | $\varepsilon_{\parallel}$ [1 kHz, 20° C.]: | 4.0 |
| CC-3-V | 5.5% | $\varepsilon_{\perp}$ [1 kHz, 20° C.]: | 7.3 |
| CC-V-V1 | 40.5% | Δε [1 kHz, 20° C.]: | −3.3 |
| CCG-V-F | 5.0% | $K_1$ [pN, 20° C.]: | 12.8 |
| CLY-3-O2 | 5.5% | $K_3$ [pN, 20° C.]: | 15.7 |
| CPY-2-O2 | 14.0% | $V_0$ [V, 20° C.]: | 2.29 |
| CPY-3-O2 | 6.0% | $\gamma_1$ [mPa s, 20° C.]: | 79 |
| CY-3-O2 | 11.5% | | |
| Σ | 100.0% | | |

EXAMPLE 44

| | | | |
|---|---|---|---|
| B(S)-2O-O4 | 4.0% | Clearing point [° C.]: | 94.9 |
| B(S)-2O-O5 | 4.0% | Δn [589 nm, 20° C.]: | 0.1047 |
| CC-3-V | 39.0% | $\varepsilon_{\parallel}$ [1 kHz, 20° C.]: | 3.4 |
| CC-3-V1 | 7.0% | $\varepsilon_{\perp}$ [1 kHz, 20° C.]: | 6.3 |
| CCP-3-1 | 3.0% | Δε [1 kHz, 20° C.]: | −2.9 |
| CLY-3-O2 | 6.0% | $K_1$ [pN, 20° C.]: | 17.4 |
| CLY-3-O3 | 6.0% | $K_3$ [pN, 20° C.]: | 17.8 |
| CLY-4-O2 | 6.0% | $V_0$ [V, 20° C.]: | 2.62 |
| CLY-5-O2 | 4.0% | $\gamma_1$ [mPa s, 20° C.]: | 103 |
| CPY-3-O2 | 10.0% | | |
| CY-3-O2 | 3.0% | | |
| PGIY-2-O4 | 4.0% | | |
| PYP-2-3 | 1.0% | | |
| CCG-V-F | 3.0% | | |
| Σ | 100.0% | | |

EXAMPLE 45

Mixture according to Example 44 is stabilized with 0.04% of the compound of formula

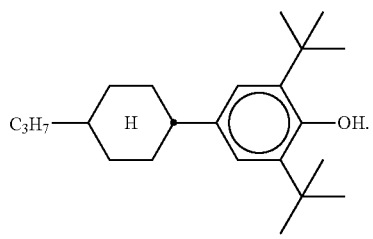

EXAMPLE 46

| | | | |
|---|---|---|---|
| CLY-3-O2 | 6.0% | Clearing point [° C.]: | 74.8 |
| CLY-3-O3 | 6.0% | Δn [589 nm, 20° C.]: | 0.1023 |
| CLY-4-O2 | 4.0% | $\varepsilon_{\parallel}$ [1 kHz, 20° C.]: | 3.9 |
| CY-3-O2 | 11.5% | $\varepsilon_{\perp}$ [1 kHz, 20° C.]: | 7.3 |
| CPY-3-O2 | 5.5% | Δε [1 kHz, 20° C.]: | −3.4 |
| B(S)-2O-O4 | 4.0% | $K_1$ [pN, 20° C.]: | 13.7 |
| B(S)-2O-O5 | 4.0% | $K_3$ [pN, 20° C.]: | 13.9 |
| B(S)-2O-O6 | 3.5% | $V_0$ [V, 20° C.]: | 2.10 |
| PGIY-2-O4 | 7.0% | $\gamma_1$ [mPa s, 20° C.]: | 81 |
| CC-3-V | 44.5% | | |
| CCG-V-F | 4.0% | | |
| Σ | 100.0% | | |

EXAMPLE 47

Mixture according to Example 48 is stabilized with 0.04% of the compound of formula

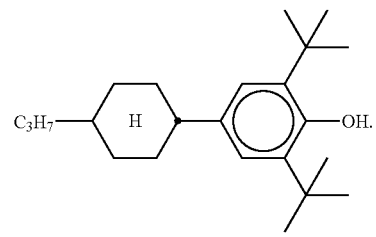

EXAMPLE 48

| | | | |
|---|---|---|---|
| CLY-3-O2 | 6.0% | Clearing point [° C.]: | 75 |
| CLY-3-O3 | 2.0% | Δn [589 nm, 20° C.]: | 0.1047 |
| CLY-4-O2 | 4.0% | $\varepsilon_{\parallel}$ [1 kHz, 20° C.]: | 3.8 |
| CY-3-O2 | 11.5% | $\varepsilon_{\perp}$ [1 kHz, 20° C.]: | 7.3 |
| CPY-2-O2 | 2.0% | Δε [1 kHz, 20° C.]: | −3.5 |
| CPY-3-O2 | 9.0% | $K_1$ [pN, 20° C.]: | 13.6 |
| B(S)-2O-O4 | 4.0% | $K_3$ [pN, 20° C.]: | 14.0 |
| B(S)-2O-O5 | 4.0% | $V_0$ [V, 20° C.]: | 2.09 |
| B(S)-2O-O6 | 3.0% | $\gamma_1$ [mPa s, 20° C.]: | 80 |
| PGIY-2-O4 | 7.0% | | |
| CC-3-V | 44.5% | | |
| CCG-V-F | 3.0% | | |
| Σ | 100.0% | | |

EXAMPLE 49

Mixture according to Example 48 is stabilized with 0.04% of the compound of formula

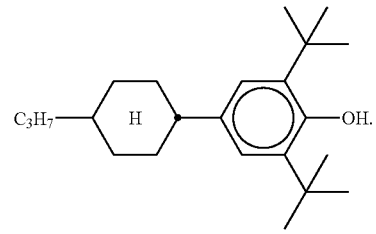

EXAMPLE 50

| Component | % | Property | Value |
|---|---|---|---|
| B(S)-5Cy-O2 | 4.0% | Clearing point [° C.]: | 73.5 |
| B(S)-2O-O5 | 4.0% | Δn [589 nm, 20° C.]: | 0.1045 |
| B(S)-2O-O6 | 4.0% | Δε [1 kHz, 20° C.]: | −3.0 |
| CC-3-V | 48.5% | $K_1$ [pN, 20° C.]: | 13.9 |
| CCG-V-F | 5.0% | $K_3$ [pN, 20° C.]: | 14.2 |
| CLY-3-O2 | 8.0% | $\gamma_1$ [mPa s, 20° C.]: | 74 |
| CLY-4-O2 | 5.0% | | |
| CPY-2-O2 | 2.0% | | |
| CPY-3-O2 | 8.0% | | |
| PGIY-2-O4 | 2.0% | | |
| PY-1-O2 | 9.5% | | |
| Σ | 100.0% | | |

EXAMPLE 51

| Component | % | Property | Value |
|---|---|---|---|
| B(S)-5Cy-O4 | 4.0% | Clearing point [° C.]: | 73.0 |
| B(S)-2O-O5 | 4.0% | Δn [589 nm, 20° C.]: | 0.1042 |
| B(S)-2O-O6 | 4.0% | Δε [1 kHz, 20° C.]: | −2.9 |
| CC-3-V | 48.5% | $K_1$ [pN, 20° C.]: | 13.8 |
| CCG-V-F | 5.0% | $K_3$ [pN, 20° C.]: | 14.0 |
| CLY-3-O2 | 8.0% | $\gamma_1$ [mPa s, 20° C.]: | 74 |
| CLY-4-O2 | 5.0% | | |
| CPY-2-O2 | 2.0% | | |
| CPY-3-O2 | 8.0% | | |
| PGIY-2-O4 | 2.0% | | |
| PY-1-O2 | 9.5% | | |
| Σ | 100.0% | | |

EXAMPLE 52

| Component | % | Property | Value |
|---|---|---|---|
| B(S)-5Cy-O2 | 4.0% | Clearing point [° C.]: | 73.0 |
| B(S)-5Cy-O4 | 4.0% | Δn [589 nm, 20° C.]: | 0.1041 |
| B(S)-2O-O6 | 4.0% | Δε [1 kHz, 20° C.]: | −2.9 |
| CC-3-V | 48.5% | $K_1$ [pN, 20° C.]: | 13.9 |
| CCG-V-F | 5.0% | $K_3$ [pN, 20° C.]: | 14.0 |
| CLY-3-O2 | 8.0% | $\gamma_1$ [mPa s, 20° C.]: | 77 |
| CLY-4-O2 | 5.0% | | |
| CPY-2-O2 | 2.0% | | |
| CPY-3-O2 | 8.0% | | |
| PGIY-2-O4 | 2.0% | | |
| PY-1-O2 | 9.5% | | |
| Σ | 100.0% | | |

EXAMPLE 53

| Component | % | Property | Value |
|---|---|---|---|
| B(S)-5Cy-O2 | 6.0% | Clearing point [° C.]: | 72.5 |
| B(S)-5Cy-O4 | 6.0% | Δn [589 nm, 20° C.]: | 0.1036 |
| CC-3-V | 48.5% | Δε [1 kHz, 20° C.]: | −2.8 |
| CCG-V-F | 5.0% | $K_1$ [pN, 20° C.]: | 13.7 |
| CLY-3-O2 | 8.0% | $K_3$ [pN, 20° C.]: | 13.8 |
| CLY-4-O2 | 5.0% | $\gamma_1$ [mPa s, 20° C.]: | 79 |
| CPY-2-O2 | 2.0% | | |
| CPY-3-O2 | 8.0% | | |
| PGIY-2-O4 | 2.0% | | |
| PY-1-O2 | 9.5% | | |
| Σ | 100.0% | | |

EXAMPLE 54

| Component | % | Property | Value |
|---|---|---|---|
| B(S)-2O-O4 | 4.0% | Clearing point [° C.]: | 76.0 |
| B(S)-2O-O5 | 4.0% | Δn [589 nm, 20° C.]: | 0.1016 |
| B(S)-2O-O6 | 4.0% | Δε [1 kHz, 20° C.]: | −3.0 |
| CC-3-V | 48.5% | $K_1$ [pN, 20° C.]: | 15.1 |
| CCG-V-F | 5.0% | $K_3$ [pN, 20° C.]: | 15.1 |
| CLY-3-O2 | 8.0% | $\gamma_1$ [mPa s, 20° C.]: | 82 |
| CLY-4-O2 | 5.0% | | |
| CPY-2-O2 | 2.0% | | |
| CPY-3-O2 | 8.0% | | |
| PGIY-2-O4 | 2.0% | | |
| LY-5Cy-O2 | 9.5% | | |
| Σ | 100.0% | | |

EXAMPLE 55

| Component | % | Property | Value |
|---|---|---|---|
| B(S)-2O-O4 | 4.0% | Clearing point [° C.]: | 74 |
| B(S)-2O-O5 | 4.0% | Δn [589 nm, 20° C.]: | 0.1050 |
| B(S)-2O-O6 | 4.0% | Δε [1 kHz, 20° C.]: | −3.0 |
| CC-3-V | 48.5% | $K_1$ [pN, 20° C.]: | 14.0 |
| CCG-V-F | 5.0% | $K_3$ [pN, 20° C.]: | 14.5 |
| CLY-3-O2 | 8.0% | $\gamma_1$ [mPa s, 20° C.]: | 77 |
| CLY-5Cy-O2 | 5.0% | | |
| CPY-2-O2 | 2.0% | | |
| CPY-3-O2 | 8.0% | | |
| PGIY-2-O4 | 2.0% | | |
| PY-1-O2 | 9.5% | | |
| Σ | 100.0% | | |

EXAMPLE 56

| Component | % | Property | Value |
|---|---|---|---|
| B(S)-2O-O4 | 4.0% | Clearing point [° C.]: | 74 |
| B(S)-2O-O5 | 4.0% | Δn [589 nm, 20° C.]: | 0.1024 |
| B(S)-2O-O6 | 4.0% | Δε [1 kHz, 20° C.]: | −3.2 |
| CC-3-V | 48.5% | $K_1$ [pN, 20° C.]: | 13.4 |
| CCG-V-F | 5.0% | $K_3$ [pN, 20° C.]: | 14.2 |
| CCOY-3-O2 | 8.0% | $\gamma_1$ [mPa s, 20° C.]: | 75 |
| CLY-4-O2 | 5.0% | | |
| CPY-2-O2 | 2.0% | | |
| CPY-3-O2 | 8.0% | | |
| PGIY-2-O4 | 2.0% | | |
| PY-1-O2 | 9.5% | | |
| Σ | 100.0% | | |

EXAMPLE 57

| Component | % | Property | Value |
|---|---|---|---|
| B(S)-2O-O4 | 4.0% | Clearing point [° C.]: | 73.5 |
| B(S)-2O-O5 | 4.0% | Δn [589 nm, 20° C.]: | 0.1048 |
| B(S)-2O-O6 | 4.0% | $\varepsilon_\parallel$ [1 kHz, 20° C.]: | 3.9 |
| CC-3-V | 48.5% | $\varepsilon_\perp$ [1 kHz, 20° C.]: | 6.9 |
| CC1G-V-F | 5.0% | Δε [1 kHz, 20° C.]: | −3.0 |
| CLY-3-O2 | 8.0% | $K_1$ [pN, 20° C.]: | 13.8 |
| CLY-4-O2 | 5.0% | $K_3$ [pN, 20° C.]: | 14.5 |
| CPY-2-O2 | 2.0% | | |
| CPY-3-O2 | 8.0% | | |
| PGIY-2-O4 | 2.0% | | |
| PY-1-O2 | 9.5% | | |
| Σ | 100.0% | | |

EXAMPLE 58

| | | | |
|---|---|---|---|
| CY-5-O2 | 7.5% | Clearing point [° C.]: | 80.3 |
| PY-3-O2 | 5.0% | $\Delta n$ [589 nm, 20° C.]: | 0.1049 |
| CY-3-O2 | 7.0% | $\Delta\varepsilon$ [1 kHz, 20° C.]: | −3.9 |
| CLY-3-O2 | 6.0% | $K_1$ [pN, 20° C.]: | 14.5 |
| CLY-3-O3 | 6.0% | $K_3$ [pN, 20° C.]: | 15.5 |
| CLY-2-O4 | 4.0% | $V_0$ [V, 20° C.] | 2.09 |
| CLY-4-O2 | 3.0% | $\gamma_1$ [mPa s, 20° C.]: | 110 |
| CPY-2-O2 | 7.0% | | |
| CPY-3-O2 | 9.0% | | |
| B-2O-O5 | 5.0% | | |
| CC-3-V | 27.0% | | |
| CCP-V-1 | 5.0% | | |
| CC-3-V1 | 5.5% | | |
| CCG-V-F | 3.0% | | |
| Σ | 100.0% | | |

EXAMPLE 59

| | | | |
|---|---|---|---|
| CC-3-V | 32.0% | Clearing point [° C.]: | 81.6 |
| CC-3-V1 | 5.0% | $\Delta n$ [589 nm, 20° C.]: | 0.1099 |
| CY-3-O2 | 15.0% | $\Delta\varepsilon$ [1 kHz, 20° C.]: | −4.4 |
| CCY-3-O1 | 3.0% | $K_1$ [pN, 20° C.]: | 15.0 |
| CCY-3-O2 | 8.0% | $K_3$ [pN, 20° C.]: | 16.5 |
| CLY-3-O2 | 8.0% | $V_0$ [V, 20° C.] | 2.05 |
| CPY-3-O2 | 9.0% | $\gamma_1$ [mPa s, 20° C.]: | 113 |
| PGIY-2-O4 | 6.0% | | |
| B(S)-2O-O4 | 4.0% | | |
| B(S)-2O-O5 | 4.0% | | |
| B(S)-2O-O6 | 3.0% | | |
| BCH-3F.F | 3.0% | | |
| Σ | 100.0% | | |

EXAMPLE 60

| | | | |
|---|---|---|---|
| CC-3-V | 30.0% | Clearing point [° C.]: | 82.7 |
| CC-3-V1 | 4.0% | $\Delta n$ [589 nm, 20° C.]: | 0.1102 |
| CY-3-O2 | 16.0% | $\Delta\varepsilon$ [1 kHz, 20° C.]: | −4.2 |
| CCY-3-O1 | 4.0% | $K_1$ [pN, 20° C.]: | 15.0 |
| CCY-3-O2 | 8.0% | $K_3$ [pN, 20° C.]: | 16.6 |
| CLY-3-O2 | 8.0% | $V_0$ [V, 20° C.] | 2.10 |
| CPY-3-O2 | 9.0% | $\gamma_1$ [mPa s, 20° C.]: | 118 |
| PGIY-2-O4 | 4.0% | | |
| B(S)-2O-O4 | 4.0% | | |
| B(S)-2O-O5 | 4.0% | | |
| B(S)-2O-O6 | 3.0% | | |
| BCH-3F.F | 6.0% | | |
| Σ | 100.0% | | |

EXAMPLE 61

| | | | |
|---|---|---|---|
| CC-3-V | 30.0% | Clearing point [° C.]: | 81.8 |
| CC-3-V1 | 5.0% | $\Delta n$ [589 nm, 20° C.]: | 0.12982 |
| CC-4-V1 | 4.0% | $\Delta\varepsilon$ [1 kHz, 20° C.]: | −4.0 |
| PY-3-O2 | 10.0% | $K_1$ [pN, 20° C.]: | 15.9 |
| PYP-2-3 | 6.0% | $K_3$ [pN, 20° C.]: | 15.2 |
| CPY-2-O2 | 8.0% | $V_0$ [V, 20° C.] | 2.06 |
| CPY-3-O2 | 8.0% | $\gamma_1$ [mPa s, 20° C.]: | 109 |
| CLY-3-O2 | 6.0% | | |
| CLY-4-O2 | 4.0% | | |
| PGIY-2-O4 | 4.0% | | |
| B(S)-2O-O4 | 4.0% | | |
| B(S)-2O-O5 | 5.0% | | |
| B(S)-2O-O6 | 4.0% | | |
| BCH-3F.F | 2.0% | | |
| Σ | 100.0% | | |

EXAMPLE 62

Mixture according to Example 61 is stabilized with 0.04% of the compound of formula

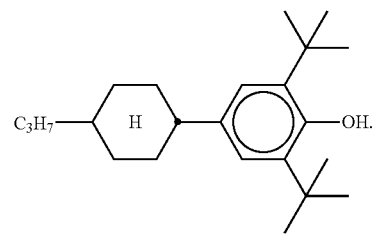

EXAMPLE 63

Mixture according to Example 61 is stabilized with 0.04% of the compound of formula

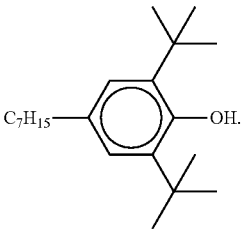

EXAMPLE 64

| | | | |
|---|---|---|---|
| B(S)-2O-O4 | 4.0% | Clearing point [° C.]: | 76.1 |
| B(S)-2O-O5 | 4.0% | $\Delta n$ [589 nm, 20° C.]: | 0.1249 |
| B(S)-2O-O6 | 3.0% | $\Delta\varepsilon$ [1 kHz, 20° C.]: | −2.0 |
| COB(S)-2-O4 | 3.0% | $K_1$ [pN, 20° C.]: | 14.3 |
| CPY-3-O2 | 8.5% | $K_3$ [pN, 20° C.]: | 13.4 |
| PGIY-2-O4 | 7.5% | $V_0$ [V, 20° C.] | 2.69 |
| PYP-2-3 | 10.0% | $\gamma_1$ [mPa s, 20° C.]: | 72 |
| PYP-2-4 | 3.5% | | |
| CC-3-V | 44.0% | | |
| CC-3-V1 | 3.0% | | |
| PP-1-2V1 | 3.5% | | |
| CCG-V-F | 6.0% | | |
| Σ | 100.0% | | |

EXAMPLE 65

Mixture according to Example 64 is stabilized with 0.04% of the compound of formula

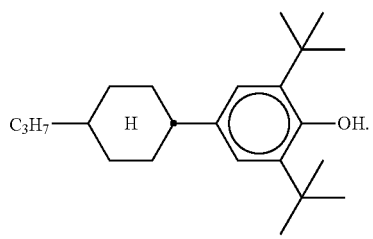

EXAMPLE 66

Mixture according to Example 64 is stabilized with 0.04% of the compound of formula

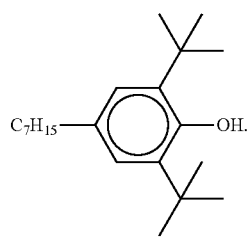

EXAMPLE 67

| | | | |
|---|---|---|---|
| B(S)-2O-O4 | 4.0% | Clearing point [° C.]: | 94.9 |
| B(S)-2O-O5 | 4.0% | Δn [589 nm, 20° C.]: | 0.1047 |
| CC-3-V | 39.0% | Δε [1 kHz, 20° C.]: | −2.9 |
| CC-3-V1 | 7.0% | $K_1$ [pN, 20° C.]: | 17.4 |
| CCP-3-1 | 3.0% | $K_3$ [pN, 20° C.]: | 17.8 |
| CLY-3-O2 | 6.0% | $V_0$ [V, 20° C.] | 2.62 |
| CLY-3-O3 | 6.0% | $\gamma_1$ [mPa s, 20° C.]: | 103 |
| CLY-4-O2 | 6.0% | | |
| CLY-5-O2 | 4.0% | | |
| CPY-3-O2 | 10.0% | | |
| CY-3-O2 | 3.0% | | |
| PGIY-2-O4 | 4.0% | | |
| PYP-2-3 | 1.0% | | |
| CCG-V-F | 3.0% | | |
| Σ | 100.0% | | |

EXAMPLE 68

Mixture according to Example 67 is stabilized with 0.04% of the compound of formula

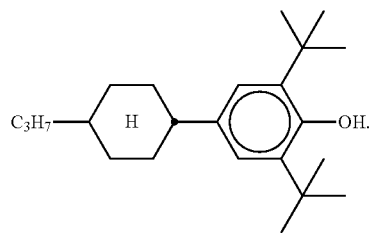

EXAMPLE 69

Mixture according to Example 67 is stabilized with 0.04% of the compound of formula

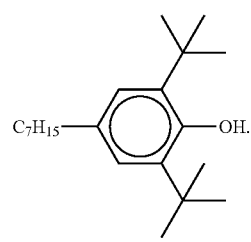

EXAMPLE 70

Mixture according to Example 67 is stabilized with 0.04% of the compound of formula

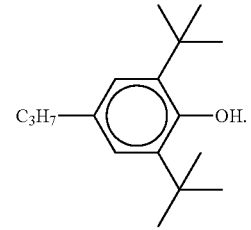

EXAMPLE 71

| | | | |
|---|---|---|---|
| B(S)-2O-O4 | 4.0% | Clearing point [° C.]: | 73.5 |
| B(S)-2O-O5 | 4.0% | Δn [589 nm, 20° C.]: | 0.1048 |
| B(S)-2O-O6 | 4.0% | Δε [1 kHz, 20° C.]: | −3.0 |
| CC-3-V | 48.5% | $K_1$ [pN, 20° C.]: | 13.5 |
| CCG-V-F | 5.0% | $K_3$ [pN, 20° C.]: | 14.3 |

|  |  |  |  |
|---|---|---|---|
| CLY-3-O2 | 8.0% | γ₁ [mPa s, 20° C.]: | 70 |
| CCY-V-O2 | 5.0% |  |  |
| CPY-2-O2 | 2.0% |  |  |
| CPY-3-O2 | 8.0% |  |  |
| PGIY-2-O4 | 2.0% |  |  |
| PY-1-O2 | 9.5% |  |  |
| Σ | 100.0% |  |  |

EXAMPLE 72

Mixture according to Example 71 is stabilized with 0.04% of the compound of formula

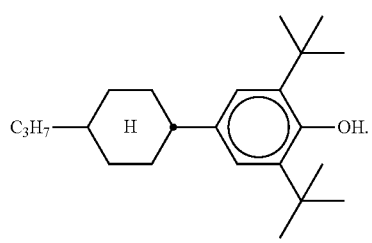

EXAMPLE 73

Mixture according to Example 71 is stabilized with 0.04% of the compound of formula

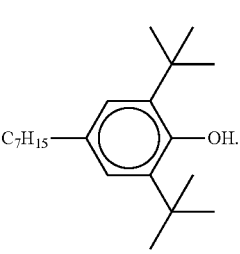

EXAMPLE 74

Mixture according to Example 71 is stabilized with 0.04% of the compound of formula

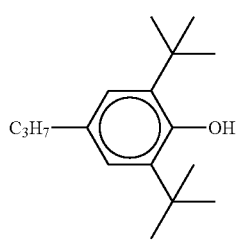

EXAMPLE 75

| | | | |
|---|---|---|---|
| B(S)-2O-O4 | 4.0% | Clearing point [° C.]: | 73.0 |
| B(S)-2O-O5 | 4.0% | Δn [589 nm, 20° C.]: | 0.1054 |
| B(S)-2O-O6 | 4.0% | Δε [1 kHz, 20° C.]: | −2.9 |
| CC-3-V | 48.5% | K₁ [pN, 20° C.]: | 13.5 |
| CCG-V-F | 5.0% | K₃ [pN, 20° C.]: | 13.8 |
| CLY-3-O2 | 8.0% | γ₁ [mPa s, 20° C.]: | 69 |
| CLY-4-O2 | 5.0% | | |
| CPY-V-O2 | 5.0% | | |
| CPY-V-O4 | 5.0% | | |
| PGIY-2-O4 | 2.0% | | |
| PY-1-O2 | 9.5% | | |
| Σ | 100.0% | | |

EXAMPLE 76

Mixture according to Example 75 is stabilized with 0.04% of the compound of formula

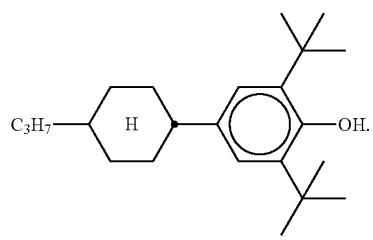

EXAMPLE 77

Mixture according to Example 75 is stabilized with 0.04% of the compound of formula

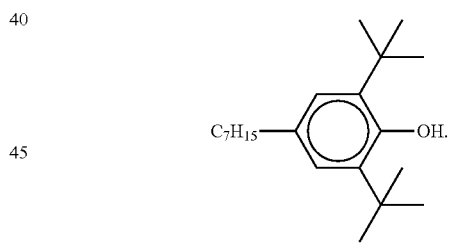

EXAMPLE 78

Mixture according to Example 75 is stabilized with 0.04% of the compound of formula

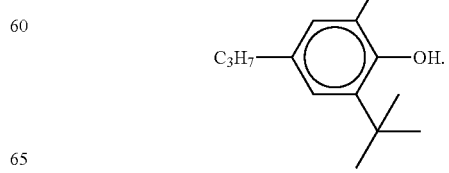

EXAMPLE 79

| | | | |
|---|---|---|---|
| B(S)-2O-O4 | 4.0% | Clearing point [° C.]: | 74.0 |
| B(S)-2O-O5 | 4.0% | Δn [589 nm, 20° C.]: | 0.1048 |
| B(S)-2O-O6 | 4.0% | Δε [1 kHz, 20° C.]: | −2.9 |
| CC-3-V | 48.5 | $K_1$ [pN, 20° C.]: | 13.2 |
| CCG-V-F | 5.0% | $K_3$ [pN, 20° C.]: | 13.7 |
| CLY-3-O2 | 8.0% | $\gamma_1$ [mPa s, 20° C.]: | 67 |
| CCY-V-O2 | 5.0% | | |
| CPY-V-O2 | 5.0% | | |
| CPY-V-O4 | 5.0% | | |
| PGIY-2-O4 | 2.0% | | |
| PY-1-O2 | 4.5% | | |
| PY-V2-O2 | 5.0% | | |
| Σ | 100.0% | | |

EXAMPLE 80

Mixture according to Example 79 is stabilized with 0.04% of the compound of formula

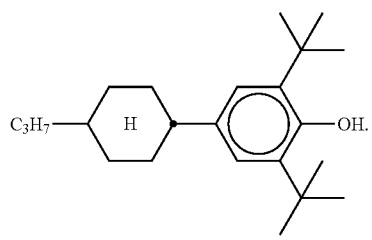

EXAMPLE 81

Mixture according to Example 79 is stabilized with 0.04% of the compound of formula

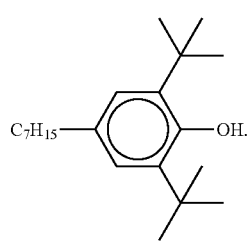

EXAMPLE 82

Mixture according to Example 79 is stabilized with 0.04% of the compound of formula

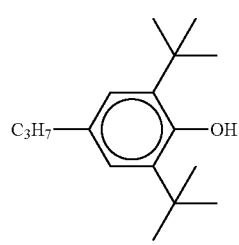

EXAMPLE 83

| | |
|---|---|
| B(S)-5Cy1O-O2 | 5.0% |
| B(S)-5Cy1O-O4 | 5.0% |
| CC-3-V | 49.5% |
| CCG-V-F | 5.0% |
| CLY-3-O2 | 8.0% |
| CLY-4-O2 | 5.0% |
| CPY-2-O2 | 3.0% |
| CPY-3-O2 | 8.0% |
| PGIY-2-O4 | 2.0% |
| PY-1-O2 | 9.5% |
| Σ | 100.0% |

EXAMPLE 84

Mixture according to Example 83 is stabilized with 0.04% of the compound of formula

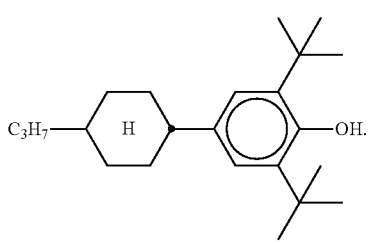

EXAMPLE 85

Mixture according to Example 83 is stabilized with 0.04% of the compound of formula

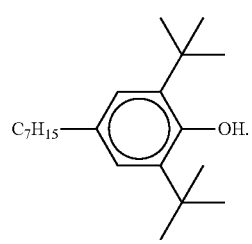

Mixture examples 3 to 85 show a reduced or even no flicker while maintaining relatively high clearing points, high contrast and low rotational viscosities.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A liquid crystal (LC) medium having negative dielectric anisotropy and comprising
one or more compounds of formula C1 and one or more compounds of formula G

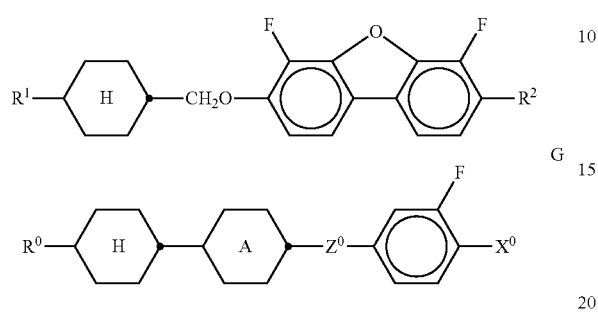

in which the individual radicals, on each occurrence identically or differently, and each, independently of one another, have the following meanings:

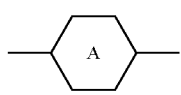

denotes

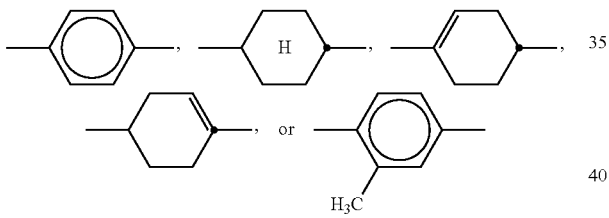

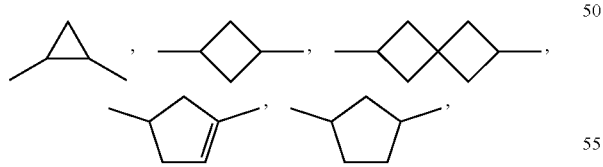

$R^0$, $R^1$ and $R^2$ denote a straight chain alkyl or alkoxy radical having 1 to 15 C atoms or a branched alkyl or alkoxy radical having 3 to 15 C atoms, in which one or more $CH_2$ groups may each be replaced, independently of one another, by —C≡C-, —CF$_2$O-, —OCF$_2$-, —CH=CH—, —O—, —CO—O— or —O-CO— in such a way that O atoms are not linked directly to one another, and in which one or more H atoms may be replaced by halogen $X^0$ denotes F, Cl, CN, SF$_5$, SCN, NCS, a halogenated alkyl radical, a halogenated alkenyl radical, a halogenated alkoxy radical or a halogenated alkenyloxy radical having 1 to 6 C atoms, and $Z^0$ denotes a single bond, —C$_2$H$_4$-, —CH$_2$O-, —CF$_2$O-, or —CH=CH-;

and
one or more compounds selected from formulae ZK and DK

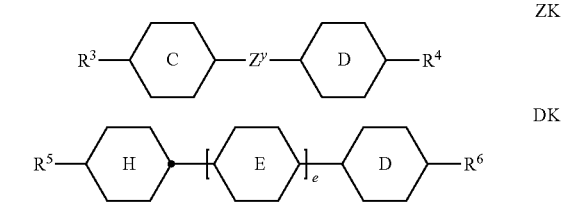

in which the individual radicals on each occurrence, identically or differently, have the following meanings:

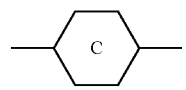

denotes

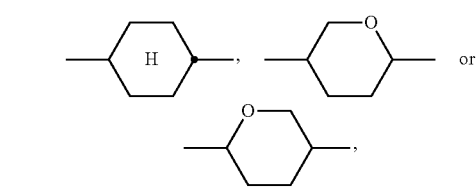

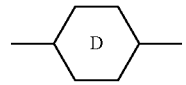

denotes

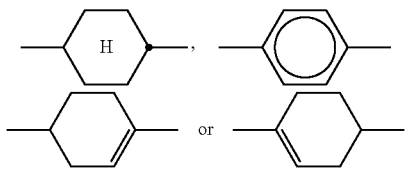

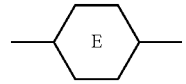

denotes

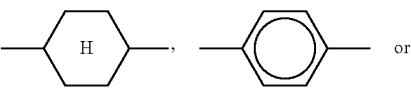

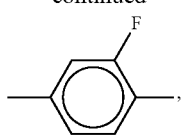

and

R³ and R⁴ each, independently of one another, denote alkyl having 1 to 12 C atoms, in which one or two non-adjacent CH₂ groups may be replaced by —O—, —CH-CH—, —CO—, —O—CO— or —CO—O— in such a way that O atoms are not linked directly to one another, $Z^y$ denotes —CH₂CH₂-, —CH=CH—, —CF₂O-, —OCF₂-, —CH₂O—, —OCH₂-, —COO—, —OCO-, —C₂F₄-, —CF=CF— or a single bond, R⁵ and R⁶ each, independently of one another, denote alkyl having 1 to 12 C atoms, in which one or two non-adjacent CH₂ groups may be replaced by —O—, —CH=CH—, —CO—, —OCO— or —COO— in such a way that O atoms are not linked directly to one another, and e denotes 1 or 2.

2. The LC medium according to claim 1, further comprising one or more compounds of formula B

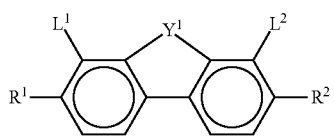

B in which the individual radicals, on each occurrence identically or differently, and each, independently of one another, have the following meanings:

R¹, R² denote a straight chain alkyl or alkoxy radical having 1 to 15 C atoms or a branched alkyl or alkoxy radical having 3 to 15 C atoms, in which one or more CH₂ groups may each be replaced, independently of one another, by

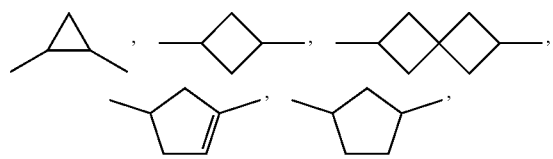

—C≡C—, —CF₂O-, —OCF₂-, —CH=CH—, —O—, —CO—O— or —O-CO— in such a way that O atoms are not linked directly to one another, and in which one or more H atoms may be replaced by halogen, L¹, L² denote F or Cl, and Y¹ denotes O, S or CH₂O.

3. The LC medium according to claim 2, wherein the one or more compounds of formula B are selected from the following formulae

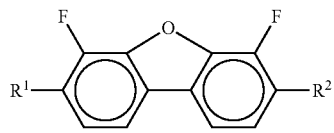

B1

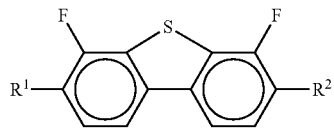

B2 wherein

R¹ and R² denote a straight chain alkyl or alkoxy radical having 1 to 15 C atoms or a branched alkyl or alkoxy radical having 3 to 15 C atoms, in which one or more CH₂ groups may each be replaced, independently of one another, by

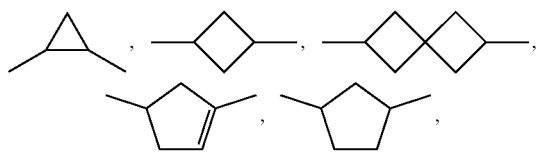

—C≡C—, —CF₂O-, —OCF₂-, —CH=CH—, —O—, —CO—O— or —O—CO— in such a way that O atoms are not linked directly to one another, and in which one or more H atoms may be replaced by halogen.

4. The LC medium according to claim 1, which additionally comprises one or more compounds selected from compounds of formula C2

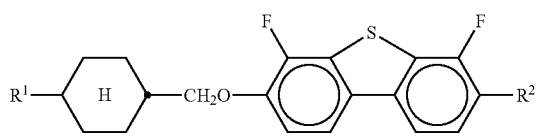

C2 wherein

R¹ and R² denote a straight chain alkyl or alkoxy radical having 1 to 15 C atoms or a branched alkyl or alkoxy radical having 3 to 15 C atoms, in which one or more CH₂ groups may each be replaced, independently of one another, by

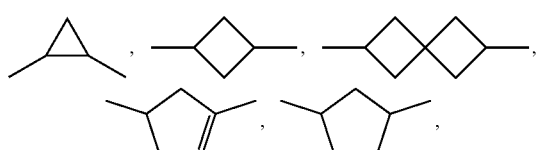

—C≡C—, —CF₂O-, —OCF₂-, —CH=CH—, —O—, —CO—O— or —O—CO— in such a way that O atoms are not linked directly to one another, and in which one or more H atoms may be replaced by halogen.

5. The LC medium according to claim 1, wherein the one or more compounds of formula G are selected from the following formulae

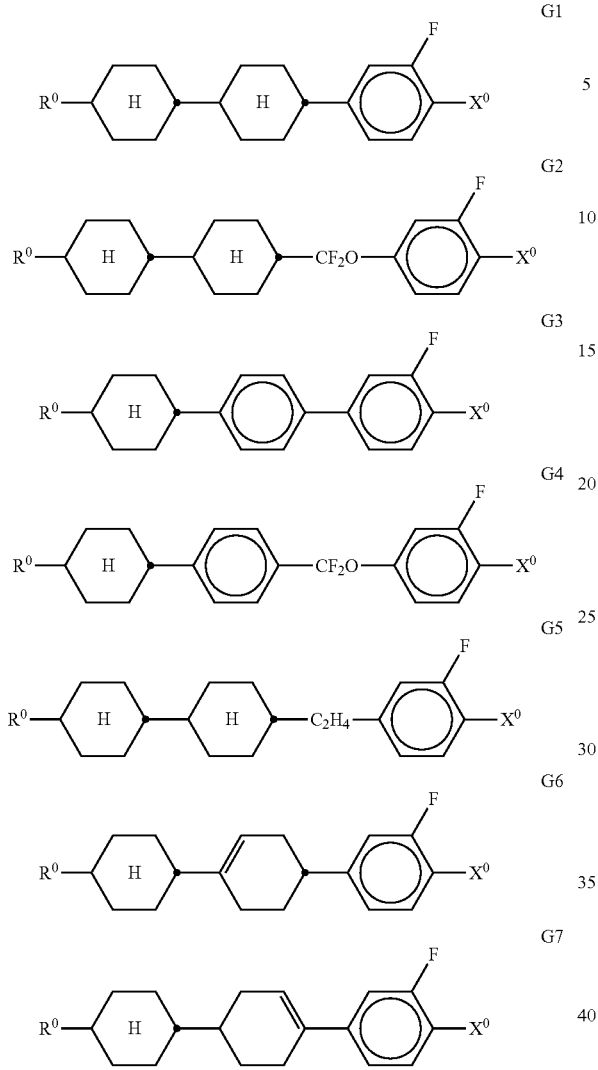

wherein

R⁰ denote a straight chain alkyl or alkoxy radical having 1 to 15 C atoms or a branched alkyl or alkoxy radical having 3 to 15 C atoms, in which one or more CH₂ groups may each be replaced, independently of one another, by

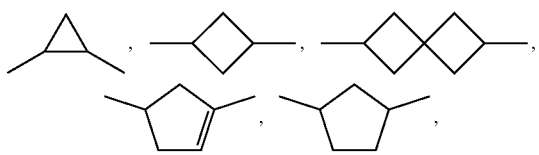

—C≡C—, —CF₂O—, —OCF₂—, —CH-CH—, —O—, —CO—O— or —O-CO— in such a way that O atoms are not linked directly to one another, and in which one or more H atoms may be replaced by halogen.

6. The LC medium according to claim 1, which additionally comprises one or more compounds selected from formulae CY and PY:

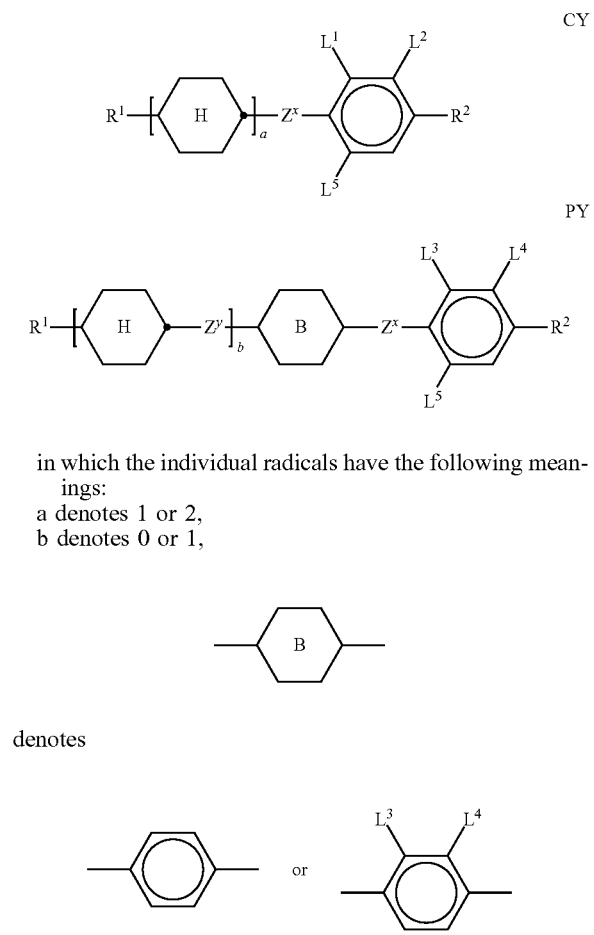

in which the individual radicals have the following meanings:
a denotes 1 or 2,
b denotes 0 or 1, denotes $R^1$ and $R^2$ each, independently of one another, denote alkyl having 1 to 12 C atoms, in which one or two non-adjacent CH₂ groups may be replaced by —O—, —CH-CH—, —CO—, —O—CO— or —CO—O— in such a way that O atoms are not linked directly to one another, $Z^x$ and $Z^y$ each, independently of one another, denotes —CH=CH—, —CH₂O-, —OCH₂-, —CF₂O-, —OCF₂-, —O—, —CH₂-, —CH₂CH₂— or a single bond, $L^{1-4}$ each, independently of one another, denote F, Cl, OCF₃, CF₃, CH₃, CH₂F, or CHF₂, and $L^5$ denotes H or CH₃.

7. The LC medium according to claim 1, which comprises one or more compounds selected from formula ZK and one or more compounds selected from formula DK.

8. The LC medium according to claim 1, which additionally comprises one or more compounds selected from the following formulae

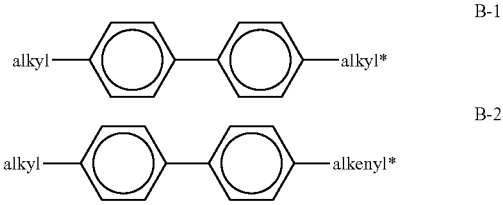

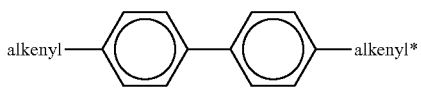

B-3 in which
alkyl and alkyl* each, independently of one another, denote a straight-chain alkyl radical having 1-6 C atoms, and
alkenyl and alkenyl* each, independently of one another, denote a straight-chain alkenyl radical having 2-6° C. atoms.

9. The LC medium according to claim 1, which additionally comprises one or more compounds of the following formula

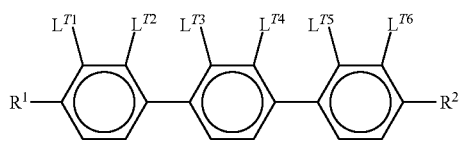

T in which the individual radicals, on each occurrence identically or differently, and each, independently of one another, have the following meaning
$R^1$, $R^2$ each, independently of one another, denote alkyl having 1 to 12 C atoms, in which one or two non-adjacent $CH_2$ groups may be replaced by —O—, —CH=CH—, —CO—, —O—CO— or —CO—O— in such a way that O atoms are not linked directly to one another, and
$L^{T1}$-$L^{T6}$ denote H, F or Cl, with at least one of $L^{T1}$ to $L^{T6}$ being F or Cl.

10. The LC medium according to claim 1, wherein
$R^5$ and $R^6$ each, independently of one another, denote alkyl or alkoxy having 1 to 6 C atoms.

11. A liquid crystal display comprising the LC medium of claim 1.

12. The LC display of claim 11, which is a VA, SA-VA, IPS, PS-IPS, FFS, PS-FFS, UB-FFS or PS-UB-FFS display.

13. A process of preparing an LC medium according to claim 1, comprising mixing one or more compounds of formula C1 with one or more compounds of formula G and one or more compounds selected from formulae ZK and DK, and optionally with further LC compounds and/or additives.

* * * * *